United States Patent
Kanna et al.

(10) Patent No.: US 8,918,792 B2
(45) Date of Patent: Dec. 23, 2014

(54) WORKFLOW MONITORING AND CONTROL SYSTEM, MONITORING AND CONTROL METHOD, AND MONITORING AND CONTROL PROGRAM

(75) Inventors: Yoshihiro Kanna, Tokyo (JP); Shinji Kikuchi, Tokyo (JP); Yohsuke Isozaki, Tokyo (JP)

(73) Assignee: NEC Corporation, Tokyo (JP)

( * ) Notice: Subject to any disclaimer, the term of this patent is extended or adjusted under 35 U.S.C. 154(b) by 211 days.

(21) Appl. No.: 13/263,771

(22) PCT Filed: May 13, 2010

(86) PCT No.: PCT/JP2010/058495
§ 371 (c)(1),
(2), (4) Date: Oct. 10, 2011

(87) PCT Pub. No.: WO2010/131778
PCT Pub. Date: Nov. 18, 2010

(65) Prior Publication Data
US 2012/0054768 A1  Mar. 1, 2012

(30) Foreign Application Priority Data
May 15, 2009  (JP) ................. 2009-119120

(51) Int. Cl.
G06F 9/46 (2006.01)
G06F 9/50 (2006.01)

(52) U.S. Cl.
CPC ............. *G06F 9/5016* (2013.01); *Y02B 60/142* (2013.01); *G06F 9/5027* (2013.01)
USPC ........... 718/104; 718/100; 718/102; 718/103; 718/107

(58) Field of Classification Search
None
See application file for complete search history.

(56) References Cited

U.S. PATENT DOCUMENTS

| | | | |
|---|---|---|---|
| 8,090,974 B1* | 1/2012 | Jain et al. | 714/3 |
| 2005/0149937 A1* | 7/2005 | Pilkington | 718/102 |
| 2006/0101467 A1* | 5/2006 | Buco et al. | 718/102 |
| 2006/0236368 A1* | 10/2006 | Raja et al. | 726/1 |
| 2008/0040630 A1* | 2/2008 | Travostino et al. | 714/11 |
| 2009/0122706 A1* | 5/2009 | Alfano et al. | 370/237 |
| 2010/0070422 A1* | 3/2010 | Kikuchi et al. | 705/301 |
| 2010/0242048 A1* | 9/2010 | Farney et al. | 718/104 |

FOREIGN PATENT DOCUMENTS

| | | |
|---|---|---|
| JP | 2004362449 A | 12/2004 |
| JP | 2007095078 A | 4/2007 |
| JP | 2008015958 A | 1/2008 |
| JP | 2008077266 A | 4/2008 |

OTHER PUBLICATIONS

International Search Report or PCT/JP2010/058495 mailed Jun. 5, 2010.

* cited by examiner

*Primary Examiner* — Emerson Puente
*Assistant Examiner* — Dong Kim
(74) *Attorney, Agent, or Firm* — Sughrue Mion, PLLC

(57) ABSTRACT

Disclosed are a workflow monitoring control system, method, and program, wherein, when workflows are executed by passing through processing sections, each provided with business application software, in order, the service quality of the workflows can be ensured in as many workflows as possible with limited computer resources. A workflow monitoring and control system connected to a plurality of processing sections each of which executes a unit process assigned respectively, a unit process being one of parts constituting business data processing, by using business application software and computer resources, comprises a workflow defining means, a service quality lower limit setting means, a service quality calculation means, a quality insufficiency judging means, a computer resource reallocation means.

14 Claims, 102 Drawing Sheets

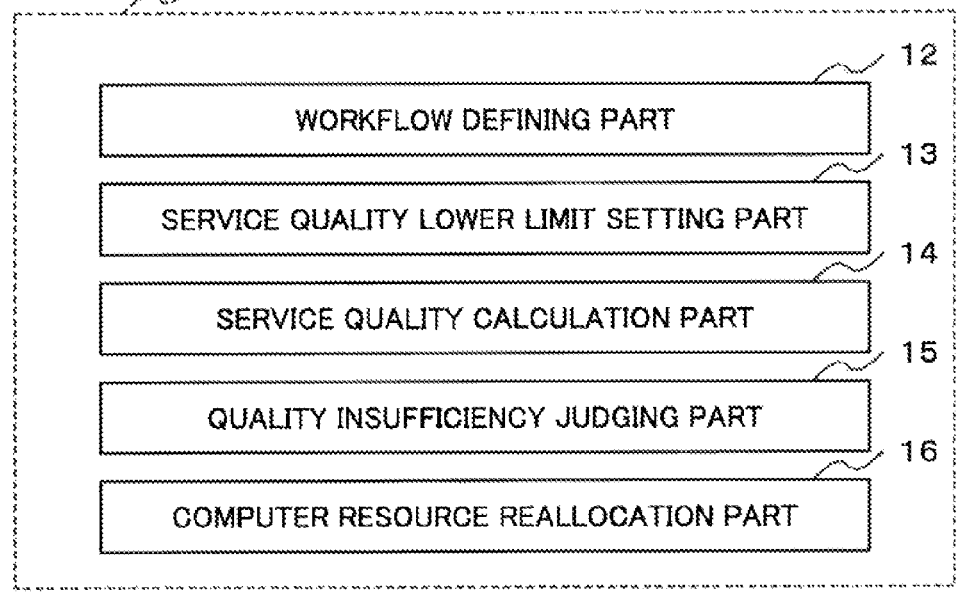
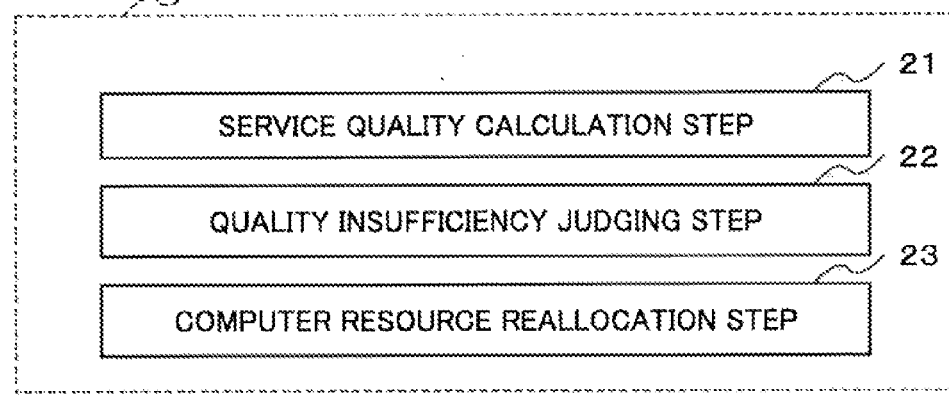
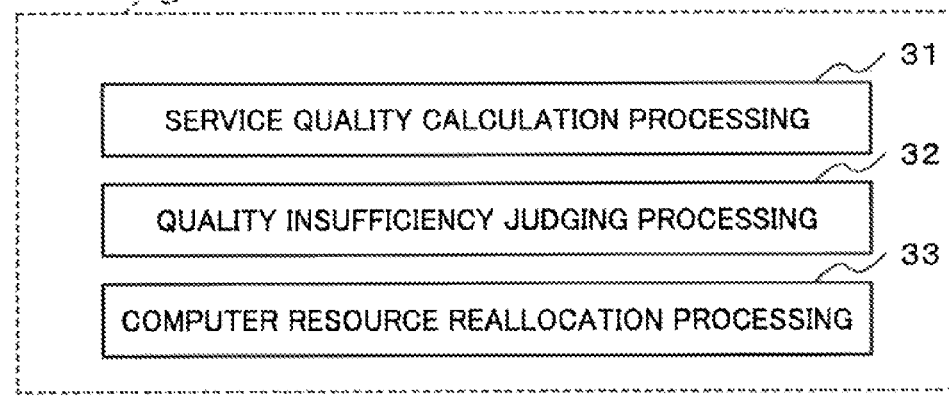

Fig.13

| | AMOUNT OF COMPUTER RESOURCES | | | | | | | | | |
|---|---|---|---|---|---|---|---|---|---|---|
| | 10 | 20 | 30 | 40 | 50 | 60 | 70 | 80 | 90 | 100 |
| FIRST BUSINESS APPLICATION | 10.000 | 5.000 | 3.333 | 3.000 | 2.800 | 2.700 | 2.600 | 2.500 | 2.500 | 2.500 |
| SECOND BUSINESS APPLICATION | 32.000 | 16.000 | 10.667 | 8.000 | 6.400 | 5.333 | 5.100 | 5.000 | 5.000 | 5.000 |
| THIRD BUSINESS APPLICATION | 75.000 | 37.500 | 25.000 | 18.750 | 15.000 | 12.500 | 10.714 | 9.375 | 8.333 | 7.500 |
| FOURTH BUSINESS APPLICATION | 60.000 | 30.000 | 20.000 | 15.000 | 12.000 | 10.000 | 8.571 | 7.500 | 6.667 | 6.000 |
| FIFTH BUSINESS APPLICATION | 20.000 | 10.000 | 6.667 | 5.000 | 4.000 | 3.600 | 3.300 | 3.100 | 3.000 | 3.000 |
| SIXTH BUSINESS APPLICATION | 40.000 | 20.000 | 13.333 | 10.000 | 8.000 | 6.667 | 5.714 | 5.000 | 4.800 | 4.700 |
| SEVENTH BUSINESS APPLICATION | 80.000 | 40.000 | 26.667 | 20.000 | 16.000 | 13.333 | 11.429 | 10.000 | 8.889 | 8.000 |

Fig.14

|  | AMOUNT OF COMPUTER RESOURCES |
|---|---:|
| FIRST BUSINESS APPLICATION | 20 |
| SECOND BUSINESS APPLICATION | 40 |
| THIRD BUSINESS APPLICATION | 50 |
| FOURTH BUSINESS APPLICATION | 50 |
| FIFTH BUSINESS APPLICATION | 40 |
| SIXTH BUSINESS APPLICATION | 40 |
| SEVENTH BUSINESS APPLICATION | 40 |

Fig.16

SYNTHESIZED WORKFLOW NUMBER

| | START | 203₁ START | 203₁ END | 203₂ START | 203₂ END | 203₃ START | 203₃ END | 203₄ START | 203₄ END | PROCESSING TIME | SERVICE LEVEL AGREEMENT |
|---|---|---|---|---|---|---|---|---|---|---|---|
| (a₁) | 605.093 | 605.093 | 610.093 | 610.093 | 618.093 | 625.102 | 640.102 | 640.102 | 652.102 | 47.009 | 120.000 |
| (b₁) | 609.832 | 610.093 | 615.093 | 618.093 | 626.093 | 655.102 | | | | | 120.000 |
| (c₁) | 615.433 | 615.433 | 620.433 | 626.093 | 634.093 | | | | | | 120.000 |
| (d₁) | 620.761 | 620.761 | 625.761 | 634.093 | 642.093 | | | | | | 120.000 |
| (e₁) | 624.892 | 625.761 | 630.761 | 642.093 | 650.093 | | | | | | 120.000 |
| (f₁) | 630.635 | 630.761 | 635.761 | 650.093 | 658.093 | | | | | | 120.000 |

SYNTHESIZED WORKFLOW NUMBER

| | START | 203₅ START | 203₅ END | 203₃ START | 203₃ END | 203₆ START | 203₆ END | 203₇ START | 203₇ END | PROCESSING TIME | SERVICE LEVEL AGREEMENT |
|---|---|---|---|---|---|---|---|---|---|---|---|
| (a₂) | 605.102 | 605.102 | 610.102 | 610.102 | 625.102 | 625.102 | 635.102 | 635.102 | 655.102 | | 150.000 |
| (b₂) | 615.286 | 615.286 | 620.286 | 640.102 | 655.102 | | | | | | 150.000 |
| (c₂) | 625.187 | 625.187 | 630.187 | | | | | | | | 150.000 |
| (d₂) | 634.443 | 634.443 | 639.443 | | | | | | | | 150.000 |
| (e₂) | 644.739 | 644.739 | 649.739 | | | | | | | | 90.000 |
| (f₂) | 655.181 | 655.181 | | | | | | | | | 150.000 |

Fig. 17

SYNTHESIZED WORKFLOW NUMBER

| | START | 203₁ START | 203₁ END | 203₂ START | 203₂ END | 203₃ START | 203₃ END | 203₄ START | 203₄ END | PROCESSING TIME | SERVICE LEVEL AGREEMENT |
|---|---|---|---|---|---|---|---|---|---|---|---|
| (a₁) | 605.093 | 605.093 | 610.093 | 610.093 | 618.093 | 625.102 | 640.102 | 640.102 | 652.102 | 47.009 | 120.000 |
| (b₁) | 609.832 | 610.093 | 615.093 | 618.093 | 626.093 | 655.102 | 670.102 | 670.102 | 682.102 | 72.270 | 120.000 |
| (c₁) | 615.433 | 615.433 | 620.433 | 626.093 | 634.093 | 700.102 | 715.102 | 715.102 | 727.102 | 111.669 | 120.000 |
| (d₁) | 620.761 | 620.761 | 625.761 | 634.093 | 642.093 | 730.102 | 745.102 | 745.102 | 757.102 | 136.341 | 120.000 |
| (e₁) | 624.892 | 625.761 | 630.761 | 642.093 | 650.093 | 745.102 | 760.102 | 760.102 | 772.102 | 147.210 | 120.000 |
| (f₁) | 630.635 | 630.761 | 635.761 | 650.093 | 658.093 | 715.102 | 730.102 | 730.102 | 742.102 | 111.467 | 120.000 |

SYNTHESIZED WORKFLOW NUMBER

| | START | 203₅ START | 203₅ END | 203₃ START | 203₃ END | 203₆ START | 203₆ END | 203₇ START | 203₇ END | PROCESSING TIME | SERVICE LEVEL AGREEMENT |
|---|---|---|---|---|---|---|---|---|---|---|---|
| (a₂) | 605.102 | 605.102 | 610.102 | 610.102 | 625.102 | 625.102 | 635.102 | 655.102 | 675.102 | 70.000 | 150.000 |
| (b₂) | 615.286 | 615.286 | 620.286 | 640.102 | 655.102 | 655.102 | 665.102 | 735.102 | 755.102 | 139.816 | 150.000 |
| (c₂) | 625.187 | 625.187 | 630.187 | 760.102 | 775.102 | 775.102 | 785.102 | 835.102 | 855.102 | 229.915 | 150.000 |
| (d₂) | 634.443 | 634.443 | 639.443 | 775.102 | 790.102 | 790.102 | 800.102 | 855.102 | 875.102 | 240.659 | 150.000 |
| (e₂) | 644.739 | 644.739 | 649.739 | 670.102 | 685.102 | 685.102 | 695.102 | 715.102 | 735.102 | 90.363 | 90.000 |
| (f₂) | 655.181 | 655.181 | 660.181 | 685.102 | 700.102 | 700.102 | 710.102 | 775.102 | 795.102 | 139.921 | 150.000 |

Fig. 18

| SYNTHESIZED WORKFLOW | EXPECTED WAITING TIME IMPROVING AMOUNT |
|---|---:|
| FIRST BUSINESS APPLICATION | 0.2895508 |
| SECOND BUSINESS APPLICATION | 3.9328 |
| THIRD BUSINESS APPLICATION | 74.7653333 |
| FOURTH BUSINESS APPLICATION | 0 |
| FIFTH BUSINESS APPLICATION | 0 |
| SIXTH BUSINESS APPLICATION | 0 |
| SEVENTH BUSINESS APPLICATION | 13 |

Fig.19

| | SYNTHESIZED WORKFLOW NUMBER | | | | | | | | | | | PROCESSING TIME | SERVICE LEVEL AGREEMENT |
|---|---|---|---|---|---|---|---|---|---|---|---|---|---|
| | START | 203₁ START | 203₁ END | 203₂ START | 203₂ END | 203₃ START | 203₃ END | 203₄ START | 203₄ END | | | | |
| (a₁) | 605.093 | 605.093 | 610.093 | 610.093 | 618.093 | 625.102 | 640.102 | 640.102 | 652.102 | | | 47.009 | 120.000 |
| (b₁) | 609.832 | 610.093 | 615.093 | 618.093 | 626.093 | 655.102 | 670.102 | 670.102 | 682.102 | | | 72.270 | 120.000 |
| (c₁) | 615.433 | 615.433 | 620.433 | 626.093 | 634.093 | 682.602 | 695.102 | 695.102 | 707.102 | | | 91.669 | 120.000 |
| (d₁) | 620.761 | 620.761 | 625.761 | 634.093 | 642.093 | 695.102 | 707.602 | 707.602 | 719.602 | | | 98.841 | 120.000 |
| (e₁) | 624.892 | 625.761 | 630.761 | 642.093 | 650.093 | 707.602 | 720.102 | 720.102 | 732.102 | | | 107.210 | 120.000 |
| (f₁) | 630.635 | 630.761 | 635.761 | 650.093 | 658.093 | 720.102 | 732.602 | 732.602 | 744.602 | | | 113.967 | 120.000 |

| | SYNTHESIZED WORKFLOW NUMBER | | | | | | | | | | | PROCESSING TIME | SERVICE LEVEL AGREEMENT |
|---|---|---|---|---|---|---|---|---|---|---|---|---|---|
| | START | 203₅ START | 203₅ END | 203₃ START | 203₃ END | 203₆ START | 203₆ END | 203₇ START | 203₇ END | | | | |
| (a₂) | 605.102 | 605.102 | 610.102 | 610.102 | 625.102 | 625.102 | 635.102 | 635.102 | 655.102 | | | 655.102 | 675.102 | 70.000 | 150.000 |
| (b₂) | 615.286 | 615.286 | 620.286 | 640.102 | 655.102 | 655.102 | 665.102 | 675.102 | 695.102 | | | 735.102 | 755.102 | 139.816 | 150.000 |
| (c₂) | 625.187 | 625.187 | 630.187 | 745.102 | 757.602 | 757.602 | 767.602 | 795.102 | 815.102 | | | 835.102 | 855.102 | 229.915 | 150.000 |
| (d₂) | 634.443 | 634.443 | 639.443 | 757.602 | 770.102 | 770.102 | 780.102 | 815.102 | 835.102 | | | 855.102 | 875.102 | 240.659 | 150.000 |
| (e₂) | 644.739 | 644.739 | 649.739 | 670.102 | 682.602 | 682.602 | 692.602 | 695.102 | 715.102 | | | 715.102 | 735.102 | 90.363 | 90.000 |
| (f₂) | 655.181 | 655.181 | 660.181 | 732.602 | 745.102 | 745.102 | 755.102 | 755.102 | 775.102 | | | 775.102 | 795.102 | 139.921 | 150.000 |

Fig.20

| SYNTHESIZED WORKFLOW | EXPECTED WAITING TIME IMPROVING AMOUNT |
|---|---|
| FIRST BUSINESS APPLICATION | 0 |
| SECOND BUSINESS APPLICATION | 0 |
| THIRD BUSINESS APPLICATION | 33.3016131 |
| FOURTH BUSINESS APPLICATION | 0 |
| FIFTH BUSINESS APPLICATION | 0 |
| SIXTH BUSINESS APPLICATION | 0 |
| SEVENTH BUSINESS APPLICATION | 20.5 |

Fig.21

SYNTHESIZED WORKFLOW NUMBER

| | START | 203₁ START | 203₁ END | 203₂ START | 203₂ END | 203₃ START | 203₃ END | 203₄ START | 203₄ END | PROCESSING TIME | SERVICE LEVEL AGREEMENT |
|---|---|---|---|---|---|---|---|---|---|---|---|
| (a₁) | 605.093 | 605.093 | 610.093 | 610.093 | 618.093 | 625.102 | 640.102 | 640.102 | 652.102 | 47.009 | 120.000 |
| (b₁) | 609.832 | 610.093 | 615.093 | 618.093 | 626.093 | 655.102 | 670.102 | 670.102 | 682.102 | 72.270 | 120.000 |
| (c₁) | 615.433 | 615.433 | 620.433 | 626.093 | 634.093 | 680.816 | 691.530 | 691.530 | 703.530 | 88.097 | 120.000 |
| (d₁) | 620.761 | 620.761 | 625.761 | 634.093 | 642.093 | 691.530 | 702.244 | 703.530 | 715.530 | 94.769 | 120.000 |
| (e₁) | 624.892 | 625.761 | 630.761 | 642.093 | 650.093 | 702.244 | 712.958 | 715.530 | 727.530 | 102.638 | 120.000 |
| (f₁) | 630.635 | 630.761 | 635.761 | 650.093 | 658.093 | 723.672 | 734.386 | 734.386 | 746.386 | 115.751 | 120.000 |

SYNTHESIZED WORKFLOW NUMBER

| | START | 203₅ START | 203₅ END | 203₃ START | 203₃ END | 203₆ START | 203₆ END | 203₇ START | 203₇ END | PROCESSING TIME | SERVICE LEVEL AGREEMENT |
|---|---|---|---|---|---|---|---|---|---|---|---|
| (a₂) | 605.102 | 605.102 | 610.102 | 610.102 | 625.102 | 625.102 | 635.102 | 655.102 | 675.102 | 70.000 | 150.000 |
| (b₂) | 615.286 | 615.286 | 620.286 | 640.102 | 655.102 | 655.102 | 665.102 | 735.102 | 755.102 | 139.816 | 150.000 |
| (c₂) | 625.187 | 625.187 | 630.187 | 745.100 | 755.814 | 755.814 | 765.814 | 835.102 | 855.102 | 229.915 | 150.000 |
| (d₂) | 634.443 | 634.443 | 639.443 | 712.958 | 723.672 | 723.672 | 733.672 | 815.102 | 835.102 | 200.659 | 150.000 |
| (e₂) | 644.739 | 644.739 | 649.739 | 670.102 | 680.816 | 680.816 | 690.816 | 715.102 | 735.102 | 90.363 | 90.000 |
| (f₂) | 655.181 | 655.181 | 660.181 | 734.386 | 745.100 | 745.100 | 755.100 | 775.102 | 795.102 | 139.921 | 150.000 |

Fig.22

| SYNTHESIZED WORKFLOW | EXPECTED WAITING TIME IMPROVING AMOUNT |
|---|---:|
| FIRST BUSINESS APPLICATION | 0 |
| SECOND BUSINESS APPLICATION | 0 |
| THIRD BUSINESS APPLICATION | 23.5491032 |
| FOURTH BUSINESS APPLICATION | 0 |
| FIFTH BUSINESS APPLICATION | 0 |
| SIXTH BUSINESS APPLICATION | 0 |
| SEVENTH BUSINESS APPLICATION | 22.1436 |

Fig.23

SYNTHESIZED WORKFLOW NUMBER

| | START | 203₁ START | 203₁ END | 203₂ START | 203₂ END | 203₃ START | 203₃ END | 203₄ START | 203₄ END | PROCESSING TIME | SERVICE LEVEL AGREEMENT |
|---|---|---|---|---|---|---|---|---|---|---|---|
| (a₁) | 605.093 | 605.093 | 610.093 | 610.093 | 618.093 | 625.102 | 640.102 | 640.102 | 652.102 | 47.009 | 120.000 |
| (b₁) | 609.832 | 610.093 | 615.093 | 618.093 | 626.093 | 655.102 | 670.102 | 670.102 | 682.102 | 72.270 | 120.000 |
| (c₁) | 615.433 | 615.433 | 620.433 | 626.093 | 634.093 | 679.477 | 688.852 | 688.852 | 700.852 | 85.419 | 120.000 |
| (d₁) | 620.761 | 620.761 | 625.761 | 634.093 | 642.093 | 688.852 | 698.227 | 700.852 | 712.852 | 92.091 | 120.000 |
| (e₁) | 624.892 | 625.761 | 630.761 | 642.093 | 650.093 | 698.227 | 707.602 | 712.852 | 724.852 | 99.960 | 120.000 |
| (f₁) | 630.635 | 630.761 | 635.761 | 650.093 | 658.093 | 716.977 | 726.352 | 726.352 | 738.352 | 107.717 | 120.000 |

SYNTHESIZED WORKFLOW NUMBER

| | START | 203₅ START | 203₅ END | 203₃ START | 203₃ END | 203₆ START | 203₆ END | 203₇ START | 203₇ END | PROCESSING TIME | SERVICE LEVEL AGREEMENT |
|---|---|---|---|---|---|---|---|---|---|---|---|
| (a₂) | 605.102 | 605.102 | 610.102 | 610.102 | 625.102 | 625.102 | 635.102 | 655.102 | 675.102 | 70.000 | 150.000 |
| (b₂) | 615.286 | 615.286 | 620.286 | 640.102 | 655.102 | 655.102 | 665.102 | 735.102 | 755.102 | 139.816 | 150.000 |
| (c₂) | 625.187 | 625.187 | 630.187 | 726.352 | 735.727 | 735.727 | 745.727 | 855.102 | 875.102 | 249.915 | 150.000 |
| (d₂) | 634.443 | 634.443 | 639.443 | 707.602 | 716.977 | 716.977 | 726.977 | 815.102 | 835.102 | 200.659 | 150.000 |
| (e₂) | 644.739 | 644.739 | 649.739 | 670.102 | 679.477 | 679.477 | 689.477 | 715.102 | 735.102 | 90.363 | 90.000 |
| (f₂) | 655.181 | 655.181 | 660.181 | 735.727 | 745.102 | 745.102 | 755.102 | 775.102 | 795.102 | 139.921 | 150.000 |

Fig.24

| SYNTHESIZED WORKFLOW | EXPECTED WAITING TIME IMPROVING AMOUNT |
|---|---:|
| FIRST BUSINESS APPLICATION | 0 |
| SECOND BUSINESS APPLICATION | 0 |
| THIRD BUSINESS APPLICATION | 18.2640649 |
| FOURTH BUSINESS APPLICATION | 0 |
| FIFTH BUSINESS APPLICATION | 0 |
| SIXTH BUSINESS APPLICATION | 0 |
| SEVENTH BUSINESS APPLICATION | 31.5 |

Fig.25

SYNTHESIZED WORKFLOW NUMBER

| | START | $203_1$ START | $203_1$ END | $203_2$ START | $203_2$ END | $203_3$ START | $203_3$ END | $203_4$ START | $203_4$ END | PROCESSING TIME | SERVICE LEVEL AGREEMENT |
|---|---|---|---|---|---|---|---|---|---|---|---|
| $(a_1)$ | 605.093 | 605.093 | 610.093 | 610.093 | 618.093 | 625.102 | 640.102 | 640.102 | 652.102 | 47.009 | 120.000 |
| $(b_1)$ | 609.832 | 610.093 | 615.093 | 618.093 | 626.093 | 655.102 | 670.102 | 670.102 | 682.102 | 72.270 | 120.000 |
| $(c_1)$ | 615.433 | 615.433 | 620.433 | 626.093 | 634.093 | 679.477 | 688.852 | 688.852 | 700.852 | 85.419 | 120.000 |
| $(d_1)$ | 620.761 | 620.761 | 625.761 | 634.093 | 642.093 | 688.852 | 698.227 | 700.852 | 712.852 | 92.091 | 120.000 |
| $(e_1)$ | 624.892 | 625.761 | 630.761 | 642.093 | 650.093 | 698.227 | 707.602 | 712.852 | 724.852 | 99.960 | 120.000 |
| $(f_1)$ | 630.635 | 630.761 | 635.761 | 650.093 | 658.093 | 716.977 | 726.352 | 726.352 | 738.352 | 107.717 | 120.000 |

SYNTHESIZED WORKFLOW NUMBER

| | START | $203_5$ START | $203_5$ END | $203_3$ START | $203_3$ END | $203_6$ START | $203_6$ END | $203_7$ START | $203_7$ END | PROCESSING TIME | SERVICE LEVEL AGREEMENT |
|---|---|---|---|---|---|---|---|---|---|---|---|
| $(a_2)$ | 605.102 | 605.102 | 610.102 | 610.102 | 625.102 | 625.102 | 635.102 | 655.102 | 675.102 | 70.000 | 150.000 |
| $(b_2)$ | 615.286 | 615.286 | 620.286 | 640.102 | 655.102 | 655.102 | 665.102 | 723.102 | 739.102 | 123.816 | 150.000 |
| $(c_2)$ | 625.187 | 625.187 | 630.187 | 726.352 | 735.727 | 735.727 | 745.727 | 819.102 | 835.102 | 209.915 | 150.000 |
| $(d_2)$ | 634.443 | 634.443 | 639.443 | 707.602 | 716.977 | 716.977 | 726.977 | 755.102 | 771.102 | 136.659 | 150.000 |
| $(e_2)$ | 644.739 | 644.739 | 649.739 | 670.102 | 679.477 | 679.477 | 689.477 | 691.102 | 707.102 | 78.363 | 90.000 |
| $(f_2)$ | 655.181 | 655.181 | 660.181 | 735.727 | 745.102 | 745.102 | 755.102 | 787.102 | 803.102 | 147.921 | 150.000 |

Fig.26

| SYNTHESIZED WORKFLOW | EXPECTED WAITING TIME IMPROVING AMOUNT |
|---|---:|
| FIRST BUSINESS APPLICATION | 0 |
| SECOND BUSINESS APPLICATION | 0 |
| THIRD BUSINESS APPLICATION | 10.6884192 |
| FOURTH BUSINESS APPLICATION | 0 |
| FIFTH BUSINESS APPLICATION | 0 |
| SIXTH BUSINESS APPLICATION | 0 |
| SEVENTH BUSINESS APPLICATION | 9.56369531 |

Fig.27

| | START | $203_1$ START | $203_1$ END | $203_2$ START | $203_2$ END | $203_3$ START | $203_3$ END | $203_4$ START | $203_4$ END | PROCESSING TIME | SERVICE LEVEL AGREEMENT |
|---|---|---|---|---|---|---|---|---|---|---|---|
| ($a_1$) | 605.093 | 605.093 | 610.093 | 610.093 | 618.093 | 625.102 | 640.102 | 640.102 | 652.102 | 47.009 | 120.000 |
| ($b_1$) | 609.832 | 610.093 | 615.093 | 618.093 | 626.093 | 655.102 | 670.102 | 670.102 | 682.102 | 72.270 | 120.000 |
| ($c_1$) | 615.433 | 615.433 | 620.433 | 626.093 | 634.093 | 678.435 | 686.768 | 686.768 | 698.768 | 83.335 | 120.000 |
| ($d_1$) | 620.761 | 620.761 | 625.761 | 634.093 | 642.093 | 688.768 | 697.101 | 698.768 | 710.768 | 90.007 | 120.000 |
| ($e_1$) | 624.892 | 625.761 | 630.761 | 642.093 | 650.093 | 697.101 | 705.434 | 710.786 | 722.786 | 97.894 | 120.000 |
| ($f_1$) | 630.635 | 630.761 | 635.761 | 650.093 | 658.093 | 722.100 | 730.433 | 730.433 | 742.433 | 111.798 | 120.000 |

SYNTHESIZED WORKFLOW NUMBER

| | START | $203_5$ START | $203_5$ END | $203_2$ START | $203_2$ END | $203_3$ START | $203_3$ END | $203_6$ START | $203_6$ END | $203_7$ START | $203_7$ END | $203_7$ START | $203_7$ END | PROCESSING TIME | SERVICE LEVEL AGREEMENT |
|---|---|---|---|---|---|---|---|---|---|---|---|---|---|---|---|
| ($a_2$) | 605.102 | 605.102 | 610.102 | 610.102 | 625.102 | 625.102 | 635.102 | 625.102 | 635.102 | 635.102 | 655.102 | 655.102 | 675.102 | 70.000 | 150.000 |
| ($b_2$) | 615.286 | 615.286 | 620.286 | 640.102 | 655.102 | 655.102 | 665.102 | 655.102 | 675.102 | 675.102 | 691.102 | 723.102 | 739.102 | 123.816 | 150.000 |
| ($c_2$) | 625.187 | 625.187 | 630.187 | 705.434 | 713.767 | 713.767 | 723.767 | 713.767 | 803.102 | 803.102 | 819.102 | 819.102 | 835.102 | 209.915 | 150.000 |
| ($d_2$) | 634.443 | 634.443 | 639.443 | 713.767 | 722.100 | 722.100 | 732.100 | 722.100 | 739.102 | 739.102 | 755.102 | 755.102 | 771.102 | 136.659 | 150.000 |
| ($e_2$) | 644.739 | 644.739 | 649.739 | 670.102 | 678.435 | 678.435 | 688.435 | 678.435 | 691.102 | 691.102 | 707.102 | 707.102 | 723.102 | 78.363 | 90.000 |
| ($f_2$) | 655.181 | 655.181 | 660.181 | 730.433 | 738.766 | 738.766 | 748.766 | 738.766 | 771.102 | 771.102 | 787.102 | 787.102 | 803.102 | 147.921 | 150.000 |

SYNTHESIZED WORKFLOW NUMBER

Fig.28

| SYNTHESIZED WORKFLOW | EXPECTED WAITING TIME IMPROVING AMOUNT |
|---|---|
| FIRST BUSINESS APPLICATION | 0 |
| SECOND BUSINESS APPLICATION | 0 |
| THIRD BUSINESS APPLICATION | 7.521991 |
| FOURTH BUSINESS APPLICATION | 0 |
| FIFTH BUSINESS APPLICATION | 0 |
| SIXTH BUSINESS APPLICATION | 0 |
| SEVENTH BUSINESS APPLICATION | 13.2241528 |

Fig.29

| | START | $203_1$ START | $203_1$ END | $203_2$ START | $203_2$ END | $203_3$ START | $203_3$ END | $203_4$ START | $203_4$ END | | PROCESSING TIME | SERVICE LEVEL AGREEMENT |
|---|---|---|---|---|---|---|---|---|---|---|---|---|
| $(a_1)$ | 605.093 | 605.093 | 610.093 | 610.093 | 618.093 | 625.102 | 640.102 | 640.102 | 652.102 | | 47.009 | 120.000 |
| $(b_1)$ | 609.832 | 610.093 | 615.093 | 618.093 | 626.093 | 655.102 | 670.102 | 670.102 | 682.102 | | 72.270 | 120.000 |
| $(c_1)$ | 615.433 | 615.433 | 620.433 | 626.093 | 634.093 | 686.768 | 695.101 | 695.101 | 707.101 | | 91.668 | 120.000 |
| $(d_1)$ | 620.761 | 620.761 | 625.761 | 634.093 | 642.093 | 703.434 | 711.767 | 711.767 | 723.767 | | 103.006 | 120.000 |
| $(e_1)$ | 624.892 | 625.761 | 630.761 | 642.093 | 650.093 | 711.767 | 720.100 | 723.767 | 735.767 | | 110.875 | 120.000 |
| $(f_1)$ | 630.635 | 630.761 | 635.761 | 650.093 | 658.093 | 720.100 | 728.433 | 735.767 | 747.767 | | 117.132 | 120.000 |

| | START | $203_5$ START | $203_5$ END | $203_3$ START | $203_3$ END | $203_6$ START | $203_6$ END | $203_7$ START | $203_7$ END | $203_7$ START | $203_7$ END | PROCESSING TIME | SERVICE LEVEL AGREEMENT |
|---|---|---|---|---|---|---|---|---|---|---|---|---|---|
| $(a_2)$ | 605.102 | 605.102 | 610.102 | 610.102 | 625.102 | 625.102 | 635.102 | 635.102 | 655.102 | 655.102 | 675.102 | 70.000 | 150.000 |
| $(b_2)$ | 615.286 | 615.286 | 620.286 | 640.102 | 655.102 | 655.102 | 665.102 | 675.102 | 688.435 | 715.101 | 728.434 | 113.148 | 150.000 |
| $(c_2)$ | 625.187 | 625.187 | 630.187 | 678.435 | 686.435 | 686.768 | 696.768 | 781.766 | 795.099 | 795.099 | 808.432 | 183.245 | 150.000 |
| $(d_2)$ | 634.443 | 634.443 | 639.443 | 695.101 | 703.434 | 703.434 | 713.434 | 728.434 | 741.767 | 741.767 | 755.100 | 120.657 | 150.000 |
| $(e_2)$ | 644.739 | 644.739 | 649.739 | 670.102 | 678.435 | 678.435 | 688.435 | 688.435 | 701.768 | 701.768 | 715.101 | 70.362 | 90.000 |
| $(f_2)$ | 655.181 | 655.181 | 660.181 | 728.433 | 736.766 | 736.766 | 746.766 | 755.100 | 768.433 | 768.433 | 781.766 | 126.585 | 150.000 |

Fig.30

| SYNTHESIZED WORKFLOW | EXPECTED WAITING TIME IMPROVING AMOUNT |
|---|---:|
| FIRST BUSINESS APPLICATION | 0 |
| SECOND BUSINESS APPLICATION | 0 |
| THIRD BUSINESS APPLICATION | 4.823063 |
| FOURTH BUSINESS APPLICATION | 0 |
| FIFTH BUSINESS APPLICATION | 0 |
| SIXTH BUSINESS APPLICATION | 0 |
| SEVENTH BUSINESS APPLICATION | 12.1380179 |

Fig.31

SYNTHESIZED WORKFLOW NUMBER

| | START | 203₁ START | 203₁ END | 203₂ START | 203₂ END | 203₃ START | 203₃ END | 203₄ START | 203₄ END | PROCESSING TIME | SERVICE LEVEL AGREEMENT |
|---|---|---|---|---|---|---|---|---|---|---|---|
| (a₁) | 605.093 | 605.093 | 610.093 | 610.093 | 618.093 | 625.102 | 640.102 | 640.102 | 652.102 | 47.009 | 120.000 |
| (b₁) | 609.832 | 610.093 | 615.093 | 618.093 | 626.093 | 655.102 | 670.102 | 670.102 | 682.102 | 72.270 | 120.000 |
| (c₁) | 615.433 | 615.433 | 620.433 | 626.093 | 634.093 | 686.768 | 695.101 | 695.101 | 707.101 | 91.668 | 120.000 |
| (d₁) | 620.761 | 620.761 | 625.761 | 634.093 | 642.093 | 703.434 | 711.767 | 711.767 | 723.767 | 103.006 | 120.000 |
| (e₁) | 624.892 | 625.761 | 630.761 | 642.093 | 650.093 | 711.767 | 720.100 | 723.767 | 735.767 | 110.875 | 120.000 |
| (f₁) | 630.635 | 630.761 | 635.761 | 650.093 | 658.093 | 720.100 | 728.433 | 735.767 | 747.767 | 117.132 | 120.000 |

SYNTHESIZED WORKFLOW NUMBER

| | START | 203₅ START | 203₅ END | 203₃ START | 203₃ END | 203₆ START | 203₆ END | 203₇ START | 203₇ END | 203₇ START | 203₇ END | PROCESSING TIME | SERVICE LEVEL AGREEMENT |
|---|---|---|---|---|---|---|---|---|---|---|---|---|---|
| (a₂) | 605.102 | 605.102 | 610.102 | 625.102 | 625.102 | 625.102 | 635.102 | 635.102 | 655.102 | 655.102 | 675.102 | 70.000 | 150.000 |
| (b₂) | 615.286 | 615.286 | 620.286 | 655.102 | 655.102 | 655.102 | 665.102 | 675.102 | 686.531 | 686.531 | 697.960 | 82.674 | 150.000 |
| (c₂) | 625.187 | 625.187 | 630.187 | 686.768 | 686.768 | 686.768 | 696.768 | 720.818 | 732.247 | 743.676 | 755.105 | 129.918 | 150.000 |
| (d₂) | 634.443 | 634.443 | 639.443 | 703.434 | 703.434 | 703.434 | 713.434 | 732.247 | 743.676 | 766.534 | 777.963 | 143.520 | 150.000 |
| (e₂) | 644.739 | 644.739 | 649.739 | 678.435 | 678.435 | 678.435 | 688.435 | 697.960 | 709.389 | 709.389 | 720.818 | 76.079 | 90.000 |
| (f₂) | 655.181 | 655.181 | 660.181 | 728.433 | 736.766 | 736.766 | 746.766 | 755.105 | 766.534 | 777.963 | 789.392 | 134.211 | 150.000 |

Fig.32

SYNTHESIZED WORKFLOW NUMBER

| | START | $203_1$ START | $203_1$ END | $203_2$ START | $203_2$ END | $203_3$ START | $203_3$ END | $203_4$ START | $203_4$ END | PROCESSING TIME | SERVICE LEVEL AGREEMENT |
|---|---|---|---|---|---|---|---|---|---|---|---|
| $(a_1)$ | 605.093 | 605.093 | 610.093 | 610.093 | 618.093 | 625.102 | 640.102 | 640.102 | 652.102 | 47.009 | 120.000 |
| $(b_1)$ | 609.832 | 610.093 | 615.093 | 618.093 | 626.093 | 655.102 | 670.102 | 670.102 | 682.102 | 72.270 | 120.000 |
| $(c_1)$ | 615.433 | 615.433 | 620.433 | 626.093 | 634.093 | 686.768 | 695.101 | 695.101 | 707.101 | 91.668 | 120.000 |
| $(d_1)$ | 620.761 | 620.761 | 625.761 | 634.093 | 642.093 | 703.434 | 711.767 | 711.767 | | | 120.000 |
| $(e_1)$ | 624.892 | 625.761 | 630.761 | 642.093 | 650.093 | 711.767 | | | | | 120.000 |
| $(f_1)$ | 630.635 | 630.761 | 635.761 | 650.093 | 658.093 | | | | | | 120.000 |

SYNTHESIZED WORKFLOW NUMBER

| | START | $203_5$ START | $203_5$ END | $203_3$ START | $203_3$ END | $203_6$ START | $203_6$ END | $203_7$ START | $203_7$ END | PROCESSING TIME | SERVICE LEVEL AGREEMENT |
|---|---|---|---|---|---|---|---|---|---|---|---|
| $(a_2)$ | 605.102 | 605.102 | 610.102 | 610.102 | 625.102 | 625.102 | 635.102 | 635.102 | 655.102 | 655.102 | 675.102 | 70.000 | 150.000 |
| $(b_2)$ | 615.286 | 615.286 | 620.286 | 640.102 | 655.102 | 655.102 | 665.102 | 675.102 | 686.531 | 686.531 | 697.960 | 82.674 | 150.000 |
| $(c_2)$ | 625.187 | 625.187 | 630.187 | 678.435 | 686.768 | 686.768 | 696.768 | ↑ | ↑ | | | | 150.000 |
| $(d_2)$ | 634.443 | 634.443 | 639.443 | 695.101 | 703.434 | ↑ | ↑ | ↑ | ↑ | | | | 150.000 |
| $(e_2)$ | 644.739 | 644.739 | 649.739 | 670.102 | 678.435 | 678.435 | 688.435 | 697.960 | 709.389 | 709.389 | | | 90.000 |
| $(f_2)$ | 655.181 | 655.181 | 660.181 | | | | | | | | | | 150.000 |

Fig.33

SYNTHESIZED WORKFLOW NUMBER

| | START | 203₁ START | 203₁ END | 203₂ START | 203₂ END | 203₃ START | 203₃ END | 203₄ START | 203₄ END | PROCESSING TIME | SERVICE LEVEL AGREEMENT |
|---|---|---|---|---|---|---|---|---|---|---|---|
| (a₁) | 605.093 | 605.093 | 610.093 | 610.093 | 618.093 | 625.102 | 640.102 | 640.102 | 652.102 | 47.009 | 120.000 |
| (b₁) | 609.832 | 610.093 | 615.093 | 618.093 | 626.093 | 655.102 | 670.102 | 670.102 | 682.102 | 72.270 | 120.000 |
| (c₁) | 615.433 | 615.433 | 620.433 | 626.093 | 634.093 | 686.768 | 695.101 | 695.101 | 707.101 | 91.668 | 120.000 |
| (d₁) | 620.761 | 620.761 | 625.761 | 634.093 | 642.093 | 703.434 | 711.767 | 711.767 | 723.767 | 103.006 | 120.000 |
| (e₁) | 624.892 | 625.761 | 630.761 | 642.093 | 650.093 | 711.767 | 720.100 | 723.767 | 735.767 | 110.875 | 120.000 |
| (f₁) | 630.635 | 630.761 | 635.761 | 650.093 | 658.093 | 720.100 | 728.433 | 735.767 | 747.767 | 117.132 | 120.000 |

SYNTHESIZED WORKFLOW NUMBER

| | START | 203₅ START | 203₅ END | 203₂ START | 203₂ END | 203₃ START | 203₃ END | 203₆ START | 203₆ END | 203₇ START | 203₇ END | PROCESSING TIME | SERVICE LEVEL AGREEMENT |
|---|---|---|---|---|---|---|---|---|---|---|---|---|---|
| (a₂) | 605.102 | 605.102 | 610.102 | 610.102 | 625.102 | 625.102 | 625.102 | 625.102 | 635.102 | 655.102 | 675.102 | 70.000 | 150.000 |
| (b₂) | 615.286 | 615.286 | 620.286 | 640.102 | 655.102 | 655.102 | 655.102 | 655.102 | 665.102 | 686.531 | 697.960 | 82.674 | 150.000 |
| (c₂) | 625.187 | 625.187 | 630.187 | 678.435 | 686.768 | 686.768 | 686.768 | 686.768 | 696.768 | 732.247 | 743.676 | 118.489 | 150.000 |
| (d₂) | 634.443 | 634.443 | 639.443 | 695.101 | 703.434 | → | 703.434 | → | → | 743.676 | 755.105 | 120.662 | 150.000 |
| (e₂) | 644.739 | 644.739 | 649.739 | 670.102 | 678.435 | 678.435 | 678.435 | 678.435 | 688.435 | 697.960 | 709.389 | 709.389 | 720.818 | 76.079 | 90.000 |
| (f₂) | 655.181 | 655.181 | 660.181 | 728.433 | 736.766 | 736.766 | 746.766 | 755.105 | 766.534 | 777.963 | 789.392 | 134.211 | 150.000 |

Fig.37

| BUSINESS APPLICATION | UTILIZATION RATIO |
|---|---|
| FIRST BUSINESS APPLICATION | 15% |
| SECOND BUSINESS APPLICATION | 20% |
| THIRD BUSINESS APPLICATION | 70% |
| FOURTH BUSINESS APPLICATION | 40% |
| FIFTH BUSINESS APPLICATION | 20% |
| SIXTH BUSINESS APPLICATION | 25% |
| SEVENTH BUSINESS APPLICATION | 65% |

Fig.44

(PERFORMANCE CHARACTERISTICS OF BUSINESS APPLICATION (SECOND/WORKFLOW))

| | AMOUNT OF COMPUTER RESOURCES (NUMBER OF BUSINESS AP EXECUTION PART) | | | | | | | | | |
|---|---|---|---|---|---|---|---|---|---|---|
| | 1 | 2 | 3 | 4 | 5 | 6 | 7 | 8 | 9 | 10 |
| FIRST BUSINESS APPLICATION | 10.000 | 5.000 | 3.333 | 3.000 | 2.800 | 2.700 | 2.600 | 2.500 | 2.500 | 2.500 |
| SECOND BUSINESS APPLICATION | 16.000 | 8.000 | 5.333 | 4.000 | 3.200 | 2.667 | 5.100 | 5.000 | 5.000 | 5.000 |
| THIRD BUSINESS APPLICATION | 30.000 | 15.000 | 10.000 | 7.500 | 6.000 | 5.000 | 4.286 | 3.750 | 3.333 | 3.000 |
| FOURTH BUSINESS APPLICATION | 24.000 | 12.000 | 8.000 | 6.000 | 4.800 | 4.000 | 3.429 | 3.000 | 2.667 | 2.400 |
| FIFTH BUSINESS APPLICATION | 10.000 | 5.000 | 3.333 | 2.500 | 2.000 | 3.600 | 3.300 | 3.100 | 3.000 | 3.000 |
| SIXTH BUSINESS APPLICATION | 20.000 | 10.000 | 6.667 | 5.000 | 4.000 | 3.333 | 2.857 | 2.500 | 4.800 | 4.700 |
| SEVENTH BUSINESS APPLICATION | 40.000 | 20.000 | 13.333 | 10.000 | 8.000 | 6.667 | 5.714 | 5.000 | 4.444 | 4.000 |

Fig.45

(AMOUNT OF COMPUTER RESOURCES (INITIAL STATE))

|  | NUMBER OF COMPUTERS |
|---|---|
| FIRST BUSINESS APPLICATION | 2 |
| SECOND BUSINESS APPLICATION | 2 |
| THIRD BUSINESS APPLICATION | 2 |
| FOURTH BUSINESS APPLICATION | 2 |
| FIFTH BUSINESS APPLICATION | 2 |
| SIXTH BUSINESS APPLICATION | 2 |
| SEVENTH BUSINESS APPLICATION | 2 |

Fig.49

| SYNTHESIZED WORKFLOW | EXPECTED WAITING TIME IMPROVING AMOUNT |
|---|---|
| FIRST BUSINESS APPLICATION | 0 |
| SECOND BUSINESS APPLICATION | 1.6899108 |
| THIRD BUSINESS APPLICATION | 134.527 |
| FOURTH BUSINESS APPLICATION | 0 |
| FIFTH BUSINESS APPLICATION | 0 |
| SIXTH BUSINESS APPLICATION | 0 |
| SEVENTH BUSINESS APPLICATION | 16.665 |

Fig.50

(COMPUTER RESOURCE ADDITION FIRST TIME (PREDICTION))

SYNTHESIZED WORKFLOW NUMBER

| | START | $203_1$ START | $203_1$ END | $203_2$ START | $203_2$ END | $203_3$ START | $203_3$ END | $203_4$ START | $203_4$ END | PROCESSING TIME | SERVICE LEVEL AGREEMENT |
|---|---|---|---|---|---|---|---|---|---|---|---|
| ($a_1$) | 605.093 | 605.093 | 615.093 | 615.093 | 631.093 | 645.102 | 675.102 | 675.102 | 699.102 | 94.009 | 150.000 |
| ($b_1$) | 609.832 | 609.832 | 619.832 | 619.832 | 635.832 | 675.102 | 705.102 | 705.102 | 729.102 | 119.270 | 150.000 |
| ($c_1$) | 615.433 | 615.433 | 625.433 | 631.093 | 647.093 | 685.286 | 715.286 | 715.286 | 739.286 | 123.853 | 150.000 |
| ($d_1$) | 620.761 | 620.761 | 630.761 | 635.832 | 651.832 | 695.000 | 725.000 | 729.102 | 753.102 | 132.341 | 150.000 |
| ($e_1$) | 624.892 | 625.433 | 635.433 | 647.093 | 663.093 | 715.286 | 745.286 | 745.286 | 769.286 | 144.394 | 150.000 |
| ($f_1$) | 630.635 | 630.761 | 640.761 | 651.832 | 667.832 | 725.000 | 755.000 | 755.000 | 779.000 | 148.365 | 150.000 |

SYNTHESIZED WORKFLOW NUMBER

| | START | $203_5$ START | $203_5$ END | $203_3$ START | $203_3$ END | $203_6$ START | $203_6$ END | $203_7$ START | $203_7$ END | PROCESSING TIME | SERVICE LEVEL AGREEMENT |
|---|---|---|---|---|---|---|---|---|---|---|---|
| ($a_2$) | 605.102 | 605.102 | 615.102 | 615.102 | 645.102 | 645.102 | 665.102 | 705.102 | 745.102 | 140.000 | 180.000 |
| ($b_2$) | 615.286 | 615.286 | 625.286 | 625.286 | 655.286 | 655.286 | 675.286 | 745.102 | 785.102 | 169.816 | 180.000 |
| ($c_2$) | 625.187 | 625.187 | 635.187 | 655.286 | 685.286 | 685.286 | 705.286 | 755.286 | 795.286 | 170.099 | 180.000 |
| ($d_2$) | 634.443 | 634.443 | 644.443 | 745.286 | 775.286 | 775.286 | 795.286 | 835.286 | 875.286 | 240.843 | 180.000 |
| ($e_2$) | 645.739 | 645.739 | 655.739 | 665.000 | 695.000 | 695.000 | 715.000 | 905.102 | 945.102 | 299.363 | 180.000 |
| ($f_2$) | 655.181 | 655.181 | 665.181 | 705.102 | 735.102 | 735.102 | 755.102 | 825.102 | 865.102 | 209.921 | 180.000 |

Fig.51

| SYNTHESIZED WORKFLOW | EXPECTED WAITING TIME IMPROVING AMOUNT |
|---|---|
| FIRST BUSINESS APPLICATION | 0 |
| SECOND BUSINESS APPLICATION | 0 |
| THIRD BUSINESS APPLICATION | 37.50625 |
| FOURTH BUSINESS APPLICATION | 0 |
| FIFTH BUSINESS APPLICATION | 0 |
| SIXTH BUSINESS APPLICATION | 0 |
| SEVENTH BUSINESS APPLICATION | 60.027997 |

Fig.52

(COMPUTER RESOURCE ADDITION SECOND TIME (PREDICTION))

SYNTHESIZED WORKFLOW NUMBER

| | START | $203_1$ START | $203_1$ END | $203_2$ START | $203_2$ END | $203_3$ START | $203_3$ END | $203_4$ START | $203_4$ END | | PROCESSING TIME | SERVICE LEVEL AGREEMENT |
|---|---|---|---|---|---|---|---|---|---|---|---|---|
| $(a_1)$ | 605.093 | 605.093 | 615.093 | 615.093 | 631.093 | 645.102 | 675.102 | 675.102 | 699.102 | | 94.009 | 150.000 |
| $(b_1)$ | 609.832 | 609.832 | 619.832 | 619.832 | 635.832 | 675.102 | 705.102 | 705.102 | 729.102 | | 119.270 | 150.000 |
| $(c_1)$ | 615.433 | 615.433 | 625.433 | 631.093 | 647.093 | 685.286 | 715.286 | 715.286 | 739.286 | | 123.853 | 150.000 |
| $(d_1)$ | 620.761 | 620.761 | 630.761 | 635.832 | 651.832 | 695.000 | 725.000 | 729.102 | 753.102 | | 132.341 | 150.000 |
| $(e_1)$ | 624.892 | 625.433 | 635.433 | 647.093 | 663.093 | 715.286 | 745.286 | 745.286 | 769.286 | | 144.394 | 150.000 |
| $(f_1)$ | 630.635 | 630.761 | 640.761 | 651.832 | 667.832 | 725.000 | 755.000 | 755.000 | 779.000 | | 148.365 | 150.000 |

SYNTHESIZED WORKFLOW NUMBER

| | START | $203_5$ START | $203_5$ END | $203_3$ START | $203_3$ END | $203_6$ START | $203_6$ END | $203_7$ START | $203_7$ END | | PROCESSING TIME | SERVICE LEVEL AGREEMENT |
|---|---|---|---|---|---|---|---|---|---|---|---|---|
| $(a_2)$ | 605.102 | 605.102 | 615.102 | 615.102 | 645.102 | 645.102 | 665.102 | 705.102 | 745.102 | | 140.000 | 180.000 |
| $(b_2)$ | 615.286 | 615.286 | 625.286 | 625.286 | 655.286 | 655.286 | 675.286 | 745.102 | 785.102 | | 169.816 | 180.000 |
| $(c_2)$ | 625.187 | 625.187 | 635.187 | 655.286 | 685.286 | 685.286 | 705.286 | 745.286 | 785.286 | | 160.099 | 180.000 |
| $(d_2)$ | 634.443 | 634.443 | 644.443 | 745.286 | 775.286 | 775.286 | 795.286 | 835.286 | 875.286 | | 240.843 | 180.000 |
| $(e_2)$ | 645.739 | 645.739 | 655.739 | 665.000 | 695.000 | 695.000 | 715.000 | 755.286 | 795.286 | | 149.547 | 150.000 |
| $(f_2)$ | 655.181 | 655.181 | 665.181 | 705.102 | 735.102 | 735.102 | 755.102 | 805.102 | 845.102 | | 189.921 | 180.000 |

Fig.53

| SYNTHESIZED WORKFLOW | EXPECTED WAITING TIME IMPROVING AMOUNT |
|---|---|
| FIRST BUSINESS APPLICATION | 0 |
| SECOND BUSINESS APPLICATION | 0 |
| THIRD BUSINESS APPLICATION | 35.191 |
| FOURTH BUSINESS APPLICATION | 0 |
| FIFTH BUSINESS APPLICATION | 0 |
| SIXTH BUSINESS APPLICATION | 0 |
| SEVENTH BUSINESS APPLICATION | 2.4998125 |

Fig.54

(COMPUTER RESOURCE ADDITION THIRD TIME (PREDICTION))
SYNTHESIZED WORKFLOW NUMBER

| | START | $203_1$ START | $203_1$ END | $203_2$ START | $203_2$ END | $203_3$ START | $203_3$ END | $203_4$ START | $203_4$ END | | PROCESSING TIME | SERVICE LEVEL AGREEMENT |
|---|---|---|---|---|---|---|---|---|---|---|---|---|
| $(a_1)$ | 605.093 | 605.093 | 615.093 | 615.093 | 631.093 | 645.102 | 675.102 | 675.102 | 699.102 | | 94.009 | 150.000 |
| $(b_1)$ | 609.832 | 609.832 | 619.832 | 619.832 | 635.832 | 675.102 | 705.102 | 705.102 | 729.102 | | 119.270 | 150.000 |
| $(c_1)$ | 615.433 | 615.433 | 625.433 | 631.093 | 647.093 | 695.000 | 725.000 | 725.000 | 749.000 | | 133.567 | 150.000 |
| $(d_1)$ | 620.761 | 620.761 | 630.761 | 635.832 | 651.832 | 695.000 | 725.000 | 729.102 | 753.102 | | 132.341 | 150.000 |
| $(e_1)$ | 624.892 | 625.433 | 635.433 | 647.093 | 663.093 | 705.102 | 735.102 | 749.000 | 773.000 | | 148.108 | 150.000 |
| $(f_1)$ | 630.635 | 630.761 | 640.761 | 651.832 | 667.832 | 715.286 | 745.286 | 753.102 | 777.102 | | 146.467 | 150.000 |

SYNTHESIZED WORKFLOW NUMBER

| | START | $203_5$ START | $203_5$ END | $203_3$ START | $203_3$ END | $203_6$ START | $203_6$ END | $203_7$ START | $203_7$ END | $203_7$ START | $203_7$ END | PROCESSING TIME | SERVICE LEVEL AGREEMENT |
|---|---|---|---|---|---|---|---|---|---|---|---|---|---|
| $(a_2)$ | 605.102 | 605.102 | 615.102 | 615.102 | 645.102 | 645.102 | 665.102 | 665.102 | 705.102 | 705.102 | 745.102 | 140.000 | 180.000 |
| $(b_2)$ | 615.286 | 615.286 | 625.286 | 625.286 | 655.286 | 655.286 | 675.286 | 675.286 | 715.286 | 745.102 | 785.102 | 169.816 | 180.000 |
| $(c_2)$ | 625.187 | 625.187 | 635.187 | 655.286 | 685.286 | 685.286 | 705.286 | 705.286 | 745.286 | 745.286 | 785.286 | 160.099 | 180.000 |
| $(d_2)$ | 634.443 | 634.443 | 644.443 | 665.000 | 695.000 | 705.286 | 725.286 | 785.286 | 825.286 | 825.286 | 865.286 | 230.843 | 180.000 |
| $(e_2)$ | 645.739 | 645.739 | 655.739 | 665.000 | 695.000 | 695.000 | 715.000 | 715.286 | 755.286 | 755.286 | 795.286 | 149.547 | 150.000 |
| $(f_2)$ | 655.181 | 655.181 | 665.181 | 685.286 | 715.286 | 715.286 | 735.286 | 785.102 | 825.102 | 805.102 | 845.102 | 189.921 | 180.000 |

Fig.55

| SYNTHESIZED WORKFLOW | EXPECTED WAITING TIME IMPROVING AMOUNT |
|---|---:|
| FIRST BUSINESS APPLICATION | 0 |
| SECOND BUSINESS APPLICATION | 0 |
| THIRD BUSINESS APPLICATION | 8.1324 |
| FOURTH BUSINESS APPLICATION | 0 |
| FIFTH BUSINESS APPLICATION | 0 |
| SIXTH BUSINESS APPLICATION | 5.143 |
| SEVENTH BUSINESS APPLICATION | 22.452316 |

Fig.56

(COMPUTER RESOURCE ADDITION FOURTH TIME (PREDICTION))

SYNTHESIZED WORKFLOW NUMBER

| | START | $203_5$ START | $203_1$ END | $203_2$ START | $203_2$ END | $203_3$ START | $203_3$ END | $203_4$ START | $203_4$ END | | PROCESSING TIME | SERVICE LEVEL AGREEMENT |
|---|---|---|---|---|---|---|---|---|---|---|---|---|
| $(a_1)$ | 605.093 | 605.093 | 615.093 | 615.093 | 631.093 | 645.102 | 675.102 | 675.102 | 699.102 | | 94.009 | 150.000 |
| $(b_1)$ | 609.832 | 609.832 | 619.832 | 619.832 | 635.832 | 675.102 | 705.102 | 705.102 | 729.102 | | 119.270 | 150.000 |
| $(c_1)$ | 615.433 | 615.433 | 625.433 | 631.093 | 647.093 | 695.000 | 725.000 | 725.000 | 749.000 | | 133.567 | 150.000 |
| $(d_1)$ | 620.761 | 620.761 | 630.761 | 635.832 | 651.832 | 695.000 | 725.000 | 729.102 | 753.102 | | 132.341 | 150.000 |
| $(e_1)$ | 624.892 | 625.433 | 635.433 | 647.093 | 663.093 | 705.102 | 735.102 | 749.000 | 773.000 | | 148.108 | 150.000 |
| $(f_1)$ | 630.635 | 630.761 | 640.761 | 651.832 | 667.832 | 715.286 | 745.286 | 753.102 | 777.102 | | 146.467 | 150.000 |

SYNTHESIZED WORKFLOW NUMBER

| | START | $203_5$ START | $203_5$ END | $203_3$ START | $203_3$ END | $203_6$ START | $203_6$ END | $203_7$ START | $203_7$ END | | PROCESSING TIME | SERVICE LEVEL AGREEMENT |
|---|---|---|---|---|---|---|---|---|---|---|---|---|
| $(a_2)$ | 605.102 | 605.102 | 615.102 | 645.102 | 645.102 | 645.102 | 665.102 | 705.102 | 745.102 | | 140.000 | 180.000 |
| $(b_2)$ | 615.286 | 615.286 | 625.286 | 655.286 | 655.286 | 655.286 | 675.286 | 745.102 | 785.102 | | 169.816 | 180.000 |
| $(c_2)$ | 625.187 | 625.187 | 635.187 | 655.286 | 685.286 | 685.286 | 705.286 | 745.286 | 785.286 | | 160.099 | 180.000 |
| $(d_2)$ | 634.443 | 634.443 | 644.443 | 665.000 | 695.000 | 705.286 | 725.286 | 765.286 | 805.286 | | 170.843 | 180.000 |
| $(e_2)$ | 645.739 | 645.739 | 655.739 | 665.000 | 695.000 | 695.000 | 715.000 | 755.000 | 795.000 | | 149.261 | 150.000 |
| $(f_2)$ | 655.181 | 655.181 | 665.181 | 685.286 | 715.286 | 715.286 | 735.286 | 825.102 | 865.102 | | 209.921 | 180.000 |

Fig.57

| SYNTHESIZED WORKFLOW | EXPECTED WAITING TIME IMPROVING AMOUNT |
|---|---:|
| FIRST BUSINESS APPLICATION | 0 |
| SECOND BUSINESS APPLICATION | 0 |
| THIRD BUSINESS APPLICATION | 4.021 |
| FOURTH BUSINESS APPLICATION | 0 |
| FIFTH BUSINESS APPLICATION | 0 |
| SIXTH BUSINESS APPLICATION | 0 |
| SEVENTH BUSINESS APPLICATION | 9.9632 |

Fig.58

(COMPUTER RESOURCE ADDITION FIFTH TIME (PREDICTION))
SYNTHESIZED WORKFLOW NUMBER

| | START | $203_1$ START | $203_1$ END | $203_2$ START | $203_2$ END | $203_3$ START | $203_3$ END | $203_4$ START | $203_4$ END | | PROCESSING TIME | SERVICE LEVEL AGREEMENT |
|---|---|---|---|---|---|---|---|---|---|---|---|---|
| $(a_1)$ | 605.093 | 605.093 | 615.102 | 615.093 | 631.093 | 645.102 | 675.102 | 675.102 | 699.102 | | 94.009 | 150.000 |
| $(b_1)$ | 609.832 | 609.832 | 619.832 | 619.832 | 635.832 | 675.102 | 705.102 | 705.102 | 729.102 | | 119.270 | 150.000 |
| $(c_1)$ | 615.433 | 615.433 | 625.433 | 631.093 | 647.093 | 695.000 | 725.000 | 725.000 | 749.000 | | 133.567 | 150.000 |
| $(d_1)$ | 620.761 | 620.761 | 630.761 | 635.832 | 651.832 | 695.000 | 725.000 | 729.102 | 753.102 | | 132.341 | 150.000 |
| $(e_1)$ | 624.892 | 625.433 | 635.433 | 647.093 | 663.093 | 705.102 | 735.102 | 749.000 | 773.000 | | 148.108 | 150.000 |
| $(f_1)$ | 630.635 | 630.761 | 640.761 | 651.832 | 667.832 | 715.286 | 745.286 | 753.102 | 777.102 | | 146.467 | 150.000 |

SYNTHESIZED WORKFLOW NUMBER

| | START | $203_5$ START | $203_5$ END | $203_3$ START | $203_3$ END | $203_6$ START | $203_6$ END | $203_7$ START | $203_7$ END | | PROCESSING TIME | SERVICE LEVEL AGREEMENT |
|---|---|---|---|---|---|---|---|---|---|---|---|---|
| $(a_2)$ | 605.102 | 605.102 | 615.102 | 615.102 | 645.102 | 645.102 | 665.102 | 665.102 | 705.102 | | 705.102 | 745.102 | 140.000 | 180.000 |
| $(b_2)$ | 615.286 | 615.286 | 625.286 | 625.286 | 655.286 | 655.286 | 675.286 | 675.286 | 715.286 | | 715.286 | 753.286 | 140.000 | 180.000 |
| $(c_2)$ | 625.187 | 625.187 | 635.187 | 655.286 | 685.286 | 685.286 | 705.286 | 705.286 | 745.286 | | 745.286 | 785.286 | 160.099 | 180.000 |
| $(d_2)$ | 634.443 | 634.443 | 644.443 | 665.000 | 695.000 | 705.286 | 725.286 | 725.286 | 765.286 | | 765.286 | 805.286 | 170.843 | 180.000 |
| $(e_2)$ | 645.739 | 645.739 | 655.739 | 665.000 | 695.000 | 695.000 | 715.000 | 715.000 | 755.000 | | 755.000 | 795.000 | 149.261 | 150.000 |
| $(f_2)$ | 655.181 | 655.181 | 665.181 | 685.286 | 715.286 | 715.286 | 735.286 | 745.102 | 785.102 | | 785.102 | 825.102 | 169.921 | 180.000 |

Fig.59

| (t = 720) ← SYNTHESIZED WORKFLOW NUMBER | | | | | | | | | | | PROCESSING TIME | SERVICE LEVEL AGREEMENT |
|---|---|---|---|---|---|---|---|---|---|---|---|---|
| | START | $203_1$ START | $203_1$ END | $203_2$ START | $203_2$ END | $203_3$ START | $203_3$ END | $203_4$ START | $203_4$ END | | | |
| $(a_1)$ | 605.093 | 605.093 | 615.093 | 615.093 | 631.093 | 645.102 | 675.102 | 675.102 | 699.102 | 94.009 | 150.000 | |
| $(b_1)$ | 609.832 | 609.832 | 619.832 | 619.832 | 635.832 | 675.102 | 705.102 | 705.102 | | | 150.000 | |
| $(c_1)$ | 615.433 | 615.433 | 625.433 | 631.093 | 647.093 | 695.000 | | | | | 150.000 | |
| $(d_1)$ | 620.761 | 620.761 | 630.761 | 635.832 | 651.832 | 695.000 | | | | | 150.000 | |
| $(e_1)$ | 624.892 | 625.433 | 635.433 | 647.093 | 663.093 | 705.102 | | | | | 150.000 | |
| $(f_1)$ | 630.635 | 630.761 | 640.761 | 651.832 | 667.832 | 715.286 | | | | | 150.000 | |

| ← SYNTHESIZED WORKFLOW NUMBER | | | | | | | | | | | PROCESSING TIME | SERVICE LEVEL AGREEMENT |
|---|---|---|---|---|---|---|---|---|---|---|---|---|
| | START | $203_5$ START | $203_5$ END | $203_3$ START | $203_3$ END | $203_6$ START | $203_6$ END | $203_7$ START | $203_7$ END | | | |
| $(a_2)$ | 605.102 | 605.102 | 615.102 | 615.102 | 645.102 | 645.102 | 665.102 | 665.102 | 705.102 | 705.102 | | 180.000 |
| $(b_2)$ | 615.286 | 615.286 | 625.286 | 625.286 | 655.286 | 655.286 | 675.286 | 675.286 | 715.286 | 715.286 | | 180.000 |
| $(c_2)$ | 625.187 | 625.187 | 635.187 | 655.286 | 685.286 | 685.286 | 705.286 | 705.286 | ↑ | | | 180.000 |
| $(d_2)$ | 634.443 | 634.443 | 644.443 | 665.000 | 695.000 | ↑ | | 715.000 | ↑ | | | 180.000 |
| $(e_2)$ | 645.739 | 645.739 | 655.739 | 665.000 | 695.000 | 695.000 | 715.000 | | | | | 150.000 |
| $(f_2)$ | 655.181 | 655.181 | 665.181 | 685.286 | 715.286 | 715.286 | | | | | | 180.000 |

Fig.62

(INITIAL STATE)

SYNTHESIZED WORKFLOW NUMBER

| | START | 203₁ START | 203₁ END | 203₂ START | 203₂ END | 203₃ START | 203₃ END | 203₄ START | 203₄ END | PROCESSING TIME | SERVICE LEVEL AGREEMENT |
|---|---|---|---|---|---|---|---|---|---|---|---|
| (a₁) | 605.093 | 605.093 | 615.093 | 615.093 | 631.093 | 631.093 | | | | | 150.000 |
| (b₁) | 615.433 | 615.433 | 625.433 | 625.433 | 641.433 | 645.102 | | | | | 150.000 |
| (c₁) | 630.635 | 630.635 | 640.635 | 640.635 | 656.635 | | | | | | 150.000 |

SYNTHESIZED WORKFLOW NUMBER

| | START | 203₅ START | 203₅ END | 203₃ START | 203₃ END | 203₆ START | 203₆ END | 203₇ START | 203₇ END | PROCESSING TIME | SERVICE LEVEL AGREEMENT |
|---|---|---|---|---|---|---|---|---|---|---|---|
| (a₂) | 605.102 | 605.102 | 615.102 | 615.102 | 645.102 | 645.102 | | | | | 180.000 |
| (b₂) | 655.181 | 655.181 | | | | | | | | | 180.000 |

Fig.63

(IN CASE OF ONLY MOST SUITABLE PRIORITY CONTROL (PREDICTION))

SYNTHESIZED WORKFLOW NUMBER

|   | START | $203_1$ START | $203_1$ END | $203_2$ START | $203_2$ END | $203_3$ START | $203_4$ START | $203_4$ END | | PROCESSING TIME | SERVICE LEVEL AGREEMENT |
|---|---|---|---|---|---|---|---|---|---|---|---|
| $(a_1)$ | 605.093 | 605.093 | 615.093 | 615.093 | 631.093 | 631.093 | 661.093 | 685.093 | | 80.000 | 150.000 |
| $(b_1)$ | 615.433 | 615.433 | 625.433 | 625.433 | 641.433 | 645.102 | 675.102 | 699.102 | | 83.669 | 150.000 |
| $(c_1)$ | 630.635 | 630.635 | 640.635 | 640.635 | 656.635 | 661.093 | 691.093 | 715.093 | | 84.458 | 150.000 |

SYNTHESIZED WORKFLOW NUMBER

|   | START | $203_5$ START | $203_5$ END | $203_3$ START | $203_3$ END | $203_6$ START | $203_6$ END | $203_4$ START | $203_7$ START | $203_7$ END | PROCESSING TIME | SERVICE LEVEL AGREEMENT |
|---|---|---|---|---|---|---|---|---|---|---|---|---|
| $(a_2)$ | 605.102 | 605.102 | 615.102 | 615.102 | 645.102 | 645.102 | 665.102 | 665.102 | 705.102 | 745.102 | 140.000 | 180.000 |
| $(b_2)$ | 655.181 | 655.181 | 665.181 | 675.102 | 705.102 | 705.102 | 725.102 | 725.102 | 765.102 | 805.102 | 149.921 | 180.000 |

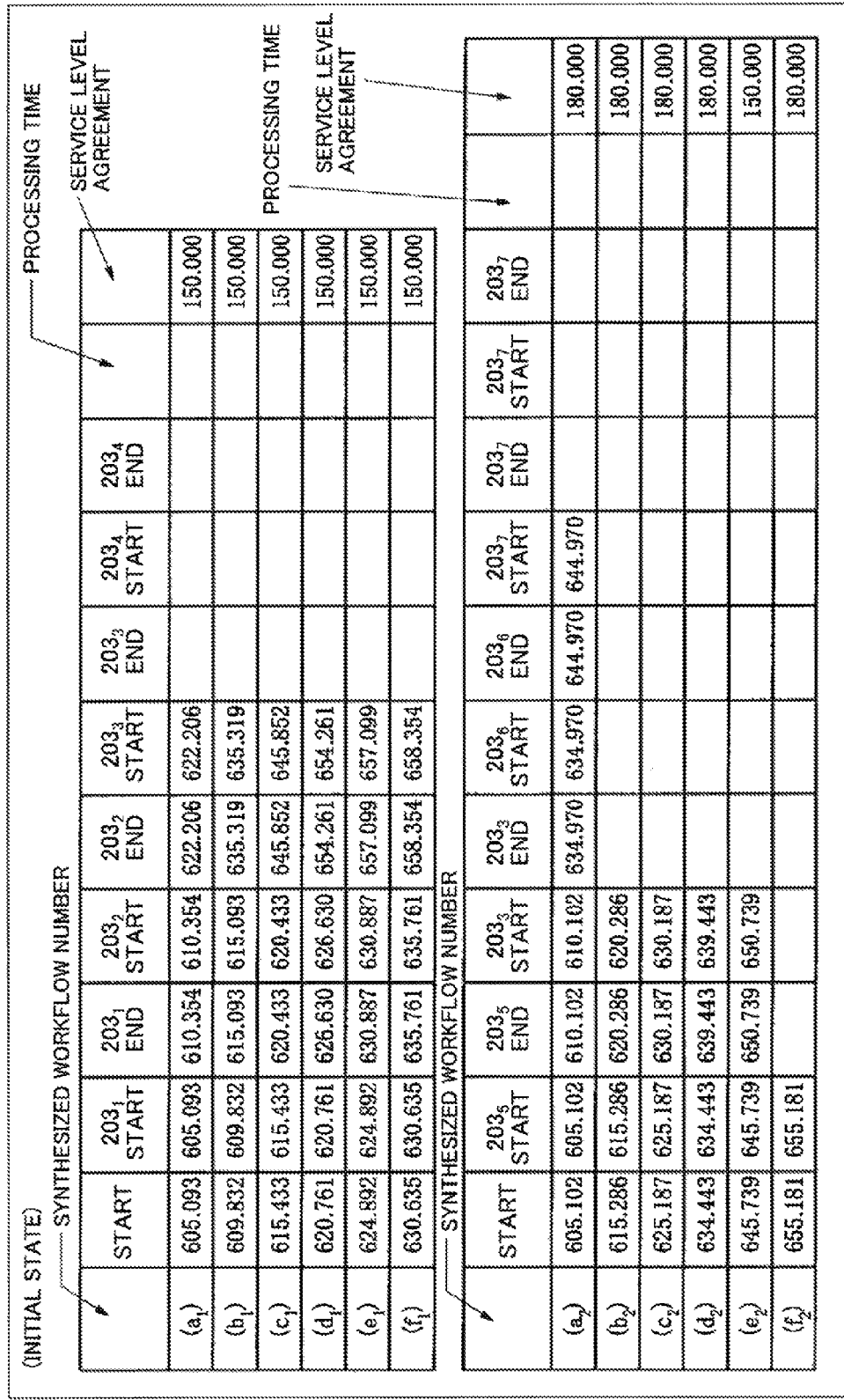

Fig.69

(IN CASE OF ONLY MOST SUITABLE PRIORITY CONTROL (PREDICTION))
SYNTHESIZED WORKFLOW NUMBER

|  | START | $203_1$ START | $203_1$ END | $203_2$ START | $203_2$ END | $203_3$ START | $203_3$ END | $203_4$ START | $203_4$ END | | PROCESSING TIME | SERVICE LEVEL AGREEMENT |
|---|---|---|---|---|---|---|---|---|---|---|---|---|
| $(a_1)$ | 605.093 | 605.093 | 610.354 | 610.354 | 622.206 | 622.206 | 726.424 | 726.424 | 738.424 | | 133.331 | 150.000 |
| $(b_1)$ | 609.832 | 609.832 | 615.093 | 615.093 | 635.319 | 635.319 | 756.891 | 756.891 | 768.891 | | 159.059 | 150.000 |
| $(c_1)$ | 615.433 | 615.433 | 620.433 | 620.433 | 645.852 | 645.852 | 769.486 | 769.486 | 781.486 | | 166.053 | 150.000 |
| $(d_1)$ | 620.761 | 620.761 | 626.630 | 626.630 | 654.261 | 654.261 | 774.253 | 781.486 | 793.486 | | 172.725 | 150.000 |
| $(e_1)$ | 624.892 | 624.892 | 630.887 | 630.887 | 657.099 | 657.099 | 774.963 | 793.486 | 805.486 | | 180.594 | 150.000 |
| $(f_1)$ | 630.635 | 630.635 | 635.761 | 635.761 | 658.354 | 658.354 | 775.102 | 805.486 | 817.486 | | 186.851 | 150.000 |

SYNTHESIZED WORKFLOW NUMBER

|  | START | $203_5$ START | $203_5$ END | $203_3$ START | $203_3$ END | $203_6$ START | $203_5$ END | $203_7$ START | $203_7$ END | $203_7$ START | $203_7$ END | PROCESSING TIME | SERVICE LEVEL AGREEMENT |
|---|---|---|---|---|---|---|---|---|---|---|---|---|---|
| $(a_2)$ | 605.102 | 605.102 | 610.102 | 610.102 | 634.970 | 634.970 | 644.970 | 644.970 | 664.970 | 664.970 | 684.970 | 79.868 | 180.000 |
| $(b_2)$ | 615.286 | 615.286 | 620.286 | 620.286 | 717.784 | 717.784 | 727.784 | 727.784 | 747.784 | 747.784 | 767.784 | 152.498 | 180.000 |
| $(c_2)$ | 625.187 | 625.187 | 630.187 | 630.187 | 747.706 | 747.706 | 757.706 | 767.784 | 787.784 | 787.784 | 797.784 | 172.597 | 180.000 |
| $(d_2)$ | 634.443 | 634.443 | 639.443 | 639.443 | 763.077 | 763.077 | 773.077 | 797.784 | 817.784 | 817.784 | 837.784 | 203.341 | 180.000 |
| $(e_2)$ | 645.739 | 645.739 | 650.739 | 650.739 | 772.744 | 773.077 | 783.077 | 877.784 | 897.784 | 897.784 | 917.784 | 272.045 | 150.000 |
| $(f_2)$ | 655.181 | 655.181 | 660.181 | 775.102 | 790.102 | 790.102 | 800.102 | 837.784 | 857.784 | 857.784 | 877.784 | 222.603 | 180.000 |

Fig.70

| SYNTHESIZED WORKFLOW | EXPECTED WAITING TIME IMPROVING AMOUNT |
|---|---:|
| FIRST BUSINESS APPLICATION | 5.7480332 |
| SECOND BUSINESS APPLICATION | 21.2162 |
| THIRD BUSINESS APPLICATION | 142.56167 |
| FOURTH BUSINESS APPLICATION | 9.3566667 |
| FIFTH BUSINESS APPLICATION | 0 |
| SIXTH BUSINESS APPLICATION | 0.0666 |
| SEVENTH BUSINESS APPLICATION | 31.4192 |

Fig.71

(COMPUTER RESOURCE ADDITION FIRST TIME (PREDICTION))

SYNTHESIZED WORKFLOW NUMBER

| | START | 203₁ START | 203₁ END | 203₂ START | 203₂ END | 203₃ START | 203₃ END | 203₄ START | 203₄ END | PROCESSING TIME | SERVICE LEVEL AGREEMENT |
|---|---|---|---|---|---|---|---|---|---|---|---|
| (a₁) | 605.093 | 605.093 | 610.354 | 610.354 | 622.206 | 622.206 | 715.353 | 715.353 | 727.353 | 122.260 | 150.000 |
| (b₁) | 609.832 | 609.832 | 615.093 | 615.093 | 635.319 | 635.319 | 740.743 | 740.743 | 752.743 | 142.911 | 150.000 |
| (c₁) | 615.433 | 615.433 | 620.433 | 620.433 | 645.852 | 645.852 | 751.238 | 752.743 | 764.743 | 149.310 | 150.000 |
| (d₁) | 620.761 | 620.761 | 626.630 | 626.630 | 654.261 | 654.261 | 755.211 | 776.743 | 788.743 | 167.982 | 150.000 |
| (e₁) | 624.892 | 624.892 | 630.887 | 630.887 | 657.099 | 657.099 | 755.802 | 788.743 | 800.743 | 175.851 | 150.000 |
| (f₁) | 630.635 | 630.635 | 635.761 | 635.761 | 658.354 | 658.354 | 755.919 | 764.743 | 776.743 | 146.108 | 150.000 |

SYNTHESIZED WORKFLOW NUMBER

| | START | 203₅ START | 203₅ END | 203₃ START | 203₃ END | 203₆ START | 203₆ END | 203₇ START | 203₇ END | 203₇ START | 203₇ END | PROCESSING TIME | SERVICE LEVEL AGREEMENT |
|---|---|---|---|---|---|---|---|---|---|---|---|---|---|
| (a₂) | 605.102 | 605.102 | 610.102 | 610.102 | 634.970 | 634.970 | 644.970 | 644.970 | 664.970 | 664.970 | 684.970 | 79.868 | 180.000 |
| (b₂) | 615.286 | 615.286 | 620.286 | 620.286 | 708.153 | 708.153 | 718.153 | 718.153 | 738.153 | 738.153 | 758.153 | 142.867 | 180.000 |
| (c₂) | 625.187 | 625.187 | 630.187 | 630.187 | 733.089 | 733.089 | 743.089 | 758.153 | 778.153 | 778.153 | 798.153 | 172.966 | 180.000 |
| (d₂) | 634.443 | 634.443 | 639.443 | 639.443 | 745.898 | 745.898 | 755.898 | 798.153 | 818.153 | 818.153 | 838.153 | 203.710 | 180.000 |
| (e₂) | 645.739 | 645.739 | 650.739 | 650.739 | 753.953 | 755.898 | 765.898 | 838.153 | 858.153 | 858.153 | 878.153 | 232.414 | 150.000 |
| (f₂) | 655.181 | 655.181 | 660.181 | 755.919 | 768.419 | 768.419 | 778.419 | 878.153 | 898.153 | 898.153 | 918.153 | 262.972 | 180.000 |

Fig.72

| SYNTHESIZED WORKFLOW | EXPECTED WAITING TIME IMPROVING AMOUNT |
|---|---:|
| FIRST BUSINESS APPLICATION | 3.9530848 |
| SECOND BUSINESS APPLICATION | 10.7686 |
| THIRD BUSINESS APPLICATION | 40.064552 |
| FOURTH BUSINESS APPLICATION | 9.0788333 |
| FIFTH BUSINESS APPLICATION | 0 |
| SIXTH BUSINESS APPLICATION | 0.389 |
| SEVENTH BUSINESS APPLICATION | 42.8488 |

Fig.73

(COMPUTER RESOURCE ADDITION SECOND TIME (PREDICTION))

SYNTHESIZED WORKFLOW NUMBER

|  | START | $203_1$ START | $203_1$ END | $203_2$ START | $203_2$ END | $203_3$ START | $203_3$ END | $203_4$ START | $203_4$ END | PROCESSING TIME | SERVICE LEVEL AGREEMENT |
|---|---|---|---|---|---|---|---|---|---|---|---|
| $(a_1)$ | 605.093 | 605.093 | 610.354 | 610.354 | 622.206 | 622.206 | 715.353 | 715.353 | 727.353 | 122.260 | 150.000 |
| $(b_1)$ | 609.832 | 609.832 | 615.093 | 615.093 | 635.319 | 635.319 | 740.743 | 740.743 | 752.743 | 142.911 | 150.000 |
| $(c_1)$ | 615.433 | 615.433 | 620.433 | 620.433 | 645.852 | 645.852 | 751.238 | 752.743 | 764.743 | 149.310 | 150.000 |
| $(d_1)$ | 620.761 | 620.761 | 626.630 | 626.630 | 654.261 | 654.261 | 755.211 | 776.743 | 788.743 | 167.982 | 150.000 |
| $(e_1)$ | 624.892 | 624.892 | 630.887 | 630.887 | 657.099 | 657.099 | 755.802 | 788.743 | 800.743 | 175.851 | 150.000 |
| $(f_1)$ | 630.635 | 630.635 | 635.761 | 635.761 | 658.354 | 658.354 | 755.919 | 764.743 | 776.743 | 146.108 | 150.000 |

SYNTHESIZED WORKFLOW NUMBER

|  | START | $203_5$ START | $203_5$ END | $203_3$ START | $203_3$ END | $203_6$ START | $203_6$ END | $203_7$ START | $203_7$ END | PROCESSING TIME | SERVICE LEVEL AGREEMENT |
|---|---|---|---|---|---|---|---|---|---|---|---|
| $(a_2)$ | 605.102 | 605.102 | 610.102 | 610.102 | 634.970 | 634.970 | 644.970 | 644.970 | 663.976 | 663.976 | 679.976 | 74.874 | 180.000 |
| $(b_2)$ | 615.286 | 615.286 | 620.286 | 620.286 | 708.153 | 708.153 | 718.153 | 718.153 | 734.153 | 734.153 | 750.153 | 134.867 | 180.000 |
| $(c_2)$ | 625.187 | 625.187 | 630.187 | 630.187 | 733.089 | 733.089 | 743.089 | 750.153 | 766.153 | 766.153 | 782.153 | 156.966 | 180.000 |
| $(d_2)$ | 634.443 | 634.443 | 639.443 | 639.443 | 745.898 | 745.898 | 755.898 | 782.153 | 796.153 | 796.153 | 812.153 | 177.710 | 180.000 |
| $(e_2)$ | 645.739 | 645.739 | 650.739 | 650.739 | 753.953 | 755.898 | 765.898 | 856.153 | 872.153 | 872.153 | 886.153 | 240.414 | 150.000 |
| $(f_2)$ | 655.181 | 655.181 | 660.181 | 755.919 | 768.419 | 768.419 | 778.419 | 812.153 | 838.153 | 838.153 | 856.153 | 200.972 | 180.000 |

Fig.74

| SYNTHESIZED WORKFLOW | EXPECTED WAITING TIME IMPROVING AMOUNT |
|---|---|
| FIRST BUSINESS APPLICATION | 0 |
| SECOND BUSINESS APPLICATION | 0 |
| THIRD BUSINESS APPLICATION | 39.277998 |
| FOURTH BUSINESS APPLICATION | 0 |
| FIFTH BUSINESS APPLICATION | 0 |
| SIXTH BUSINESS APPLICATION | 0 |
| SEVENTH BUSINESS APPLICATION | 22.325917 |

Fig.75

(COMPUTER RESOURCE ADDITION THIRD TIME (PREDICTION))
SYNTHESIZED WORKFLOW NUMBER

|  | START | 203₁ START | 203₁ END | 203₂ START | 203₂ END | 203₃ START | 203₃ END | 203₄ START | 203₄ END | | |
|---|---|---|---|---|---|---|---|---|---|---|---|
| (a₁) | 605.093 | 605.093 | 610.354 | 610.354 | 622.206 | 622.206 | 707.444 | 707.444 | 719.444 | 114.351 | 150.000 |
| (b₁) | 609.832 | 609.832 | 615.093 | 615.093 | 635.319 | 635.319 | 729.206 | 729.206 | 741.206 | 131.374 | 150.000 |
| (c₁) | 615.433 | 615.433 | 620.433 | 620.433 | 645.852 | 645.852 | 738.202 | 741.206 | 753.206 | 137.773 | 150.000 |
| (d₁) | 620.761 | 620.761 | 626.630 | 626.630 | 654.261 | 654.261 | 741.607 | 753.206 | 765.206 | 144.445 | 150.000 |
| (e₁) | 624.892 | 624.892 | 630.887 | 630.887 | 657.099 | 657.099 | 742.114 | 777.206 | 789.206 | 164.314 | 150.000 |
| (f₁) | 630.635 | 630.635 | 635.761 | 635.761 | 658.354 | 658.354 | 742.214 | 765.206 | 777.206 | 146.571 | 150.000 |

—PROCESSING TIME
—SERVICE LEVEL AGREEMENT

SYNTHESIZED WORKFLOW NUMBER

|  | START | 203₅ START | 203₅ END | 203₃ START | 203₃ END | 203₆ START | 203₆ END | 203₇ START | 203₇ END | | |
|---|---|---|---|---|---|---|---|---|---|---|---|
| (a₂) | 605.102 | 605.102 | 610.102 | 610.102 | 634.970 | 634.970 | 644.970 | 644.970 | 663.976 | 663.976 | 679.976 | 74.874 | 180.000 |
| (b₂) | 615.286 | 615.286 | 620.286 | 620.286 | 701.273 | 701.273 | 711.273 | 711.273 | 727.273 | 727.273 | 743.273 | 127.987 | 180.000 |
| (c₂) | 625.187 | 625.187 | 630.187 | 630.187 | 722.646 | 722.646 | 732.646 | 743.624 | 759.624 | 759.624 | 775.624 | 150.437 | 180.000 |
| (d₂) | 634.443 | 634.443 | 639.443 | 639.443 | 733.624 | 733.624 | 743.624 | 775.624 | 791.624 | 791.624 | 807.624 | 173.181 | 180.000 |
| (e₂) | 645.739 | 645.739 | 650.739 | 650.739 | 740.529 | 743.624 | 753.624 | 839.624 | 855.624 | 855.624 | 871.624 | 225.885 | 150.000 |
| (f₂) | 655.181 | 655.181 | 660.181 | 742.214 | 752.928 | 753.624 | 763.624 | 807.624 | 823.624 | 823.624 | 839.624 | 184.443 | 180.000 |

—PROCESSING TIME
—SERVICE LEVEL AGREEMENT

Fig.76

| SYNTHESIZED WORKFLOW | EXPECTED WAITING TIME IMPROVING AMOUNT |
|---|---|
| FIRST BUSINESS APPLICATION | 0 |
| SECOND BUSINESS APPLICATION | 0 |
| THIRD BUSINESS APPLICATION | 29.420757 |
| FOURTH BUSINESS APPLICATION | 0 |
| FIFTH BUSINESS APPLICATION | 0 |
| SIXTH BUSINESS APPLICATION | 0.7582 |
| SEVENTH BUSINESS APPLICATION | 21.669375 |

Fig.77

(COMPUTER RESOURCE ADDITION FOURTH TIME (PREDICTION))
SYNTHESIZED WORKFLOW NUMBER

| | START | $203_5$ START | $203_1$ END | $203_2$ START | $203_2$ END | $203_3$ START | $203_3$ END | $203_4$ START | $203_4$ END | | PROCESSING TIME | SERVICE LEVEL AGREEMENT |
|---|---|---|---|---|---|---|---|---|---|---|---|---|
| $(a_1)$ | 605.093 | 605.093 | 610.354 | 610.354 | 622.206 | 622.206 | 701.515 | 701.515 | 713.515 | | 108.422 | 150.000 |
| $(b_1)$ | 609.832 | 609.832 | 615.093 | 615.093 | 635.319 | 635.319 | 720.557 | 720.557 | 732.557 | | 122.725 | 150.000 |
| $(c_1)$ | 615.433 | 615.433 | 620.433 | 620.433 | 645.852 | 645.852 | 728.429 | 732.557 | 744.557 | | 129.124 | 150.000 |
| $(d_1)$ | 620.761 | 620.761 | 626.630 | 626.630 | 654.261 | 654.261 | 731.408 | 744.557 | 756.557 | | 135.796 | 150.000 |
| $(e_1)$ | 624.892 | 624.892 | 630.887 | 630.887 | 657.099 | 657.099 | 731.852 | 756.557 | 768.557 | | 143.665 | 150.000 |
| $(f_1)$ | 630.635 | 630.635 | 635.761 | 635.761 | 658.354 | 658.354 | 731.939 | 768.557 | 780.557 | | 149.922 | 150.000 |

SYNTHESIZED WORKFLOW NUMBER

| | START | $203_5$ START | $203_5$ END | $203_3$ START | $203_3$ END | $203_6$ START | $203_6$ END | $203_7$ START | $203_7$ END | | PROCESSING TIME | SERVICE LEVEL AGREEMENT |
|---|---|---|---|---|---|---|---|---|---|---|---|---|
| $(a_2)$ | 605.102 | 605.102 | 610.102 | 610.102 | 634.970 | 634.970 | 644.970 | 663.976 | 679.976 | | 74.874 | 180.000 |
| $(b_2)$ | 615.286 | 615.286 | 620.286 | 620.286 | 696.115 | 696.115 | 706.115 | 722.115 | 738.115 | | 122.829 | 180.000 |
| $(c_2)$ | 625.187 | 625.187 | 630.187 | 630.187 | 714.817 | 714.817 | 724.817 | 754.115 | 770.115 | | 144.928 | 180.000 |
| $(d_2)$ | 634.443 | 634.443 | 639.443 | 639.443 | 724.423 | 724.817 | 734.817 | 786.115 | 802.115 | | 167.672 | 180.000 |
| $(e_2)$ | 645.739 | 645.739 | 650.739 | 650.739 | 730.465 | 734.817 | 744.817 | 850.115 | 865.115 | | 219.376 | 150.000 |
| $(f_2)$ | 655.181 | 655.181 | 660.181 | 731.939 | 741.314 | 744.817 | 754.817 | 818.115 | 834.115 | | 178.934 | 180.000 |

Fig.78

| SYNTHESIZED WORKFLOW | EXPECTED WAITING TIME IMPROVING AMOUNT |
|---|---:|
| FIRST BUSINESS APPLICATION | 0 |
| SECOND BUSINESS APPLICATION | 0 |
| THIRD BUSINESS APPLICATION | 7.8192791 |
| FOURTH BUSINESS APPLICATION | 0 |
| FIFTH BUSINESS APPLICATION | 0 |
| SIXTH BUSINESS APPLICATION | 0.8704 |
| SEVENTH BUSINESS APPLICATION | 14.718173 |

Fig.79

(COMPUTER RESOURCE ADDITION FIFTH TIME (PREDICTION))
SYNTHESIZED WORKFLOW NUMBER

| | START | $203_1$ START | $203_1$ END | $203_2$ START | $203_2$ END | $203_3$ START | $203_3$ END | $203_4$ START | $203_4$ END | PROCESSING TIME | SERVICE LEVEL AGREEMENT |
|---|---|---|---|---|---|---|---|---|---|---|---|
| ($a_1$) | 605.093 | 605.093 | 610.354 | 610.354 | 622.206 | 622.206 | 701.515 | 701.515 | 713.515 | 108.422 | 150.000 |
| ($b_1$) | 609.832 | 609.832 | 615.093 | 615.093 | 635.319 | 635.319 | 720.557 | 720.557 | 732.557 | 122.725 | 150.000 |
| ($c_1$) | 615.433 | 615.433 | 620.433 | 620.433 | 645.852 | 645.852 | 728.429 | 732.557 | 744.557 | 129.124 | 150.000 |
| ($d_1$) | 620.761 | 620.761 | 626.630 | 626.630 | 654.261 | 654.261 | 731.408 | 744.557 | 756.557 | 135.796 | 150.000 |
| ($e_1$) | 624.892 | 624.892 | 630.887 | 630.887 | 657.099 | 657.099 | 731.852 | 756.557 | 768.557 | 143.665 | 150.000 |
| ($f_1$) | 630.635 | 630.635 | 635.761 | 635.761 | 658.354 | 658.354 | 731.939 | 768.557 | 780.557 | 149.922 | 150.000 |

SYNTHESIZED WORKFLOW NUMBER

| | START | $203_5$ START | $203_5$ END | $203_2$ START | $203_2$ END | $203_6$ START | $203_6$ END | $203_7$ START | $203_7$ END | PROCESSING TIME | SERVICE LEVEL AGREEMENT |
|---|---|---|---|---|---|---|---|---|---|---|---|
| ($a_2$) | 605.102 | 605.102 | 610.102 | 610.102 | 634.970 | 634.970 | 644.970 | 663.313 | 679.313 | 74.211 | 180.000 |
| ($b_2$) | 615.286 | 615.286 | 620.286 | 620.286 | 696.115 | 696.115 | 706.115 | 719.448 | 732.781 | 117.495 | 180.000 |
| ($c_2$) | 625.187 | 625.187 | 630.187 | 630.187 | 714.817 | 714.817 | 724.817 | 772.780 | 786.113 | 160.926 | 180.000 |
| ($d_2$) | 634.443 | 634.443 | 639.443 | 639.443 | 724.423 | 724.817 | 734.817 | 799.446 | 812.779 | 178.336 | 180.000 |
| ($e_2$) | 645.739 | 645.739 | 650.739 | 650.739 | 730.465 | 734.817 | 744.817 | 759.446 | 772.780 | 127.041 | 150.000 |
| ($f_2$) | 655.181 | 655.181 | 660.181 | 731.939 | 741.314 | 744.817 | 754.817 | 826.112 | 839.445 | 184.264 | 180.000 |

Fig.80

| SYNTHESIZED WORKFLOW | EXPECTED WAITING TIME IMPROVING AMOUNT |
|---|---:|
| FIRST BUSINESS APPLICATION | 0 |
| SECOND BUSINESS APPLICATION | 0 |
| THIRD BUSINESS APPLICATION | 7.9756625 |
| FOURTH BUSINESS APPLICATION | 0 |
| FIFTH BUSINESS APPLICATION | 0 |
| SIXTH BUSINESS APPLICATION | 0.7006 |
| SEVENTH BUSINESS APPLICATION | 8.2771805 |

Fig.81

(COMPUTER RESOURCE ADDITION SIXTH TIME (PREDICTION))

SYNTHESIZED WORKFLOW NUMBER

| | START | $203_1$ START | $203_1$ END | $203_2$ START | $203_2$ END | $203_3$ START | $203_3$ END | $203_4$ START | $203_4$ END | | PROCESSING TIME | SERVICE LEVEL AGREEMENT |
|---|---|---|---|---|---|---|---|---|---|---|---|---|
| $(a_1)$ | 605.093 | 605.093 | 610.354 | 610.354 | 622.206 | 622.206 | 701.515 | 701.515 | 713.515 | | 108.422 | 150.000 |
| $(b_1)$ | 609.832 | 609.832 | 615.093 | 615.093 | 635.319 | 635.319 | 720.557 | 720.557 | 732.557 | | 122.725 | 150.000 |
| $(c_1)$ | 615.433 | 615.433 | 620.433 | 620.433 | 645.852 | 645.852 | 732.557 | 732.557 | 744.557 | | 129.124 | 150.000 |
| $(d_1)$ | 620.761 | 620.761 | 626.630 | 626.630 | 654.261 | 654.261 | 731.408 | 744.557 | 756.557 | | 135.796 | 150.000 |
| $(e_1)$ | 624.892 | 624.892 | 630.887 | 630.887 | 657.099 | 657.099 | 731.852 | 756.557 | 768.557 | | 143.665 | 150.000 |
| $(f_1)$ | 630.635 | 630.635 | 635.761 | 635.761 | 658.354 | 658.354 | 731.939 | 768.557 | 780.557 | | 149.922 | 150.000 |

SYNTHESIZED WORKFLOW NUMBER

| | START | $203_5$ START | $203_5$ END | $203_3$ START | $203_3$ END | $203_6$ START | $203_6$ END | $203_7$ START | $203_7$ END | | PROCESSING TIME | SERVICE LEVEL AGREEMENT |
|---|---|---|---|---|---|---|---|---|---|---|---|---|
| $(a_2)$ | 605.102 | 605.102 | 610.102 | 610.102 | 634.970 | 634.970 | 644.970 | 662.840 | 678.840 | | 73.738 | 180.000 |
| $(b_2)$ | 615.286 | 615.286 | 620.286 | 620.286 | 696.115 | 696.115 | 706.115 | 719.448 | 730.877 | | 115.591 | 180.000 |
| $(c_2)$ | 625.187 | 625.187 | 630.187 | 630.187 | 714.817 | 714.817 | 724.817 | 742.306 | 753.735 | | 128.548 | 180.000 |
| $(d_2)$ | 634.443 | 634.443 | 639.443 | 639.443 | 724.423 | 724.817 | 734.817 | 753.735 | 788.022 | | 165.008 | 180.000 |
| $(e_2)$ | 645.739 | 645.739 | 650.739 | 650.739 | 730.465 | 734.817 | 744.817 | 765.164 | 776.593 | | 130.854 | 150.000 |
| $(f_2)$ | 655.181 | 655.181 | 660.181 | 731.939 | 741.314 | 744.817 | 754.817 | 799.451 | 810.880 | | 167.128 | 180.000 |

Fig.83

(IN CASE OF ONLY MOST SUITABLE PRIORITY CONTROL (PREDICTION))

SYNTHESIZED WORKFLOW NUMBER →

| | START | $203_1$ START | $203_1$ END | $203_2$ START | $203_2$ END | $203_3$ START | $203_3$ END | $203_4$ START | $203_4$ END | PROCESSING TIME | SERVICE LEVEL AGREEMENT |
|---|---|---|---|---|---|---|---|---|---|---|---|
| $(a_1)$ | 605.093 | 605.093 | 610.354 | 610.354 | 622.206 | 622.206 | 701.515 | 701.515 | 713.515 | 108.422 | 150.000 |
| $(b_1)$ | 609.832 | 609.832 | 615.093 | 615.093 | 635.319 | 635.319 | 720.557 | 720.557 | 732.557 | 122.725 | 150.000 |
| $(c_1)$ | 615.433 | 615.433 | 620.433 | 620.433 | 645.852 | 645.852 | 728.429 | 732.557 | 744.557 | 129.124 | 150.000 |
| $(d_1)$ | 620.761 | 620.761 | 626.630 | 626.630 | 654.261 | 654.261 | 731.408 | 744.557 | 756.557 | 135.796 | 150.000 |
| $(e_1)$ | 624.892 | 624.892 | 630.887 | 630.887 | 657.099 | 657.099 | 731.852 | 756.557 | 768.557 | 143.665 | 150.000 |
| $(f_1)$ | 630.635 | 630.635 | 635.761 | 635.761 | 658.354 | 658.354 | 731.939 | 768.557 | 780.557 | 149.922 | 150.000 |

SYNTHESIZED WORKFLOW NUMBER →

| | START | $203_5$ START | $203_5$ END | $203_3$ START | $203_3$ END | $203_6$ START | $203_6$ END | $203_7$ START | $203_7$ END | PROCESSING TIME | SERVICE LEVEL AGREEMENT |
|---|---|---|---|---|---|---|---|---|---|---|---|
| $(a_2)$ | 605.102 | 605.102 | 610.102 | 610.102 | 634.970 | 634.970 | 644.970 | 662.840 | 678.840 | 73.738 | 180.000 |
| $(b_2)$ | 615.286 | 615.286 | 620.286 | 620.286 | 696.115 | 696.115 | 706.115 | 719.448 | 730.877 | 115.591 | 180.000 |
| $(c_2)$ | 625.187 | 625.187 | 630.187 | 630.187 | 714.817 | 714.817 | 724.817 | 742.306 | 753.735 | 128.548 | 180.000 |
| $(d_2)$ | 634.443 | 634.443 | 639.443 | 639.443 | 724.423 | ↑ | ↑ | 753.735 | 788.022 | 153.579 | 180.000 |
| $(e_2)$ | 645.739 | 645.739 | 650.739 | 650.739 | 730.465 | 734.817 | 744.817 | 765.164 | 776.593 | 130.854 | 150.000 |
| $(f_2)$ | 655.181 | 655.181 | 660.181 | 731.939 | 741.314 | 744.817 | 754.817 | 788.022 | 810.880 | 155.699 | 180.000 |

Fig. 85

(INITIAL STATE)

SYNTHESIZED WORKFLOW NUMBER

| | START | $203_1$ START | $203_1$ END | $203_2$ START | $203_2$ END | $203_3$ START | $203_3$ END | $203_4$ START | $203_4$ END | | PROCESSING TIME | SERVICE LEVEL AGREEMENT |
|---|---|---|---|---|---|---|---|---|---|---|---|---|
| $(a_1)$ | 605.093 | 605.093 | 610.093 | 610.093 | 618.093 | 618.093 | 653.329 | 653.329 | 665.329 | | 60.236 | 150.000 |
| $(b_1)$ | 615.433 | 615.433 | 620.433 | 620.433 | 628.433 | 628.102 | | | | | | 150.000 |
| $(c_1)$ | 630.635 | 630.635 | 635.635 | 635.635 | 643.635 | 643.635 | | | | | | 150.000 |

SYNTHESIZED WORKFLOW NUMBER

| | START | $203_5$ START | $203_5$ END | $203_3$ START | $203_3$ END | $203_6$ START | $203_6$ END | $203_7$ START | $203_7$ END | | PROCESSING TIME | SERVICE LEVEL AGREEMENT |
|---|---|---|---|---|---|---|---|---|---|---|---|---|
| $(a_2)$ | 605.102 | 605.102 | 610.102 | 610.102 | 634.116 | 634.116 | 644.116 | 644.116 | | | | 180.000 |
| $(b_2)$ | 655.181 | 655.181 | | | | | | | | | | 180.000 |

Fig.86

(IN CASE OF ONLY MOST SUITABLE PRIORITY CONTROL (PREDICTION))

SYNTHESIZED WORKFLOW NUMBER

| | START | 203₁ START | 203₁ END | 203₂ START | 203₂ END | 203₃ START | 203₃ END | 203₄ START | 203₄ END | PROCESSING TIME | SERVICE LEVEL AGREEMENT |
|---|---|---|---|---|---|---|---|---|---|---|---|
| (a₁) | 605.093 | 605.093 | 610.093 | 610.093 | 618.093 | 618.093 | 653.329 | 653.329 | 665.329 | 60.236 | 150.000 |
| (b₁) | 615.433 | 615.433 | 620.433 | 620.433 | 628.433 | 628.102 | 663.338 | 665.329 | 677.329 | 61.896 | 150.000 |
| (c₁) | 630.635 | 630.635 | 635.635 | 635.635 | 643.635 | 643.635 | 670.102 | 677.329 | 689.329 | 58.694 | 150.000 |

SYNTHESIZED WORKFLOW NUMBER

| | START | 203₅ START | 203₅ END | 203₃ START | 203₃ END | 203₆ START | 203₆ END | 203₇ START | 203₇ END | PROCESSING TIME | SERVICE LEVEL AGREEMENT |
|---|---|---|---|---|---|---|---|---|---|---|---|
| (a₂) | 605.102 | 605.102 | 610.102 | 610.102 | 634.116 | 634.116 | 644.116 | 644.116 | 664.116 | 664.116 | 684.116 | 79.014 | 180.000 |
| (b₂) | 655.181 | 655.181 | 660.181 | 670.102 | 685.102 | 685.102 | 695.102 | 695.102 | 715.102 | 715.102 | 735.102 | 79.921 | 180.000 |

Fig.89

(INITIAL STATE)

SYNTHESIZED WORKFLOW NUMBER

| | START | $203_1$ START | $203_1$ END | $203_2$ START | $203_2$ END | $203_3$ START | $203_3$ END | $203_4$ START | $203_4$ END | PROCESSING TIME | SERVICE LEVEL AGREEMENT |
|---|---|---|---|---|---|---|---|---|---|---|---|
| $(a_1)$ | 605.093 | 605.093 | 610.354 | 610.354 | 622.206 | 622.206 | | | | | 150.000 |
| $(b_1)$ | 609.832 | 609.832 | 615.093 | 615.093 | 635.319 | 635.319 | | | | | 150.000 |
| $(c_1)$ | 615.433 | 615.433 | 620.433 | 620.433 | 645.852 | 645.852 | | | | | 150.000 |
| $(d_1)$ | 620.761 | 620.761 | 626.630 | 626.630 | 654.261 | 654.261 | | | | | 150.000 |
| $(e_1)$ | 624.892 | 624.892 | 630.887 | 630.887 | 657.099 | 657.099 | | | | | 150.000 |
| $(f_1)$ | 630.635 | 630.635 | 635.761 | 635.761 | 658.354 | 658.354 | | | | | 150.000 |

SYNTHESIZED WORKFLOW NUMBER

| | START | $203_5$ START | $203_5$ END | $203_3$ START | $203_3$ END | $203_6$ START | $203_6$ END | $203_7$ START | $203_7$ END | PROCESSING TIME | SERVICE LEVEL AGREEMENT |
|---|---|---|---|---|---|---|---|---|---|---|---|
| $(a_2)$ | 605.102 | 605.102 | 610.102 | 610.102 | 634.970 | 634.970 | 644.970 | 644.970 | | | 180.000 |
| $(b_2)$ | 615.286 | 615.286 | 620.286 | 620.286 | | | | | | | 180.000 |
| $(c_2)$ | 625.187 | 625.187 | 630.187 | 630.187 | | | | | | | 180.000 |
| $(d_2)$ | 634.443 | 634.443 | 639.443 | 639.443 | | | | | | | 180.000 |
| $(e_2)$ | 645.739 | 645.739 | 650.739 | 650.739 | | | | | | | 150.000 |
| $(f_2)$ | 655.181 | 655.181 | | | | | | | | | 180.000 |

Fig.90

(IN CASE OF ONLY MOST SUITABLE PRIORITY CONTROL (PREDICTION))

SYNTHESIZED WORKFLOW NUMBER

| | START | $203_1$ START | $203_1$ END | $203_2$ START | $203_2$ END | $203_3$ START | $203_3$ END | $203_4$ START | $203_4$ END | | PROCESSING TIME | SERVICE LEVEL AGREEMENT |
|---|---|---|---|---|---|---|---|---|---|---|---|---|
| $(a_1)$ | 605.093 | 605.093 | 610.354 | 610.354 | 622.206 | 622.206 | 666.738 | 666.738 | 678.738 | | 73.645 | 150.000 |
| $(b_1)$ | 609.832 | 609.832 | 615.093 | 615.093 | 635.319 | 635.319 | 683.227 | 683.227 | 695.227 | | 85.395 | 150.000 |
| $(c_1)$ | 615.433 | 615.433 | 620.433 | 620.433 | 645.852 | 645.852 | 696.251 | 696.251 | 708.251 | | 92.818 | 150.000 |
| $(d_1)$ | 620.761 | 620.761 | 626.630 | 626.630 | 654.261 | 654.261 | 719.991 | 719.991 | 731.991 | | 111.230 | 150.000 |
| $(e_1)$ | 624.892 | 624.892 | 630.887 | 630.887 | 657.099 | 657.099 | 734.687 | 734.687 | 746.687 | | 121.795 | 150.000 |
| $(f_1)$ | 630.635 | 630.635 | 635.761 | 635.761 | 658.354 | 658.354 | 761.264 | 761.264 | 773.264 | | 142.629 | 150.000 |

SYNTHESIZED WORKFLOW NUMBER

| | START | $203_5$ START | $203_5$ END | $203_3$ START | $203_3$ END | $203_6$ START | $203_6$ END | $203_7$ START | $203_7$ END | | PROCESSING TIME | SERVICE LEVEL AGREEMENT |
|---|---|---|---|---|---|---|---|---|---|---|---|---|
| $(a_2)$ | 605.102 | 605.102 | 610.102 | 610.102 | 634.970 | 634.970 | 644.970 | 664.970 | 684.970 | | 79.868 | 180.000 |
| $(b_2)$ | 615.286 | 615.286 | 620.286 | 620.286 | 672.516 | 672.516 | 682.516 | 704.970 | 724.970 | | 109.684 | 180.000 |
| $(c_2)$ | 625.187 | 625.187 | 630.187 | 630.187 | 705.650 | 705.650 | 715.650 | 744.970 | 764.970 | | 139.783 | 180.000 |
| $(d_2)$ | 634.443 | 634.443 | 639.443 | 639.443 | 746.429 | 746.429 | 756.429 | 784.970 | 804.970 | | 170.527 | 180.000 |
| $(e_2)$ | 645.739 | 645.739 | 650.739 | 650.739 | 790.102 | 790.102 | 800.102 | 864.970 | 884.970 | | 239.231 | 150.000 |
| $(f_2)$ | 655.181 | 655.181 | 660.181 | 660.181 | 776.264 | 776.264 | 786.264 | 824.970 | 844.970 | | 189.789 | 180.000 |

Fig.91

| SYNTHESIZED WORKFLOW | EXPECTED WAITING TIME IMPROVING AMOUNT |
|---|---|
| FIRST BUSINESS APPLICATION | 0 |
| SECOND BUSINESS APPLICATION | 0 |
| THIRD BUSINESS APPLICATION | 37.574333 |
| FOURTH BUSINESS APPLICATION | 0 |
| FIFTH BUSINESS APPLICATION | 0 |
| SIXTH BUSINESS APPLICATION | 0 |
| SEVENTH BUSINESS APPLICATION | 12.7148 |

Fig.92

(COMPUTER RESOURCE ADDITION FIRST TIME (PREDICTION))
SYNTHESIZED WORKFLOW NUMBER

| | START | $203_5$ START | $203_1$ END | $203_2$ START | $203_2$ END | $203_3$ START | $203_3$ END | $203_4$ START | $203_4$ END | | PROCESSING TIME | SERVICE LEVEL AGREEMENT |
|---|---|---|---|---|---|---|---|---|---|---|---|---|
| $(a_1)$ | 605.093 | 605.093 | 610.354 | 610.354 | 622.206 | 622.206 | 665.615 | 665.615 | 677.615 | | 72.522 | 150.000 |
| $(b_1)$ | 609.832 | 609.832 | 615.093 | 615.093 | 635.319 | 635.319 | 683.656 | 683.656 | 695.656 | | 85.824 | 150.000 |
| $(c_1)$ | 615.433 | 615.433 | 620.433 | 620.433 | 645.852 | 645.852 | 694.509 | 695.656 | 707.656 | | 92.223 | 150.000 |
| $(d_1)$ | 620.761 | 620.761 | 626.630 | 626.630 | 654.261 | 654.261 | 706.460 | 707.656 | 719.656 | | 98.895 | 150.000 |
| $(e_1)$ | 624.892 | 624.892 | 630.887 | 630.887 | 657.099 | 657.099 | 726.539 | 726.539 | 738.539 | | 113.647 | 150.000 |
| $(f_1)$ | 630.635 | 630.635 | 635.761 | 635.761 | 658.354 | 658.354 | 738.902 | 738.539 | 750.539 | | 119.904 | 150.000 |

SYNTHESIZED WORKFLOW NUMBER

| | START | $203_5$ START | $203_5$ END | $203_3$ START | $203_3$ END | $203_6$ START | $203_6$ END | $203_7$ START | $203_7$ END | | PROCESSING TIME | SERVICE LEVEL AGREEMENT |
|---|---|---|---|---|---|---|---|---|---|---|---|---|
| $(a_2)$ | 605.102 | 605.102 | 610.102 | 634.970 | 634.970 | 634.970 | 644.970 | 664.970 | 684.970 | | 79.868 | 180.000 |
| $(b_2)$ | 615.286 | 615.286 | 620.286 | 670.430 | 670.430 | 670.430 | 680.430 | 704.970 | 724.970 | | 109.684 | 180.000 |
| $(c_2)$ | 625.187 | 625.187 | 630.187 | 714.292 | 714.292 | 714.292 | 724.292 | 744.970 | 764.970 | | 139.783 | 180.000 |
| $(d_2)$ | 634.443 | 634.443 | 639.443 | 748.687 | 748.687 | 748.687 | 758.687 | 784.970 | 804.970 | | 170.527 | 180.000 |
| $(e_2)$ | 645.739 | 645.739 | 650.739 | 772.899 | 772.899 | 772.899 | 782.899 | 844.970 | 864.970 | | 239.231 | 150.000 |
| $(f_2)$ | 655.181 | 655.181 | 660.181 | 761.367 | 761.367 | 761.367 | 771.367 | 824.970 | 844.970 | | 189.789 | 180.000 |

Fig.93

| SYNTHESIZED WORKFLOW | EXPECTED WAITING TIME IMPROVING AMOUNT |
|---|---:|
| FIRST BUSINESS APPLICATION | 0 |
| SECOND BUSINESS APPLICATION | 0 |
| THIRD BUSINESS APPLICATION | 28.339676 |
| FOURTH BUSINESS APPLICATION | 0 |
| FIFTH BUSINESS APPLICATION | 0 |
| SIXTH BUSINESS APPLICATION | 0 |
| SEVENTH BUSINESS APPLICATION | 19.1348 |

Fig.94

(COMPUTER RESOURCE ADDITION SECOND TIME (PREDICTION))
SYNTHESIZED WORKFLOW NUMBER

| | START | $203_1$ START | $203_1$ END | $203_2$ START | $203_2$ END | $203_3$ START | $203_3$ END | $203_4$ START | $203_4$ END | PROCESSING TIME | SERVICE LEVEL AGREEMENT |
|---|---|---|---|---|---|---|---|---|---|---|---|
| $(a_1)$ | 605.093 | 605.093 | 610.354 | 610.354 | 622.206 | 622.206 | 664.813 | 664.813 | 676.813 | 71.720 | 150.000 |
| $(b_1)$ | 609.832 | 609.832 | 615.093 | 615.093 | 635.319 | 635.319 | 676.590 | 676.813 | 688.813 | 78.981 | 150.000 |
| $(c_1)$ | 615.433 | 615.433 | 620.433 | 620.433 | 645.852 | 645.852 | 685.892 | 688.813 | 700.813 | 85.380 | 150.000 |
| $(d_1)$ | 620.761 | 620.761 | 626.630 | 626.630 | 654.261 | 654.261 | 696.135 | 700.813 | 712.813 | 92.052 | 150.000 |
| $(e_1)$ | 624.892 | 624.892 | 630.887 | 630.887 | 657.099 | 657.099 | 713.345 | 713.345 | 725.345 | 100.453 | 150.000 |
| $(f_1)$ | 630.635 | 630.635 | 635.761 | 635.761 | 658.354 | 658.354 | 723.341 | 725.345 | 737.345 | 106.710 | 150.000 |

SYNTHESIZED WORKFLOW NUMBER

| | START | $203_5$ START | $203_5$ END | $203_3$ START | $203_3$ END | $203_6$ START | $203_6$ END | $203_7$ START | $203_7$ END | PROCESSING TIME | SERVICE LEVEL AGREEMENT |
|---|---|---|---|---|---|---|---|---|---|---|---|
| $(a_2)$ | 605.102 | 605.102 | 610.102 | 610.102 | 634.970 | 634.970 | 644.970 | 664.970 | 684.970 | 79.868 | 180.000 |
| $(b_2)$ | 615.286 | 615.286 | 620.286 | 620.286 | 668.940 | 668.940 | 678.940 | 684.970 | 704.970 | 109.684 | 180.000 |
| $(c_2)$ | 625.187 | 625.187 | 630.187 | 630.187 | 702.848 | 702.848 | 712.848 | 724.970 | 744.970 | 139.783 | 180.000 |
| $(d_2)$ | 634.443 | 634.443 | 639.443 | 639.443 | 731.728 | 731.728 | 741.728 | 744.970 | 764.970 | 170.527 | 180.000 |
| $(e_2)$ | 645.739 | 645.739 | 650.739 | 650.739 | 752.326 | 741.612 | 751.612 | 844.970 | 864.970 | 239.231 | 150.000 |
| $(f_2)$ | 655.181 | 655.181 | 660.181 | 660.181 | 742.442 | 742.442 | 752.442 | 824.970 | 844.970 | 189.789 | 180.000 |

Fig.95

| SYNTHESIZED WORKFLOW | EXPECTED WAITING TIME IMPROVING AMOUNT |
|---|---:|
| FIRST BUSINESS APPLICATION | 0 |
| SECOND BUSINESS APPLICATION | 0 |
| THIRD BUSINESS APPLICATION | 20.29871 |
| FOURTH BUSINESS APPLICATION | 0 |
| FIFTH BUSINESS APPLICATION | 0 |
| SIXTH BUSINESS APPLICATION | 0 |
| SEVENTH BUSINESS APPLICATION | 29.1772 |

Fig. 96

(COMPUTER RESOURCE ADDITION THIRD TIME (PREDICTION))
SYNTHESIZED WORKFLOW NUMBER

| | START | $203_1$ START | $203_1$ END | $203_2$ START | $203_2$ END | $203_3$ START | $203_3$ END | $203_4$ START | $203_4$ END | | PROCESSING TIME | SERVICE LEVEL AGREEMENT |
|---|---|---|---|---|---|---|---|---|---|---|---|---|
| $(a_1)$ | 605.093 | 605.093 | 610.354 | 610.354 | 622.206 | 622.206 | 664.813 | 664.813 | 676.813 | | 71.720 | 150.000 |
| $(b_1)$ | 609.832 | 609.832 | 615.093 | 615.093 | 635.319 | 635.319 | 676.590 | 676.813 | 688.813 | | 78.981 | 150.000 |
| $(c_1)$ | 615.433 | 615.433 | 620.433 | 620.433 | 645.852 | 645.852 | 685.892 | 688.813 | 700.813 | | 85.380 | 150.000 |
| $(d_1)$ | 620.761 | 620.761 | 626.630 | 626.630 | 654.261 | 654.261 | 702.848 | 702.848 | 714.848 | | 94.087 | 150.000 |
| $(e_1)$ | 624.892 | 624.892 | 630.887 | 630.887 | 657.099 | 657.099 | 713.345 | 714.848 | 726.848 | | 101.956 | 150.000 |
| $(f_1)$ | 630.635 | 630.635 | 635.761 | 635.761 | 658.354 | 658.354 | 723.341 | 726.848 | 738.848 | | 108.213 | 150.000 |

SYNTHESIZED WORKFLOW NUMBER

| | START | $203_5$ START | $203_5$ END | $203_3$ START | $203_3$ END | $203_2$ END | $203_6$ START | $203_6$ END | $203_7$ START | $203_7$ END | PROCESSING TIME | SERVICE LEVEL AGREEMENT |
|---|---|---|---|---|---|---|---|---|---|---|---|---|
| $(a_2)$ | 605.102 | 605.102 | 610.102 | 610.102 | 634.970 | 634.970 | 634.970 | 644.970 | 644.970 | 663.976 | 663.976 | 679.976 | 74.874 | 180.000 |
| $(b_2)$ | 615.286 | 615.286 | 620.286 | 620.286 | 668.940 | 668.940 | 668.940 | 678.940 | 679.976 | 695.976 | 695.976 | 711.976 | 96.690 | 180.000 |
| $(c_2)$ | 625.187 | 625.187 | 630.187 | 630.187 | 692.605 | 692.605 | 692.605 | 702.605 | 711.976 | 727.976 | 727.976 | 743.976 | 118.789 | 180.000 |
| $(d_2)$ | 634.443 | 634.443 | 639.443 | 639.443 | 731.728 | 731.728 | 731.728 | 741.728 | 743.976 | 759.976 | 759.976 | 807.976 | 173.533 | 180.000 |
| $(e_2)$ | 645.739 | 645.739 | 650.739 | 650.739 | 752.326 | 752.326 | 741.612 | 751.612 | 759.976 | 775.976 | 775.976 | 791.976 | 146.237 | 150.000 |
| $(f_2)$ | 655.181 | 655.181 | 660.181 | 660.181 | 742.442 | 742.442 | 742.442 | 752.442 | 807.976 | 823.976 | 823.976 | 839.976 | 184.795 | 180.000 |

Fig.97

| SYNTHESIZED WORKFLOW | EXPECTED WAITING TIME IMPROVING AMOUNT |
|---|---|
| FIRST BUSINESS APPLICATION | 0 |
| SECOND BUSINESS APPLICATION | 0 |
| THIRD BUSINESS APPLICATION | 8.9417055 |
| FOURTH BUSINESS APPLICATION | 0 |
| FIFTH BUSINESS APPLICATION | 0 |
| SIXTH BUSINESS APPLICATION | 0 |
| SEVENTH BUSINESS APPLICATION | 9.2568236 |

Fig.98

(COMPUTER RESOURCE ADDITION FOURTH TIME (PREDICTION))
SYNTHESIZED WORKFLOW NUMBER — PROCESSING TIME — SERVICE LEVEL AGREEMENT

| | START | 203₁ START | 203₁ END | 203₂ START | 203₂ END | 203₃ START | 203₃ END | 203₄ START | 203₄ END | | |
|---|---|---|---|---|---|---|---|---|---|---|---|
| (a₁) | 605.093 | 605.093 | 610.354 | 610.354 | 622.206 | 622.206 | 668.940 | 668.940 | 680.940 | 75.847 | 150.000 |
| (b₁) | 609.832 | 609.832 | 615.093 | 615.093 | 635.319 | 635.319 | 676.590 | 676.813 | 688.813 | 78.981 | 150.000 |
| (c₁) | 615.433 | 615.433 | 620.433 | 620.433 | 645.852 | 645.852 | 685.892 | 688.813 | 700.813 | 85.380 | 150.000 |
| (d₁) | 620.761 | 620.761 | 626.630 | 626.630 | 654.261 | 654.261 | 702.848 | 702.848 | 714.848 | 94.087 | 150.000 |
| (e₁) | 624.892 | 624.892 | 630.887 | 630.887 | 657.099 | 657.099 | 721.132 | 721.132 | 733.132 | 108.240 | 150.000 |
| (f₁) | 630.635 | 630.635 | 635.761 | 635.761 | 658.354 | 658.354 | 752.326 | 752.326 | 764.326 | 133.691 | 150.000 |

SYNTHESIZED WORKFLOW NUMBER — PROCESSING TIME — SERVICE LEVEL AGREEMENT

| | START | 203₅ START | 203₅ END | 203₃ START | 203₃ END | 203₆ END | 203₇ START | 203₇ END | | |
|---|---|---|---|---|---|---|---|---|---|---|
| (a₂) | 605.102 | 605.102 | 610.102 | 610.102 | 634.970 | 644.970 | 644.970 | 663.313 | 663.313 | 71.544 | 180.000 |
| (b₂) | 615.286 | 615.286 | 620.286 | 620.286 | 664.127 | 674.127 | 676.646 | 689.979 | 689.979 | 88.026 | 180.000 |
| (c₂) | 625.187 | 625.187 | 630.187 | 630.187 | 692.605 | 702.605 | 703.312 | 716.645 | 716.645 | 104.791 | 180.000 |
| (d₂) | 634.443 | 634.443 | 639.443 | 639.443 | 710.635 | 720.635 | 729.978 | 743.311 | 743.311 | 122.201 | 180.000 |
| (e₂) | 645.739 | 645.739 | 650.739 | 650.739 | 731.016 | 741.016 | 750.644 | 769.977 | 769.977 | 137.571 | 150.000 |
| (f₂) | 655.181 | 655.181 | 660.181 | 660.181 | 741.730 | 751.730 | 783.310 | 796.643 | 796.643 | 154.795 | 180.000 |

Fig. 99

(t = 720) — SYNTHESIZED WORKFLOW NUMBER

| | START | $203_1$ START | $203_1$ END | $203_2$ START | $203_2$ END | $203_3$ START | $203_3$ END | $203_4$ START | $203_4$ END | | PROCESSING TIME | SERVICE LEVEL AGREEMENT |
|---|---|---|---|---|---|---|---|---|---|---|---|---|
| $(a_1)$ | 605.093 | 605.093 | 610.354 | 610.354 | 622.206 | 622.206 | 668.940 | 668.940 | 680.940 | | 75.847 | 150.000 |
| $(b_1)$ | 609.832 | 609.832 | 615.093 | 615.093 | 635.319 | 635.319 | 676.590 | 676.813 | 688.813 | | 78.981 | 150.000 |
| $(c_1)$ | 615.433 | 615.433 | 620.433 | 620.433 | 645.852 | 645.852 | 685.892 | 688.813 | 700.813 | | 85.380 | 150.000 |
| $(d_1)$ | 620.761 | 620.761 | 626.630 | 626.630 | 654.261 | 654.261 | 702.848 | 702.848 | 714.848 | | 94.087 | 150.000 |
| $(e_1)$ | 624.892 | 624.892 | 630.887 | 630.887 | 657.099 | 657.099 | | | | | | 150.000 |
| $(f_1)$ | 630.635 | 630.635 | 635.761 | 635.761 | 658.354 | 658.354 | | | | | | 150.000 |

— SYNTHESIZED WORKFLOW NUMBER

| | START | $203_5$ START | $203_5$ END | $203_3$ START | $203_3$ END | $203_6$ START | $203_6$ END | $203_7$ START | $203_7$ END | | PROCESSING TIME | SERVICE LEVEL AGREEMENT |
|---|---|---|---|---|---|---|---|---|---|---|---|---|
| $(a_2)$ | 605.102 | 605.102 | 610.102 | 610.102 | 634.970 | 634.970 | 644.970 | 644.970 | 663.313 | 663.313 | 71.544 | 180.000 |
| $(b_2)$ | 615.286 | 615.286 | 620.286 | 620.286 | 664.127 | 664.127 | 674.127 | 676.646 | 689.979 | 689.979 | 88.026 | 180.000 |
| $(c_2)$ | 625.187 | 625.187 | 630.187 | 630.187 | 692.605 | 692.605 | 702.605 | 703.312 | 716.645 | 716.645 | | 180.000 |
| $(d_2)$ | 634.443 | 634.443 | 639.443 | 639.443 | 710.635 | ↑ | ↑ | ↑ | ↑ | | | 180.000 |
| $(e_2)$ | 645.739 | 645.739 | 650.739 | 650.739 | | | | | | | | 150.000 |
| $(f_2)$ | 655.181 | 655.181 | 660.181 | 660.181 | | | | | | | | 180.000 |

Fig. 100

(IN CASE OF ONLY MOST SUITABLE PRIORITY CONTROL (PREDICTION))

SYNTHESIZED WORKFLOW NUMBER

|  | START | $203_1$ START | $203_1$ END | $203_2$ START | $203_2$ END | $203_3$ START | $203_3$ END | $203_4$ START | $203_4$ END | PROCESSING TIME | SERVICE LEVEL AGREEMENT |
|---|---|---|---|---|---|---|---|---|---|---|---|
| ($a_1$) | 605.093 | 605.093 | 610.354 | 610.354 | 622.206 | 622.206 | 668.940 | 668.940 | 680.940 | 75.847 | 150.000 |
| ($b_1$) | 609.832 | 609.832 | 615.093 | 615.093 | 635.319 | 635.319 | 676.590 | 676.813 | 688.813 | 78.981 | 150.000 |
| ($c_1$) | 615.433 | 615.433 | 620.433 | 620.433 | 645.852 | 645.852 | 685.892 | 688.813 | 700.813 | 85.380 | 150.000 |
| ($d_1$) | 620.761 | 620.761 | 626.630 | 626.630 | 654.261 | 654.261 | 702.848 | 702.848 | 714.848 | 94.087 | 150.000 |
| ($e_1$) | 624.892 | 624.892 | 630.887 | 630.887 | 657.099 | 657.099 | 721.132 | 721.132 | 733.132 | 108.240 | 150.000 |
| ($f_1$) | 630.635 | 630.635 | 635.761 | 635.761 | 658.354 | 658.354 | 752.326 | 752.326 | 764.326 | 133.691 | 150.000 |

SYNTHESIZED WORKFLOW NUMBER

|  | START | $203_5$ START | $203_5$ END | $203_3$ START | $203_3$ END | $203_6$ START | $203_6$ END | $203_7$ START | $203_7$ END | PROCESSING TIME | SERVICE LEVEL AGREEMENT |
|---|---|---|---|---|---|---|---|---|---|---|---|
| ($a_2$) | 605.102 | 605.102 | 610.102 | 610.102 | 634.970 | 634.970 | 644.970 | 644.970 | 663.313 | 663.313 | 71.544 | 180.000 |
| ($b_2$) | 615.286 | 615.286 | 620.286 | 620.286 | 664.127 | 664.127 | 674.127 | 676.646 | 689.979 | 689.979 | 88.026 | 180.000 |
| ($c_2$) | 625.187 | 625.187 | 630.187 | 630.187 | 692.605 | 692.605 | 702.605 | 703.312 | 716.645 | 716.645 | 104.791 | 180.000 |
| ($d_2$) | 634.443 | 634.443 | 639.443 | 639.443 | 710.635 | ↑ | ↑ | ↑ | ↑ | 729.978 | 108.868 | 180.000 |
| ($e_2$) | 645.739 | 645.739 | 650.739 | 650.739 | 731.016 | 731.016 | 741.016 | 743.311 | 756.644 | 756.644 | 124.238 | 150.000 |
| ($f_2$) | 655.181 | 655.181 | 660.181 | 660.181 | 741.730 | 741.730 | 751.730 | 769.977 | 783.310 | 783.310 | 141.462 | 180.000 |

Fig. 101

(INITIAL STATE)

SYNTHESIZED WORKFLOW NUMBER

| | START | 203₁ START | 203₁ END | 203₂ START | 203₂ END | 203₃ START | 203₃ END | 203₄ START | 203₄ END | PROCESSING TIME | SERVICE LEVEL AGREEMENT |
|---|---|---|---|---|---|---|---|---|---|---|---|
| (a₁) | 605.093 | 605.093 | 610.093 | 610.093 | 618.093 | 618.093 | 653.329 | 653.329 | 665.329 | 60.236 | 150.000 |
| (b₁) | 615.433 | 615.433 | 620.433 | 620.433 | 628.433 | 628.102 | | | | | 150.000 |
| (c₁) | 630.635 | 630.635 | 635.635 | 635.635 | 643.635 | 643.635 | | | | | 150.000 |

SYNTHESIZED WORKFLOW NUMBER

| | START | 203₅ START | 203₅ END | 203₃ START | 203₃ END | 203₆ START | 203₆ END | 203₇ START | 203₇ END | PROCESSING TIME | SERVICE LEVEL AGREEMENT |
|---|---|---|---|---|---|---|---|---|---|---|---|
| (a₂) | 605.102 | 605.102 | 610.102 | 610.102 | 634.116 | 634.116 | 644.116 | 644.116 | | | 180.000 |
| (b₂) | 655.181 | 655.181 | | | | | | | | | 180.000 |

Fig. 102

(IN CASE OF ONLY MOST SUITABLE PRIORITY CONTROL (PREDICTION))

SYNTHESIZED WORKFLOW NUMBER

| | START | 203₁ START | 203₁ END | 203₂ START | 203₂ END | 203₃ START | 203₃ END | 203₄ START | 203₄ END | PROCESSING TIME | SERVICE LEVEL AGREEMENT |
|---|---|---|---|---|---|---|---|---|---|---|---|
| (a₁) | 605.093 | 605.093 | 610.093 | 610.093 | 618.093 | 618.093 | 653.329 | 653.329 | 665.329 | 60.236 | 150.000 |
| (b₁) | 615.433 | 615.433 | 620.433 | 620.433 | 628.433 | 628.102 | 663.338 | 665.329 | 677.329 | 61.896 | 150.000 |
| (c₁) | 630.635 | 630.635 | 635.635 | 635.635 | 643.635 | 643.635 | 670.102 | 677.329 | 689.329 | 58.694 | 150.000 |

SYNTHESIZED WORKFLOW NUMBER

| | START | 203₅ START | 203₅ END | 203₃ START | 203₃ END | 203₆ START | 203₆ END | 203₇ START | 203₇ END | PROCESSING TIME | SERVICE LEVEL AGREEMENT |
|---|---|---|---|---|---|---|---|---|---|---|---|
| (a₂) | 605.102 | 605.102 | 610.102 | 610.102 | 634.116 | 634.116 | 644.116 | 644.116 | 664.116 | 79.014 | 180.000 |
| (b₂) | 655.181 | 655.181 | 660.181 | 670.102 | 685.102 | 685.102 | 695.102 | 715.102 | 735.102 | 79.921 | 180.000 |

WORKFLOW MONITORING AND CONTROL SYSTEM, MONITORING AND CONTROL METHOD, AND MONITORING AND CONTROL PROGRAM

TECHNICAL FIELD

The present invention relates to a workflow monitoring and control system, a workflow monitoring and control method and a workflow monitoring and control program, and particularly relates to a workflow monitoring and control system, a workflow monitoring and control method and a workflow monitoring and control program suitable for processing a workflow, which is a flow of unit processes constituting business data processing, by using an application software corresponding to each unit process.

BACKGROUND ART

When a plurality of services are operated in cooperation with each other, a service control system which executes a plurality of services by combining and with assuring response requirement in particular in a user's request is proposed as a first related art of the present invention (for example, refer to patent document 1).

FIG. 103 shows a configuration of the service control system according to this first related art. This service control system 100 includes first and second service providers 101, 102 which provide services, a service requester 103 which is a client which requests services, and a service coordinator 104 which provides providing services provided by any one of the first and the second service providers 101, 102 to the service requester 103 by combining plural services.

In the service control system 100 like this, the service coordinator 104 is provided with a receiving part III for receiving request information sent from the service requester 103, a transmission part 112 for transmitting receive rejection information which rejects to receive the request information, a cooperation service management part 113 for making a plurality of services operate in cooperation, an executing part 114 for executing each service of service group which is requested by the request information having been received at the receiving part 111 based on a result of judgment of the cooperation service management part 113, and a memory storage (memory unit) 117 for storing the providing service 115 provided by the first service provider 101 and load information 116 which indicates processing status of the service provided by the first service provider 101.

In the service control system 100, the service requester 103 transmits the request information for requesting each service of the service group, which combines any of services among a plurality of services as a group, to be provided. The receiving part 111 in the service coordinator 104 receives this request information and supplies it to the cooperation service management part 113. The cooperation service management part 113 is managing current providing status of each service of the service group mentioned above. The cooperation service management part 113 judges whether it is possible or not to provide each service of the service group, which is requested by the request information received at the receiving part 111, based on service providing conditions indicated by a plurality of service providing condition information stored in the memory storage 117.

The executing part 114 in the service coordinator 104 executes each service of the service group, which is received by the receiving part 111 from the service provider 101, based on the result of judgment by the cooperation service management part 113, and provides the execution result to the service requester 103. The transmission part 112 distinguishes whether the cooperation service management part 113 has judged that it was possible to provide all of the services of the service group which was requested by the request information received at the receiving part 111. And, when it is not possible to provide all of the services, the receive rejection information which rejects an acceptance of the request information received at the receiving part 111 is transmitted to the service requester 103.

In contrast, FIG. 104 shows a configuration of the service control system according to a second related art. A distributed service control apparatus 140 which constitutes this service control system 130 is arranged in the system in which a plurality of servers operates in cooperation by exchanging messages. The distributed service control apparatus 140 is arranged as a repeater at front end of the server (message processing unit) 160 which executes services.

A message receiving control part 141 of this distributed service control apparatus 140 controls reception of a processing request message 142 from other server which is not shown. A message state management unit 143 includes a message weight calculation part 144 and a message weight storage part 145. When the processing request message 142 is sent from the message receiving control part 141, the message weight calculation part 144 calculates processing amount to the processing request message 142, more specifically, predicted value of processing time in the server 160 based on a predetermined message weight rule. The message weight calculation part 144 stores the processing amount of the server 160 having been calculated in the message weight storage part 145 as message weight information.

A message queue 147 temporarily accumulates the processing request message 142 to the server 160. A processing request management unit 148 includes a plurality of executable thread 149 and a thread group control part 150, and transmits the processing request message 142 to the server 160 for making the server execute the processing. Here, the thread group control part 150 performs management of the thread 149 and allocation of processing. The thread 149 transmits the processing request message 142 to the server 160 for making the server execute the processing. The number of this thread 149 becomes the number of parallel processing in the server 160.

A service quality performance storage part 151 stores information relating to service quality requirements which should be satisfied as performance requirements of the server 160. A control rule decision part 152 controls a size of the message queue 147 and the number of parallel processing of the processing request message 142 in the processing request management unit 148, based on the processing time and the service quality requirements to the processing request message 142. The control rule decision part 152 performs correction (learning) of the message weight rule by using the message weight information (server processing amount), which has been calculated using the message weight rule, and an actual measurement result of the processing time in the server 160.

In the service control system 130 of such a configuration, the message weight calculation part 144 calculates processing amount in the server 160 to the processing request message 142 stored in the message queue 147. The thread 149 takes the processing request message 142 out from the message queue 147 and makes the server 160 execute the processing. The control rule decision part 152 determines the size of the message queue 147 and the number of parallel processing of the thread 149 so that service quality requirements may be satisfied.

PRIOR ART DOCUMENTS

Patent Document

[Patent document 1] Japanese Patent Application Publication No. 2004-362449 (paragraphs 0009-0018 and FIG.1)
[Patent document 2] Japanese Patent Application Publication No. 2008-077266 (paragraphs 0029 and 0031-0034, and FIG.1)

DISCLOSURE OF THE INVENTION

Problem to be Solved by the Invention

In such related arts in relation to the present invention, the first related art shown in FIG. 103 needs the second service provider 102 as a spare service provider in order to achieve Service Level Agreement (SLA) which means a time of service processing ends in a predetermined reference time. The reason is because the service control system 100 is configured so that it may be possible to select a suitable service provider from a plurality of service providers which provide identical services, it may be possible to alternatively use other service provider when one service provider is being used and also it may be possible to try to reduce waiting time when receiving the same service, in order that it may be possible to achieve the Service Level Agreement.

The second related art shown in FIG. 104 suppresses the number of processing of the processing request message 142 when it is predicted that service quality requirements will not be able to be satisfied. On the other hand, the second related art increases the number of processing of the processing request message 142 when it is predicted that service quality requirements will be able to be satisfied. As a result, the second related art is performing processing with satisfying the service quality and bringing out the best processing capability of the server. Accordingly, when it tries to achieve the Service Level Agreement for several services together, the required computer resources become large.

Moreover, these first and second related arts try to assign enough computer resources for execution of each service in order to achieve the Service Level Agreement, that is, in general, in order to satisfy a lower limit of service quality as the quality when providing service. However, there also may be a case where it does not care each service standard as far as a lower limit of the service quality as the whole can be achieved. In such a case, the computer resources which are to be needed for the first and second related arts are excessive, and there is a problem of occurring waste.

The object of the present invention is to provide a workflow monitoring and control system, a workflow monitoring and control method and a workflow monitoring and control program which can satisfy a lower limit of the service quality for as many workflows as possible with limited computer resources when a plurality of processing sections, each of which is provided with a business application software, execute unit processes of the work flow.

Means for Solving a Problem

A workflow monitoring and control system of one exemplary embodiment of the present invention is connected to a plurality of processing sections each of which executes a unit process assigned respectively, a unit process being one of parts constituting business data processing, by using business application software and computer resources, and the system is characterized by including:

a workflow defining means for setting a workflow definition which defines an execution order of the unit processes for each workflow, which is a business data processing request;

a service quality lower limit setting means for setting a lower limit of an acceptable service quality for each workflow, the service quality being a quality of the workflow whose unit processes have been executed by the plurality of processing sections according to the workflow definition set by the workflow defining means;

a service quality calculation means for calculating service quality for each workflow, under a condition where computer resources allocated to each of the plurality of the processing sections are fixed as they are, by calculating for each processing section, processing time between an arrival and a completion of processing of a workflow at the processing section, according to processing time when the processing section only processes the workflow and a way the processing section handles a resource competition among a plurality of the workflows, and accumulating a plurality of the calculated processing times of the processing sections required for each workflow;

a quality insufficiency judging means for judging if the service quality calculated by the service quality calculation means for any workflow is lower than the lower limit for the workflow; and a computer resource reallocation means for changing an amount of the allocated computer resources for one of the plurality of the processing sections, when the quality insufficiency judging means judges the service quality of a workflow is lower than the lower limit, in order to correct a situation where the service quality of the workflow is lower than the lower limit for the workflow.

A workflow monitoring and control method of one exemplary embodiment of the present invention is a method for executing workflows, each of which is a request for business data processing, by passing the workflow through each of a plurality of processing sections in a predetermined order, the processing section inputting the workflow, and executing a unit process assigned respectively, a unit process being one of parts constituting the business data processing, by using business application software and computer resources, the method comprising:

calculating service quality for each workflow at a completion time of the business data processing, under a condition where computer resources allocated to each of the plurality of processing sections are fixed as they are, by calculating for each processing section, processing time between an arrival and a completion of processing of the workflow at the processing section, according to processing time when the processing section only processes the workflow and a way the processing section handles resource competition among a plurality of the workflows, and accumulating a plurality of the calculated processing times of the processing sections required for each workflow;

judging if the service quality for any workflow is lower than a lower limit which is defined corresponding to each workflow; and changing an amount of the allocated computer resources for one of the plurality of processing sections, when judging the service quality for any workflow is lower than the lower limit, in order to correct a situation where the service quality of the workflow is lower than the lower limit for the workflow.

A workflow monitoring and control program of one exemplary embodiment of the present invention is a program for causing a computer, which makes a workflow, which is a request for business data processing, executed a workflow by passing the workflow through each of a plurality of processing sections in a predetermined order, the processing section inputting the workflow, and executing a unit process assigned respectively, a unit process being one of parts constituting the business data processing, by using business application software and computer resources, to execute processing of:

service quality calculation processing for calculating service quality for each workflow at a completion time of the business data processing, under a condition where computer resources allocated to each of the plurality of processing sections are fixed as they are, by calculating for each processing section, processing time between an arrival and a completion of processing of a workflow at the processing section, according to processing time when the processing section only processes the workflow and a way the processing section handles a resource competition among a plurality of workflows, and accumulating a plurality of the calculated processing times of the processing sections required for each workflow;

quality insufficiency judging processing for judging if the service quality for any workflow is lower than a lower limit which is defined corresponding to each workflow; and computer resource reallocation processing for changing an amount of the allocated computer resources for one of the plurality of processing sections, when judging the service quality for any workflow is lower than the lower limit, in order to correct a situation where the service quality of the workflow is lower than the lower limit for the workflow.

Effect of The Invention

The present invention makes it possible to predict beforehand the service quality at the time of processing completion of each workflow which has been executed by passing through a plurality of the processing sections in a predetermined order from a processing section which handles start of the processing to a processing section which handles completion of the processing. And, the present invention makes it possible to reallocate the amount of the computer resources to each processing section when there is a workflow having the predicted service quality which is lower than the lower limit of the service quality. As a result, the present invention makes it possible to achieve effective use of computer resources and to satisfy the lower limit of the service quality for as many workflows as possible.

BRIEF DESCRIPTION OF THE DRAWINGS

FIG. 1 is one configuration example of a workflow monitoring and control system of the present invention.

FIG. 2 is one configuration example of a workflow monitoring and control method of the present invention.

FIG. 3 is one configuration example of a workflow monitoring and control program of the present invention.

FIG. 13 is an explanation drawing showing performance characteristics of each of the business applications used in this operation example.

FIG. 14 is an explanation drawing showing an amount of computer resources assigned to each of the business applications in the initial state according to this operation example.

FIG. 16 is an explanation drawing showing the state of the synthesized workflows being executed at the time 660 when the synthesized workflows have been executed from the time 0 according to this operation example.

FIG. 17 is an explanation drawing showing one example of the state and the history information of the synthesized workflows acquired when the activation control part has started the state observation part for the first time according to this operation example.

FIG. 18 is an explanation drawing showing the expected waiting time improving amount of each business application calculated based on a prediction result according to this operation example.

FIG. 19 is an explanation drawing showing the state of the synthesized workflows in case where computer resources have been added first time according to this operation example.

FIG. 20 is an explanation drawing showing the expected waiting time improving amount to each business application in a case where computer resources are to be added second time according to this operation example.

FIG. 21 is an explanation drawing showing the state of the synthesized workflows in a case where computer resources have been added second time according to this operation example.

FIG. 22 is an explanation drawing showing the expected waiting time improving amount to each business application in a case where computer resources are to be added third time according to this operation example.

FIG. 23 is an explanation drawing showing the state of the synthesized workflows in a case where computer resources have been added third time according to this operation example.

FIG. 24 is an explanation drawing showing the expected waiting time improving amount to each business application in a case where computer resources are to be added fourth time according to this operation example.

FIG. 25 is an explanation drawing showing the state of the synthesized workflows in a case where computer resources have been added fourth time according to this operation example.

FIG. 26 is an explanation drawing showing the expected waiting time improving amount to each business application in a case where computer resources are to be added fifth time according to this operation example.

FIG. 27 is an explanation drawing showing the state of the synthesized workflows in a case where computer resources have been added fifth time according to this operation example.

FIG. 28 is an explanation drawing showing the expected waiting time improving amount to each business application in a case where computer resources are to be added sixth time according to this operation example.

FIG. 29 is an explanation drawing showing the state of the synthesized workflows in a case where computer resources have been added sixth time according to this operation example.

FIG. 30 is an explanation drawing showing the expected waiting time improving amount having been calculated for each business application in a case where computer resources are to be added seventh time according to this operation example.

FIG. 31 is an explanation drawing showing the state of the synthesized workflows in a case where computer resources have been added seventh time according to this operation example.

FIG. 32 is an explanation drawing showing the state of the synthesized workflows in a case where the activation control part restarted the state observation part at the time 720 according to this operation example.

FIG. 33 is an explanation drawing showing the state of the synthesized workflows in a case where the future is predicted in a similar way at time point of the time 660 according to this operation example.

FIG. 37 is an explanation drawing showing utilization ratio of each of the business applications which is obtained by the computer resource reduction decision part according to this operation example.

FIG. 44 is an explanation drawing showing performance characteristics of each of the business applications used in the first modification example.

FIG. 45 is an explanation drawing showing an amount of computer resources assigned to each of the business applications in the initial state according to the first modification example.

FIG. 49 is an explanation drawing showing the expected waiting time improving amount of each of the business applications calculated based on the prediction result according to the first modification example.

FIG. 50 is an explanation drawing showing the state of the synthesized workflows in a case where computer resources have been added first time according to the first modification example.

FIG. 51 is an explanation drawing showing the expected waiting time improving amount having been calculated for each of the business applications in a case where computer resources are to be added second time according to the first modification example.

FIG. 52 is an explanation drawing showing the state of the synthesized workflows in a case where computer resources have been added second time according to the first modification example.

FIG. 53 is an explanation drawing showing the expected waiting time improving amount having been calculated for each of the business applications in a case where computer resources are to be added third time according to the first modification example.

FIG. 54 is an explanation drawing showing the state of the synthesized workflows in a case where computer resources have been added third time according to the first modification example.

FIG. 55 is an explanation drawing showing the expected waiting time improving amount having been calculated for each of the business applications in a case where computer resources are to be added fourth time according to the first modification example.

FIG. 56 is an explanation drawing showing the state of the synthesized workflows in a case where computer resources have been added fourth time according to the first modification example.

FIG. 57 is an explanation drawing showing the expected waiting time improving amount having been calculated for each of the business applications in a case where computer resources are to be added fifth time according to the first modification example.

FIG. 58 is an explanation drawing showing the state of the synthesized workflows in a case where computer resources have been added fifth time according to the first modification example.

FIG. 59 is an explanation drawing showing the state of the synthesized workflows in a case where the activation control part restarted the state observation part at the time 720 according to the first modification example.

FIG. 62 is an explanation drawing showing the state of the synthesized workflows acquired by the state observation part in a case where the activation control part started the state observation part for the first time at the time 660 according to the first modification example.

FIG. 63 is an explanation drawing showing the prediction of operation of the synthesized workflows until all synthesized workflows are completed, which was created by the most suitable priority control result calculation part using a predicting part, according to the first modification example.

FIG. 68 is an explanation drawing showing one example of the state and the history information of the synthesized workflows acquired when the activation control part has started the state observation part for the first time in the second modification example.

FIG. 69 is an explanation drawing showing a prediction result of operation of the synthesized workflows until all synthesized workflows are completed in the second modification example.

FIG. 70 is an explanation drawing showing the expected waiting time improving amount of each business application calculated based on the prediction result according to the second modification example.

FIG. 71 is an explanation drawing showing the state of the synthesized workflows in a case where computer resources have been added first time according to the second modification example.

FIG. 72 is an explanation drawing showing the expected waiting time improving amount having been calculated for each business application in a case where computer resources are to be added second time according to the second modification example.

FIG. 73 is an explanation drawing showing the state of the synthesized workflows in a case where computer resources have been added second time according to the second modification example.

FIG. 74 is an explanation drawing showing the expected waiting time improving amount having been calculated for each business application in a case where computer resources are to be added third time according to the second modification example.

FIG. 75 is an explanation drawing showing the state of the synthesized workflows in a case where computer resources have been added third time according to the second modification example.

FIG. 76 is an explanation drawing showing the expected waiting time improving amount having been calculated for each business application in a case where computer resources are to be added fourth time according to the second modification example.

FIG. 77 is an explanation drawing showing the state of the synthesized workflows in a case where computer resources have been added fourth time according to the second modification example.

FIG. 78 is an explanation drawing showing the expected waiting time improving amount having been calculated for each business application in a case where computer resources are to be added fifth time according to the second modification example.

FIG. 79 is an explanation drawing showing the state of the synthesized workflows in a case where computer resources have been added fifth time according to the second modification example.

FIG. 80 is an explanation drawing showing the expected waiting time improving amount having been calculated for each business application in a case where computer resources are to be added sixth time according to the second modification example.

FIG. 81 is an explanation drawing showing the state of the synthesized workflows in a case where computer resources have been added sixth time according to the second modification example.

FIG. 83 is an explanation drawing showing the state of the synthesized workflows in a case where the future is predicted in a similar way at time point of the time 660 according to the second modification example.

FIG. 85 is an explanation drawing showing the state of the synthesized workflows which is acquired by the state observation part in a case where the activation control part started the state observation part for the first time at the time 660 according to the second modification example.

FIG. 86 is an explanation drawing showing the prediction of operation of the synthesized workflows until all synthesized workflows are completed, which was created by the most suitable priority control result calculation part using a predicting part, according to the second modification example.

FIG. 89 is an explanation drawing showing one example of the state and the history information of the synthesized workflows acquired when the activation control part has started the state observation part for the first time in the third modification example.

FIG. 90 is an explanation drawing showing a prediction result in a case of only the most suitable priority control according to the third modification example.

FIG. 91 is an explanation drawing showing the expected waiting time improving amount of each business application calculated based on the prediction result according to the third modification example.

FIG. 92 is an explanation drawing showing the state of the synthesized workflows in a case where computer resources have been added first time according to the third modification example.

FIG. 93 is an explanation drawing showing the expected waiting time improving amount having been calculated for each business application in a case where computer resources are to be added second time according to the third modification example.

FIG. 94 is an explanation drawing showing the state of the synthesized workflows in a case where computer resources have been added second time according to the third modification example.

FIG. 95 is an explanation drawing showing the expected waiting time improving amount having been calculated for each business application in a case where computer resources are to be added third time according to the third modification example.

FIG. 96 is an explanation drawing showing the state of the synthesized workflows in a case where computer resources have been added third time according to the third modification example.

FIG. 97 is an explanation drawing showing the expected waiting time improving amount having been calculated for each business application in a case where computer resources are to be added fourth time according to the third modification example.

FIG. 98 is an explanation drawing showing the state of the synthesized workflows in a case where computer resources have been added fourth time according to the third modification example.

FIG. 99 is an explanation drawing showing the state of the synthesized workflows in a case where the activation control part restarted the state observation part at the time 780 according to the third modification example.

FIG. 100 is an explanation drawing showing the state of the synthesized workflows in a case where the future is predicted in a similar way at time point of the time 660 according to the third modification example.

FIG. 101 is an explanation drawing showing the state of the synthesized workflows acquired by the state observation part in a case where the activation control part started the state observation part for the first time at the time 660 according to the third modification example.

FIG. 102 is an explanation drawing showing the prediction of operation of the synthesized workflows until all synthesized workflows are completed, which was created by the most suitable priority control result calculation part using a predicting part, according to the third modification example.

Figure 4:
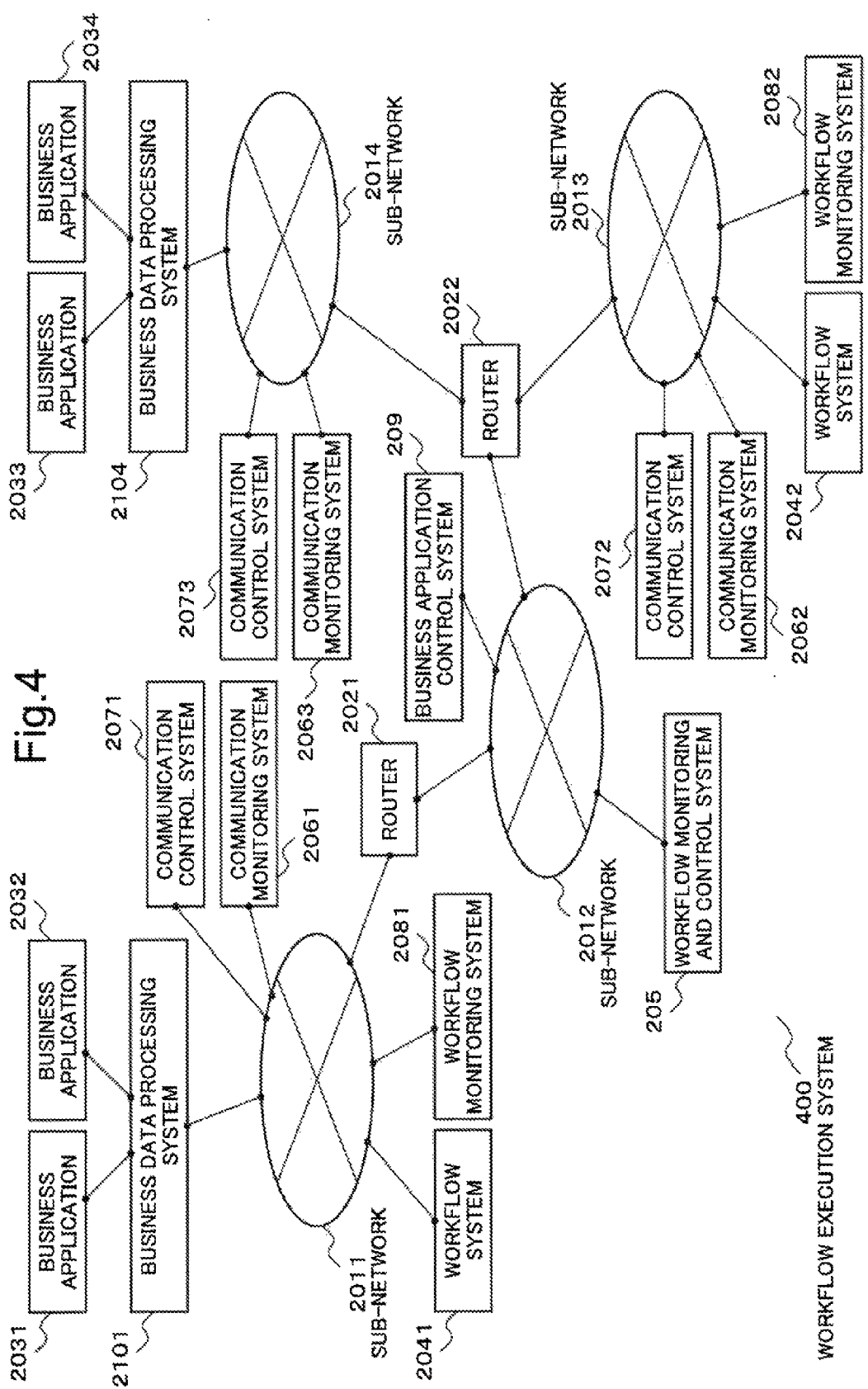
FIG. 4 is an explanation drawing showing a general communication environment of a workflow execution system to which the present invention is carried out.

DESCRIPTION OF THE REFERENCE NUMERALS 10, 205, 205A, 205B a workflow monitoring and control system
11 a processing section
12 a workflow defining part
13 a service quality lower limit setting part
14 a service quality calculation part
15 a quality insufficiency judging part
16 a computer resource reallocation part
20 a workflow monitoring and control method
21 a service quality calculation step
22 a quality insufficiency judging step
23 a computer resource reallocation step
30 a workflow monitoring and control program
31, service quality calculation processing
32 quality insufficiency judging processing
33 computer resource reallocation processing
201 sub-network
202 a router
203 business application
204 a workflow system
206 a communication monitoring system
207 a communication control system
208 a workflow monitoring system
209, 209A, 209B, 209C a business application control system
210 a business data processing system
211 a workflow definition and business definition repository
212 a service level agreement repository
213 a business data processing system repository
221 a workflow definition and business definition acquisition part
222 a workflow synthesizing part
223 synthesized workflow definition DB
224 a monitoring information receiving part
225 a monitoring information analysis part
226 monitoring information storage DB
227 an activation control part
228 a state observation part
229, 229A, 229B, 229C a most suitable priority control result calculation part
230, 230A, 230B, 230C a verification part
231, 231A, 231B, 231C a computer resource addition decision part
232, 232A, 232B, 232C a computer resource reduction decision part
233, 233A, 233B, 233C a predicting part
234 control history storage DB
235 control signal transmission part
236 a target state management part
237 control system storage DB
242 a communication information holding part
243 a communication control part
245 a control signal receiving part
246 a control information holding part 400, 400A, 400B a workflow execution system
501 a business application (AP) execution part
(a1)-(f1), (a2)-(f2) synthesized workflows

MOST PREFERRED EXEMPLARY EMBODIMENT FOR CARRYING OUT THE INVENTION

FIG. 1 shows one configuration example of a workflow monitoring and control system of the present invention. The workflow monitoring and control system 10 of the present invention is connected with a plurality of processing sections, and includes a workflow defining part 12, a service quality lower limit setting part 13, a service quality calculation part 14, a quality insufficiency judging part 15 and a computer resource reallocation part 16.

Here, each processing section (for example, cluster system) executes business data processing (unit process) in each assigned range using a business application software and computer resources (for example, each computer).

The workflow defining part 12 sets workflow definitions to a storage area.

Figure 15:
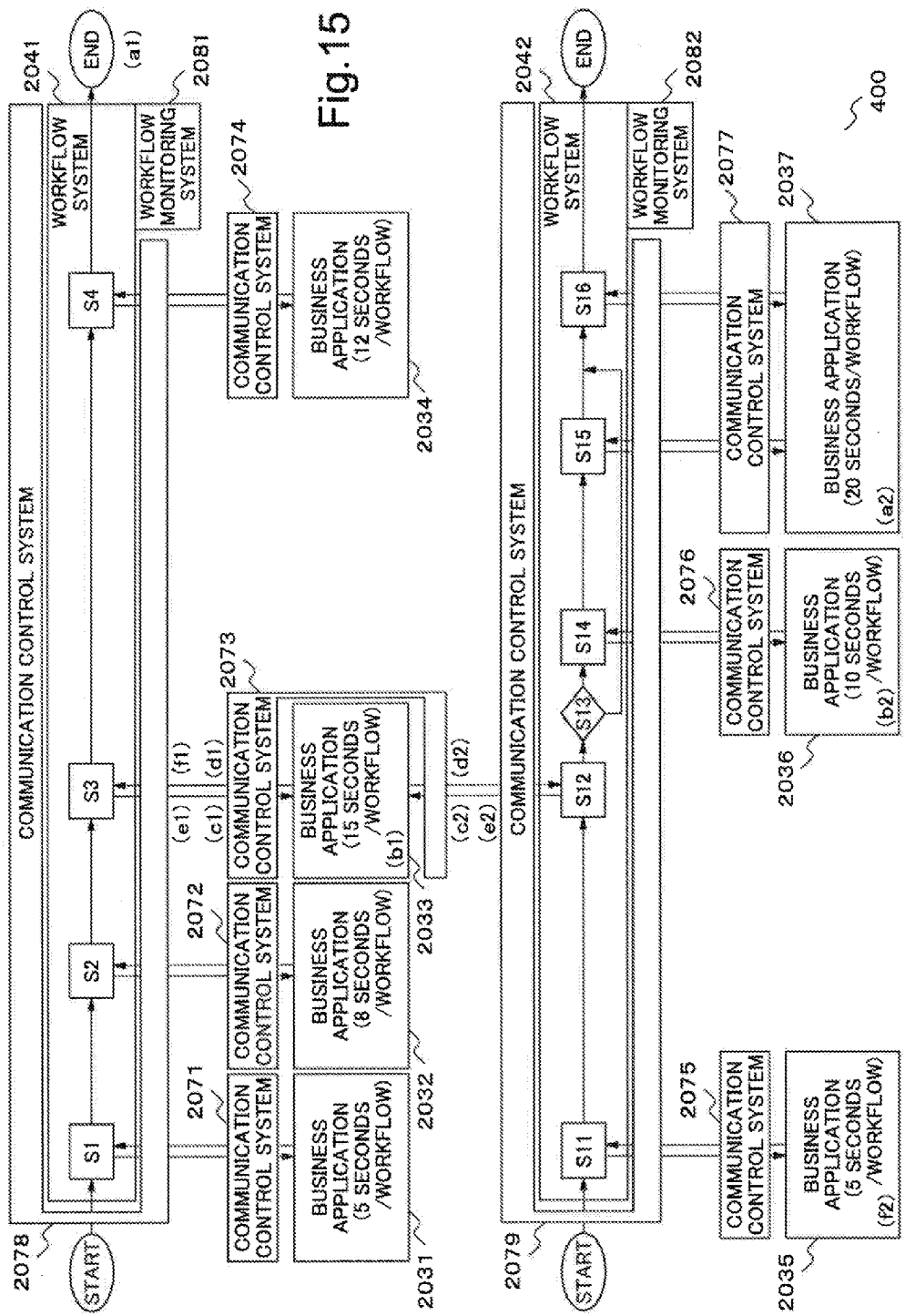
FIG. 15 is a system configuration drawing showing the state of the work flow monitoring and control system at the time 660 when the synthesized workflows have been executed since the time 0 according to this operation example.

Here, a workflow means each of requests for business data processing (an instance of processing request). The workflow definition defines a sequence of each unit process which is executed for each of workflows inputted to a workflow execution system 400 (FIG. 4, FIG. 15) or the like. Each workflow is executed by passing through each processing section in the order defined by the workflow definition, wherein the processing section executes the assigned unit process from the start until the completion of business data processing. For example, the unit processes S1, S2, S3 and S4 are executed in series for the workflows a1 to f1 shown in upper row of FIG. 15. For the workflows a2 to e2 shown in lower row of FIG. 15, depending on the condition of S13, the unit processes S11, S12, S13, S14, S15 and S16 are executed in series, or the unit processes S1.1, S12, S13 and S16 are executed in series. Each processing section is connected with other apparatus, is provided with a business application software and computer resources, inputs a workflow and executes each unit process. In FIG. 15, each processing section is described as the communication control system 207n and the business application 203n (n=1-7).

The service quality lower limit setting part 13 sets an acceptable lower limit of the service quality, which is the quality of the workflow which has completed business data processing, for each workflow. The service quality calculation part 14 calculates the service quality expected at the time of the completion of the business data processing of each workflow, under a condition where an amount of computer resources allocated to each of the plurality of processing sections are fixed as the current value, by accumulating processing time, which is from the arrival of processing request at a processing section to the completion of processing of unit process at the processing section, of each of the processing sections. The processing time in each processing section is calculated based on the required processing time of the business data processing which is needed in a case where the processing section only processes the processing request and also reflecting competition if a plurality of processing requests competes. The quality insufficiency judging part 15 judges a case where the calculated service quality is lower than the lower limit of the service quality for any of the workflows. The computer resource reallocation part 16 increases an amount of computer resources for at least one processing section, in such a case where the quality insufficiency judging part 15 judges that the service quality calculated for a certain workflow is lower than the lower limit, in order to correct a situation where the service quality of the workflow is lower than the lower limit.

FIG. 2 shows one configuration example of a workflow monitoring and control method of the present invention. The workflow monitoring and control method 20 of the present invention includes a service quality calculation step 21, a quality insufficiency judging step 22 and a computer resource reallocation step 23. Here, when a plurality of processing sections, which perform business data processing (unit process) of respectively assigned range by using business application software and computer resources, execute a workflow, which passes through each of the processing sections in a predetermined order, as a flow of unit process of the business data processing, the service quality calculation step 21 calculates the service quality expected at the time of the completion of the business data processing of each workflow, under a condition where an amount of computer resources allocated to each of the plurality of processing sections are fixed as the current value. The service quality is calculated in each of the plurality of processing sections by analyzing existence or non-existence or an amount of the waiting time until a processing start which occurs to a workflow and also the processing time. The quality insufficiency judging step 22 judges a case where the calculated service quality is lower than a lower limit of the service quality for any of the workflows. The computer resource reallocation step 23 reallocates an amount of computer resources for a plurality of processing sections, when the quality insufficiency judging step 22 judges that the service quality calculated for a certain workflow is lower than the lower limit, in order to correct a situation where the service quality of the workflow is lower than the lower limit.

FIG. 3 shows one configuration example of a workflow monitoring and control program of the present invention. The workflow monitoring and control program 30 of the present invention causes a computer (for example, a workflow monitoring and control system 205) included in a system, in which a plurality of processing sections, which perform business data processing (unit process) of respectively assigned range by using business application software and computer resources, execute a workflow, which passes through each of the processing sections in a predetermined order, as a flow of unit process of the business data processing, to execute service quality calculation processing 31, quality insufficiency judging processing 32 and computer resource reallocation processing 33. Here, the service quality calculation processing 31 calculates the service quality expected at the time of the completion of the business data processing of each workflow, under a condition where an amount of computer resources allocated to each of the plurality of processing sections are fixed as the current value. The quality insufficiency judging processing 32 judges a case where the calculated service quality is lower than a lower limit of the service quality for any of the workflows. The computer resource reallocation processing 33 reallocates an amount of computer resources for a plurality of processing sections, when the quality insufficiency judging processing 32 judges that the service quality calculated for a certain workflow is lower than the lower limit, in order to correct a situation where the service quality of the workflow is lower than the lower limit.

<Exemplary Embodiment of the Invention>

FIG. 4 shows a general communication environment of a workflow execution system 400 to which the present invention is carried out. In this communication environment, a plurality of sub-networks 2011, 2012 or the like are managed under the management policy and the security policy held by these sub-networks 2011, 2012. Further, these pluralities of sub-networks 2011, 2012 or the like are combined by coupling means such as routers 2021, 2022 or the like and configuring a larger network.

For example, the first sub-network 2011 is connected with the second sub-network 2012 by the first router 2021. The second sub-network 2012 is connected with the third sub-network 2013 and the fourth sub-network 2014 by the second router 2022.

The business applications 2031, 2032 or the like which deal with processing of unit process of a workflow, which will be described in detail later, are provided in the business data processing system 2101, 2104 or the like which is connected to any one of the sub-networks 2011, 2012 or the like. The business data processing system 2101, which is provided with the first and the second business applications 2031, 2032 in the communication environment shown in FIG. 4, is connected to the first sub-network 2011. The business data processing system 2104, which is provided with the third and the fourth business applications 2033, 2034, is connected to the fourth sub-network 2014.

The workflow system 2041, 2042 or the like, which performs the workflow processing in which business data processing is completed, by coordinating the business applications 2031, 2032 or the like, to successively execute processing of a plurality of unit processes from the starting of the business data processing, is also connected to any one of the sub-networks 2011, 2012 or the like. In the communication environment shown in FIG. 4, the first workflow system 2041 is connected to the first sub-network 2011, and the second workflow system 2042 is connected to the third sub-network 2013 respectively.

Any number of communication monitoring systems 2061, 2062 or the like, which monitor communication on the sub-network 2011, 2012 or the like and notify a workflow monitoring and control system 205 of a monitoring result, are connected to each of the sub-networks 2011, 2012 or the like. In the communication environment shown in FIG. 4, the first communication monitoring system 2061 is connected to the first sub-network 2011, the second communication monitoring system 2062 is connected to the third sub-network 2013 and the third communication monitoring system 2063 is connected to the fourth sub-network 2014 respectively. The monitoring targets of the respective communication monitoring systems 2061, 2062 or the like are the business application 203 and the workflow system 204. In general, the communication monitoring system 2061, 2062 or the like targets at the business application 203 and the workflow system 204, which are belonging in the same sub-network 201 as itself, for monitoring.

Each communication control system 2071, 2072 or the like controls communication on the sub-networks 2011, 2012 or the like according to a control signal from the workflow monitoring and control system 205. Any number of the communication control systems 2071, 2072 or the like are connected to each of the sub-networks 2011, 2012 or the like. In the communication environment shown in FIG. 4, the first communication control system 2071 is connected to the first sub-network 2011, the second communication control system 2072 is connected to the third sub-network 2013 and the third communication control system 2073 is connected to the fourth sub-network 2014 respectively. The control targets of the respective communication control systems 207 are the business application 203 and the workflow system 204. In general, the communication control system 207 targets at the business application 203 and the workflow system 204, which are belonging in the same sub-network 201 as itself, for controlling.

The workflow monitoring system 2081, 2082 or the like, which monitors operation of workflows and notifies the workflow monitoring and control system 205, is connected to the sub-network 2011, 2012 or the like corresponding to the workflow system 2041, 2042 or the like. In the communication environment shown in FIG. 4, the first workflow monitoring system 2081 is connected to the first sub-network 2011 and the second workflow monitoring system 2082 is connected to the third sub-network 2013 respectively. The monitoring target of the respective workflow monitoring systems 208 is the workflow system 204. In general, the workflow monitoring system 208 targets at the workflow system 204, which is belonging in the same sub-network 201 as itself, for monitoring.

At least one workflow monitoring and control system 205, which monitors and controls the business application 203 and the workflow system 204, exists in the general communication environment in which the present invention is carried out. Referring to FIG. 4, the workflow monitoring and control system 205 is connected to the second sub-network 2012.

Further, at least one business application control system 209, which controls computer resources used by the business applications 2031, 2032 or the like, which are provided in the business data processing system 2101, 2104 or the like, exists in the general communication environment shown in this FIG. 4. The business application control system 209 is connected to the second sub-network 2012 in an example shown in this figure.

Next, operation in the communication environment as above will be described.

The first and the second workflow systems 2041, 2042 and the first to the fourth business applications 2031-2034 execute the business data processing in cooperation with each other. At that time, the first and the second workflow systems 2041, 2042 and the first to the fourth business applications 2031-2034 mutually communicate depending on their needs. Information transmitted by the workflow system 204 and the business application 203 is received by the communication control system 207, which targets at the workflow system 204 and the business application 203 at the transmission end for controlling, and appropriate control is performed as necessary. Next, this information is transmitted to the communication control system 207, which targets at the workflow system 204 and the business application 203 at the receiving end for controlling, and appropriate control is performed as necessary. Next, this information is received by the workflow system 204 and the business application 203 at the receiving end.

Further, the fact that the workflow system 204 and the business application 203 have transmitted information is monitored by the communication monitoring system 206 which targets at the workflow system 204 and the business application 203 at the transmission end for monitoring. The fact that the workflow system 204 and the business application 203 have received the information is monitored by the communication monitoring system 206 which targets at the workflow system 204 and the business application 203 at the receiving end for monitoring.

Also, the fact that there has been a progress of business data processing, for example, in the workflow system 204 is monitored by the workflow monitoring and control system 205 which targets at the workflow system 204 for monitoring.

The configuration shown in FIG. 4 as mentioned above does not assume a specific organization or the like, and it still remains without loss of generality.

<Exemplary Embodiment of the Invention>

Figure 5:
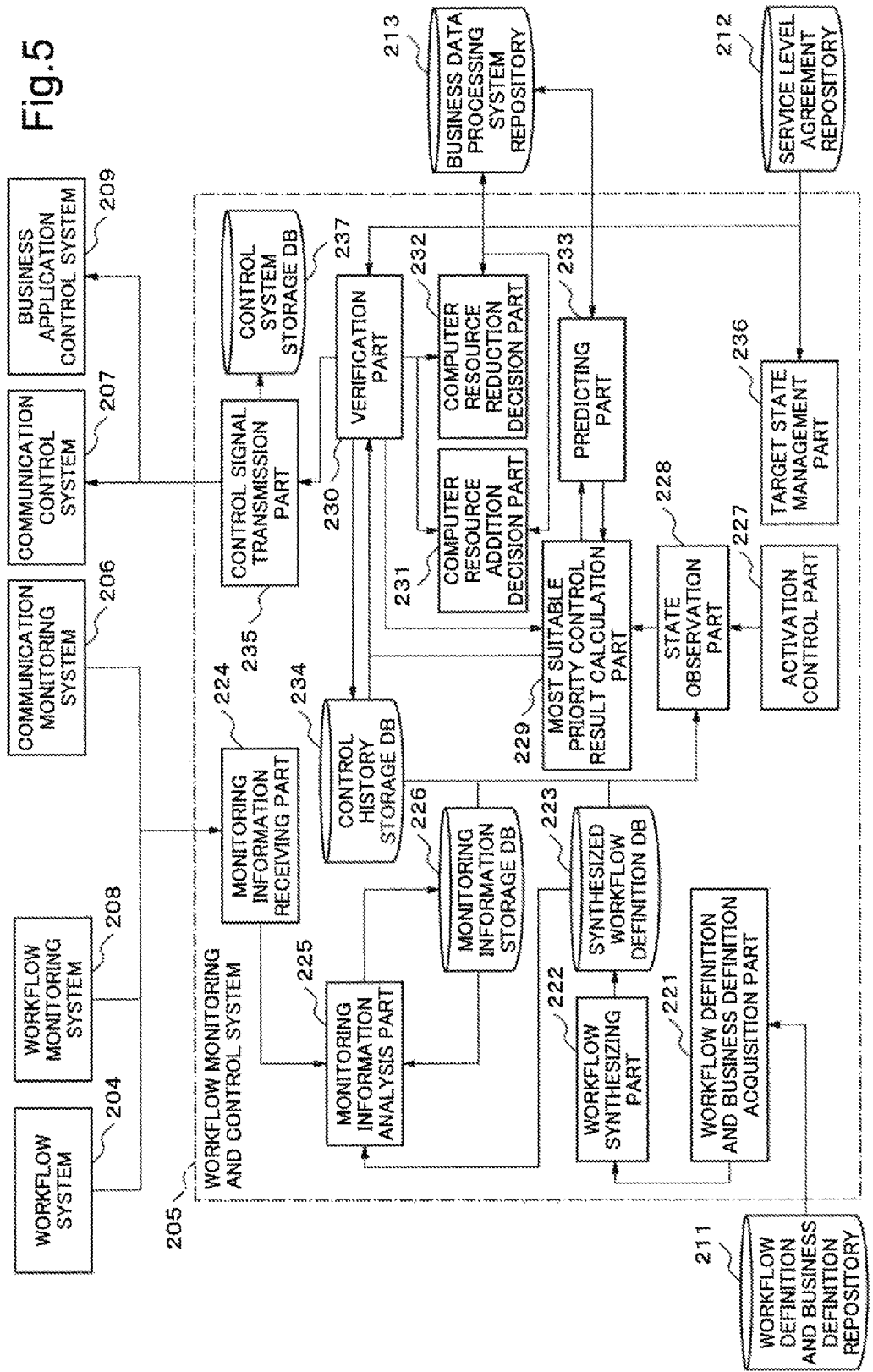
FIG. 5 is a system configuration drawing showing an outline of the workflow monitoring and control system and its vicinities according to the exemplary embodiment of the present invention.

FIG. 5 shows a primary part of the system configuration of the workflow monitoring and control system 205 and its vicinities according to one exemplary embodiment of the present invention. This figure is assumed, for example, the communication environment shown in FIG. 4.

FIG. 5 shows a workflow monitoring and control system 205, a workflow system 204, a workflow monitoring system 208, a communication monitoring system 206, a communication control system 207, a business application control system 209, a workflow definition and business definition repository 211 which stores definition information of a workflow executed by the workflow system 204 and definition information of the business application 203 (FIG. 4), a service level agreement repository 212 which stores service level agreement information and a business data processing system repository 213 which stores deployment information and performance characteristics information of a business data processing system. Here, "repository" generally means a storage place where data, information and programs are systematically stored like a container and a stockroom.

The workflow monitoring and control system 205 includes a workflow definition and business definition acquisition part 221 which acquires a workflow definition and a business definition, a workflow synthesizing part 222 which analyzes a communication relation among a plurality of workflow definitions and business definitions and generates a synthesized workflow definition in which a workflow definition and business definitions mutually communicating are synthesized, synthesized workflow definition DB (database) 223 which stores the synthesized workflow definitions, a monitoring information receiving part 224 which receives monitoring information from the workflow monitoring system 208 and the communication monitoring system 206, a monitoring information analysis part 225 which analyzes the monitoring information by correlating with synthesized workflow definitions, monitoring information storage DB (database) 226 which stores the monitoring information, an activation control part 227 which transmits a start request periodically, a state observation part 228 which acquires the state of the synthesized workflows up to the present, a most suitable priority control result calculation part 229 which predicts operation of synthesized workflows when performing the most suitable control, a verification part 230 which verifies based on the prediction results whether the synthesized workflow is expected to achieve the service level agreement, a computer resource addition decision part 231 which calculates a required amount of computer resources for achieving the service level agreement, a computer resource reduction decision part 232 which calculates a reduction amount of computer resources not affecting the service quality agreement achievement, a predicting part 233 which predicts a state of the synthesized workflows after a unit time based on a state of the synthesized workflows at a certain time and an allocation amount of computer resources to the business application control system 209, control history storage DB (database) 234 which stores past control histories, a control signal transmission part 235 which transmits a control signal to the communication control system 207, a target state management part 236 which holds the service level agreement, and control system storage DB (database) 237 which holds a mutual corresponding relationship among the communication control system 207. FIG. 5 shows only one communication control system 207 as a representative. When plural communication control systems 207 exist, the control system storage DB 237 holds the corresponding relationship of the communication control system 207 and the workflow system 204.

Here, the synthesized workflow is an instance (substance) of a processing request (processing target data or the like) of the business data processing which is processed according to a synthesized workflow definition. The synthesized workflow definition is synthesized by adding a plurality of workflow definitions. The synthesized workflow is actually used more than a single workflow. Accordingly, in this specification, terminology of "synthesized workflow" is used as terminology which includes not only a synthesized workflow but also a single workflow.

In this exemplary embodiment, each system focusing on the workflow monitoring and control system 205 generally operates as follows. FIG. 4 and FIG. 5 are referred in the description.

In the workflow definition and business definition repository 211, a definition of the workflow executed on the workflow system 204 which becomes a monitoring control target and a definition of the business application 203 executed on the business data processing system 210 are stored in advance. Also, in the service level agreement repository 212, the service level agreement set for the workflow system 204 and the business application 203 which become monitoring control targets is stored in advance. Here, the service level agreement is an example of a lower limit which can be permitted to the service quality mentioned above. In the business data processing system repository 213, deployment information of the business data processing system 210 to which the business application 203 can be deployed, performance characteristics information of the business data processing system 210, deployment information of the business application 203 in the business data processing system 210, and allocation information of computer resources to the business application 203 are stored.

The workflow definition and business definition acquisition part 221 acquires workflow definitions and business definitions from the workflow definition and business definition repository 211 before execution of the workflow system 204 and the business application 203. The workflow synthesizing part 222 creates a synthesized workflow definition from the acquired workflow definitions and business definitions and stores in the synthesized workflow definition DB223. Further, the target state management part 236 acquires service level agreement information from the service level agreement repository 212 and holds.

When the workflow system 204 and the business application 203 operate, the workflow monitoring system 208 and the communication monitoring system 206 detect a progress of the business data processing and an occurrence of communication, and notify the monitoring information receiving part 224. The received Monitoring information is analyzed by correlating with the synthesized workflow definitions in the monitoring information analysis part 225, and is stored in the monitoring information storage DB 226.

In parallel with this, the activation control part 227 transmits a start request to the state observation part 228 periodically. The state observation part 228 correlates the monitoring information stored in the monitoring information storage DB 226 with the synthesized workflow definitions stored in the synthesized workflow DB 223, and creates the state and history information of the synthesized workflows which are currently being executed and statistics information of the synthesized workflows which were executed in the past. Moreover, the state observation part 228 acquires the present control condition from the control history storage DB 234.

The state observation part 228 inputs the state and the history information of the synthesized workflows which are currently being executed, the statistics information of the synthesized workflows which were executed in the past and the present control condition to the most suitable priority control result calculation part 229.

The most suitable priority control result calculation part 229 predicts the future state, based on the inputted information, in a case where the most suitable priority control was supposed to be performed to the synthesized workflows which are currently being executed. The predicting part 233 performs this prediction using the allocation information of computer resources to the business applications stored in the business data processing system repository 213. The most suitable priority control result calculation part 229 outputs the prediction result to the verification part 230. Further, the service quality calculation part 14 in FIG. 1 calculates the service quality expected at the time of the completion of the business data processing of each of the workflows. The calculation result is an example of the prediction result in this exemplary embodiment.

The verification part 230 compares the prediction result with the target state management part 236 and judges the target achievement state. The quality insufficiency judging part 15 in FIG. 1 is an example of the verification part 230 in this exemplary embodiment, and when the service quality of any of the workflows is lower than a lower limit of the service quality at the time of the completion of the business data processing, this is discriminated. As a result, the verification part 230 stores the control information in the control history storage DB 234 if the prediction result is proper, transmits the validity of the prediction result to the communication control system 207 and the business application control system 209 by the control signal transmission part 235 and ends. If the prediction result does not achieve the service level agreement, the verification part 230 notifies the computer resource addition decision part 231 of the input and output of the most suitable priority control result calculation part 229.

The computer resource addition decision part 231 creates a plan for adding computer resources to an appropriate business application 203 with reference to the received input and output of the most suitable priority control result calculation part 229, and sets it to the business data processing system repository 213. When the quality insufficiency judging part 15 judges that the service quality of a certain workflow is lower than a lower limit, the computer resource reallocation part 16 reallocates the amount of computer resources to a plurality of processing sections in order to correct a situation where the service quality of the certain workflow is lower than the lower limit. This processing is an example of creation of the plan for adding computer resources in this exemplary embodiment. The most suitable priority control result calculation part 229 inputs the state and the history information of the synthesized workflows which are currently being executed and the statistics information of the synthesized workflows which were executed in the past, and predicts the future state in a case where the most suitable priority control is performed to the synthesized workflows once again.

The verification part 230 notifies the computer resource reduction decision part 232 of the input and output of the most suitable priority control result calculation part 229 in case of judging that this prediction result achieves the service level agreement with great excess. The computer resource reduction decision part 232 creates a plan for appropriately reducing computer resources having been allocated to the business applications 203 with reference to the received input and output of the most suitable priority control result calculation part 229, and sets it to the business data processing system repository 213. The most suitable priority control result calculation part 229 inputs the state and the history information of the synthesized workflows which are currently being executed and the statistics information of the synthesized workflows which were executed in the past, and predicts the state of the future in a case where the most suitable priority control is performed to the synthesized workflows once again.

Figure 6:
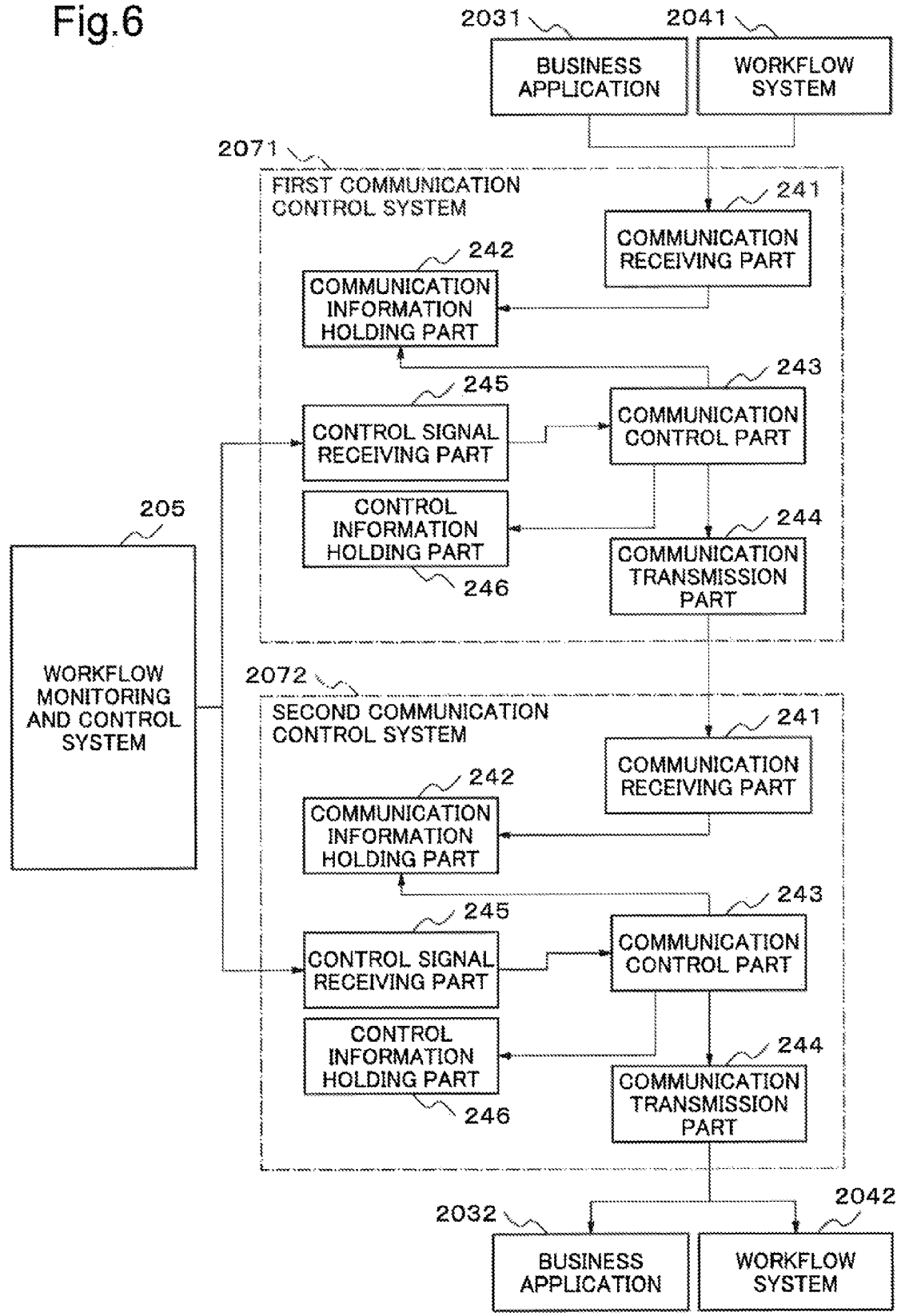
FIG. 6 is a block diagram showing a configuration of each system focusing on a communication control system according to this exemplary embodiment.

FIG. 6 shows the configuration of each system focusing on the communication control system 207 in this exemplary embodiment. This figure shows an example that the workflow monitoring and control system 205 is connected with the first communication control system 2071 and the second communication control system 2072 in the communication environment shown in FIG. 4. The communication control systems 207 connected to the workflow monitoring and control system 205 in FIG. 5 is the first and the second communication control systems 2071, 2072 in FIG. 6. The first communication control system 2071 is connected to the first business application 2031 and the first workflow system 2041 via the business data processing system 2101 which is omitted to be shown. Similarly, the second communication control system 2072 is connected to the second business application 2032 and the second workflow system 2042 via the business data processing system 2101.

The first communication control system 2071 includes a communication receiving part 241 which receives information transmitted by the first business application 2031, the first workflow system 2041 or other communication control system 207 (such as the second communication control system 2072), a communication information holding part 242 which holds the received information, a communication control part 243 which determines whether it keeps holding, transmits or abandons the received information, a communication transmission part 244 which transmits information to the business application 203, the workflow system 204 or other communication control systems 207, a control signal receiving part 245 which receives a control signal from the workflow monitoring and control system 205, and a control information holding part 246 which holds information relating to control conditions.

Further, the second communication control system 2072 is identical to the configuration of the first communication control system 2071. Accordingly, describing of its configuration will be omitted.

Each system focusing on a portion of the workflow monitoring and control system 205 shown in FIG. 6 generally operates as follows.

For example, information transmitted from the first business application 2031 and the first workflow system 2041 is received at the communication receiving part 241 of the first communication control system 2071 which targets at these for controlling, and is held by the communication information holding part 242. The communication control part 243 is started when the received information is held in the communication information holding part 242, or at the predetermined set time. And, the communication control part 243 classifies each communication information held by the communication information holding part 242 into the communication information to be held, the communication information to be transmitted and the communication information to be abandoned with reference to the control conditions stored in the control information holding part 246.

Among these, the communication information which was classified into one to be held is held just as it is, and the communication information which was classified into one to be abandoned is deleted from the communication information holding part 242. The communication information which was classified into one to be transmitted is transmitted by the communication transmission part 244 to the business application 203, the workflow system 204 or other communication control systems 207 such as the second communication control system 2072 in the receiving end.

The second communication control system 2072, which targets at the second business application 2032 and the second workflow system 2042 at the receiving end for controlling, also operates similarly. As a result, the transmitted information is received finally by the second business application 2032 or the second workflow system 2042 at the receiving end. In parallel with this, the workflow monitoring and control system 205 appropriately transmits a control signal to the control signal receiving part 245 of the first and the second communication control systems 2071, 2072 as necessary.

The control signal receiving part 245 notifies the communication control part 243 of the received control signal. The communication control part 243 classifies, if necessary, each of the communication information held in the communication information holding part 242 into the communication information to be held, the communication information to be transmitted and the communication information to be abandoned with reference to the received control condition. The communication control part 243 holds the communication information, which was classified into one to be held, just as it is, and deletes the communication information, which was classified into one to be abandoned, from the communication information holding part 242. When having been abandoned, the processing of the corresponding synthesized workflow disappears at that stage. This means that the corresponding business application 203 and other succeeding business application 203 can skip to perform processing of the synthesized workflow. That is, processing time of one or more other synthesized workflows can be reduced under the sacrifice of the synthesized workflow which has become a target of abandon.

The communication information, which was classified into one to be transmitted, is transmitted by the communication transmission part 244 to the communication receiving part 241 of the second communication control system 2072, which targets at the second business application 2032 and the second workflow system 2042 at the receiving end for controlling. After that, the communication control part 243 stores the control signal in the control information holding part 246.

Figure 7:
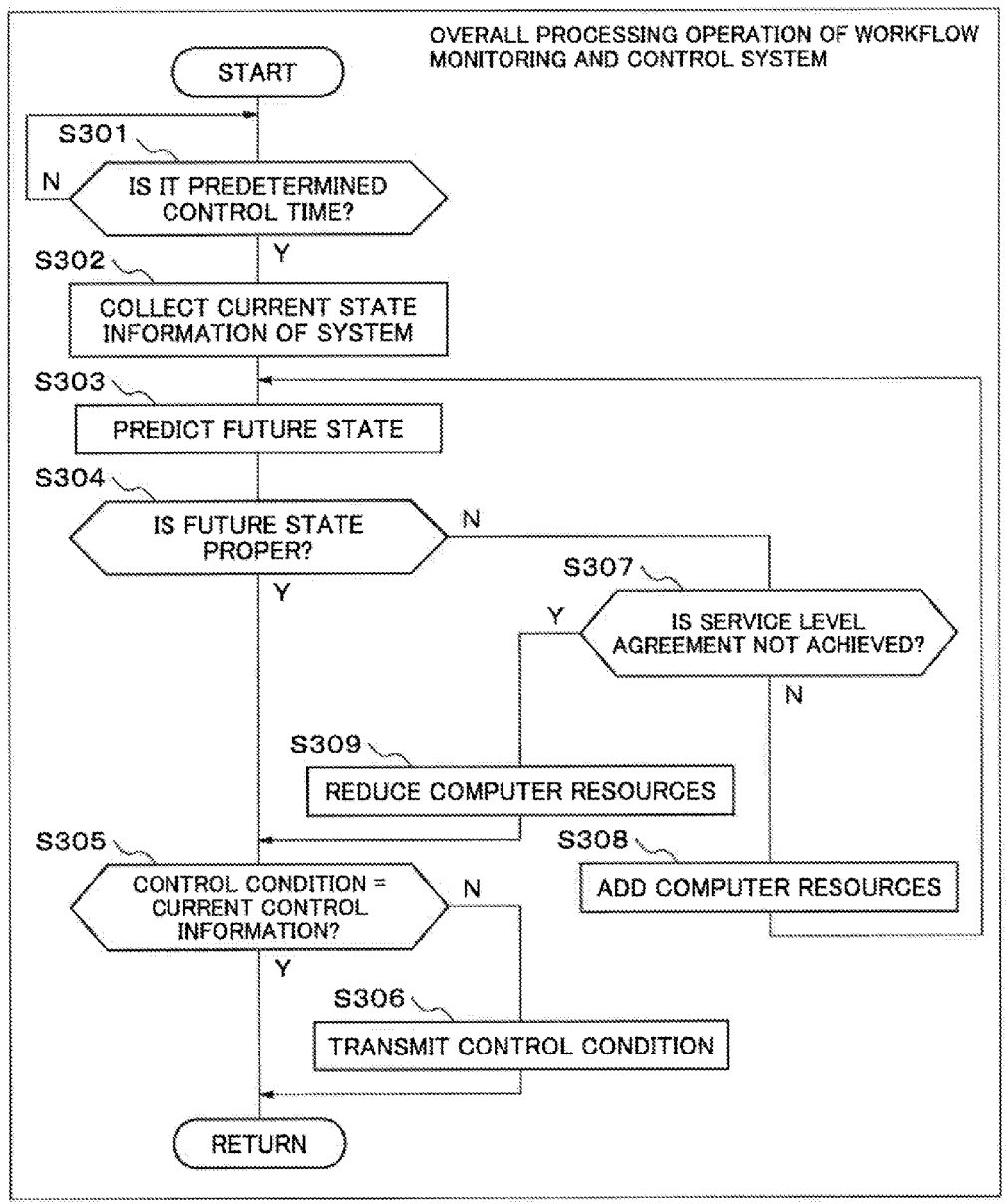
FIG. 7 is a flow chart showing overall processing operation of the workflow monitoring and control system of this exemplary embodiment.

FIG. 7 outlines overall processing operation of the workflow monitoring and control system of this exemplary embodiment. This figure will be described together with FIG. 5 and FIG. 6. The workflow monitoring and control system 205 is equipped with CPU (Central Processing Unit) which is not shown and a storage medium such as a hard disk for storing control programs executed by this CPU. By executing this control program, CPU may realize functionally at least a part of each part in the workflow monitoring and control system 205 described foregoing by software. Each part in the workflow monitoring and control system 205, or CPU, realizes the control which will be described below.

The activation control part 227 is standing by (Step S301), until it becomes a predetermined control time. When it has become the predetermined control time (Y), the activation control part 227 starts the state observation part 228, and the state observation part 228 correlates monitoring information stored in the monitoring information storage DB 226 with a synthesized workflow definition stored in the synthesized workflow definition DB 223. And, the state observation part 228 creates the state and history information of the synthesized workflows which are currently being executed, and statistics information of the synthesized workflows which were executed in the past (Step S302).

Next, the most suitable priority control result calculation part 229 acquires the state and the history information of the synthesized workflows which are currently being executed, the statistics information of the synthesized workflows which were executed in the past and the present control condition acquired from the control history storage DB 234. The most suitable priority control result calculation part 229 predicts the future state of the synthesized workflows which are currently being executed based on these inputted information. The prediction result of the future state of the synthesized workflows and the input to the most suitable priority control result calculation part 229 are outputted to the verification part 230 (Step S303).

The verification part 230 judges the validity of the prediction result with reference to the target state management part 236 (Step S304). When the prediction result is proper (Y), that is, when the prediction result achieves the service level agreement and this does not exceed the service level agreement substantially, the verification part 230 refers to the control history storage DB 234, and as a result, judges whether a control condition is same as the present control condition (Step S305). When it is the same (Y), the verification part 230 ends the operation without transmitting the control condition, and the workflow monitoring and control system 205 returns to the processing of Step S301 (return).

When the control condition is not the same as the present control condition (step S305: N), the verification part 230 stores the control condition which is not the same in the control history storage DB 234. And, the control signal transmission part 235 transmits the control condition to the communication control system 207 (Step S306). After this, the workflow monitoring and control system 205 returns to the processing of Step S301 (return).

The case where it is judged that the prediction result is not proper (N) in Step S304 is either one of the following two cases. One is the case where it is judged that the prediction result does not achieve the service level agreement. Another is the case where it is judged that the prediction result has exceeded the service level agreement substantially. Accordingly, the verification part 230 discriminates whether the service level agreement is achieved or not (Step S307), in a case where it is judged that the prediction result is not proper (Step S304: N).

In a case where it is judged that the prediction result does not achieve the service level agreement (N), the computer resource addition decision part 231 decides an appropriate business application 203 to which computer resources are to be added and the addition amount. And, the computer resource addition decision part 231 sets the allocated amount of computer resources after addition of the business application 203 to the business data processing system repository 213 (Step S308), and the most suitable priority control result calculation part 229 inputs the state and the history information of the synthesized workflows which are currently being executed and the statistics information of the synthesized workflows which were executed in the past, and predicts the future state of the synthesized workflows which are currently being executed (Step S303).

In contrast, in a case where it is judged that the prediction result exceeded the service level agreement substantially (step S307: Y), the computer resource reduction decision part 232 decides an appropriate business application 203 from which computer resources are to be reduced and the reduction amount, and sets the allocated amount of computer resources after reduction of the business application to the business data processing system repository 213 (Step S309). As an example of a method of judging that the prediction result exceeds the service level agreement substantially, there is a method of judging whether the difference with the service level agreement of the synthesized workflow having the smallest margin to the service level agreement exceeds a predetermined range. If computer resources are reduced in this way, the verification part 230 advances towards the processing of Step S305.

Figure 8:
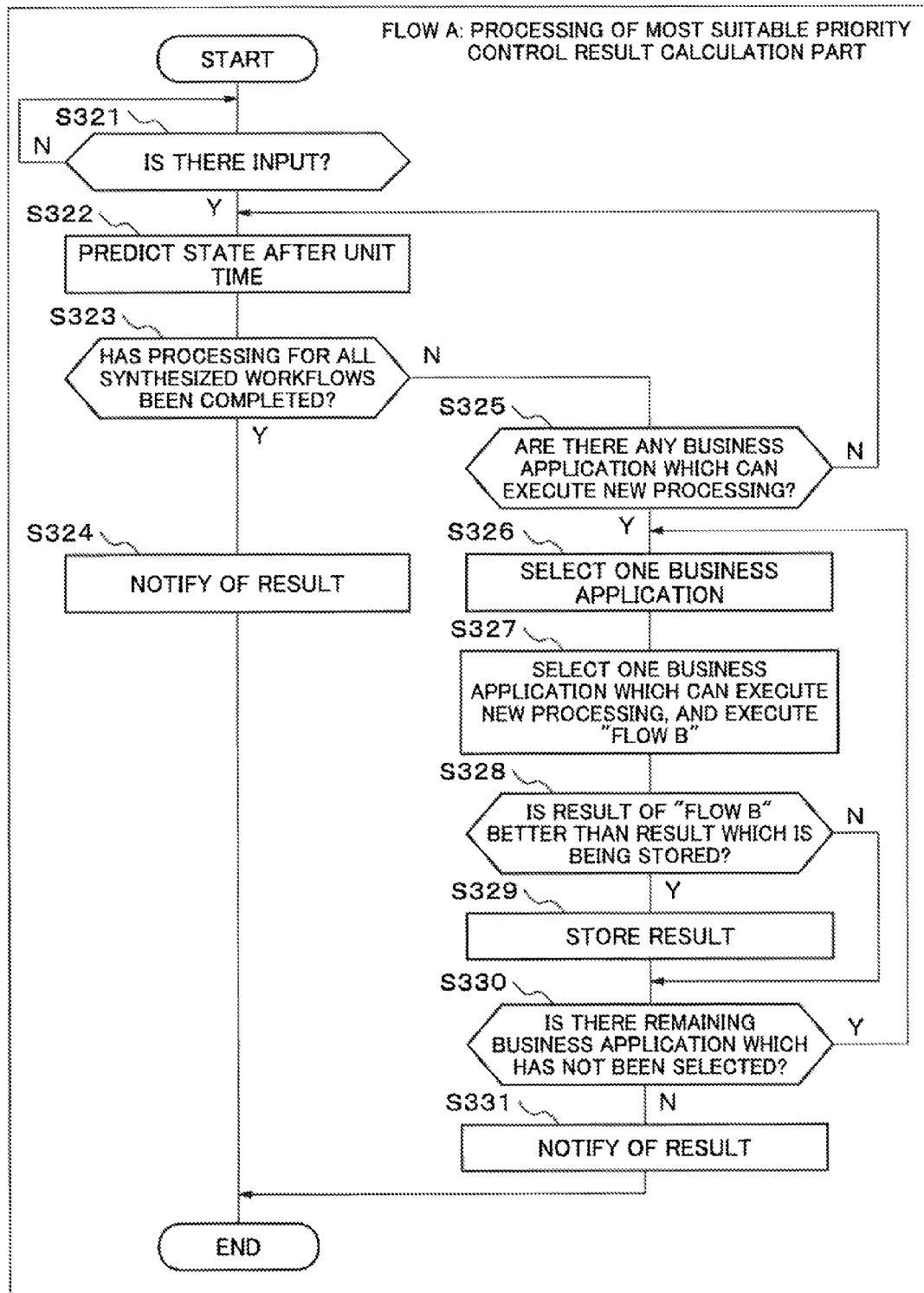
FIG. 8 is a flow chart showing processing of the most suitable priority control result calculation part as "flow A" according to this exemplary embodiment.

FIG. 8 shows processing of the most suitable priority control result calculation part 229. This figure will be described together with FIG. 5 and FIG. 6. Further, operation of the most suitable priority control result calculation part 229 shown in FIG. 8 varies depending on the contents of the monitoring control target and the service level agreement. The processing operation shown in FIG. 8 is an example.

First, the most suitable priority control result calculation part 229 acquires the state and the history information of the synthesized workflows which are currently being executed, the statistics information of the synthesized workflows which were executed in the past and the present control condition (step S321:Y). After this, the most suitable priority control result calculation part 229 predicts the state of the synthesized workflows after a unit time, based on the state and the history information of the synthesized workflows which are currently being executed, and information of the business data processing system repository 213, by using the predicting part 233 (Step S322). Here, the unit time is the time which is sufficiently short enough to the time required for processing of the synthesized workflow, and determined in the predicting part 233.

Next, the most suitable priority control result calculation part 229 judges whether the processing for all synthesized workflows has been completed (Step S323). In a case where it is judged that everything has completed (Y), the most suitable priority control result calculation part 229 notifies the verification part 230 of the state of the predicted synthesized workflows (Step S324) and ends a series of processing (end).

On the other hand, when it is not judged that the processing for all synthesized workflows has been completed (step S323: N), the most suitable priority control result calculation part 229 judges from the state of the synthesized workflows whether any business application 203 which can execute new processing exists (Step S325). An example of the method for judging a business application 203 which can execute new processing is the method which judges whether there exists a workflow which is waiting for processing of a business application 203 which is not executing any processing.

In a case where it is judged that there exist the business applications 203 which can execute new processing (Y), the most suitable priority control result calculation part 229 selects one business application 203 which can execute new processing (Step S326). And, executes "flow B" shown in next FIG. 9 for the selected business application 203 (Step S327). A series of processing shown in FIG. 8 is "flow A".

When a result of executing "flow B" is the best among the results of "flow B" having been obtained up to now (step S328:Y), the most suitable priority control result calculation part 229 stores this obtained result as the best result (Step S329). An example of the method for comparing results of "flow B" is the method which judges that the fewer the number of synthesized workflows which cannot achieve the service level agreement, the better it is, and in a case where all synthesized workflows have achieved the service level agreement, judges that the greater the degree of exceeding the service level agreement, the better it is.

If the obtained result is stored as the best result in Step S329, the most suitable priority control result calculation part 229 judges whether there exists a business application 203 which can execute new processing and is not yet selected for executing "flow B" (Step S330). In a case where it is judged that such business application 203 exists (Y), the most suitable priority control result calculation part 229 returns to Step S326, and repeats the similar processing until such a business application 203 does not exist any more. In a case where there exists no business application 203 which is not yet selected for executing "flow B" (step S330: N), the most suitable priority control result calculation part 229 notifies of the best result stored in Step S329 as the processing result of "flow A" (Step S331), and ends the processing of "flow A" (end).

In contrast, when it is judged in Step S328 that the result of executing "flow B" is not the best among the results of "flow B" having been obtained up to now (N), the most suitable priority control result calculation part 229 advances towards Step S330 without storing the processing result. Further, when it is judged in Step 325 that there exists no business application 203 which can execute new processing (N), the most suitable priority control result calculation part 229 returns the processing to Step S322.

Figure 9:
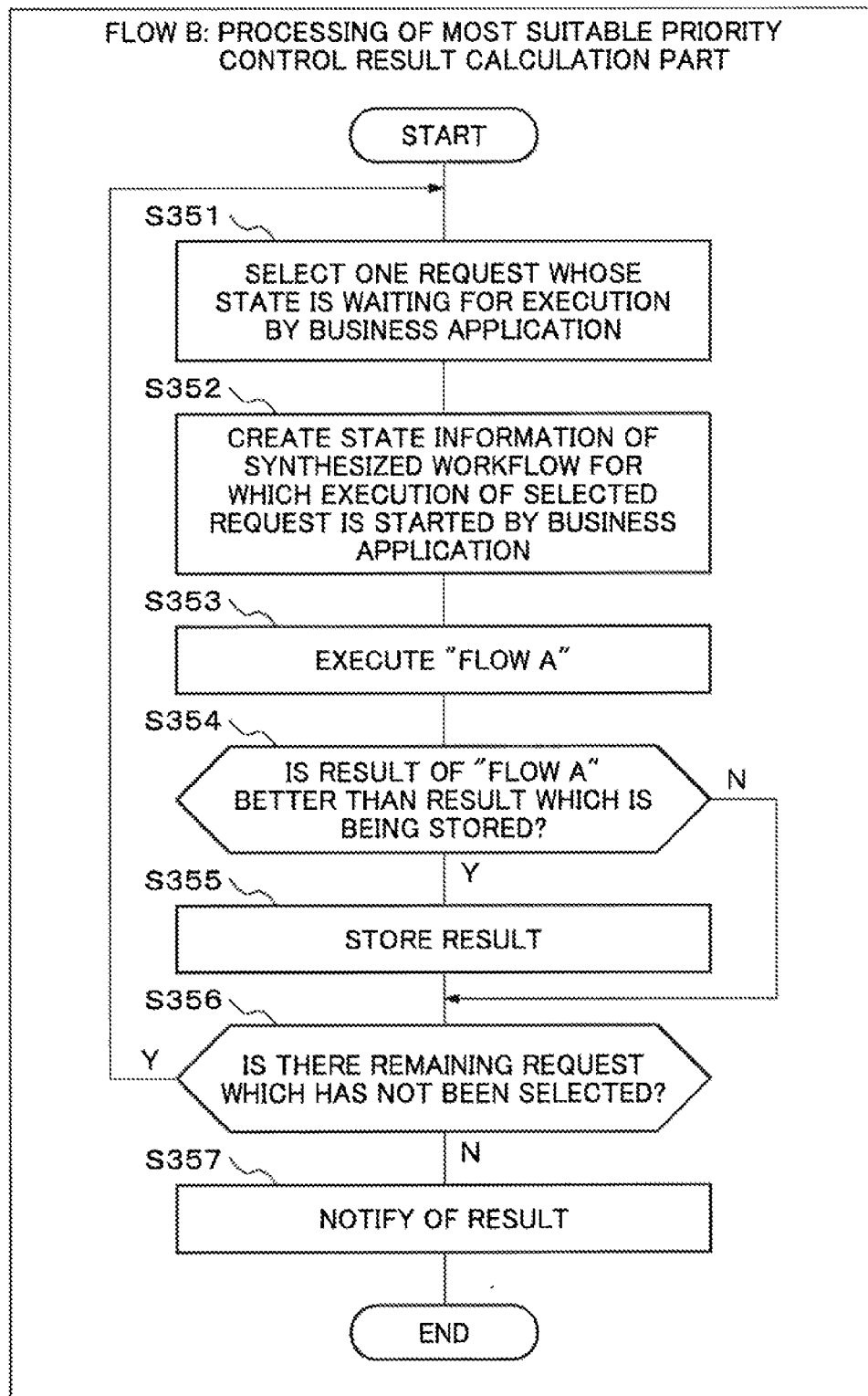
FIG. 9 is a flow chart showing processing of the most suitable priority control result calculation part as "flow B" according to this exemplary embodiment.

FIG. 9 shows the specific contents of "flow B" written in Step S327 of FIG. 8. This figure will be described together with FIG. 5 and FIG. 6.

In "flow B", first, the most suitable priority control result calculation part 229 selects one of processing requests waiting for processing by the selected business application 203 (Step S351). Then, the most suitable priority control result calculation part 229 updates the state of the synthesized workflows at the time of this selection, and creates state information of the synthesized workflow for which execution of the selected processing request is started by the selected business application 203 (Step S352). And, the most suitable priority control result calculation part 229 executes "flow A" shown as FIG. 8 by inputting the state and the history information of the synthesized workflow created in this Step S352, the statistics information of the synthesized workflows which were executed in the past and the present control condition (Step S353).

Next, the most suitable priority control result calculation part 229 judges whether this processing result of "flow A" is the best among the processing results of "flow A" obtained while executing "flow B" (Step S354). In a case where it is judged that it is the best (Y), the most suitable priority control result calculation part 229 stores the obtained result as the best result in "flow B" (Step S355). The comparison method of the processing result of "flow A" is the same as the comparison method of the result of "flow B" which has already been described.

When having stored the best result in Step S355 as above, the most suitable priority control result calculation part 229 judges whether there still remains a request which has not been selected in "flow B" among processing requests waiting for processing by the selected business application 203 (Step S356). When it is judged that such a request is remaining (Y), the most suitable priority control result calculation part 229 returns to Step S351, and repeats the similar processing until such a request is not remaining any more.

When it is judged that the request, which has not been selected in "flow B", is not remaining (step S356: N), the most suitable priority control result calculation part 229 notifies of the best processing result stored in Step S355 as the processing result of "flow B" (Step S357), and ends a series of processing in "flow B" (end).

Figure 10:
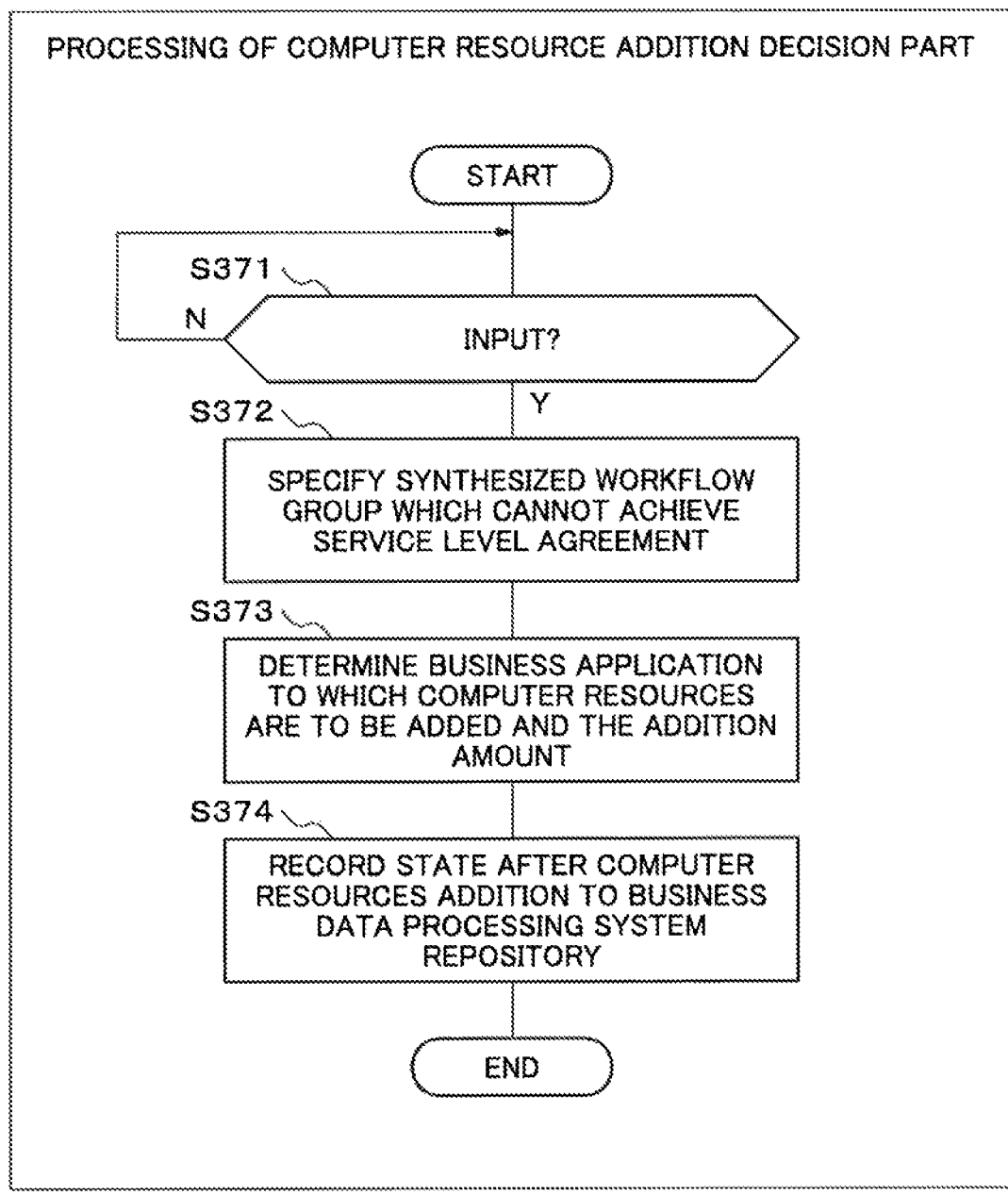
FIG. 10 is a flow chart showing processing of the computer resource addition decision part according to this exemplary embodiment.
Figure 11:
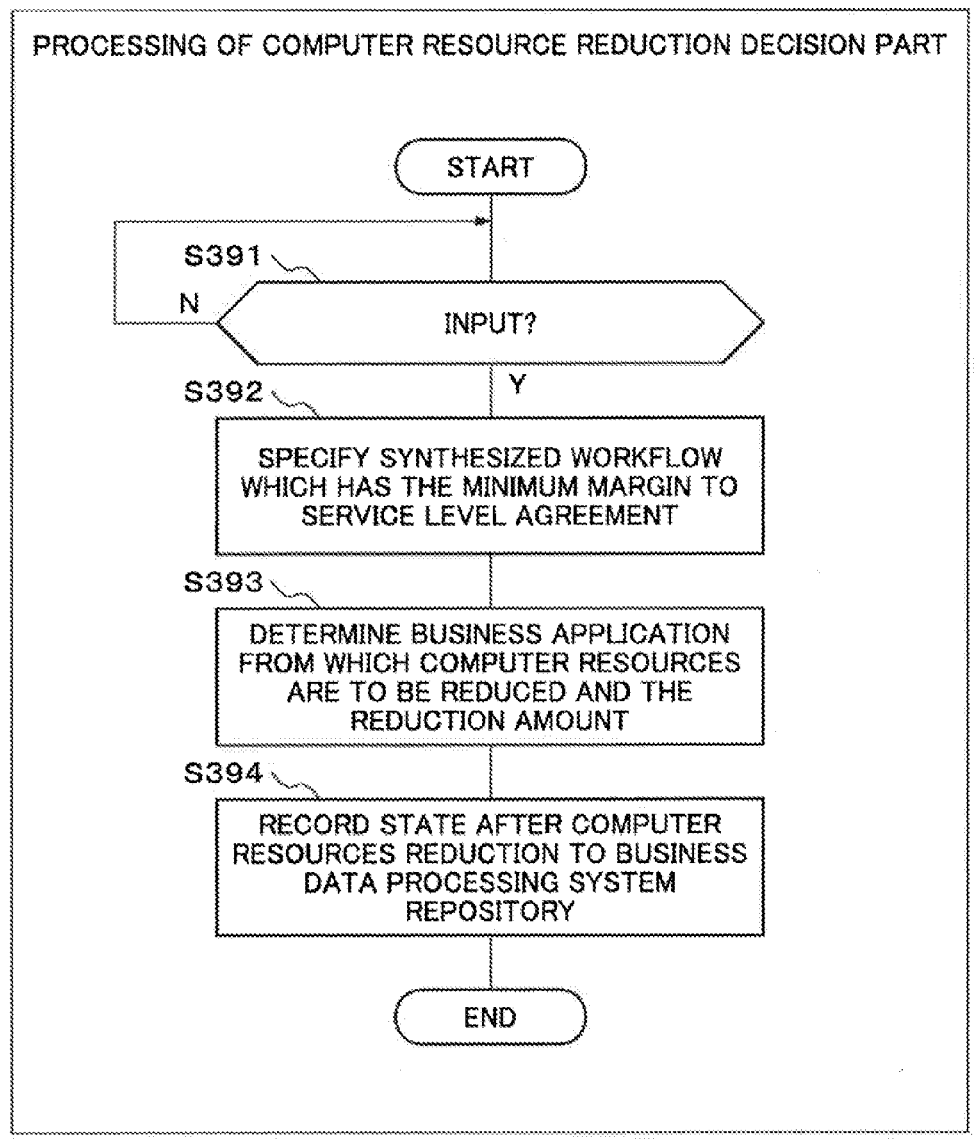
FIG. 11 is a flow chart showing operation of the computer resource reduction decision part according to this exemplary embodiment.

FIG. 10 shows processing of the computer resource addition decision part, and FIG. 11 shows processing of the computer resource reduction decision part. Both figures will be described together with FIG. 5 and FIG. 6. Further, these figures show an operation example of the computer resource addition decision part 231 and the computer resource reduction decision part 232 respectively. Operation of the computer resource addition decision part 231 and the computer resource reduction decision part 232 varies depending on the contents of the monitoring control target and the service level agreement, and the characteristics of the business data processing system.

First, the computer resource addition decision part 231 acquires, from the verification part 230, the prediction results of the most suitable priority control result calculation part 229 including the expected state of the synthesized workflows at the time when execution of all synthesized workflows has been completed and the history information until it has reached at this state, and the information of the target state management part 236 which was used for judgment of the prediction result by the verification part 230 (step S371: Y). The computer resource addition decision part 231 specifies a synthesized workflow group which cannot achieve the service level agreement based on the inputted information (Step S372).

Next, the computer resource addition decision part 231 determines the business application 203 to which computer resources are to be added and the addition amount (Step S373). An example of this decision method is the method which adds the minimum unit of computer resources to the business application 203 which is predicted to have the largest total of waiting time (standby time) which is a time from a request of execution to each business application 203 by the synthesized workflow group specified in Step S372 to a start of the execution. Also, this decision method may be the method by the following way. First, it obtains value 1 by dividing the waiting time, which is a time from an execution request to each business application 203 by the synthesized workflow group specified in Step S372 to a start of execution, by an execution required time of the business application 203. Second, it obtains value 2 by multiplying value 1 by an execution required time improving amount of the business application 203 in case of having added the minimum unit of computer resources to the business application 203. Third, it obtains value 3 by summing value 2 of all execution requests requested to each business application 203 by the workflow included in the synthesized workflow group specified in Step S372 for each of the business applications 203. Finally, the minimum unit of computer resources is added to the business application 203 which is predicted to have the largest value 3.

When having decided, as described above, the business application 203 to which computer resources are to be added and the addition amount (Step S373), the computer resource addition decision part 231 stores the state after the obtained computer resources having been added to the obtained business application 203, in the business data processing system repository 213 (Step S374). The computer resource addition decision part 231 ends the processing in this way (end).

FIG. 11 shows operation of the computer resource reduction decision part. This figure will be described together with FIG. 5.

The computer resource reduction decision part 232 acquires, from the verification part 230, the prediction results in the most suitable priority control result calculation part 229 including the expected state of the synthesized workflows at the time that execution of all synthesized workflows has been completed and the history information until it has reached at this state, and the information of the target state management part 236 which was used for judgment of the prediction result by the verification part 230 (step S391: Y).

Next, the computer resource reduction decision part 232 specifies the synthesized workflow having the smallest margin to the service level agreement based on this inputted information (Step S392). And, the business application 203 from which computer resources are to be reduced and the reduction amount are determined from a view point as achievement of the service level agreement to the synthesized workflows other than this specified synthesized workflow (Step S393). An example of this decision method is the method which reduces the minimum unit of computer resources from the business application 203 having the shortest waiting time among the business applications 203 which are not used, in a period for which the prediction is performed, by the synthesized workflow specified in step S392. Also, this decision method may be the method which reduces the minimum unit of computer resources from the business application 203 having the smallest utilization ratio of the past fixed period among the business applications 203 which are not used, in a period for which the prediction is performed, by the synthesized workflow specified in step S392.

When having decided, as described above, the business application 203 from which computer resources are to be reduced and the reduction amount in Step S393, the computer resource reduction decision part 232 stores the state after the obtained computer resources having been reduced from the obtained business application 203, in the business data processing system repository 213 (Step S394). The computer resource reduction decision part 232 ends the processing in this way (end). With respect to reduction of computer resources, it is not the indispensable condition to specify the synthesized workflow having the smallest margin to the service level agreement first (FIG. 11, step S392). The reduction of computer resources is also possible by the technique other than this.

The workflow monitoring and control system 205 according to the exemplary embodiment of the present invention described above can increase a possibility that the workflow execution system 400 maintains the service quality based on the service level agreement without changing the business application 203 and the configuration of the workflow system 204. The reason is because that the workflow monitoring and control system 205 performs an operation prediction of the business application 203 and the workflow system 204, finds appropriate operation which can maintain the service quality based on the service level agreement, and is performing control so that the business data processing system 210 or the like, which executes business applications 203, may perform appropriate operation. Also, it increases a possibility of maintaining the service quality based on the service level agreement that the workflow monitoring and control system 205 according to the exemplary embodiment controls computer resources used by the business applications 203 as necessary.

Further, the workflow monitoring and control system 205 according to this exemplary embodiment increases a possibility that the workflow execution system 400 maintains the service quality based on the service level agreement even when a plurality of service level agreements are set. The reason is because that the workflow monitoring and control system 205 according to this exemplary embodiment performs an operation prediction of the business application 203 and the workflow system 204, and finds appropriate operation which can maintain the service quality based on a plurality of service level agreements.

Moreover, the workflow monitoring and control system 205 according to this exemplary embodiment increases a possibility that the workflow execution system 400 maintains the service quality based on the service level agreement, while saving computer resources for executing business applications 203. The reason is because that the workflow monitoring and control system 205 according to this exemplary embodiment performs an operation prediction of the business application 203 and the workflow system 204, and controls so that the workflow execution system 400 may save computer resources used by the business application 203 in the range where the service quality based on the service level agreement can be maintained.

Operation Example 1

Next, an operation example of the present invention will be described.

Figure 12:
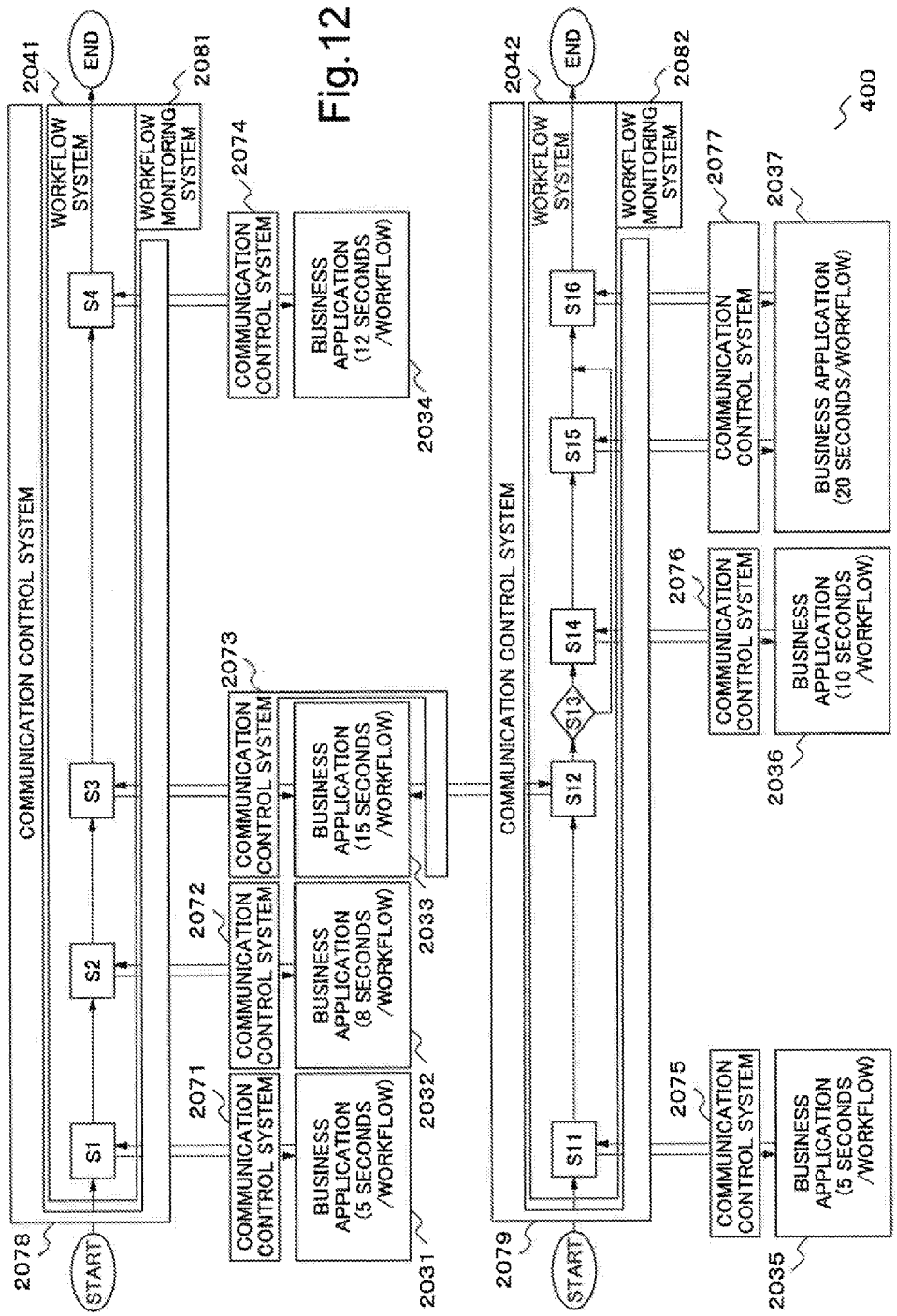
FIG. 12 is a system configuration drawing showing a part of the configuration of the workflow execution system according to one operation example of the present invention.

FIG. 12 shows a part of the configuration of the workflow execution system 400 in one operation example of the present invention. The workflow execution system 400 of this operation example includes first and second workflow systems 2041, 2042 and first to seventh business applications 2031-2037, and these are the monitoring and control targets of the workflow monitoring and control system 205. However, in this figure, the workflow monitoring and control system 205 and the business data processing system 210 which deploys the first to the seventh business applications 2031-2037 (refer to FIG. 4) are omitted. Further, the relation of connection among the first and the second workflow systems 2041, 2042, the first to the seventh business applications 2031-2037, the first to the seventh communication control systems 2071-2077 and the first and the second workflow monitoring systems 2081, 2082 is different from the exemplary connection relationship shown in FIG. 4.

One workflow definition exists in the first workflow system 2041. The workflow, which is processed according to this workflow definition, communicates with the first to the fourth business applications 2031-2034 successively in the process of each of Steps S1 to S4 of the flow shown by "START" to "END" indicated on the upper half of FIG. 12.

Another workflow definition also exists in the second workflow system 2042. The workflow, which is processed according to this workflow definition, communicates with the fifth, the third, the sixth and the seventh business applications 2035, 2033, 2036 and 2037 successively in the process of each of Steps S11 to S16 of the flow shown by "START" to "END" indicated on the lower half of FIG. 12.

Here, the first communication control system 2071 controls communication of the first business application 2031 during processing of Step S1, and the second communication control system 2072 controls communication of the second business application 2032 during processing of Step S2. The third communication control system 2073 controls communication of the third business application 2033 during processing of Step S3 and Step S12, and the fourth communication control system 2074 controls communication of the fourth business application 2034 during processing of Step S4. Moreover, the fifth communication control system 2075 controls communication of the fifth business application 2035 during processing of Step S11, and the sixth communication control system 2076 controls communication of the sixth business application 2036 during processing of Step S14. Moreover, the seventh communication control system 2077 controls communication of the seventh business application 2037 during processing of Step S15 and Step S16. Further, the eighth communication control system 2078 performs overall communication control of the first workflow system 2041, and the ninth communication control system 2079 performs overall communication control of the second workflow system 2042 respectively.

FIG. 13 shows the performance characteristics of each business application 203 used in this operation example. In FIG. 13, vertical axis indicates the first to the seventh business applications 2031-2037, horizontal axis is indicating a multiple of the unit amount such as "10" and "20" as the amount of computer resources, and each cell is indicating processing time per one workflow of the corresponding application when the corresponding amount of computer resources is given to the application. For example, the first business application 2031 performs processing in 10 seconds per one workflow at the time of 10 units of the amount of computer resources, and when the amount of computer resources becomes double, 20 units, the processing time per one workflow is reduced to a half, 5 seconds. The data which shows the performance characteristics of the first to the seventh business applications 2031-2037 shown in FIG. 13 is stored in the business data processing system repository 213 shown in FIG. 5.

FIG. 14 shows the amount of computer resources assigned to each of the business applications 203 in the initial state. The amount of computer resources at the initial state for the first to the seventh business applications 2031-2037 are also stored in the business data processing system repository 213 shown in FIG. 5.

By this allocation state of the amount of computer resources, the first business application 2031 and the fifth business application 2035 perform processing in 5 seconds per a case (per a workflow) of processing as shown in FIG. 12. Also, it performs processing respectively that the second business application 2032 in 8 seconds per a case of processing, the third business application 2033 in 15 seconds per a case of processing, the fourth business application 2034 in 12 seconds per a case of processing, the sixth business application 2036 in 10 seconds per a case of processing, and the seventh business application 2037 in 20 seconds per a case of processing.

These workflow definitions and business application definitions are stored in the workflow definition and business definition repository 211. Further, the workflow definition and business definition acquisition part 221 and the workflow synthesizing part 222 shown in FIG. 5 generate one synthesized workflow definition in which one workflow definition existing in the first workflow system 2041 and the total of four business application definitions existing in the first to the fourth business applications 2031-2034 have been synthesized, and one synthesized workflow definition in which one workflow definition existing in the second workflow system 2042 and the total of four business application definitions existing in the fifth, the third, the sixth and the seventh business applications 2035, 2033, 2036 and 2037 have been synthesized, and store in the synthesized workflow definition DB 223 (FIG. 5).

The service level agreement is set in the workflow definition of the workflow shown in FIG. 12. In the synthesized workflow definition focusing on one workflow definition existing in the first workflow system 2041, the service level agreement which requests to complete processing within 180 seconds is set. Also, in the synthesized workflow definition focusing on one workflow definition existing in the second workflow system 2042, two of the service level agreements are defined depending on a user of the synthesized workflow definition. Specifically, for example, the service level agreement which requests to complete processing received from a part of users within 100 seconds and to complete processing received from the other users within 150 seconds is set. Such service level agreements are stored in the service level agreement repository 212 (FIG. 5). Thus, the service quality according to the degree of each user's demand for the service can be achieved by setting a service level agreement for each of a plurality of users.

In the workflow execution system 400 of this operation example, the first workflow monitoring system 2081 targets at the first workflow system 2041 for monitoring, and the second workflow monitoring system 2082 targets at the second workflow system 2042 for monitoring.

In the initial state, the control information holding part 246 (refer to FIG. 6) of each of the communication control systems 2071-2079 holds the setting information which directs that each of the communication control systems 2071-2079 immediately transmits the information transmitted by the respective control targets. Further, the control information holding part 246 holds the setting information which directs that each of the communication control systems 2071-2079 once holds the information to be received by the respective control targets, and transmits these to the control targets in order of reception with the same interval as the processing time of the control targets. Moreover, communication among the first and the second workflow systems 2041, 2042 and the first to the seventh business applications 2031-2037 is monitored by the communication monitoring system 206. The information which defines these monitoring targets and control targets is stored in the control system storage DB 237 (FIG. 5).

In addition, for example, the activation control part 227 (FIG. 5) is set to start the state observation part 228 (FIG. 5) every 60 seconds. Also, the predicting part 233 (FIG. 5) is set to obtain the state of 0.1 seconds later of the state of an inputted synthesized workflows.

Further, the state where the verification part 230 (FIG. 5) judges that "a prediction result achieves the service level agreement with great excess" means, for example, the state where all synthesized workflows are completed in a time of less than a half of time defined by the service level agreement.

FIG. 15 shows the state of the workflow monitoring and control system 205 at the time 660 when synthesized workflows have been executed since the time 0. FIG. 16 shows the state of the synthesized workflows being executed at the time 660 when synthesized workflows have been executed from the time 0. In FIG. 15, the same part as FIG. 12 is given an identical reference numeral, and the description will be omitted appropriately.

As shown in FIG. 15 and FIG. 16, at this time 660, there exist six synthesized workflows (a1)-(f1) which are controlled by the first workflow system 2041 for their execution and six synthesized workflows (a2)-(f2) which are controlled by the second workflow system 2042 for their execution. The synthesized workflow (a1) has already completed its operation. The synthesized workflow (h1) is being executed in the third business application 2033. The synthesized workflows (c1), (d1), (e1) and (f1) are held in a waiting state of execution at the third communication control system 2073. The synthesized workflow (a2) is being executed in the seventh business application 2037, and the synthesized workflow (b2) is being executed in the sixth business application 2036. The synthesized workflows (c2), (d2) and (e2) are held in a waiting state of execution at the third communication control system 2073, and the synthesized workflow (f2) is being executed in the fifth business application 2035.

Among six synthesized workflows (a2)-(f2) in the second workflow system 2042 shown in FIG. 15, the synthesized workflows (a2), (b2), (c2) and (d2) and the synthesized workflow (f2) are requested to complete processing within 150 seconds according to the given service level agreement, and the synthesized workflow (e2) is requested to complete processing within 90 seconds.

FIG. 17 shows one example of the state and the history information of the synthesized workflows acquired when the activation control part 227 has started the state observation part 228 for the first time. This figure will be described together with FIG. 5 and FIG. 15.

When the activation control part 227 starts the state observation part 228 for the first time at the time 660, the state observation part 228 acquires the state and the history information of the synthesized workflows as shown in FIG. 16.

At this time point, the information of the initial state of the control information holding part 246, which directs to transmit immediately the information transmitted by the control target, and to transmit immediately the information to be received by the control target, is set in the control history storage DB 234. The state observation part 228 inputs the state and the history information of the synthesized workflows as shown in FIG. 16 and the information of the control history storage DB 234 to the most suitable priority control result calculation part 229.

The most suitable priority control result calculation part 229 creates a prediction of operation of synthesized workflows until all synthesized workflows are completed by using the predicting part 233. First, the most suitable priority control result calculation part 229 notifies the predicting part 233 of the state and the history information of the synthesized workflows at the time 660, and obtains the state prediction of the synthesized workflows at the time 660.1.

By repeatedly performing the similar prediction with advancing the time, at the time 670.102, the third business application 2033 has finished the processing of the synthesized workflow (b1) and it becomes possible to execute a new synthesized workflow. The synthesized workflows which can be executed in the third business application 2033 at that time are the synthesized workflows (c1), (d1), (e1), (f1), (c2), (d2), (e2) and (f2). The most suitable priority control result calculation part 229 predicts each future state in a case where each of the synthesized workflows is selected, as new processing to be executed in the third business application 2033. The most suitable priority control result calculation part 229 chooses the best result among these prediction results as a prediction result to be obtained. FIG. 17 shows these prediction results. According to FIG. 17, the processing time of the synthesized workflows (d1), (e1), (c2), (d2) and (e2) does not reach the service level agreement. It is necessary to add computer resources in order to aim at achievement of the service level agreement.

Accordingly, the computer resource addition decision part 231 determines the business application 203 to which computer resources are to be added and the addition amount. For this, the computer resource addition decision part 231 uses a concept of an expected waiting time improving amount. The expected waiting time improving amount is calculated as follows. First, value 1 is calculated by dividing the waiting time, which is a time from an execution request to each business application 203 by the synthesized workflow group which is not reaching the service level agreement to a start of execution, by an execution required time of the business application 203. Second, value 2 is calculated by multiplying value 1 by an execution required time improving amount of the business application 203 in case of having added the minimum unit of computer resources to the business application 203. Then, the expected waiting time improving amount is calculated by summing value 2 of all execution requests requested to each business application 203 by the workflow included in the synthesized workflow group specified in Step S372 of FIG. 10 for each of the business applications 203. And, the computer resource addition decision part 231 adds the minimum unit of computer resources to the business application 203 which is predicted to have the largest expected waiting time improving amount having been obtained.

FIG. 18 shows the expected waiting time improving amount of each business application calculated based on a prediction result. FIG. 18 shows the expected waiting time improving amount of each business application 203 calculated based on a prediction result in order to obtain the business application 203 which is predicted to have the largest expected waiting time improving amount.

According to FIG. 18, the third business application 2033 has the largest expected waiting time improving amount. Accordingly, in case of this example, the computer resource addition decision part 231 adds computer resources to the third business application 2033. As a result, the computer resources assigned to the third business application 2033 will be 60 units, and the processing required time of the application will become 12.5 seconds/case.

FIG. 19 shows the state of the synthesized workflows in a case where computer resources have been added first time. This figure will be described together with FIG. 5 and FIG. 15.

The most suitable priority control result calculation part 229 acquires the operation prediction of the synthesized workflows in case of computer resources having been added first, by the same method as used at the time when the prediction result of FIG. 17 was obtained. FIG. 19 shows this result. According to FIG. 19, the synthesized workflows (c1) and (d1) can achieve the service level agreement, but the synthesized workflows (c2), (d2) and (e2) have not been able to achieve the service level agreement yet. For this reason, the computer resource addition decision part 231 obtains the expected waiting time improving amount in order to select once again the business application 203 to which computer resources are to be added.

FIG. 20 shows the expected waiting time improving amount calculated to each business application in a case where computer resources are to be added second time. According to this figure, the third business application 2033 has the largest expected waiting time improving amount. For this reason, the computer resource addition decision part 231 adds computer resources to the third business application 2033. As a result, the computer resources assigned to the third business application 2033 will be 70 units, and the processing required time of the application will become 10.714 seconds/case.

By this condition, the most suitable priority control result calculation part 229 acquires the operation prediction of the synthesized workflows in case of computer resources having been added, by the same method as used at the time when the prediction result of FIG. 17 was obtained.

FIG. 21 shows the state of the synthesized workflows in a case where computer resources have been added second time. According to FIG. 21, the synthesized workflows (c2), (d2) and (e2) have not been able to achieve the service level agreement yet. For this reason, the computer resource addition decision part 231 obtains the expected waiting time improving amount in order to select once again the business application to which computer resources are to be added.

FIG. 22 shows the expected waiting time improving amount calculated to each business application 203 in a case where computer resources are to be added third time. According to this figure, the third business application 2033 has the largest expected waiting time improving amount. For this reason, the computer resource addition decision part 231 adds computer resources to the third business application 2033. As a result, the computer resources assigned to the third business application 2033 will be 80 units, and the processing required time of the application will become 9.375 seconds/case.

By this condition, the most suitable priority control result calculation part 229 (FIG. 5) acquires the operation prediction of the synthesized workflows in case of computer resources having been added, by the same method as used at the time when the prediction result of FIG. 17 was obtained.

FIG. 23 shows the state of the synthesized workflows in a case where computer resources have been added third time. According to FIG. 23, the synthesized workflows (c2), (d2) and (e2) have not been able to achieve the service level agreement yet. For this reason, the computer resource addition decision part 231 obtains the expected waiting time improving amount in order to select once again the business application to which computer resources are to be added.

FIG. 24 shows the expected waiting time improving amount calculated to each business application in a case where computer resources are to be added fourth time. According to this figure, the seventh business application 2037 has the largest expected waiting time improving amount. For this reason, the computer resource addition decision part 231 adds computer resources to the seventh business application 2037. As a result, the computer resources assigned to the seventh business application 2037 will be 50 units, and the processing required time of the application will become 16 seconds/case.

By this condition, the most suitable priority control result calculation part 229 (FIG. 5) acquires the operation prediction of the synthesized workflows in case of computer resources having been added, by the same method as used at the time when the prediction result of FIG. 17 was obtained.

FIG. 25 shows the state of the synthesized workflows in a case where computer resources have been added fourth time. According to FIG. 25, the synthesized workflows (d2) and (e2) can achieve the service level agreement, but the synthesized workflow (c2) has not been able to achieve the service level agreement yet. For this reason, the computer resource addition decision part 231 obtains the expected waiting time improving amount in order to select once again the business application to which computer resources are to be added.

FIG. 26 shows the expected waiting time improving amount calculated to each business application in a case where computer resources are to be added fifth time. According to this figure, the third business application 2033 has the largest expected waiting time improving amount. For this reason, the computer resource addition decision part 231 adds computer resources to the third business application 2033. As a result, the computer resources assigned to the third business application 2033 will be 90 units, and the processing required time of the application will become 8.333 seconds/case.

By this condition, the most suitable priority control result calculation part 229 (FIG. 5) acquires the operation prediction of the synthesized workflows in case of computer resources having been added, by the same method as used at the time when the prediction result of FIG. 17 was obtained.

FIG. 27 shows the state of the synthesized workflows in a case where computer resources have been added fifth time. According to FIG. 27, the synthesized workflow (c2) has not been able to achieve the service level agreement yet. For this reason, the computer resource addition decision part 231 obtains the expected waiting time improving amount in order to select once again the business application to which computer resources are to be added.

FIG. 28 shows the expected waiting time improving amount calculated to each business application in a case where computer resources are to be added sixth time. According to this figure, the seventh business application 2037 has the largest expected waiting time improving amount. For this reason, the computer resource addition decision part 231 adds computer resources to the seventh business application 2037. As a result, the computer resources assigned to the seventh business application 2037 will be 60 units, and the processing required time of the application will become 13.333 seconds/case.

By this condition, the most suitable priority control result calculation part 229 (FIG. 5) acquires the operation prediction of the synthesized workflows in case of computer resources having been added, by the same method as used at the time when the prediction result of FIG. 17 was obtained.

FIG. 29 shows the state of the synthesized workflows in a case where computer resources have been added sixth time. According to FIG. 29, the synthesized workflow (c2) has not been able to achieve the service level agreement yet. For this reason, the computer resource addition decision part 231 obtains the expected waiting time improving amount in order to select once again the business application to which computer resources are to be added.

FIG. 30 shows the expected waiting time improving amount calculated to each business application in a case where computer resources are to be added seventh time. According to this figure, the seventh business application 2037 has the largest expected waiting time improving amount. For this reason, the computer resource addition decision part 231 adds computer resource to the seventh business application 2037. As a result, the computer resources assigned to the seventh business application 2037 will be 70 units, and the processing required time of the application will become 11.429 seconds/case.

By this condition, the most suitable priority control result calculation part 229 (FIG. 5) acquires the operation prediction of the synthesized workflows in case of computer resources having been added, by the same method as used at the time when the prediction result of FIG. 17 was obtained.

FIG. 31 shows the state of the synthesized workflows in a case where computer resources have been added seventh time. According to FIG. 31, it is expected that all synthesized workflows can achieve the service level agreement by this condition.

When it becomes to be expected that all synthesized workflows can achieve the service level agreement by addition of computer resources as above, the verification part 230 judges whether the priority control condition and the addition and reduction condition in the prediction mentioned above are different from the control information which was set in the previous time. In case of this example, because control was started at the time 660 for the first time, the verification part 230 judges that it is different from the control information which was set in the previous time, and the control signal transmission part 235 transmits the control information to the communication control system 207.

FIG. 32 shows the state of the synthesized workflows in a case where the activation control part 227 restarted the state observation part 228 at the time 720. When the activation control part 227 shown in FIG. 5 restarts the state observation part 228 at this time 720, the state observation part 228 acquires the state and the history information of the synthesized workflows shown in this FIG. 32. When comparing FIG. 32 with FIG. 31, processing of the synthesized workflow (d2) is different from the prediction result due to the conditional branch indicated in Step S13 of FIG. 12. In the synthesized workflows other than this, processing is progressing as the prediction result.

FIG. 33 shows the state of the synthesized workflows in a case where the future is predicted at time point of the time 720 in a similar way at time point of the time 660. As shown in this FIG. 33, in this case, it is expected that all synthesized workflows achieve the service level agreement. For this reason, new control is not performed.

Next, in this monitoring target, operation will be described in a case where the state of the synthesized workflows is different.

Figure 34:
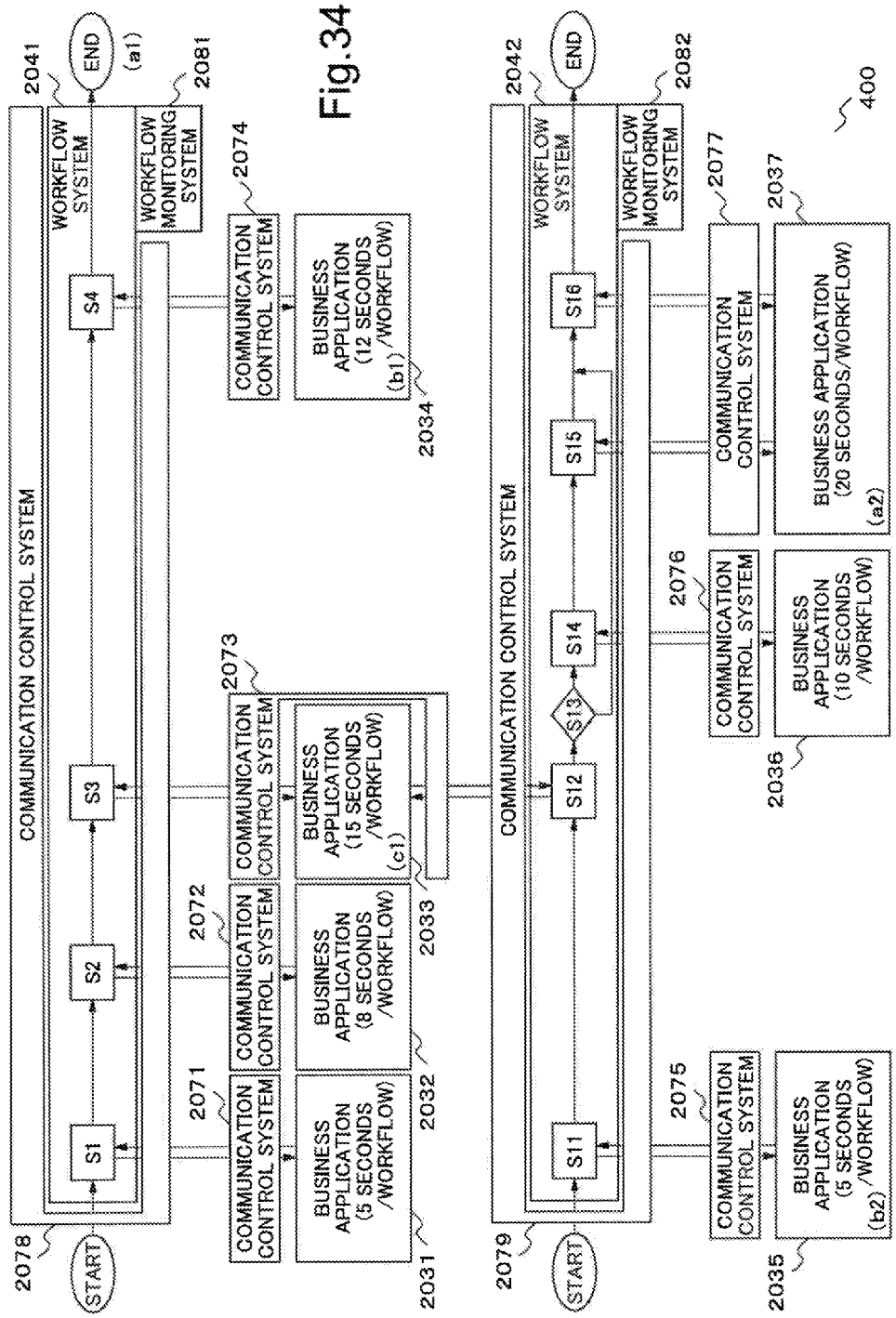
FIG. 34 is an explanation drawing showing the state of the synthesized workflows being executed at the time 660 when synthesized workflows have been executed since the time 0 according to this operation example.

FIG. 34 shows the state of the synthesized workflows which are being executed at the time 660 when synthesized workflows have been executed since the time 0. There exist three synthesized workflows which are controlled by the first workflow system 2041 for their execution and two synthesized workflows which are controlled by the second workflow system 2042 for their execution. At the time 660, the synthesized workflow (a1) has already completed its operation, the synthesized workflow (b1) is being executed in the fourth business application 2034 and the synthesized workflow (c1) is being executed in the third business application 2033. The synthesized workflow (a2) is being executed in the seventh business application 2037, and the synthesized workflow (b2) is being executed in the fifth business application 2035. Two synthesized workflows in the second workflow system 2042 are required to complete within 150 seconds according to the given service level agreement.

Figure 35:
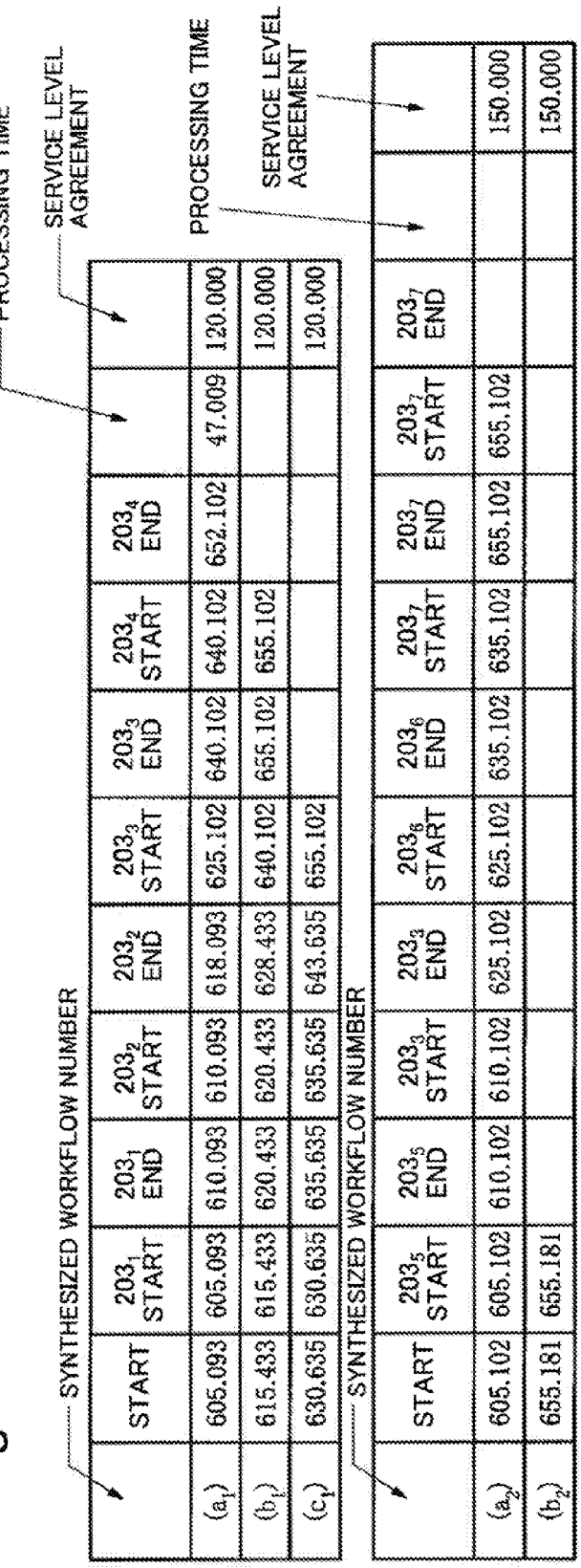
FIG. 35 is an explanation drawing showing the state of the synthesized workflows acquired by the state observation part in a case where the activation control part started the state observation part for the first time at the time 660 according to this operation example.

FIG. 35 shows the state of the synthesized workflows acquired by the state observation part 228 in a case where the activation control part 227 started the state observation part 228 for the first time at the time 660. This figure will be described together with FIG. 5. Thus, when the activation control part 227 starts the state observation part 228 for the first time at the time 660, the state observation part 228 acquires the state and the history information of the synthesized workflows as shown in this FIG. 35. At this time point, the information at the initial state of the control information holding part 246 (FIG. 6) is set to the control history storage DB 234 shown in FIG. 5. This is the information which directs the communication control system 207 or the like that the information transmitted by the control target is to be transmitted immediately, and the information to be received by the control target is to be held once and to be transmitted in order of reception with the same interval as the average processing time of the control target. The state observation part 228 inputs the state and the history information of the synthesized workflows shown in FIG. 35, and the information of the control history storage DB 234 to the most suitable priority control result calculation part 229.

Figure 36:
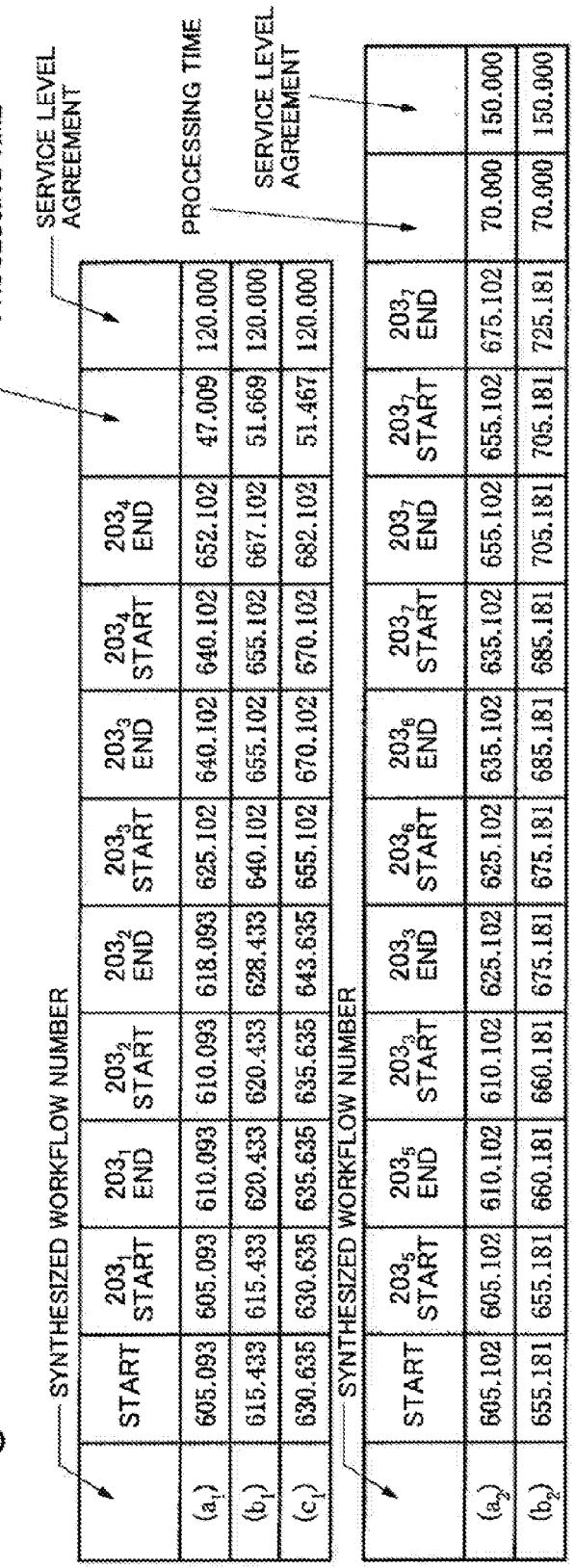
FIG. 36 is an explanation drawing showing the prediction of operation of the synthesized workflows until all synthesized workflows are completed, which was created by the most suitable priority control result calculation part using a predicting part, according to this operation example.

FIG. 36 shows the prediction of operation of the synthesized workflows until all synthesized workflows are completed, which was created by the most suitable priority control result calculation part 229 using the predicting part 233. According to the prediction of operation of the synthesized workflows shown in FIG. 36 which is created by the most suitable priority control result calculation part 229 of FIG. 5 using the predicting part 233, all synthesized workflows achieve the service level agreement with substantially exceeding.

For this reason, the computer resource reduction decision part 232 (FIG. 5) determines the business application 203 from which computer resources are to be reduced and the amount of reduction. Here, the computer resource reduction decision part 232 adopts the method which reduces the minimum unit of computer resources from the business application whose utilization ratio of the past fixed period is the smallest among the business applications 203 which are not used, in a period for which the prediction is performed, by the synthesized workflow with the smallest margin to the service level agreement. Accordingly, the computer resource reduction decision part 232 (FIG. 5) obtains utilization ratio of the business applications 203 of the past fixed period from the synthesized workflows history.

FIG. 37 shows utilization ratio of each business application which is obtained by the computer resource reduction decision part 232. When the result shown in this FIG. 37 is obtained, the business application with the lowest utilization ratio is the first business application 2031. Further, it is judged based on the synthesized workflow definition that the synthesized workflow (b1), which is a synthesized workflow with the smallest margin to the service level agreement, does not use the first business application 2031 after the time 660. For this reason, the computer resource reduction decision part 232 decides to reduce the minimum unit of computer resources from the first business application 2031. As a result, the amount of computer resources of the first business application 2031 is reduced, for example, reduced 10 units from the amount of computer resources shown in FIG. 14, and will be 10 units, and the processing required time of the first business application 2031 will become 10 seconds/case.

Next, the verification part 230 judges whether the priority control condition and the addition and reduction condition in the prediction are different from the control information which was set in the previous time. In case of this example, because control was started at the time 660 for the first time, the verification part 230 judges that it is different from the control information which was set in the previous time, and the control signal transmission part 235 transmits the control information to the communication control system 207.

Next, first to third modification examples of the present invention will be described. Here, in the first modification example, the business applications 2031, 2032 or the like shown in FIG. 4 process requests in parallel. Further, in the second modification example, the business applications 2031, 2032 or the like process requests in time-sharing. In the third modification example, the business applications 2031, 2032 or the like perform a priority control.

<First Modification Example of the Invention>

Figure 38:
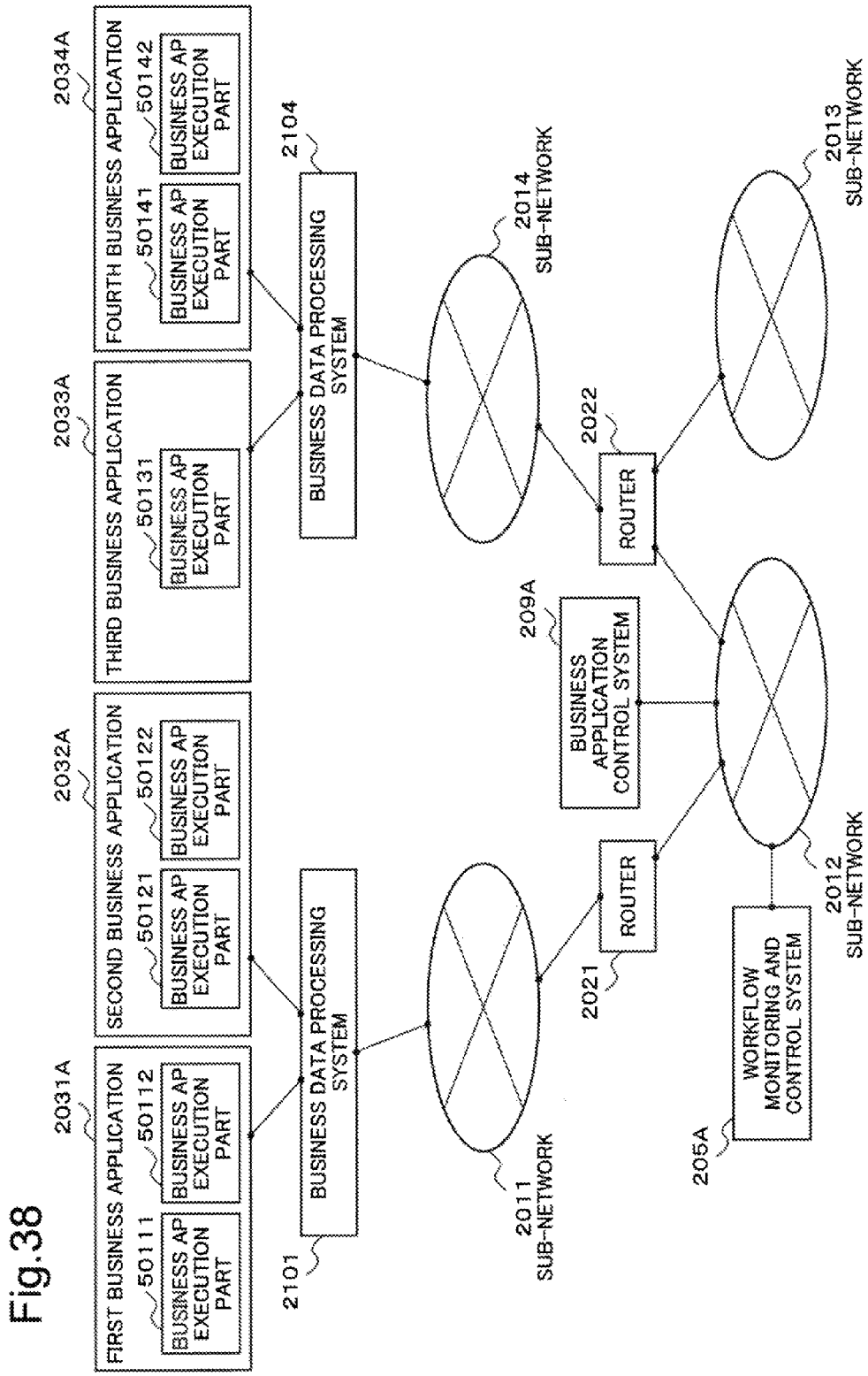
FIG. 38 is an explanation drawing showing a primary part of a communication environment of a workflow monitoring and control system according to a first modification example of the present invention.

FIG. 38 shows a primary part of a communication environment of a workflow monitoring and control system 400A of a first modification example of the present invention. This FIG. 38 shows the primary part of the system focusing on first to fourth business applications 2031A-2034A in two business data processing systems 2101, 2104 as one example. Those parts which are not shown in FIG. 38 are the same configuration as those in FIG. 4. In FIG. 38, the same part as FIG. 4 is given an identical reference numeral, and the description is omitted appropriately. In the description of the first modification example, the business application 203 shown in the previous exemplary embodiment and operation example is referred as the business application 203A.

The first business application 2031A is equipped with the first and the second business application (AP) execution parts 50111, 50112. The second business application 2032A is equipped with the first and the second business application execution parts 50121, 50122. The third business application 2033A is equipped with the first business application execution part 50131. The fourth business application 2034A is equipped with the first and the second business application execution part 50141, 50142. Although this FIG. 38 is illustrating only the first to the fourth business applications 2031A-2034A, other business applications 2035A or the like which are not illustrated are also equipped with at least one business application execution part 501 similarly. Further, each of the business applications 2031A, 2032A or the like can have more than two business application execution parts 501 as necessary. Here, unless otherwise noted in particular, the first to the fourth business applications 2031A-2034A being illustrated will be described. Further, in the figure, APE means the business application (AP) execution part.

When information is received from the business data processing system 2101, the first business application 2031A selects one of the first and the second business application execution parts 50121, 50122 which is not executing business data processing, and executes business data processing. The third and the fourth business applications 2033A, 2034A are also similar.

In this communication environment of the workflow monitoring and control system 400A, there exists at least one business application control system 209A which controls the number of the business application execution parts 501 which are used by the business applications 2031A, 2032A or the like executed on each of the business data processing systems 2101, 2104 or the like. In an example shown in this FIG. 38, the business application control system 209A is connected to the second sub-network 2012 together with the workflow monitoring and control system 205A.

Figure 39:
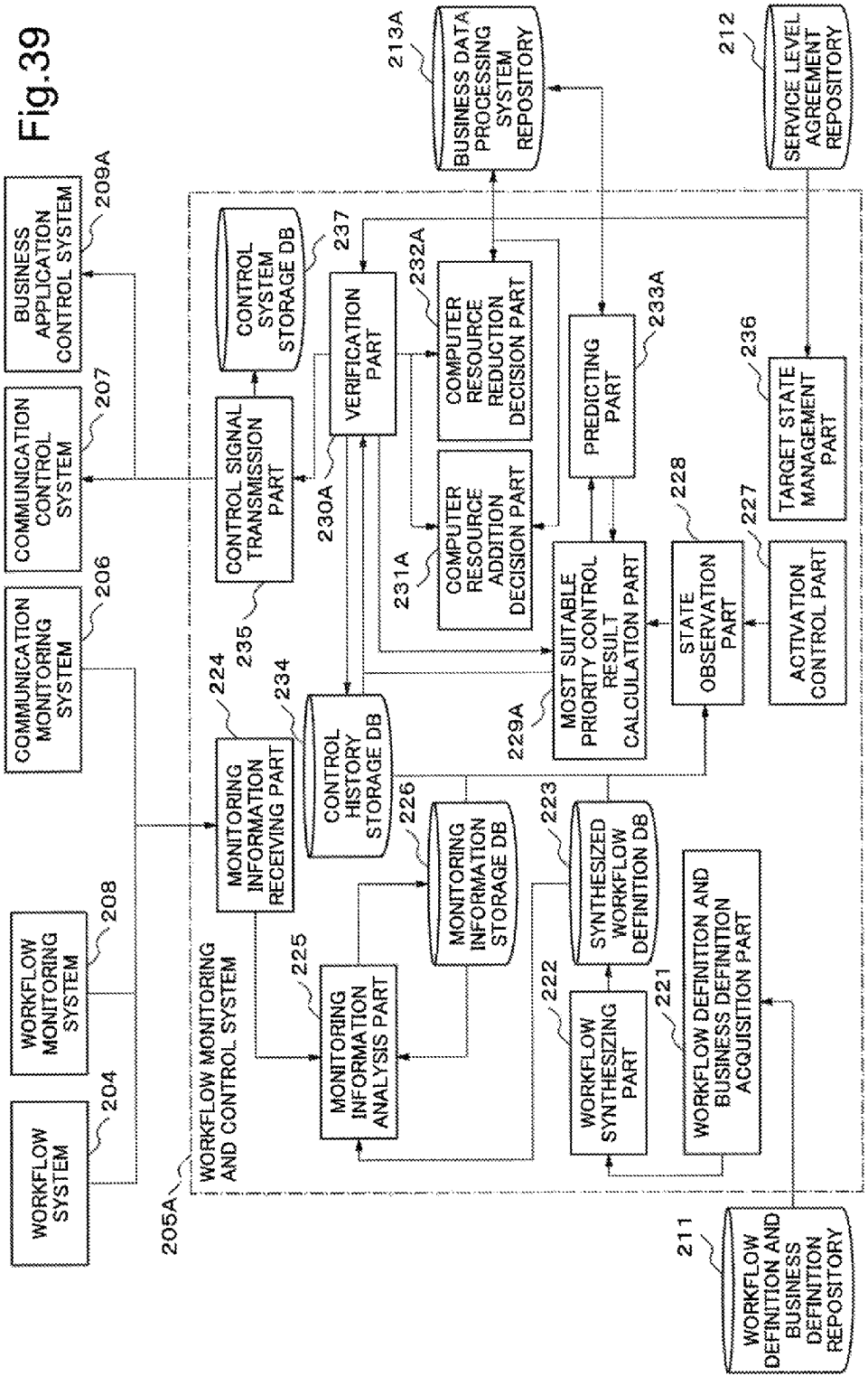
FIG. 39 is a system configuration drawing showing the workflow monitoring and control system and its vicinities according to the first modification example.

FIG. 39 shows a primary part of the system configuration of the workflow monitoring and control system 400A and its vicinities according to the first modification example. In this FIG. 39, the same part as FIG. 5 is given an identical reference numeral, and the description is omitted appropriately. This figure will be described together with FIG. 38. The computer resource addition decision part 231A in the workflow monitoring and control system 205A calculates the number of the business application execution parts 501 required for achieving the service level agreement. Further, the computer resource reduction decision part 232A calculates the amount of reduction of the business application execution parts 501 which does not affect achievement of the service level agreement. Moreover, the predicting part 233A predicts a state of synthesized workflows after a unit time based on a state of the synthesized workflows at a certain time and the number of the business application execution parts 501 of the business application control system 209A. The business data processing system repository 213A stores deployment information of the business data processing systems 210 to which the business applications 203A can be deployed, performance characteristics information of the business data processing systems 210, deployment information of the business applications 203A in the business data processing systems 210 and number information of the business application execution parts in the business applications 203A.

The most suitable priority control result calculation part 229A predicts the future state, based on the inputted information, in a case where the most suitable priority control is performed to the synthesized workflows which are currently being executed. The predicting part 233A performs this prediction using the number information of the business application execution parts 501 in the business applications 203 stored in the business data processing system repository 213A. The most suitable priority control result calculation part 229A outputs the prediction result to the verification part 230A. Further, the service quality calculation part 14 in FIG. 1 calculates the service quality at the time of the completion of business data processing of each of the workflows. The calculation result is an example of the prediction result in this exemplary embodiment.

The verification part 230A compares the prediction result with the target state management part 236 and judges whether the target is achievement or not. The quality insufficiency judging part 15 in FIG. 1 is an example of the verification part 230A in this exemplary embodiment, and when the expected service quality of any of the workflows is lower than a lower limit of the service quality at the time of the completion of the business data processing, this is discriminated. As a result, the verification part 230A stores the control information in the control history storage DB 234 if the prediction result is proper, transmits the validity of the prediction result to the communication control system 207 and the business application control system 209 by the control signal transmission part 235 and ends. If the prediction result does not achieve the service level agreement, the verification part 230 notifies the computer resource addition decision part 231A of the input and output of the most suitable priority control result calculation part 229.

The computer resource addition decision part 231A creates a plan for adding computer resources to an appropriate business application 203 with reference to the received input and output of the most suitable priority control result calculation part 229A, and sets it to the business data processing system repository 213A. When the quality insufficiency judging part 15 judges that the service quality of a certain workflow is lower than the lower limit, the computer resource reallocation part 16 reallocates the amount of computer resources by changing the number of the business application execution parts 501 to a plurality of processing sections in order to correct a situation where the service quality of the certain workflow is lower than the lower limit. This processing is an example of creation of the plan for adding computer resources in the first modification example. The most suitable priority control result calculation part 229A acquires the state and the history information of the synthesized workflows which are currently being executed and the statistics information of the synthesized workflows which were executed in the past, and predicts the future state in a case where the most suitable priority control is performed to the synthesized workflows once again.

The verification part 230A notifies the computer resource reduction decision part 232A of the input and output of the most suitable priority control result calculation part 229A in case of judging that this prediction result achieves the service level agreement with great excess. The computer resource reduction decision part 232A creates a plan for appropriately reducing the number of the business application execution parts 501 having been allocated to the business applications 203 with reference to the received input and output of the most suitable priority control result calculation part 229A, and sets it to the business data processing system repository 213A. The most suitable priority control result calculation part 229A inputs the state and the history information of the synthesized workflows which are currently being executed and the statistics information of the synthesized workflows which were executed in the past, and predicts the state of the future in a case where the most suitable priority control is performed to the synthesized workflows once again.

Figure 40:
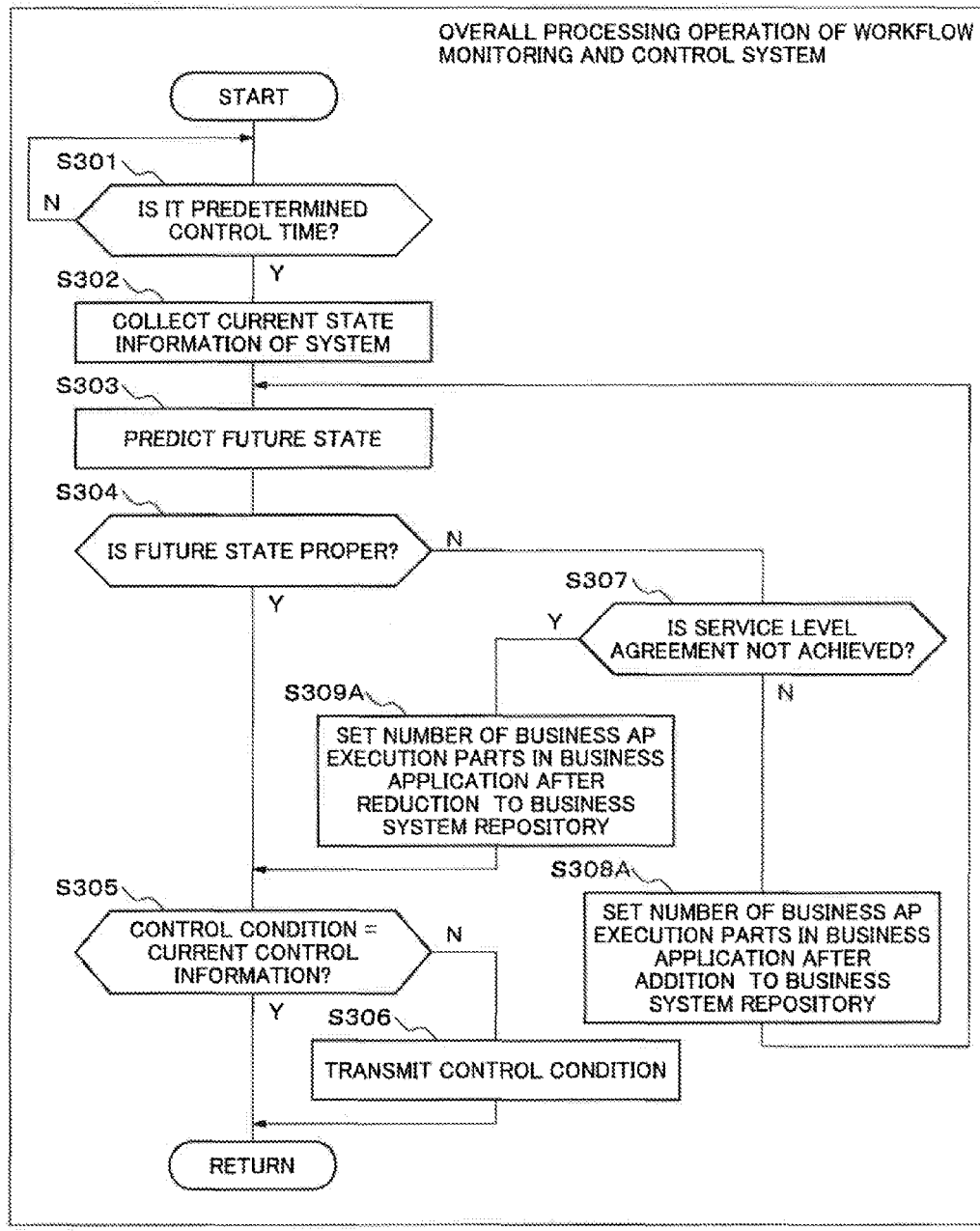
FIG. 40 is a flow chart showing an outline of overall processing operation of the workflow monitoring and control system according to the first modification example.

FIG. 40 outlines an overall processing operation of the workflow monitoring and control system according to this first modification example. This figure will be described together with FIG. 39 and FIG. 6. However, the workflow monitoring and control system 205 in FIG. 6 is read as the workflow monitoring and control system 205A in FIG. 39.

The workflow monitoring and control system 205A is equipped with CPU (Central Processing Unit) which is not shown and a storage medium such as a hard disk for storing control programs executed by this CPU. By executing this control program, CPU may realize functionally at least a part among each part in the workflow monitoring and control system 205A described foregoing, by software. Each part in the workflow monitoring and control system 205A, or CPU, realizes control which will be described below.

The activation control part 227 is standing by (Step S301), until it becomes the predetermined control time, and stopping its operation. When it has become the predetermined control time (Y), the activation control part 227 starts the state observation part 228, and the state observation part 228 correlates monitoring information stored in the monitoring information storage DB 226 with a synthesized workflow definition stored in the synthesized workflow definition DB 223. And, the state observation part 228 creates a state and history information of the synthesized workflows which are currently being executed, and statistics information of the synthesized workflows which were executed in the past (Step S302).

Next, the most suitable priority control result calculation part 229A acquires the state and the history information of the synthesized workflows which are currently being executed, the statistics information of the synthesized workflows which were executed in the past and the present control condition acquired from the control history storage DB 234. The most suitable priority control result calculation part 229A predicts the future state of the synthesized workflows which are currently being executed based on these inputted information. The prediction result of the future state of the synthesized workflows and the input to the most suitable priority control result calculation part 229A are outputted to the verification part 230A (Step S303).

The verification part 230A judges the validity of the prediction result with reference to the target state management part 236 (Step S304). As the result, when the prediction result is proper (Y), that is, when the prediction result achieves the service level agreement and this does not exceed the service level agreement substantially, the verification part 230A refers to the control history storage DB 234, and judges whether a control condition is same as the present control condition (Step S305). When it is the same (Y), the verification part 230A ends operation without transmitting the control condition, and the workflow monitoring and control system 205A returns to the processing of Step S301 (return).

When the control condition is not the same as the present control condition (step S305: N), the verification part 230A stores the control condition which is not the same in the control history storage DB 234. And, the control signal transmission part 235 transmits the control condition to the communication control system 207 (Step S306). After this, the workflow monitoring and control system 205A returns to the processing of Step S301 (return).

The case where it is judged that the prediction result is not proper (N) in Step S304 is either one of the following two cases. One is the case where it is judged that the prediction result does not achieve the service level agreement. Another is the case where it is judged that the prediction result has exceeded the service level agreement substantially. Accordingly, the verification part 230A discriminates whether the service level agreement is achieved or not (Step S307), in a case where it is judged that the prediction result is not proper (Step S304: N).

In a case where it is judged that the prediction result does not achieve the service level agreement (N), the computer resource addition decision part 231A decides an appropriate business application 203 to which computer resources are to be added and the addition amount. And, the computer resource addition decision part 231A sets the number of the business application execution parts 501 after addition in the business application to the business data processing system repository 213A (Step S308A), and the most suitable priority control result calculation part 229A inputs the state and the history information of the synthesized workflows which are currently being executed and the statistics information of the synthesized workflows which were executed in the past, and predicts the future state of the synthesized workflows which are currently being executed (Step S303).

In contrast, in a case where it is judged that the prediction result exceeded the service level agreement substantially (step S307: Y), the computer resource reduction decision part 232A calculates an appropriate business application from which computer resources are to be reduced and the reduction amount, and sets the number of the business application execution parts 501 after reduction in the business application to the business data processing system repository 213A (Step S309A). As an example of a method of judging that the prediction result exceeds the service level agreement substantially, there is a method of judging whether the difference with the service level agreement of the synthesized workflow having the smallest margin to the service level agreement exceeds a predetermined range. If computer resources are reduced in this way, the verification part 230A advances towards the processing of Step S305.

Figure 41:
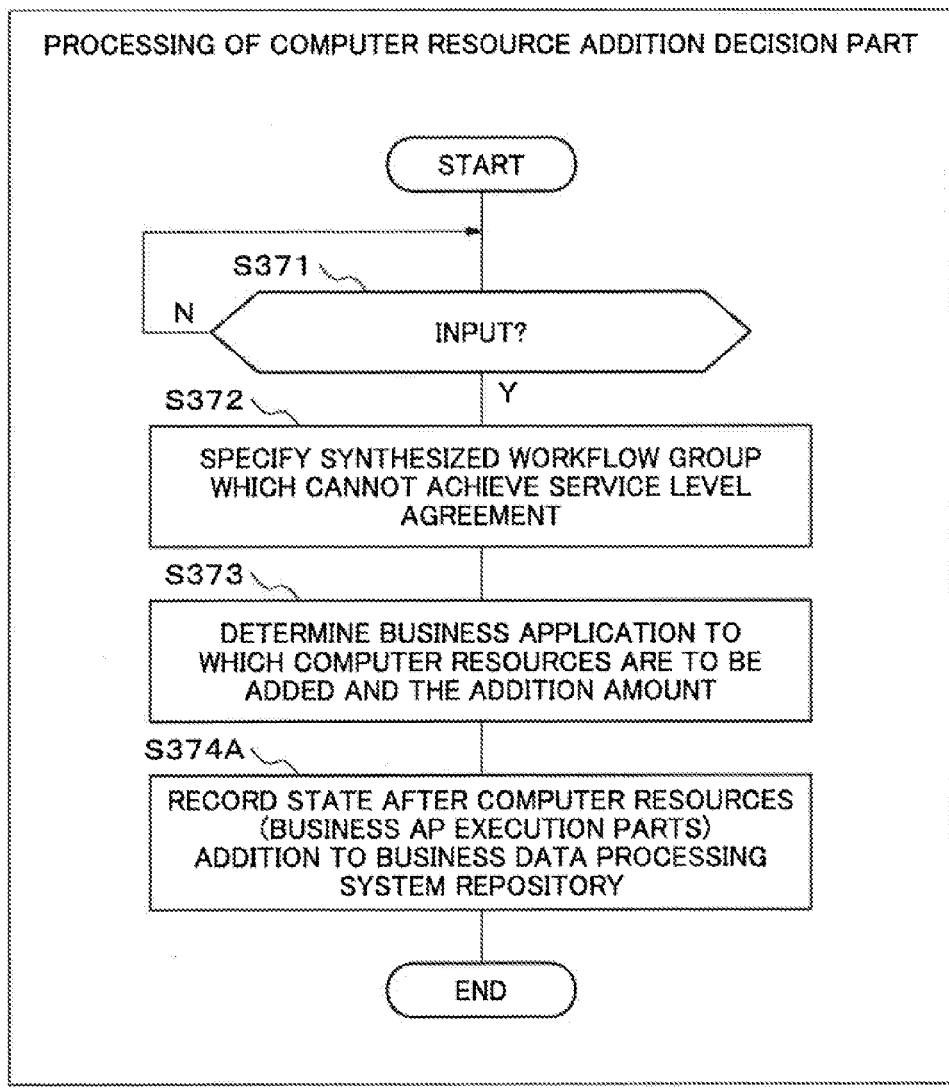
FIG. 41 is a flow chart showing processing of the computer resource addition decision part according to the first modification example.
Figure 42:
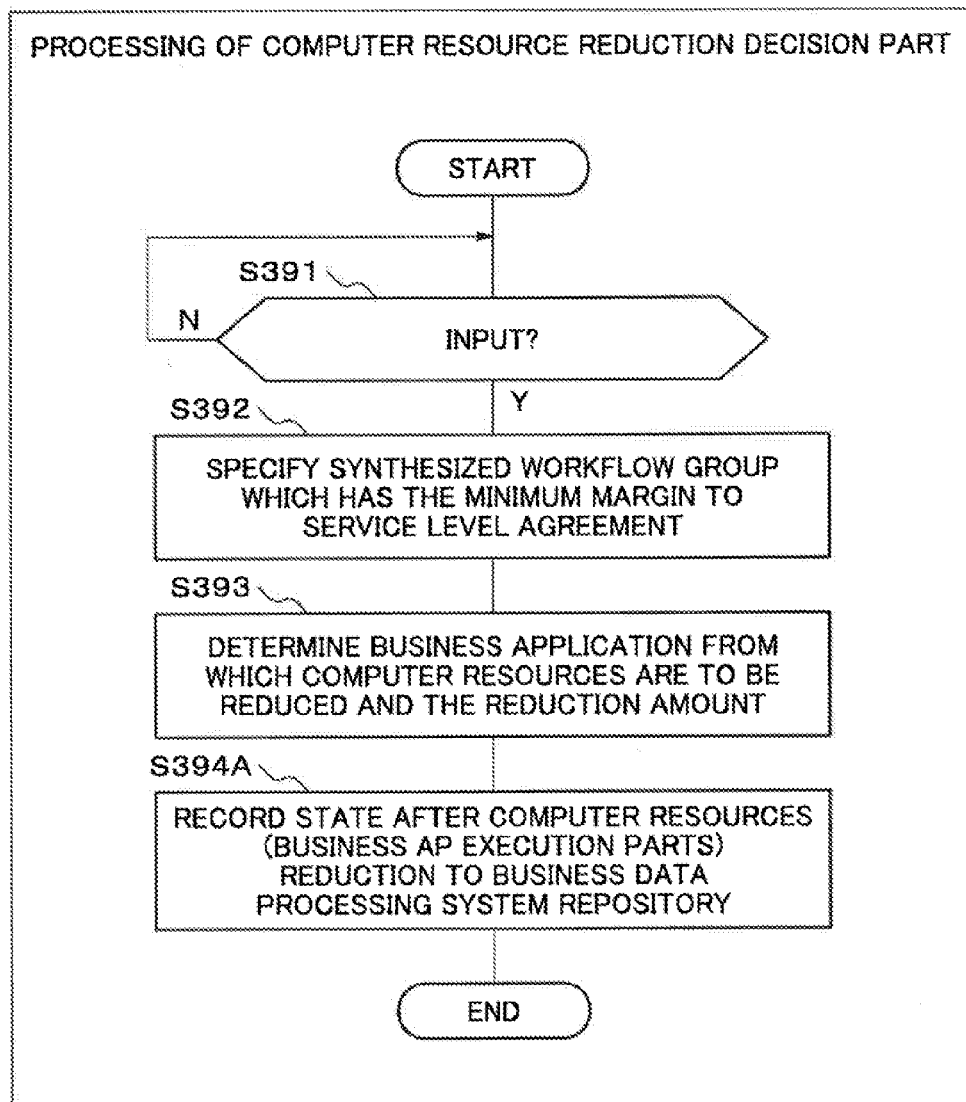
FIG. 42 is a flow chart showing processing of the computer resource reduction decision part according to the first modification example.

FIG. 41 shows processing of the computer resource addition decision part 231A, and FIG. 42 shows processing of the computer resource reduction decision part 232A according to the first modification example. Both figures will be described together with FIG. 38, FIG. 39 and FIG. 6. Further, these figures show each of operation examples of the computer resource addition decision part 231A and the computer resource reduction decision part 232A. Operation of the computer resource addition decision part 231A and the computer resource reduction decision part 232A varies depending on the contents of the monitoring control target and the service level agreement, and the characteristics of the business data processing system.

First, the computer resource addition decision part 231A acquires, from the verification part 230A, the prediction results of the most suitable priority control result calculation part 229 including the expected state of the synthesized workflows at the time that execution of all synthesized workflows has been completed and the history information until it has reached at this state, and the information of the target state management part 236 which was used for judgment of the prediction result by the verification part 230A (step S371: Y). And, the computer resource addition decision part 231A specifies a synthesized workflow group which cannot achieve the service level agreement based on the inputted information (Step S372).

Next, the computer resource addition decision part 231A determines the business application 203A to which computer resources are to be added and the addition amount (Step S373). An example of this decision method is the method which adds the minimum unit of computer resources to the business application 203A which is predicted to have the largest total of waiting time (standby time) which is a time from a request of execution to the business application 203A by the synthesized workflow group specified in Step S372 to a start of execution. Also, this decision method may be the method by the following way. First, it obtains value 1 by dividing the waiting time, which is a time from an execution request to each business application 203A by the synthesized workflow group specified in Step S372 to a start of execution, by an execution required time of the business application 203A. Second, it obtains value 2 by multiplying value 1 by an execution required time improving amount of the business application 203A in case of having added the minimum unit of computer resources to the business application 203. Third, it obtains value 3 by summing value 2 of all execution requests requested to each business application 203A by the workflow included in the synthesized workflow group specified in Step S372 for each of the business applications 203. Finally, the minimum unit of computer resources is added to the business application 203A which is predicted to have the largest value 3.

When having decided as described above, the business application 203A to which computer resources are to be added and the addition amount (Step S373), the computer resource addition decision part 231A stores the state, which becomes after the obtained computer resources (business application execution parts 501) having been added to the obtained business application 203A, in the business data processing system repository 213A (Step S374A). The computer resource addition decision part 231 ends the processing in this way (end).

FIG. 42 shows operation of the computer resource reduction decision part. This figure will be described together with FIG. 38 and FIG. 39.

The computer resource reduction decision part 232A acquires, from the verification part 230A, the prediction results in the most suitable priority control result calculation part 0.229A including the expected state of the synthesized workflows at the time that execution of all synthesized workflows has been completed and the history information until it has reached at this state, and the information of the target state management part 236 which was used for judgment of the prediction result by the verification part 230A (step S391: Y).

Next, the computer resource reduction decision part 232A specifies the synthesized workflow having the smallest margin to the service level agreement based on this inputted information (Step S392). And, the business application 203A from which computer resources are to be reduced and the reduction amount are determined from a view point as achievement of the service level agreement to the synthesized workflows other than this specified synthesized workflow (Step S393). An example of this decision method is the method which reduces the minimum unit of computer resources from the business application 203A having the shortest waiting time among the business applications 203A which are not used, in a period for which the prediction is performed, by the synthesized workflow specified in Step S392. Also, this decision method may be the method which reduces the minimum unit of computer resources from the business application 203A having the smallest utilization ratio of the past fixed period among the business applications 203A which are not used, in a period for which the prediction is performed, by the synthesized workflow specified in Step S392.

When having decided, as described above, the business application 203A from which computer resources are to be reduced and the reduction amount in Step S393, the computer resource reduction decision part 232A stores the state after the obtained computer resources (business application execution part 501) having been reduced from the obtained business application 203A, in the business data processing system repository 213A (Step S394A). The computer resource reduction decision part 232A ends the processing in this way (end). With respect to reduction of computer resources, it is not the indispensable condition to specify the synthesized workflow having the smallest margin to the service level agreement first (FIG. 42, step S392). The reduction of computer resources is also possible by the technique other than this.

Figure 43:
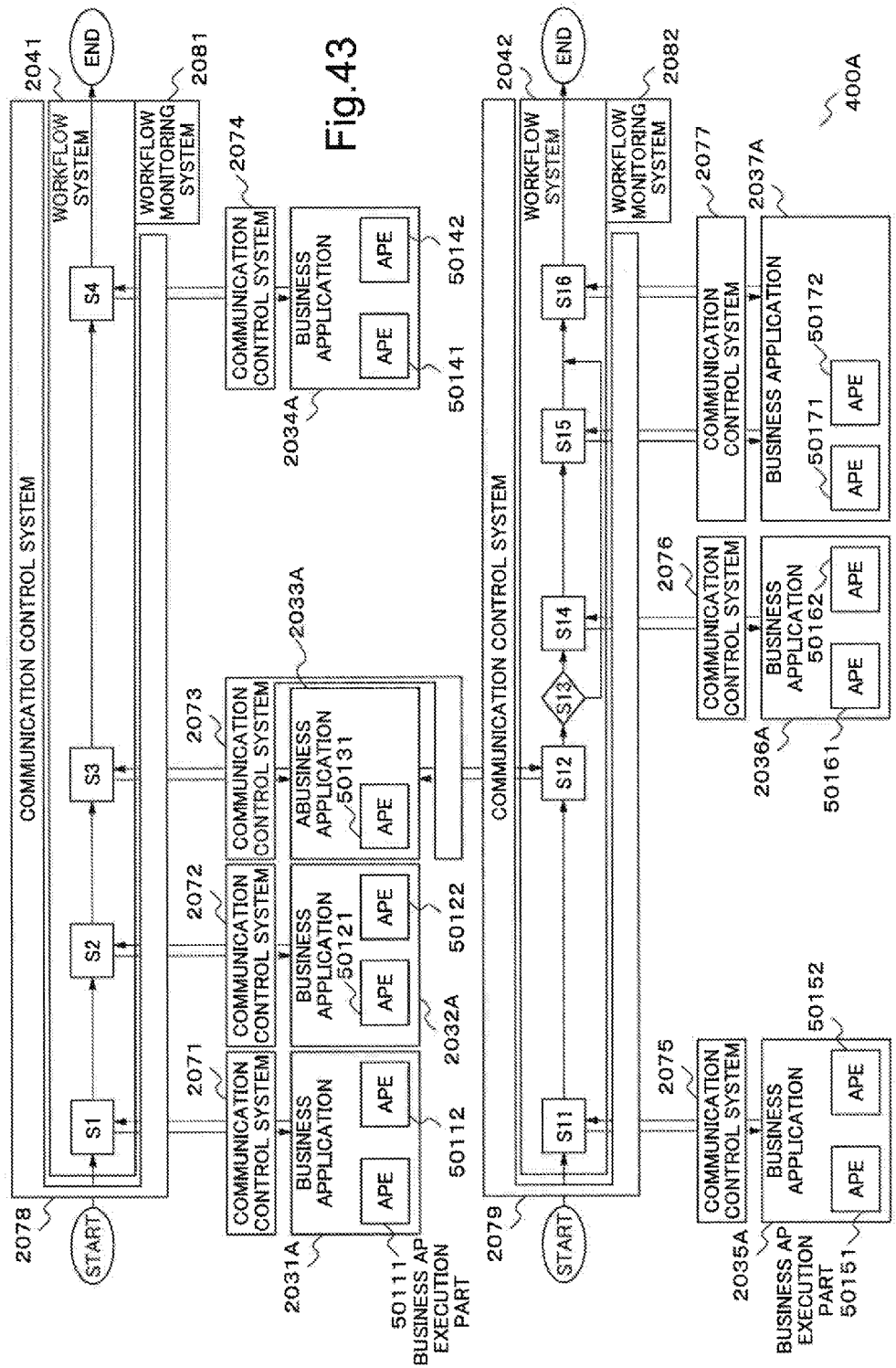
FIG. 43 is a system configuration drawing showing a specific configuration of the workflow execution system according to the first modification example.

FIG. 43 shows a specific configuration of the workflow execution system according to the first modification example, and is corresponding to FIG. 12. The workflow execution system 400A of this first modification example includes first and second workflow systems 2041, 2042 and first to seventh business applications 2031A-2037A, and these are the monitoring and control targets of the workflow monitoring and control system 205A. However, in this figure, the workflow monitoring and control system 205A and the business data processing system 210 (refer to FIG. 38) which deploys the first to the seventh business applications 2031A-2037A are omitted. Further, the relation of connection among the first and the second workflow systems 2041, 2042, the first to the seventh business applications 2031A-2037A, the first to the ninth communication control systems 2071-2079 and the first and the second workflow monitoring systems 2081, 2082 is different from the exemplary connection relationship shown in FIG. 4 or FIG. 38.

One workflow definition exists in the first workflow system 2041. The workflow, which is processed according to this workflow definition, communicates with the first to the fourth business applications 2031A-2034A successively in the process of each of Steps S1 to S4 of the flow shown by "START" to "END" indicated on the upper half of FIG. 43.

Another workflow definition also exists in the second workflow system 2042. The workflow, which is processed according to this workflow definition, communicates with the fifth, the third, the sixth and the seventh business applications 2035A, 2033A, 2036A and 2037A successively in the process of each of Steps S11 to S16 of the flow shown by "START" to "END" indicated on the lower half of FIG. 43. In each of the first to the seventh business applications 2031A-2037A, a predetermined number of business to application (AP) execution parts 50111, 50112 or the like are deployed.

Here, the first communication control system 2071 controls communication of the first business application 2031A during processing of Step S1, and the second communication control system 2072 controls communication of the second business application 2032A during processing of Step S2. Further, the third communication control system 2073 controls communication of the third business application 2033A during processing of Step S3 and Step S12, and the fourth communication control system 2074 controls communication of the fourth business application 2034A during processing of Step S4. Moreover, the fifth communication control system 2075 controls communication of the fifth business application 2035A during processing of Step S11, and the sixth communication control system 2076 controls communication of the sixth business application 2036A during processing of Step S14. Moreover, the seventh communication control system 2077 controls communication of the seventh business application 2037A during processing of Step S15 and Step S16. Further, the eighth communication control system 2078 performs overall communication control of the first workflow system 2041, and the ninth communication control system 2079 performs overall communication control of the second workflow system 2042 respectively.

FIG. 44 shows the performance characteristics of each business application 203A used in the first modification example. In FIG. 44, vertical axis indicates the first to the seventh business applications 2031A-2037A, horizontal axis is indicating the number of business application execution parts 501 to be used as the amount of computer resources, and each cell is indicating processing time per one workflow of the corresponding application 203A when the corresponding amount of computer resources is given. For example, the first business application 2031A performs processing in 10 seconds per one case (per one workflow) at the time of using one set of the business application execution part 501 as the amount of computer resources. When the amount of computer resources becomes double, i.e., tow of the business application execution parts 501, the processing time of 10 seconds per one case does not change, however, one case is processed in every 5 seconds because two business application execution parts 501 perform processing. The data which shows the performance characteristics of the first to the seventh business applications 2031A-2037A shown in FIG. 44 is stored in the business data processing system repository 213A shown in FIG. 39.

FIG. 45 shows the computer resources assigned to each of the business applications 203A in the initial state. The amount of computer resources at the initial state for the first to the seventh business applications 2031A-2037A are also stored in the business data processing system repository 213A shown in FIG. 39.

By this allocation state of the amount of computer resources, the first business application 2031A and the fifth business application 2035A perform processing in 5 seconds per a case of processing as shown in FIG. 44. Also, the second business application 2032A performs processing in 8 seconds per a case of processing, the third business application 2033A performs processing in 15 seconds per a case of processing, the fourth business application 2034A performs processing in 12 seconds per a case of processing, the sixth business application 2036A performs processing in 10 seconds per a case of processing, and the seventh business application 2037A performs processing in 20 seconds per a case of processing.

These workflow definitions and business application definitions are stored in the workflow definition and business definition repository 211 (FIG. 39). Further, the workflow definition and business definition acquisition part 221 and the workflow synthesizing part 222 shown in FIG. 39 generate one synthesized workflow definition in which one workflow definition existing in the first workflow system 2041 and the total of four business application definitions existing in the first to the fourth business applications 2031A-2034A have been synthesized, and one synthesized workflow definition in which one workflow definition existing in the second workflow system 2042 and the total of four business application definitions existing in the fifth, the third, the sixth and the seventh business applications 2035A, 2033A, 2036A and 2037A have been synthesized, and store them in the synthesized workflow definition DB 223 (FIG. 39).

The service level agreement is set in the workflow definition of the workflow shown in FIG. 43. In the synthesized workflow definition focusing on one workflow definition existing in the first workflow system 2041, the service level agreement which requests to complete processing within 150 seconds is set. Also, in the synthesized workflow definition focusing on one workflow definition existing in the second workflow system 2042, two of the service level agreements are defined depending on a user of the synthesized workflow definition. Specifically, for example, the service level agreement which requests to complete processing received from a part of users within 150 seconds and to complete processing received from the other users within 180 seconds is set. Such service level agreements are stored in the service level agreement repository 212 (FIG. 39). Thus, the service quality according to the degree of each user's demand for the service can be achieved by setting a1 service level agreement for each of a plurality of the users.

In the workflow execution system 400A of this first modification example, the first workflow monitoring system 2081 targets at the first workflow system 2041 for monitoring, and the second workflow monitoring system 2082 targets at the second workflow system 2042 for monitoring.

In the initial state, the control information holding part 246 (refer to FIG. 6) of each of the communication control systems 2071-2079 holds the setting information which directs that each of the communication control systems 2071-2079 immediately transmits information transmitted by the respective control targets. Further, the control information holding part 246 holds the setting information which directs that each of the communication control systems 2071-2079 once holds information to be received by the respective control targets, and transmits these to the control targets in order of reception with the same interval as the processing time of the control targets. Moreover, communication among the first and the second workflow systems 2041, 2042 and the first to the seventh business applications 2031A-2037A is monitored by the communication monitoring system 206 (FIG. 39). The information which defines these monitoring targets and control targets is stored in the control system storage DB 237 (FIG. 39).

In addition, for example, the activation control part 227 (FIG. 39) is set to start the state observation part 228 (FIG. 39) every 60 seconds. Also, the predicting part 233A (FIG. 39) is set to obtain the state of 0.1 seconds later of the state of an inputted synthesized workflows.

Further, the state where the verification part 230A (FIG. 39) judges that "a prediction result achieves the service level agreement with great excess" means, for example, the state that all synthesized workflows belonging to a certain synthesized workflow definition are completed in a time of less than ⅔ of time defined by the service level agreement.

Figure 46:
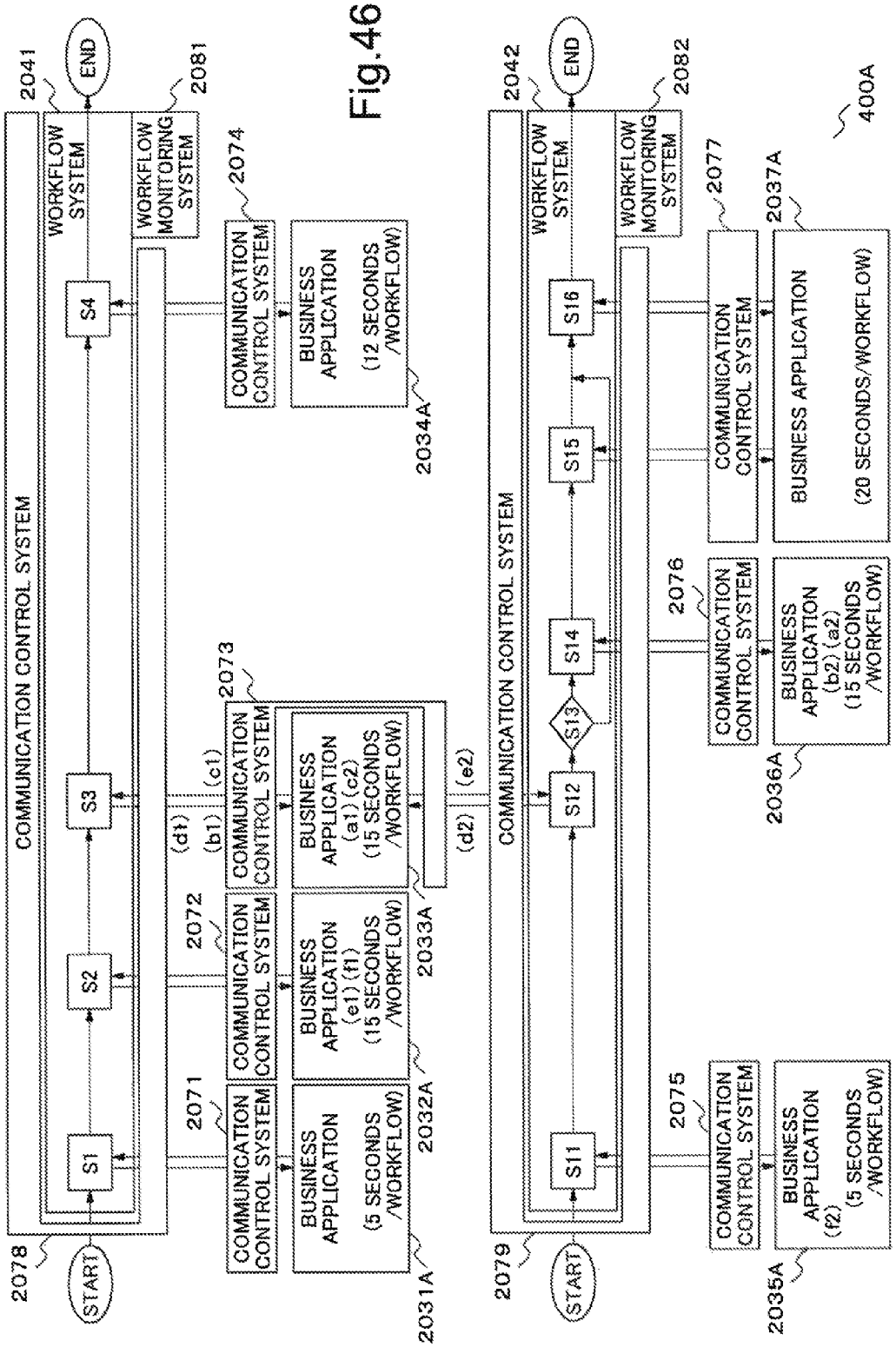
FIG. 46 is an explanation drawing showing the state of the workflow monitoring and control system at the time 660 when synthesized workflows have been executed since the time 0 according to the first modification example.

FIG. 46 shows a state of the workflow monitoring and control system 205A at the time 660 when synthesized workflows have been executed since the time 0. Further, FIG. 47 shows one example of the state and the history information of the synthesized workflows acquired when the activation control part 227 has started the state observation part 228 for the first time.

Figure 47:
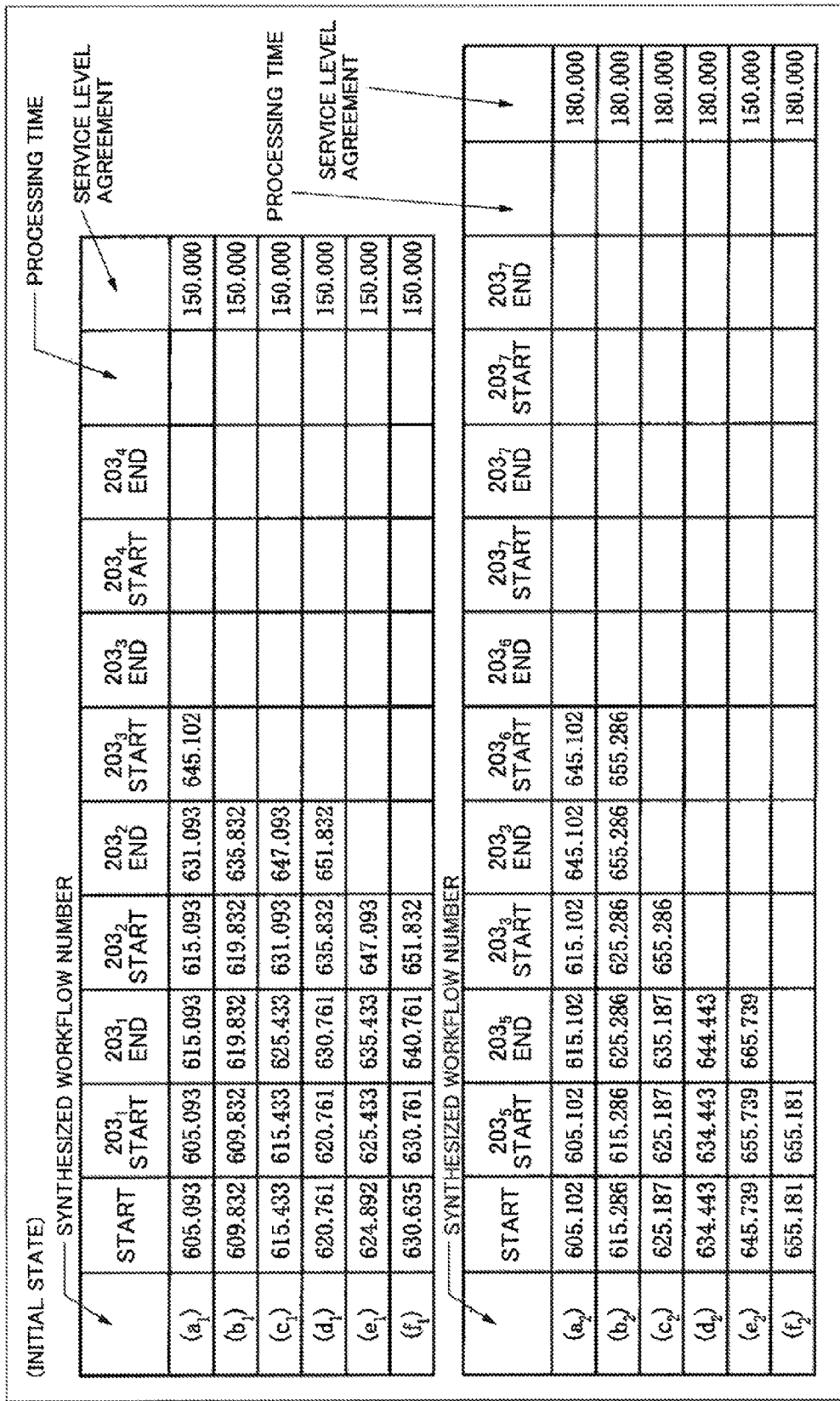
FIG. 47 is an explanation drawing showing one example of the state and the history information of the synthesized workflows acquired when the activation control part of the first modification example has started the state observation part for the first time.

As shown in FIG. 46 and FIG. 47, at this time 660, six synthesized workflows (a1)-(f1) which are controlled by the first workflow system 2041 for their execution, and six synthesized workflows (a2)-(f2) which are controlled by the second workflow system 2042 for their execution, are operating. The synthesized workflow (a1) is being executed in the third business application 2033A. The synthesized workflows (b1), (e1) and (d1) are held in a waiting state of execution at the third communication control system 2073. The synthesized workflows (e1) and (f1) are being executed in the second business application 2032A. The synthesized workflows (a2) and (b2) are being executed in the sixth business application 2036A and the synthesized workflow (c2) is being executed in the third business application 2033A. The synthesized workflows (d2) and (e2) are held in a waiting state of execution at the third communication control system 2073, and the synthesized workflow (f2) is being executed in the fifth business application 2035A.

Among six synthesized workflows (a2)-(f2) in the second workflow system 2042 shown in FIG. 47, the synthesized workflows (a2), (b2), (c2) and (d2) and the synthesized workflow (f2) are requested to complete processing within 180 seconds according to the given service level agreement, and the synthesized workflow (e2) is requested to complete processing within 150 seconds.

When the activation control part 227 starts the state observation part 228 for the first time at the time 660, the state observation part 228 acquires the state and the history information of the synthesized workflows as shown in FIG. 47.

At this time point, the information of the initial state of the control information holding part 246, which directs to transmit immediately the information transmitted by the control target, and to hold once information to be received by the control target, and to transmit to the control target in order of reception with the same interval as the average processing time of the control target, is set in the control history storage DB 234. The state observation part 228 inputs the state and the history information of the synthesized workflows as shown in FIG. 47, and the information of the control history storage DB 234 to the most suitable priority control result calculation part 229A.

The most suitable priority control result calculation part 229A creates a prediction of operation of synthesized workflows until all synthesized workflows are completed by using the predicting part 233A. First, the most suitable priority control result calculation part 229A notifies the predicting part 233A of the state and the history information of the synthesized workflows at the time 660, and obtains the state prediction of the synthesized workflows at the time 660.1.

By repeatedly performing the similar prediction with advancing the time, at the time 675.102, the third business application 2033A has finished the processing of the synthesized workflow (a1) and it becomes possible to execute a new synthesized workflow. The synthesized workflows which can be executed in the third business application 2033A at that time are the synthesized workflows (b1), (c1), (d1), (e1), (f1), (d2), (e2) and (f2). The most suitable priority control result calculation part 229A predicts the future state in a case where each of the synthesized workflows is selected, as new processing to be executed in the third business application 2033A. The most suitable priority control result calculation part 229A chooses the best result among these prediction results as a prediction result to be obtained.

Figure 48:
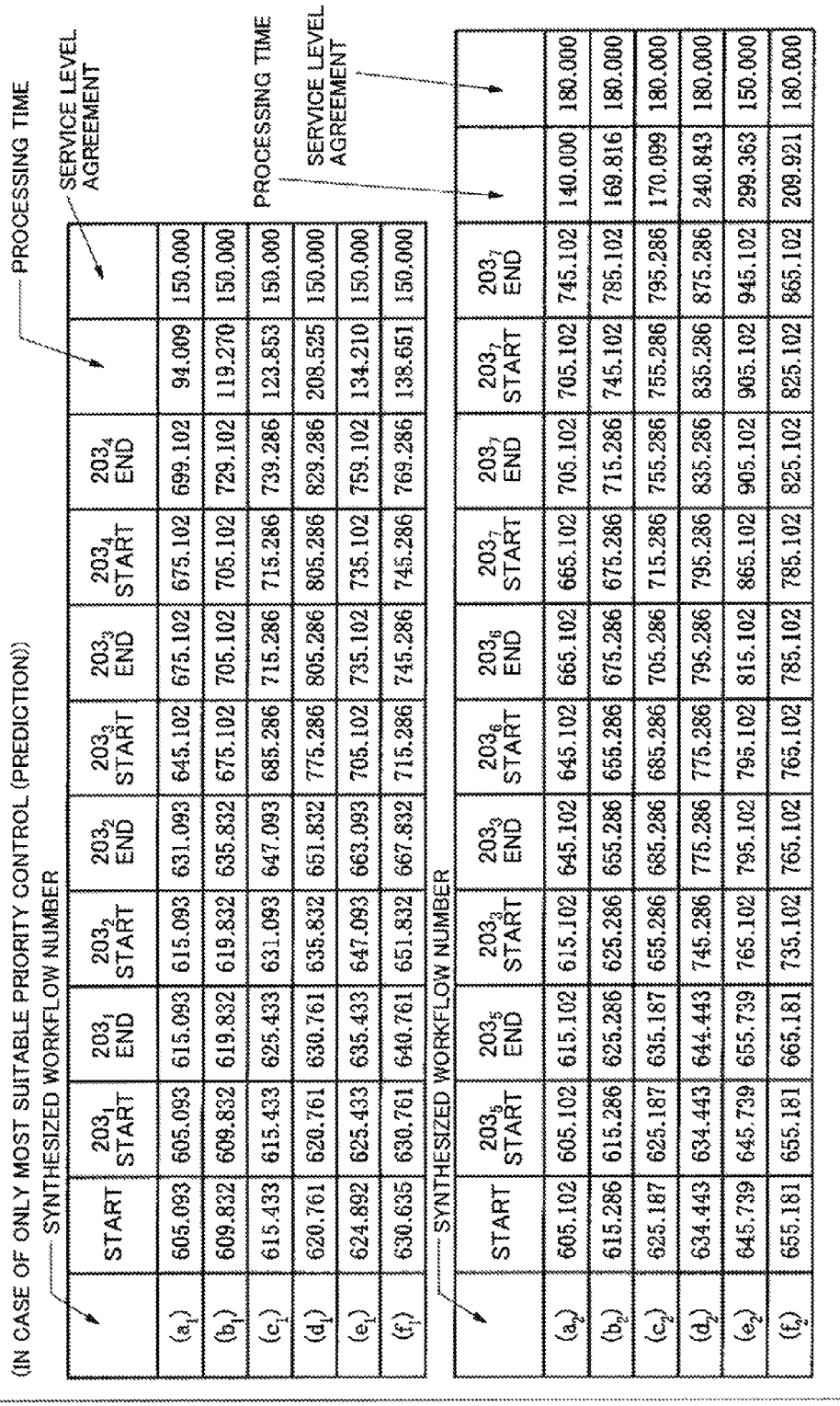
FIG. 48 is an explanation drawing showing a prediction result which is calculated by the most suitable priority control result calculation part according to the first modification example.

FIG. 48 shows a prediction result which is calculated by the most suitable priority control result calculation part 229A. According to FIG. 48, the processing time of the synthesized workflows (d1), (d2), (e2) and (f2) does not reach the service level agreement. It is necessary to add computer resources in order to aim at achievement of the service level agreement.

Accordingly, the computer resource addition decision part 231A determines the business application 203A to which computer resources are to be added and the addition amount. The computer resource addition decision part 231A uses a concept of an expected waiting time improving amount. The expected waiting time improving amount is calculated as follows. First, value 1 is calculated by dividing the waiting time, which is a time from an execution request to each business application 203A by the synthesized workflow group which is not reaching the service level agreement to a start of execution, by an execution required time of the business application 203A. Second, value 2 is calculated by multiplying value 1 by an execution waiting time interval improving amount of the business application 203A in case of adding a business application execution part 501 (FIG. 28) to the business application 203A. Then, the expected waiting time improving amount is calculated by summing value 2 of all execution requests requested to each business application 203A by the workflow included in the synthesized workflow group specified in Step S372 of FIG. 41 for each of the business applications 203A. And, the computer resource addition decision part 231A adds the minimum unit of computer resources to the business application 203A which is predicted to have the largest expected waiting time improving amount having been obtained.

FIG. 49 shows the expected waiting time improving amount of each of the business applications calculated based on the prediction result. This FIG. 48 shows the expected waiting time improving amount of each business application 203A calculated based on a prediction result in order to obtain the business application 203A which is predicted to have the largest expected waiting time improving amount.

According to this FIG. 49, the third business application 2033A has the largest expected waiting time improving amount. Accordingly, in case of this example, the computer resource addition decision part 231A adds computer resources to the third business application 2033A. As a result, a business application execution part 501 (FIG. 38) is added to the third business application 2033A, and total of three business application execution parts 501 are assigned to this application.

FIG. 50 shows the state of the synthesized workflows in a case where computer resources have been added first time. This figure will be described together with FIG. 46, FIG. 39 and FIG. 43.

The most suitable priority control result calculation part 229A acquires the operation prediction of the synthesized workflows in case of computer resources having been added first, by the same method as used at the time when the prediction result of FIG. 17 was obtained. FIG. 50 shows this result. At this time, for example, computer resources are added at the time 665. According to FIG. 50, the synthesized workflow (d1) can achieve the service level agreement, but the synthesized workflows (d2), (e2) and (f2) have not been able to achieve the service level agreement yet. For this reason, the computer resource addition decision part 231A obtains the expected waiting time improving amount in order to select once again the business application to which computer resources are to be added.

FIG. 51 shows the expected waiting time improving amount calculated to each business application 203A in a case where computer resources are to be added second time. According to this figure, the seventh business application 2037A has the largest expected waiting time improving amount. For this reason, the computer resource addition decision part 231A adds computer resources to the seventh business application 2037A. As a result, a the business application execution part 501 is added to the seventh business application 2037A, and total of three business application execution parts 501 are assigned to this application.

By this condition, the most suitable priority control result calculation part 229A (FIG. 39) acquires the operation prediction of the synthesized workflows in case of computer resources having been added, by the same method as used at the time when the prediction result of FIG. 21 was obtained.

FIG. 52 shows the state of the synthesized workflows in a case where computer resources have been added second time. For example, computer resources are added at the time 665.

According to FIG. 52, the synthesized workflow (e2) can achieve the service level agreement, but the synthesized workflow (d2) and (f2) have not been able to achieve the service level agreement yet. For this reason, the computer resource addition decision part 231A obtains the expected waiting time improving amount in order to select once again the business application 203A to which computer resources are to be added.

FIG. 53 shows the expected waiting time improving amount calculated to each business application 203A in a case where computer resources are to be added third time. According to this figure, the third business application 2033A has the largest expected waiting time improving amount. For this reason, the computer resource addition decision part 231A adds computer resources to the third business application 2033. As a result, a business application execution part 501 is added to the third business application 2033A, and total of four business application execution part 501 are assigned to this application.

By this condition, the most suitable priority control result calculation part 229A (FIG. 39) acquires the operation prediction of the synthesized workflows in case of computer resources having been added, by the same method as used at the time when the prediction result of FIG. 23 was obtained.

FIG. 54 shows the state of the synthesized workflows in a case where computer resources have been added third time. It is supposed that computer resources are added at the time 665. According to this FIG. 54, although processing time has been shortened, the synthesized workflows (d2) and (f2) have not been able to achieve the service level agreement yet. For this reason, the expected waiting time improving amount is obtains in order to select once again the business application to which computer resources are to be added.

FIG. 55 shows the expected waiting time improving amount calculated to each business application 203A in a case where computer resources are to be added fourth time. According to this figure, the seventh business application 2037A has the largest expected waiting time improving amount. For this reason, computer resources are added to the seventh business application 2037A. As a result, a business application execution part 501 is added to the seventh business application 2037A, and total of four business application execution'parts 501 are assigned to this application.

By this condition, the most suitable priority control result calculation part 229A (FIG. 39) acquires the operation prediction of the synthesized workflows in case of computer resources having been added, by the same method as used at the time when the prediction result of FIG. 25 was obtained.

FIG. 56 shows the state of the synthesized workflows in a case where computer resources have been added fourth time. For example, computer resources are added at the time 665. According to FIG. 56, the synthesized workflow (d2) can achieve the service level agreement, but the synthesized workflow (f2) has not been able to achieve the service level agreement yet.

For this reason, the computer resource addition decision part 231A obtains the expected waiting time improving amount in order to select once again the business application 203A to which computer resources are to be added.

FIG. 57 shows the expected waiting time improving amount calculated to each business application 203A in a case where computer resources are to be added fifth time. According to FIG. 57, the seventh business application 2037A has the largest expected waiting time improving amount. For this reason, the computer resource addition decision part 231A adds computer resources to the seventh business application 2037A. As a result, a business application execution part 501 is added to the seventh business application 2037A, and total of five business application execution parts 501 are assigned to this application.

By this condition, the most suitable priority control result calculation part 229A (FIG. 39) acquires the operation prediction of the synthesized workflows in case of computer resources having been added, by the same method as used at the time when the prediction result of FIG. 27 was obtained.

FIG. 58 shows the state of the synthesized workflows in a case where computer resources have been added fifth time. For example, computer resources are added at the time 665.

According to FIG. 58, it is expected that all synthesized workflows can achieve the service level agreement by this condition.

When it becomes to be expected that all synthesized workflows can achieve the service level agreement by addition of computer resources as above, the verification part 230A judges whether the priority control condition and the addition and reduction condition in the prediction mentioned above are different from the control information which was set in the previous time. In case of this example, because control was started at the time 660 for the first time, the verification part 230A judges that it is different from the control information which was set in the previous time, and the control signal transmission part 235 transmits the control information to the communication control system 207.

FIG. 59 shows the state of the synthesized workflows in a case where the activation control part 227 restarted the state observation part at the time 720. When the activation control part 227 shown in FIG. 39 restarts the state observation part 228 at this time 720, the state observation part 228 acquires the state and the history information of the synthesized workflows shown in this FIG. 59. When comparing FIG. 59 with FIG. 58, processing of the synthesized workflow (d2) is different from the prediction result due to the conditional branch indicated in Step S13 of FIG. 43. In the synthesized workflows other than this, processing is progressing as the prediction result.

Figure 60:
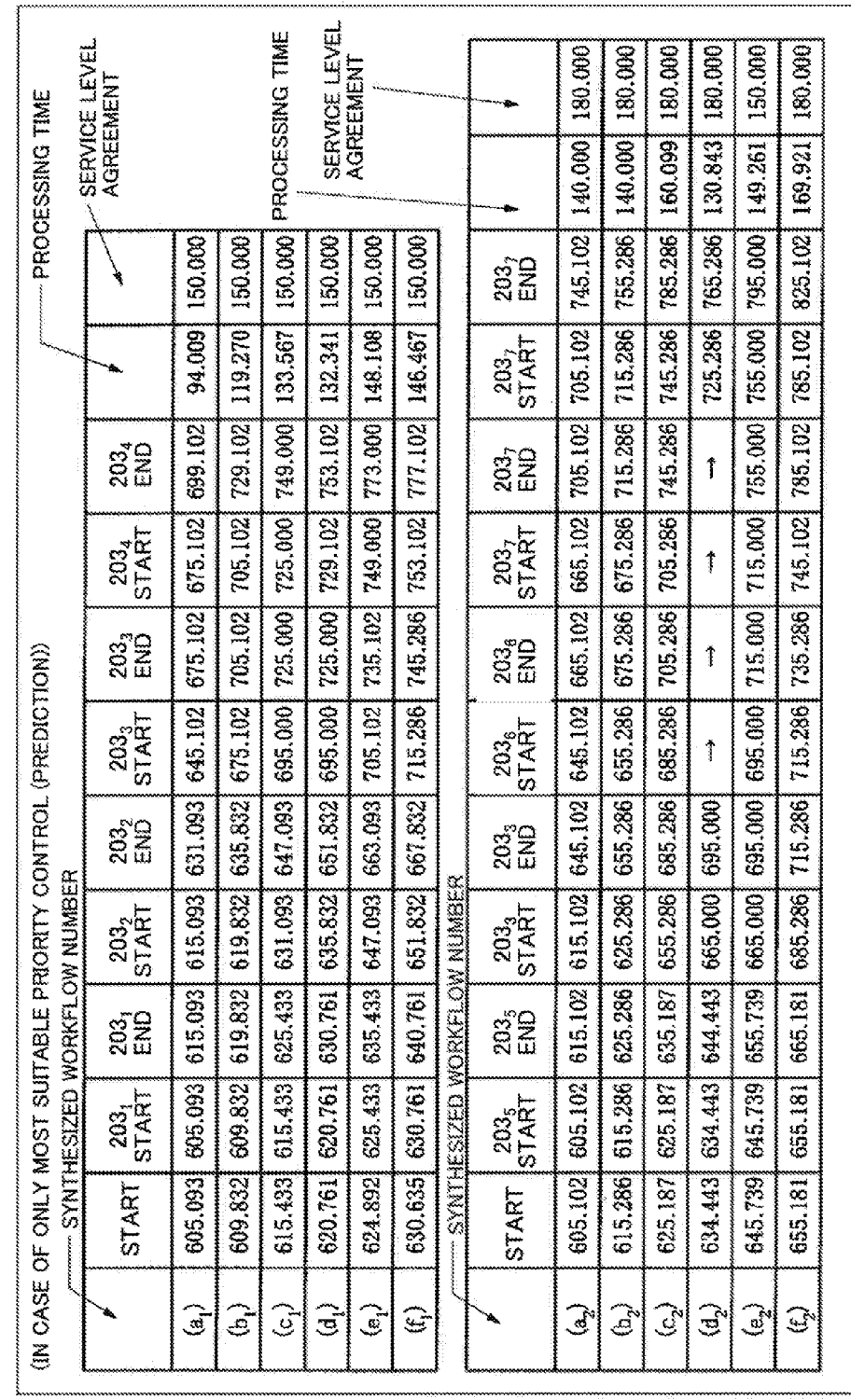
FIG. 60 is an explanation drawing showing the state of the synthesized workflows in a case where the future is predicted in a similar way at time point of the time 660 according to the first modification example.

FIG. 60 shows the state of the synthesized workflows in a case where the future is predicted at time point of the time 720 in a similar way at time point of the time 660. As shown in this FIG. 60, in this case, it is expected that all synthesized workflows achieve the service level agreement. For this reason, new control is not performed.

Next, in this monitoring target system, operation will be described in a case where the state of the synthesized workflows is different.

Figure 61:
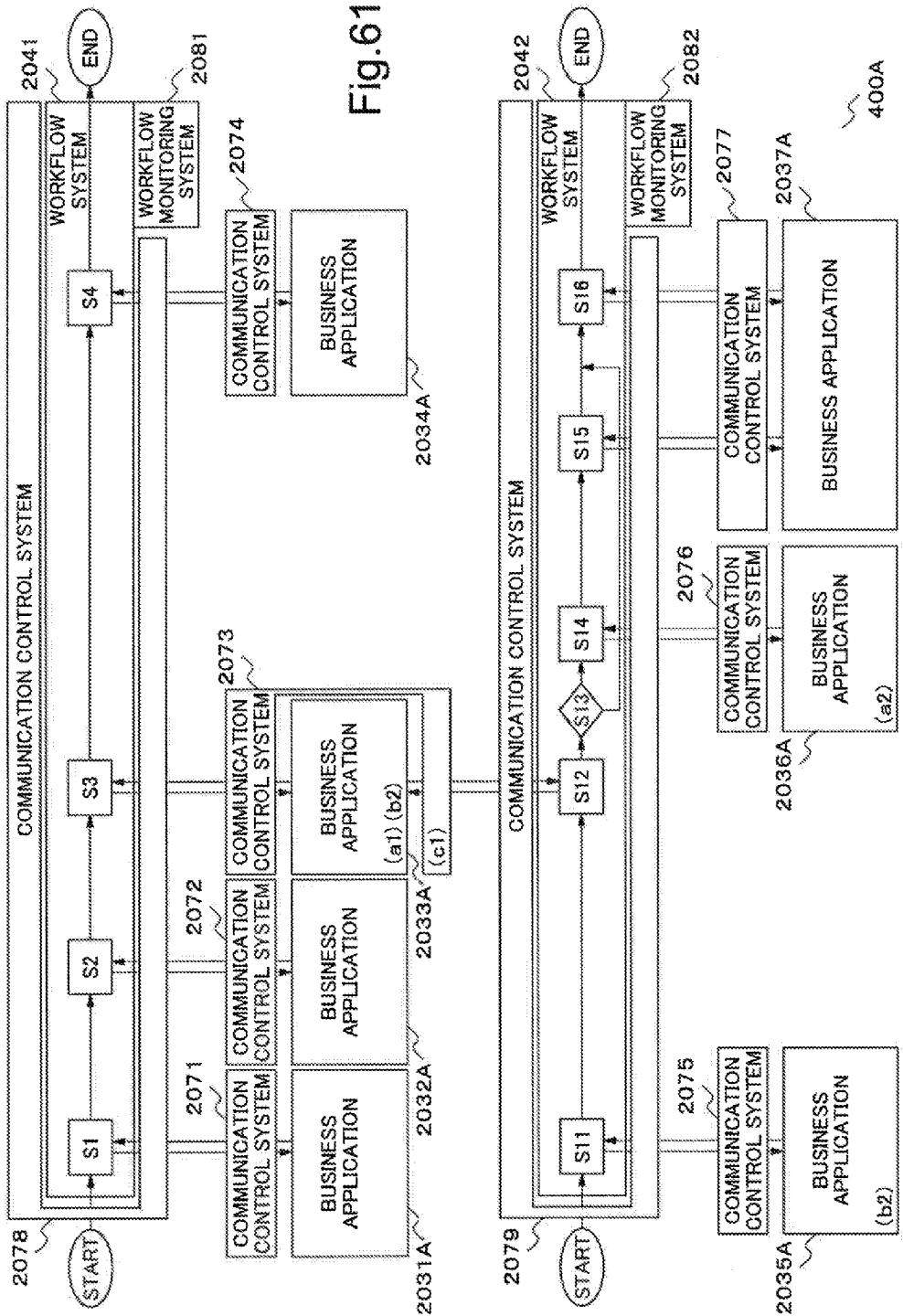
FIG. 61 is an explanation drawing showing the state of the synthesized workflows being executed at the time 660 according to the first modification example.

FIG. 61 shows the state of the synthesized workflows which are being executed at the time 660 when the synthesized workflows have been executed since the time 0. Three synthesized workflows, which are controlled by the first workflow system 2041 for their execution, and two synthesized workflows, which are controlled by the second workflow system 2042 for their execution, are operating. At the time 660, the synthesized workflows (a1), (b1) are being executed in the third business application 2033A, and the synthesized workflow (c1) is held in a waiting state of execution at the third communication control system 2073. The synthesized workflow (a2) is being executed in the sixth business application 2036A, and the synthesized workflow (b2) is being executed in the fifth business application 2035A. Two synthesized workflows in the second workflow system 2042 are required to complete within 180 seconds according to the given service level agreement.

FIG. 62 shows the state of the synthesized workflows which is acquired by the state observation part 228 in a case where the activation control part 227 started the state observation part 228 for the first time at the time 660. This figure will be described together with FIG. 39. Thus, when the activation control part 227 starts the state observation part 228 for the first time at the time 660, the state observation part 228 acquires the state and the history information of the synthesized workflows as shown in this FIG. 62. At this time point, the information at the initial state of the control information holding part 246 (FIG. 6) is set to the control history storage DB 234 shown in FIG. 39. This is the information which directs the communication control system 207 or the like that the information transmitted by the control target is to be transmitted immediately, and the information to be received by the control target is to be held once and to be transmitted in order of reception with the same interval as the average processing time of the control target. The state observation part 228 inputs the state and the history information of the synthesized workflows shown in FIG. 62, and the information of the control history storage DB 234 to the most suitable priority control result calculation part 229A.

FIG. 63 shows the prediction of operation of the synthesized workflows until all synthesized workflows are completed, which was created by the most suitable priority control result calculation part 229A using the predicting part 233A. According to the prediction of operation of the synthesized workflows shown in FIG. 63 which is created by the most suitable priority control result calculation part 229A of FIG. 39 using the predicting part 233A, all synthesized workflows belonging to the synthesized workflow definition focusing on one workflow definition which exists in the first workflow system 2041 achieve the service level agreement with substantially exceeding.

For this reason, the computer resource reduction decision part 232A (FIG. 39) determines the business application 203A from which computer resources are to be reduced and the amount of reduction. The computer resource reduction decision part 232A adopts the method which reduces the minimum unit of computer resources from the business application 203A whose utilization ratio of the past fixed period is the smallest among the business applications 203A which are not used, in a period for which the prediction is performed, by the synthesized workflow with the smallest margin to the service level agreement. Accordingly, the computer resource reduction decision part 232A (FIG. 39) obtains utilization ratio of business applications 203A of the past fixed period from the synthesized workflows history.

FIG. 37 indicated before shows the utilization ratio of each business application 203A which is obtained by the computer resource reduction decision part 232A. When the result shown in this FIG. 37 is obtained, the business application 203A with the lowest utilization ratio is the first business application 2031A. Further, it is judged based on the synthesized workflow definition that the synthesized workflow (b2), which is a synthesized workflow with the smallest margin to the service level agreement, does not use the first business application 2031A after the time 660. For this reason, the computer resource reduction decision part 232A decides to reduce the minimum unit of computer resources from the first business application 2031A. As a result, for example, a business application execution part 501 is reduced from the amount of computer resources shown in FIG. 45, and the amount of computer resources of the first business application 2031A becomes one business application execution part 501.

Next, the verification part 230A judges whether the priority control condition and the addition and reduction condition in the prediction are different from the control information which was set in the previous time. In this case, because control was started at the time 660 for the first time, the verification part 230A judges that it is different from the control information which was set in the previous time, and the control signal transmission part 235 transmits the control information to the communication control system 207.

<Second Modification Example of the Invention>

Figure 64:
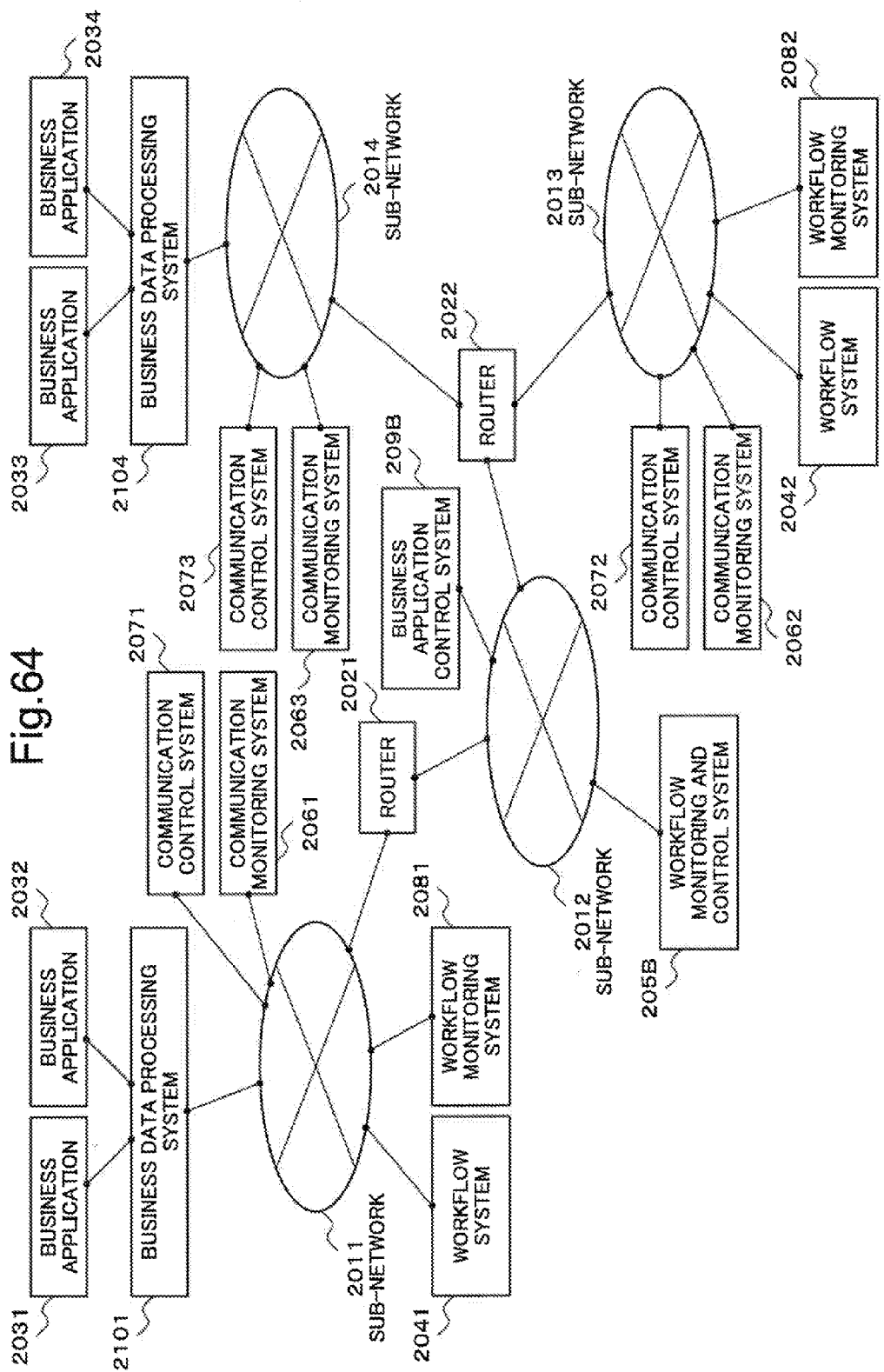
FIG. 64 is an explanation drawing showing a communication environment of a workflow monitoring and control system according to a second modification example of the present invention.

FIG. 64 shows a communication environment of a workflow monitoring and control system 400B as a second modification example of the present invention. In FIG. 64, the same part as FIG. 4 is given an identical reference numeral, and the description is omitted appropriately.

In the communication environment shown in this FIG. 64, there exists the computer resources used by the business applications 2031, 2032 or the like which are executed on the business data processing systems 2101, 2104 or the like, and at least one business application control system 209B which controls the computer resources used by each of the business applications 2031, 2032. The business application control system 209B is connected to the second sub-network 2012 in an example shown in this figure. There also exists at least one workflow monitoring and control system 205B which monitors the business applications 2031, 2032 or the like and the workflow system 204. The workflow monitoring and control system 205B is connected to the second sub-network 2012.

According to the previous exemplary embodiment, when there are a plurality of synthesized workflows which are processing targets in any one of business applications 2031, 2032 or the like, the business application control system 209 shown in FIG. 4 selects a synthesized workflow having the highest priority and makes it being executed. And, at the time point when it has completed the processing of the synthesized workflow, the business application control system 209 makes the processing of one synthesized workflow having the next high priority start. In the second modification example of the present invention, the business applications 2031, 2032 or the like perform the processing of a plurality of synthesized workflows, which become control targets, in parallel with time division manner.

Figure 65:
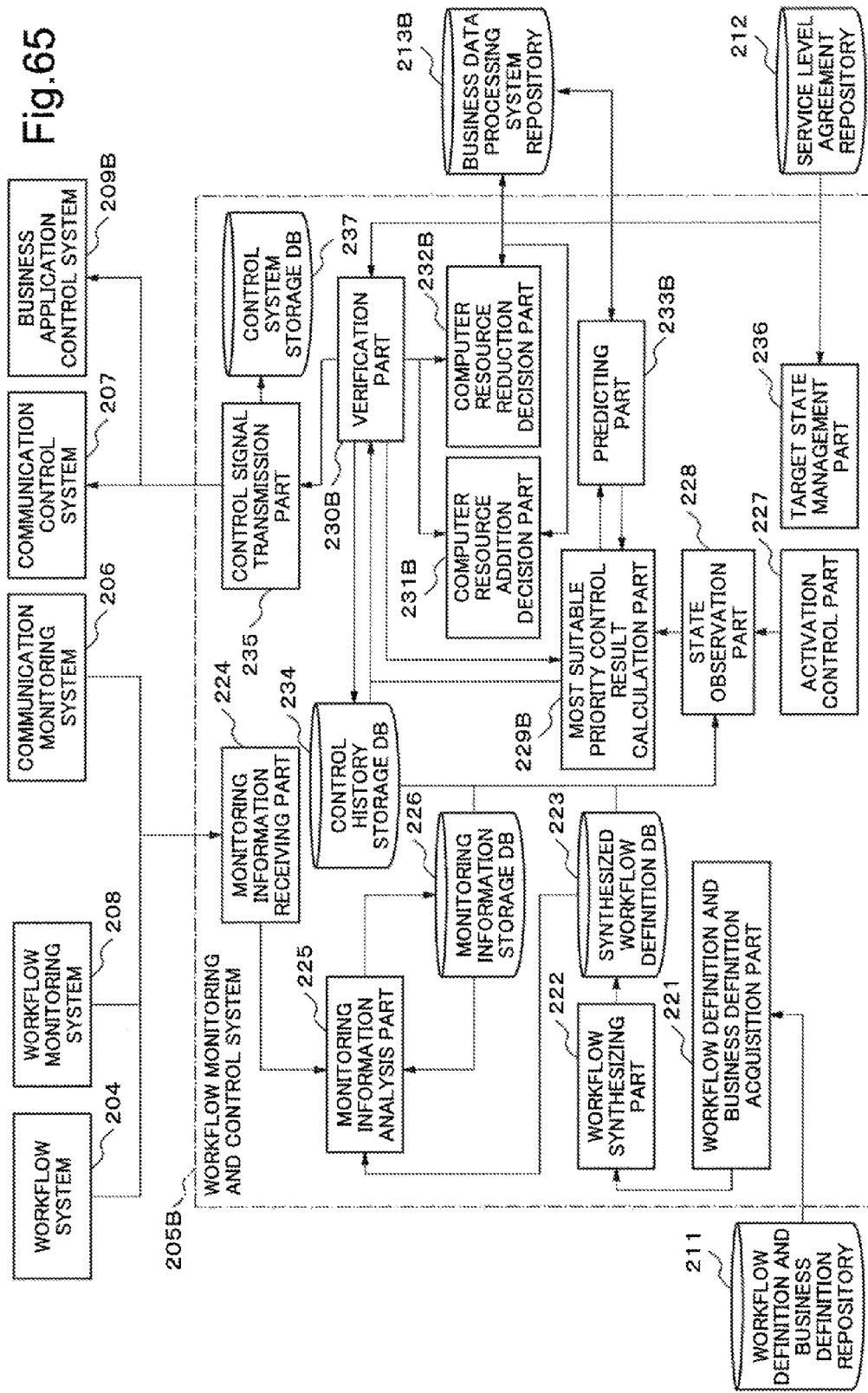
FIG. 65 is a system configuration drawing showing the primary part of the system configuration of the workflow monitoring and control system and its vicinities according to the second modification example.

FIG. 65 shows a primary part of the system configuration of the workflow monitoring and control system 400B and its vicinities according to the second modification example. In FIG. 65, the same part as FIG. 5 is given an identical reference numeral, and the description is omitted appropriately.

In FIG. 65, the workflow monitoring and control system 205B includes a workflow definition and business definition acquisition part 221 which acquires a workflow definition and a business definition, a workflow synthesizing part 222 which analyzes a communication relation among a plurality of workflow definitions and business definitions, and generates a synthesized workflow definition in which a workflow definition and business definitions mutually communicating are synthesized, synthesized workflow definition DB (database) 223 which stores the synthesized workflow definitions, a monitoring information receiving part 224 which receives monitoring information from the workflow monitoring system 208 and the communication monitoring system 206, a monitoring information analysis part 225 which analyzes monitoring information by correlating with synthesized workflows definition, monitoring information storage DB (database) 226 which stores monitoring information, an activation control part 227 which transmits a start request periodically, a state observation part 228 which acquires the state of the synthesized workflows up to the present, a most suitable priority control result calculation part 229B which predicts operation of synthesized workflows when performing the most suitable control, a verification part 230B which verifies based on the prediction results whether the synthesized workflow is expected to achieve the service level agreement, a computer resource addition decision part 231B which calculates the amount of computer resources required for achieving the service level agreement, a computer resource reduction decision part 232B which calculates the reduction amount of computer resources which does not affect achievement of the service level agreement, a predicting part 233B which predicts a state of a synthesized workflow after a unit time based on a state of the synthesized workflows at a certain time and the allocation amount of computer resources to the business application control system 209B, control history storage DB (database) 234 which stores past control histories, a control signal transmission part 235 which transmits a control signal to the communication control system 207, a target state management part 236 which holds the service level agreement, and control system storage DB (database) 237 which holds a mutual corresponding relationship among the communication control system 207. FIG. 65 shows only one communication control system 207 as a representative. When plural communication control systems 207 exist, the control system storage DB 237 holds a corresponding relationship among communication control systems 207.

In this exemplary embodiment, each system focusing on the workflow monitoring and control system 205B generally operates as follows. FIG. 64 and FIG. 65 are referred in the description.

In the workflow definition and business definition repository 211, the definition of workflow which is executed on the workflow system 204 of a monitoring control target and the definition of business application 203 which is executed on the business data processing system 210 are stored in advance. Also, in the service level agreement repository 212, the service level agreement which is set for the workflow system 204 of a monitoring control target and the business application 203 is stored in advance. Here, the service level agreement is an example of a lower limit which can be permitted to the service quality mentioned above. In the business data processing system repository 213, deployment information of the business data processing system 210 to which the business application 203 can be deployed, performance characteristics information of the business data processing system 210, deployment information of the business application 203 in the business data processing system 210, and information of amount of computer resources allocated to the business application 203 are stored.

The workflow definition and business definition acquisition part 221 acquires workflow definitions and business definitions from the workflow definition and business definition repository 211 before execution of the workflow system 204 and the business application 203. The workflow synthesizing part 222 creates a synthesized workflow definition from the acquired workflow definitions and business definitions and stores in the synthesized workflow definition DB223. Further, the target state management part 236 acquires the service level agreement information from the service level agreement repository 212 and holds.

When the workflow system 204 and the business application 203 operate, the workflow monitoring system 208 and the communication monitoring system 206 detect progress of business data processing and occurrence of communication, and notify the monitoring information receiving part 224. The received monitoring information is analyzed by correlating with the synthesized workflow definitions in the monitoring information analysis part 225, and is stored in the monitoring information storage DB 226.

In parallel with this, the activation control part 227 transmits a start request to the state observation part 228 periodically. The state observation part 228 correlates the monitoring information stored in the monitoring information storage DB 226 with the synthesized workflow definitions stored in the synthesized workflow DB 223, and creates a state and history information of the synthesized workflows which are currently being executed and the statistics information of the synthesized workflows which were executed in the past. Moreover, the state observation part 228 acquires the present control condition from the control history storage DB 234. The state observation part 228 inputs the state and the history information of the synthesized workflows which are currently being executed, the statistics information of the synthesized workflows which were executed in the past and the present control condition to the most suitable priority control result calculation part 229B.

The most suitable priority control result calculation part 229B predicts the future state, based on the inputted information, in a case where the most suitable priority control was supposed to be performed to the synthesized workflows which are currently being executed. The predicting part 233 performs this prediction using the allocation information of computer resources to the business application stored in the business data processing system repository 213. The most suitable priority control result calculation part 229B outputs the prediction result to the verification part 230B. Further, the service quality calculation part 14 in FIG. 1 calculates the service quality expected at the time of the completion of business data processing of each of the workflows. The calculation result is an example of the prediction result in the second modification example.

The verification part 230B compares the prediction result with the target state management part 236 and judges the target achievement state. The quality insufficiency judging part 15 in FIG. 1 is an example of the verification part 230B in the second modification example, and when the service quality of any of workflows is lower than a lower limit of the service quality at the time of the completion of the business data processing, this is discriminated. As a result, the verification part 230B stores the control information in the control history storage DB 234 if the prediction result is proper, transmits the validity of the prediction result to the communication control system 207 and the business application control system 209 by the control signal transmission part 235 and ends. If the prediction result does not achieve the service level agreement, the verification part 230 notifies the computer resource addition decision part 231 of the input and output of the most suitable priority control result calculation part 229B.

The computer resource addition decision part 231B creates a plan for adding computer resources to an appropriate business application 203 with reference to the received input and output of the most suitable priority control result calculation part 229B, and sets it to the business data processing system repository 213B. When the quality insufficiency judging part 15 judges that the service quality of a certain workflow is lower than the lower limit, the computer resource reallocation part 16 reallocates the amount of computer resources among a plurality of processing sections in order to correct a situation where the service quality of the certain workflow is lower than the lower limit. This processing is an example of creation of the plan for adding computer resources in the second modification example. The most suitable priority control result calculation part 229B inputs the state and the history information of the synthesized workflows which are currently being executed and the statistics information of the synthesized workflows which were executed in the past, and predicts the future state in a case where the most suitable priority control is performed to the synthesized workflows once again.

The verification part 230B notifies the computer resource reduction decision part 232B of the input and output of the most suitable priority control result calculation part 229B in case of judging that this prediction result achieves the service level agreement with great excess. The computer resource reduction decision part 232B creates a plan for appropriately reducing computer resources, by reducing the number of business application execution parts 501, having been allocated to the business applications 203 with reference to the received input and output of the most suitable priority control result calculation part 229B, and sets it to the business data processing system repository 213B. The most suitable priority control result calculation part 229B inputs the state and the history information of the synthesized workflows which are currently being executed and the statistics information of the synthesized workflows which were executed in the past, and predicts the state of the future in a case where the most suitable priority control was supposed to be performed to the synthesized workflows once again.

Figure 66:
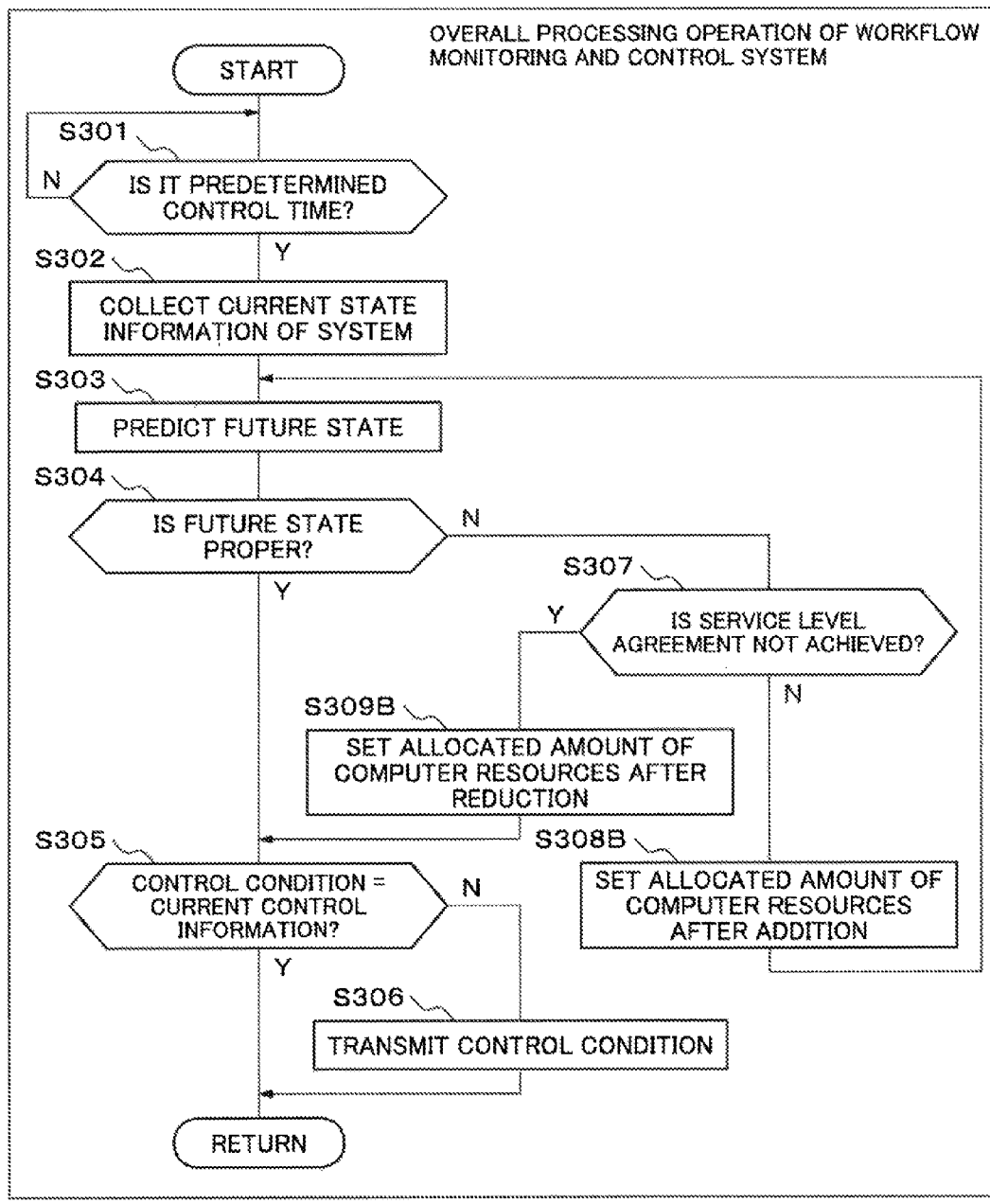
FIG. 66 is a flow chart showing an outline of overall processing operation of the workflow monitoring and control system according to the second modification example.

FIG. 66 outlines an overall processing operation of the workflow monitoring and control system according to the second modification example. This figure will be described together with FIG. 65 and FIG. 6. However, the workflow monitoring and control system 205 in FIG. 6 is read as the workflow monitoring and control system 205B in FIG. 65.

The workflow monitoring and control system 205B is equipped with CPU which is not shown and a storage medium such as a hard disk for storing control programs executed by this CPU. By executing this control program, CPU may realize functionally at least a part of each part in the workflow monitoring and control system 205B described foregoing by software. Each part in the workflow monitoring and control system 205B, or CPU, realizes control which will be described below.

The activation control part 227 is standing by (Step S301), until it becomes the predetermined control time, and stopping its operation. When it has become the predetermined control time (Y), the activation control part 227 starts the state observation part 228, and the state observation part 228 correlates monitoring information stored in the monitoring information storage DB 226 with a synthesized workflow definition stored in the synthesized workflow definition DB 223. And, the state observation part 228 creates a state and history information of the synthesized workflows which are currently being executed, and statistics information of the synthesized workflows which were executed in the past (Step S302).

Next, the most suitable priority control result calculation part 229B acquires the state and the history information of the synthesized workflows which are currently being executed, the statistics information of the synthesized workflows which were executed in the past and the present control condition acquired from the control history storage DB 234. The most suitable priority control result calculation part 229B predicts the future state of the synthesized workflows which are currently being executed based on these inputted information. The prediction result of the future state of the synthesized workflows and the input to the most suitable priority control result calculation part 229B are outputted to the verification part 230B (Step S303).

The verification part 230B judges the validity of the prediction result with reference to the target state management part 236 (Step S304). As the result, when the prediction result is proper (Y), that is, when the prediction result achieves the service level agreement and this does not exceed the service level agreement substantially, the verification part 230B refers to the control history storage DB 234, and judges whether a control condition is same as the present control condition (Step S305). When it is the same (Y), the verification part 230B ends operation without transmitting the control condition, and the workflow monitoring and control system 205B returns to the processing of Step S301 (return).

When the control condition is not the same as the present control condition (step S305: N), the verification part 230B stores the control condition which is not the same in the control history storage DB 234. And, the control signal transmission part 235 transmits the control condition to the communication control system 207 (Step S306). After this, the workflow monitoring and control system 205B returns to the processing of Step S301 (return).

The case where it is judged that the prediction result is not proper (N) in Step S304 is either one of the following two cases. One is the case where it is judged that the prediction result does not achieve the service level agreement. Another is the case where it is judged that the prediction result has exceeded the service level agreement substantially. Accordingly, the verification part 230B discriminates whether the service level agreement is achieved or not (Step S307), in a case where it is judged that the prediction result is not proper (Step S304: N).

In a case where it is judged that the prediction result does not achieve the service level agreement (N), the computer resource addition decision part 231B decides an appropriate business application 203 to which computer resources are to be added and the addition amount. And, the computer resource addition decision part 231B sets the allocated amount of computer resources after addition in the business application 203 to the business data processing system repository 213B (Step S308B), and the most suitable priority control result calculation part 229B inputs the state and the history information of the synthesized workflows which are currently being executed and the statistics information of the synthesized workflows which were executed in the past, and predicts the future state of the synthesized workflows which are currently being executed (Step S303).

In contrast, in a case where it is judged that the prediction result exceeded the service level agreement substantially (step S307: Y), the computer resource reduction decision part 232B decides an appropriate business application 203 from which computer resources are to be reduced and the reduction amount, and sets the allocated amount of computer resources after reduction in the business application to the business data processing system repository 213B (Step S30913). As an example of a method of judging that the prediction result exceeds the service level agreement substantially, there is a method of judging whether the difference with the service level agreement of the synthesized workflow having the smallest margin to the service level agreement exceeds a predetermined range. If computer resources are reduced in this way, the verification part 230B advances towards the processing of Step S305.

In the foregoing description, FIG. 10 shows the processing of the computer resource addition decision part 231B, and FIG. 11 shows the processing of the computer resource reduction decision part 232B. Further, these figures show each of operation examples of the computer resource addition decision part 231B and the computer resource reduction decision part 232B. Operation of the computer resource addition decision part 231B and the computer resource reduction decision part 232B varies depending on the contents of the monitoring control target and the service level agreement and the characteristics of the business data processing system. These figures will be described together with FIG. 65 and FIG. 6.

First, the computer resource addition decision part 231B acquires, from the verification part 230B, the prediction results in the most suitable priority control result calculation part 229B including the expected state of the synthesized workflows at the time that execution of all synthesized workflows has been completed and the history information until it has reached at this state, and the information of the target state management part 236 which was used for judgment of the prediction result by the verification part 230B (step S371: Y). And, the computer resource addition decision part 231B specifies a synthesized workflow group which cannot achieve the service level agreement based on the inputted information (Step S372).

Next, the computer resource addition decision part 231B determines the business application 203 to which computer resources are to be added and the addition amount (Step S373). An example of this decision method is the method which adds the minimum unit of computer resources to the business application 203 which is predicted to have the largest total time of the time which is obtained by subtracting the shortest time required for executing the business application 203 from the time which is a time from a request of execution to each business application 203 by the synthesized workflow group specified in Step S372 to a completion of the execution. Also, this decision method may be the method by the following way. First, it obtains value 1 by dividing the time, which subtracts the shortest time required for executing the business application 203 from the—time which is a time from a request of execution to each business application 203 by the synthesized workflow group specified in Step S372 to a completion of the execution, by the execution required time of the business application 203. Second, it obtains value 2 by multiplying value 1 by the execution required time improving amount of the business application 203 in case of having added the minimum unit of computer resources to the business application 203. Third, it obtains value 3 by summing value 2 of all execution requests requested to each business application 203 by the workflow included in the synthesized workflow group specified in Step S372 for each of the business applications 203. Finally, the minimum unit of computer resources is added to the business application 203 which is predicted to have the largest value 3.

When having determined the business application 203 to which computer resources are to be added and the addition amount as described above (Step S373), the computer resource addition decision part 231B stores the state after the obtained computer resources having been added to the obtained business application 203, in the business data processing system repository 213B (Step S374). The computer resource addition decision part 231B ends the processing in this way (end).

FIG. 11 indicated before shows operation of the computer resource reduction decision part 232B. This figure will be described together with FIG. 65.

The computer resource reduction decision part 232B acquires, from the verification part 230B, the prediction results in the most suitable priority control result calculation part 229B including the expected state of the synthesized workflows at the time that execution of all synthesized workflows has been completed and the history information until it has reached at this state, and the information of the target state management part 236 which was used for judgment of the prediction result by the verification part 230B (step S391: Y).

Next, the computer resource reduction decision part 232B specifies the synthesized workflow having the smallest margin to the service level agreement based on this inputted information (Step S392). And, the business application 203 from which computer resources are to be reduced and the reduction amount are determined from a view point as achievement of the service level agreement to the synthesized workflows other than this specified synthesized workflow (Step S393). An example of this decision method is the method which reduces the minimum unit of computer resources from the business application 203 having the shortest waiting time among the business applications 203 which are not used, in a period for which the prediction is performed, by the synthesized workflow specified in step S392. Also, this decision method may be the method which reduces the minimum unit of computer resources from the business application 203 having the smallest utilization ratio of the past fixed period among the business applications 203A which are not used, in a period for which the prediction is performed, by the synthesized workflow specified in step S392.

When having determined the business application 203 from which computer resources are to be reduced and the reduction amount in Step S393 as described above, the computer resource reduction decision part 232B stores the state after the obtained computer resources having been reduced from the obtained business application 203, in the business data processing system repository 213B (Step S394). The computer resource reduction decision part 232B ends the processing in this way (end). With respect to reduction of computer resources, it is not the indispensable condition to specify the synthesized workflow having the smallest margin to the service level agreement first (FIG. 11, step S392). The reduction of computer resources is also possible by the technique other than this.

Figure 67:
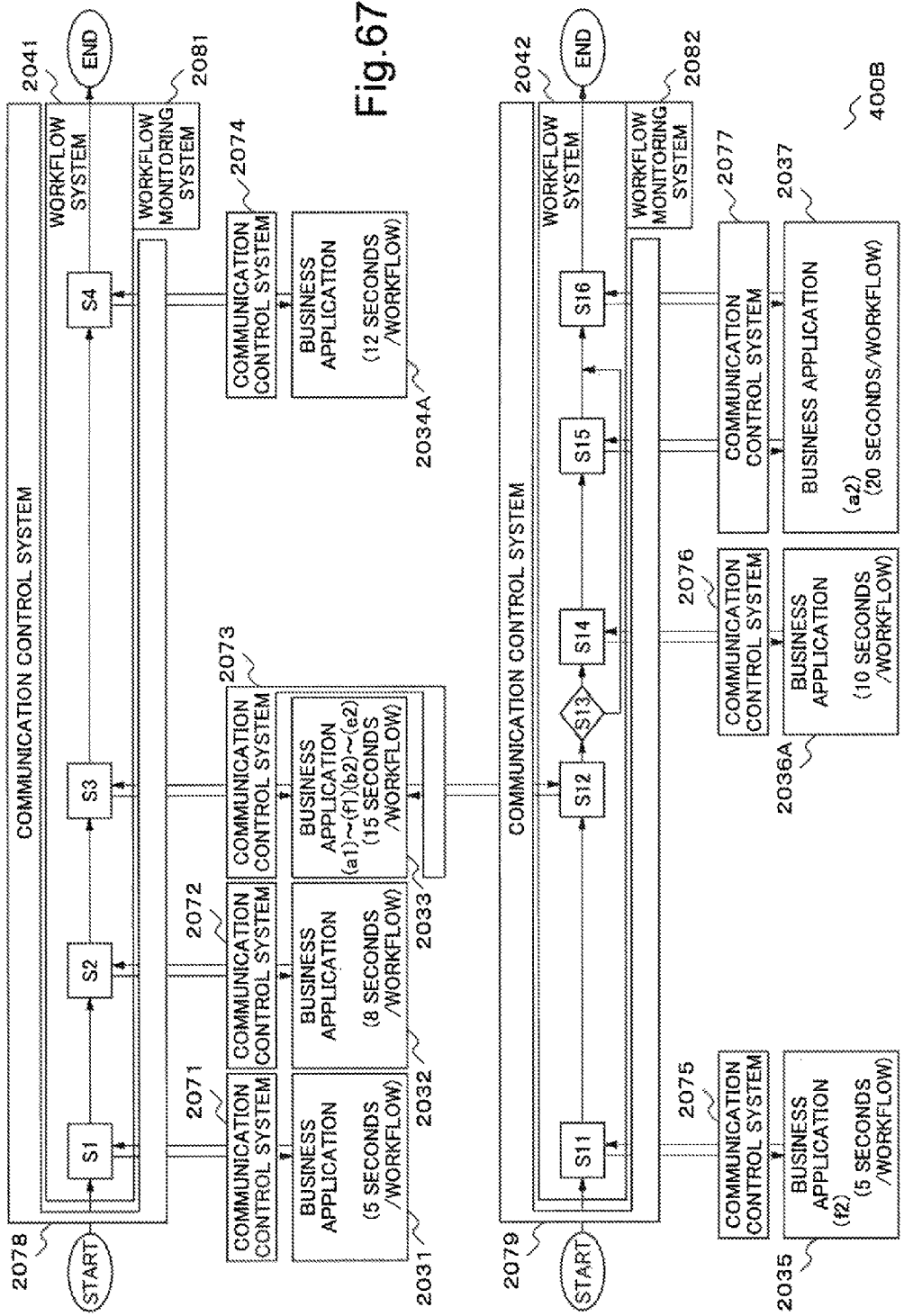
FIG. 67 is a flow chart showing a state of the workflow monitoring and control system at the time 660 according to the second modification example.

FIG. 67 shows a state of the workflow monitoring and control system at the time 660 when the synthesized workflows have been executed since the time 0. FIG. 68 shows the state of the synthesized workflows at the time 660 when synthesized workflows have been executed since the time 0 in the workflow execution system 400B. As shown in FIG. 67 and FIG. 68, at the time 660, six synthesized workflows (a1)-(f1), which are controlled by the first workflow system 2041 for their execution, and six synthesized workflows (a2)-(f2), which are controlled by the second workflow system 2042 for their execution, are operating. Among these, the synthesized workflows (a1), (b1), (c1), (d1), (e1) and (f1) are being executed in the third business application 2033. Further, the synthesized workflow (a2) is being executed in the seventh business application 2037, and the synthesized workflows (b2), (c2), (d2) and (e2) are being executed in the third business application 2033. The synthesized workflow (f2) is being executed in the fifth business application 2035.

Those six synthesized workflows (a1)-(f1) in the first workflow system 2041 shown in FIG. 67 are requested to complete processing within 150 seconds according to the given service level agreement. Among six synthesized workflows (a2)-(f2) in the second workflow system 2042, those synthesized workflows (a2), (b2), (c2) and (d2) and the synthesized workflow (f2) are requested to complete processing within 180 seconds according to the given service level agreement, and the synthesized workflow (e2) is requested to complete processing within 150 seconds.

FIG. 68 shows one example of the state and the history information of the synthesized workflows which is acquired when the activation control part 227 has started the state observation part 228 for the first time. This figure will be described together with FIG. 65 and FIG. 67.

When the activation control part 227 starts the state observation part 228 for the first time at the time 660, the state observation part 228 acquires the state and the history information of the synthesized workflows as shown in FIG. 68.

At this time point, the information of the initial state of the control information holding part 246, which directs to transmit immediately the information transmitted by the control target, and to transmit immediately the information to be received by the control target, is set in the control history storage DB 234. The state observation part 228 inputs the state and the history information of the synthesized workflows as shown in FIG. 68, and the information of the control history storage DB 234 to the most suitable priority control result calculation part 229B.

The most suitable priority control result calculation part 229B creates a prediction of operation of synthesized workflows until all synthesized workflows are completed by using the predicting part 2338.

FIG. 69 shows a prediction result of operation of the synthesized workflows until all synthesized workflows are completed. According to FIG. 69, the processing time of the synthesized workflows (b1), (c1), (d1), (e1), (f1), (d2), (e2) and (f2) does not reach the service level agreement. It is necessary to add computer resources in order to aim at achievement of the service level agreement.

Accordingly, the computer resource addition decision part 231B determines the business application 203 to which computer resources are to be added and the addition amount. The computer resource addition decision part 231B uses a concept of an expected waiting time improving amount. The expected waiting time improving amount is calculated as follows. First, value 1 is calculated by dividing the waiting time, which is a time from an execution request to each business application 203 by the synthesized workflow group not reaching the service level agreement to a start of execution, by the execution required time of the business application 203. Second, value 2 is calculated by multiplying value 1 by a execution waiting time interval improving amount of the business application 203 in case of having added the minimum unit of computer resources to the business application 203. Then, the expected waiting time improving amount is calculated by summing value 2 of all execution requests requested to each business application 203 by the workflow included in the synthesized workflow group specified in Step S372 of FIG. 10 for each of the business applications 203. And, the computer resource addition decision part 231B adds the minimum unit of computer resources to the business application 203 which is predicted to have the largest expected waiting time improving amount having been obtained.

FIG. 70 shows the expected waiting time improving amount of each of the business applications 203 calculated based on the prediction result. FIG. 70 shows the expected waiting time, improving amount of each business application 203 calculated based on the prediction result in order to obtain the business application 203 which is predicted to have the largest expected waiting time improving amount.

According to this FIG. 70, the third business application 2033 has the largest expected waiting time improving amount. Accordingly, in case of this example, the computer resource addition decision part 231B adds computer resources to the third business application 2033. As a result, the computer resources assigned to the third business application 2033 will be 60 units, and the processing required time of the application will become 12.5 seconds/case (refer to FIG. 13 and FIG. 14).

FIG. 71 shows the state of the synthesized workflows in a case where computer resources have been added first time. This figure will be described together with FIG. 65 and FIG. 67. The most suitable priority control result calculation part 229B acquires the operation prediction of the synthesized workflows in case of computer resources having been added first, by the same method as used at the time when the prediction result of FIG. 17 was obtained. FIG. 71 shows this result. For example, computer resources are added at the time 660. According to FIG. 71, the synthesized workflows (b1), (c1) and (f1) can achieve the service level agreement, but the synthesized workflows (d1), (e1), (d2), (e2) and (f2) have not been able to achieve the service level agreement yet. For this reason, the computer resource addition decision part 231B obtains the expected waiting time improving amount in order to select once again the business application 203 to which computer resources are to be added.

FIG. 72 shows the expected waiting time improving amount calculated to each business application 203 in a case where computer resources are to be added second time. According to this figure, the seventh business application 2037 has the largest expected waiting time improving amount. For this reason, the computer resource addition decision part 231B adds computer resources to the seventh business application 2037. As a result, the computer resources assigned to the seventh business application 2037 will be 50 units, and the processing required time of the application will become 13.333 seconds/case (refer to FIG. 13 and FIG. 14). By this condition, the most suitable priority control result calculation part 229B acquires the operation prediction of the synthesized workflows in case of computer resources having been added, by the same method as used at the time when the prediction result of FIG. 21 was obtained.

FIG. 73 shows the state of the synthesized workflows in a case where computer resources have been added second time. This figure will be described together with FIG. 65 and FIG. 67. For example, computer resources are added at the time 660. According to FIG. 73, the synthesized workflow (d2) can achieve the service level agreement, but the synthesized workflows (d1), (e1), (e2) and (f2) have not been able to achieve the service level agreement yet. For this reason, the computer resource addition decision part 231B obtains the expected waiting time improving amount in order to select once again the business application to 203 which computer resources are to be added.

FIG. 74 shows the expected waiting time improving amount calculated to each business application 203 in a case where computer resources are to be added third time. According to this figure, the third business application 2033 has the largest expected waiting time improving amount. For this reason, the computer resource addition decision part 231B adds computer resources to the third business application 2033. As a result, the computer resources assigned to the third business application 2033 will be 70 units, and the processing required time of the application will become 10.714 seconds/case (refer to FIG. 13 and FIG. 14).

FIG. 75 shows the state of the synthesized workflows in a case where computer resources have been added third time. The most suitable priority control result calculation part 229B acquires the operation prediction of the synthesized workflow in case of computer resources having been added, by the same method as used at the time when the prediction result of FIG. 23 was obtained. For example, computer resources are added at the time 660. According to FIG. 75, the synthesized workflow (d1) can achieve the service level agreement, but the synthesized workflows (e1), (e2) and (f2) have not been able to achieve the service level agreement yet. For this reason, the computer resource addition decision part 231B obtains the expected waiting time improving amount in order to select once again the business application 203 to which computer resources are to be added.

FIG. 76 shows the expected waiting time improving amount calculated to each business application 203 in a case where computer resources are to be added fourth time. According to this figure, the third business application 2033 has the largest expected waiting time improving amount. For this reason, the computer resource addition decision part 231B adds computer resources to the third business application 2033. As a result, the computer resources assigned to the third business application 2033 will be 80 units, and the processing required time of the application will become 9.375 seconds/case (refer to FIG. 13 and FIG. 14).

FIG. 77 shows the state of the synthesized workflows in a case where computer resources have been added fourth time. The most suitable priority control result calculation part 229B acquires the operation prediction of the synthesized workflow in case of computer resources having been added, by the same method as used at the time when the prediction result of FIG. 25 was obtained. For example, computer resources are added at the time 660. According to FIG. 77, the synthesized workflows (e1) and (f2) can achieve the service level agreement, but the synthesized workflow (e2) has not been able to achieve the service level agreement yet. For this reason, the computer resource addition decision part 231B obtains the expected waiting time improving amount in order to select once again the business application 203 to which computer resources are to be added.

FIG. 78 shows the expected waiting time improving amount calculated to each business application 203 in a case where computer resources are to be added fifth time. According to this Figure, the seventh business application 2037 has the largest expected waiting time improving amount. For this reason, the computer resource addition decision part 231B adds computer resources to the seventh business application 2037. As a result, the computer resources assigned to the seventh business application 2037 will be 60 units, and the processing required time of the application will become 13.333 seconds/case (refer to FIG. 13 and FIG. 14).

FIG. 79 shows the state of the synthesized workflows in a case where computer resources have been added fifth time. By the condition shown in FIG. 78, the most suitable priority control result calculation part 229B acquires the operation prediction of the synthesized workflows in case of computer resources having been added, by the same method as used at the time when the prediction result of FIG. 27 was obtained. FIG. 79 shows this result. For example, computer resources are added at the time 660. According to FIG. 79, the synthesized workflow (e2) can achieve the service level agreement, but the synthesized workflow (f2) has not been able to achieve the service level agreement yet. For this reason, the computer resource addition decision part 231B obtains the expected waiting time improving amount in order to select once again the business application 203 to which computer resources are to be added.

FIG. 80 shows the expected waiting time improving amount calculated to each business application in a case where computer resources are to be added sixth time. According to this figure, the seventh business application 2037 has the largest expected waiting time improving amount. For this reason, the computer resource addition decision part 231B adds computer resources to the seventh business application 2037. As a result, the computer resources assigned to the seventh business application 2037 will be 70 units, and the processing required time of the application will become 11.429 seconds/case.

FIG. 81 shows the state of the synthesized workflows in a case where computer resources have been added sixth time. By the condition shown in FIG. 80, the most suitable priority control result calculation part 229B acquires the operation prediction of the synthesized workflows in case of computer resources having been added, by the same method as used at the time when the prediction result of FIG. 29 was obtained. FIG. 81 shows this result. For example, computer resources are added at the time 660. According to FIG. 81, it is expected that all synthesized workflows can achieve the service level agreement by this condition.

When it becomes to be expected that all synthesized workflows can achieve the service level agreement by addition of computer resources as described above, the verification part 230B judges whether the priority control condition and the addition and reduction condition in the prediction mentioned above are different from the control information which was set in the previous time. In case of this example, because control was started at the time 660 for the first time, the verification part 230B judges that it is different from the control information which was set in the previous time, and the control signal transmission part 235 transmits the control information to the communication control system 207.

Figure 82:
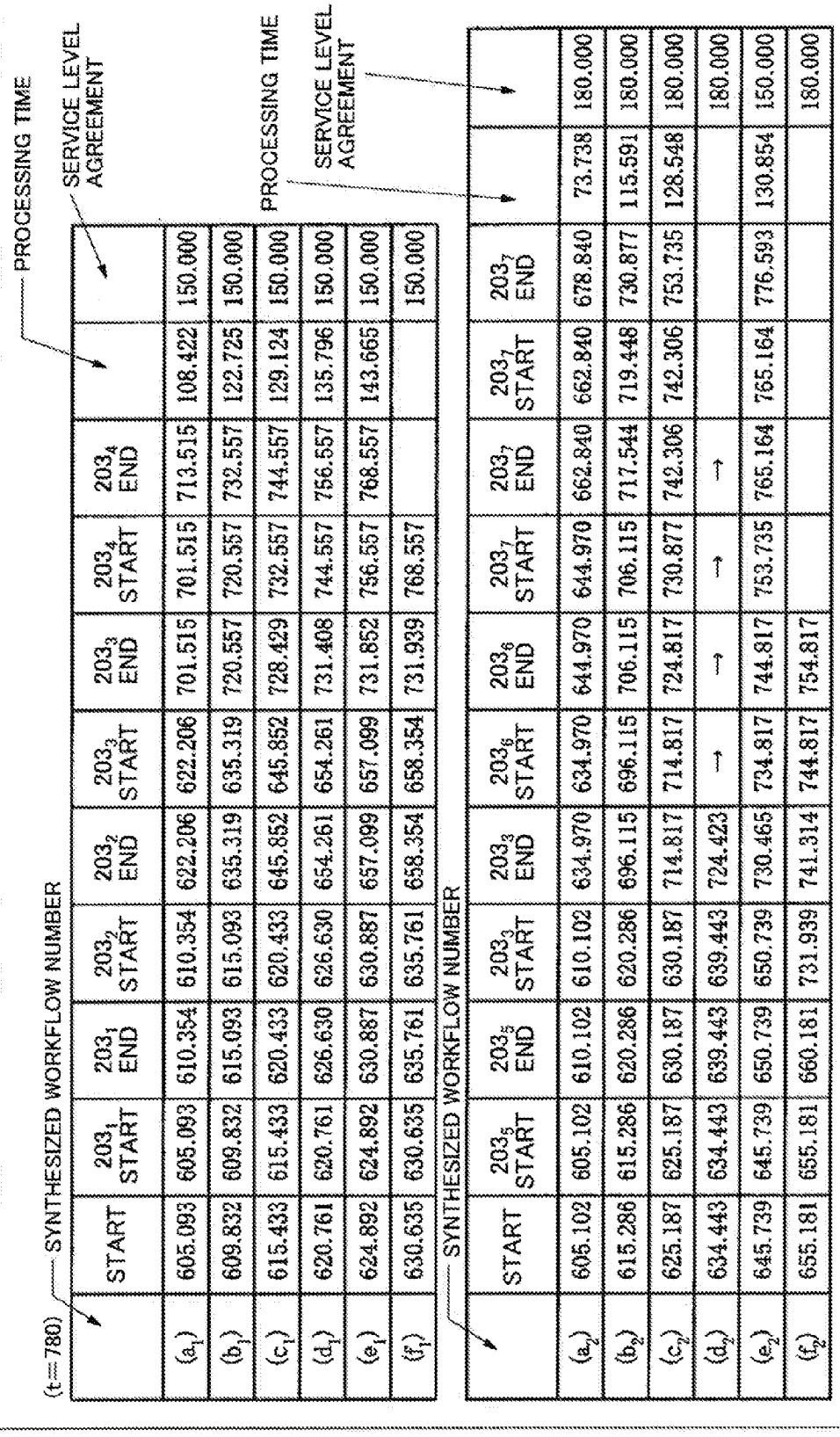
FIG. 82 is an explanation drawing showing the state of the synthesized workflows in a case where the activation control part restarted the state observation part at the time 780 according to the second modification example.

FIG. 82 shows the state of the synthesized workflows in a case where the activation control part 227 restarted the state observation part 228 at the time 780. When the activation control part 227 shown in FIG. 65 restarts the state observation part 228 at this time 720, the state observation part 228 acquires the state and the history information of the synthesized workflows shown in this FIG. 82. When comparing FIG. 82 with FIG. 81, processing of the synthesized workflow (d2) is different from the prediction result due to the conditional branch indicated in Step S13 of FIG. 67. In the synthesized workflows other than this, processing is progressing as the prediction result.

FIG. 83 shows the state of the synthesized workflows in a case where the future is predicted at time point of the time 780 in a similar way at time point of the time 660. As shown in this FIG. 83, in this case, it is expected that all synthesized workflows achieve the service level agreement. For this reason, new control is not performed.

Next, in this monitoring target, operation will be described in a case where the state of the synthesized workflows is different.

Figure 84:
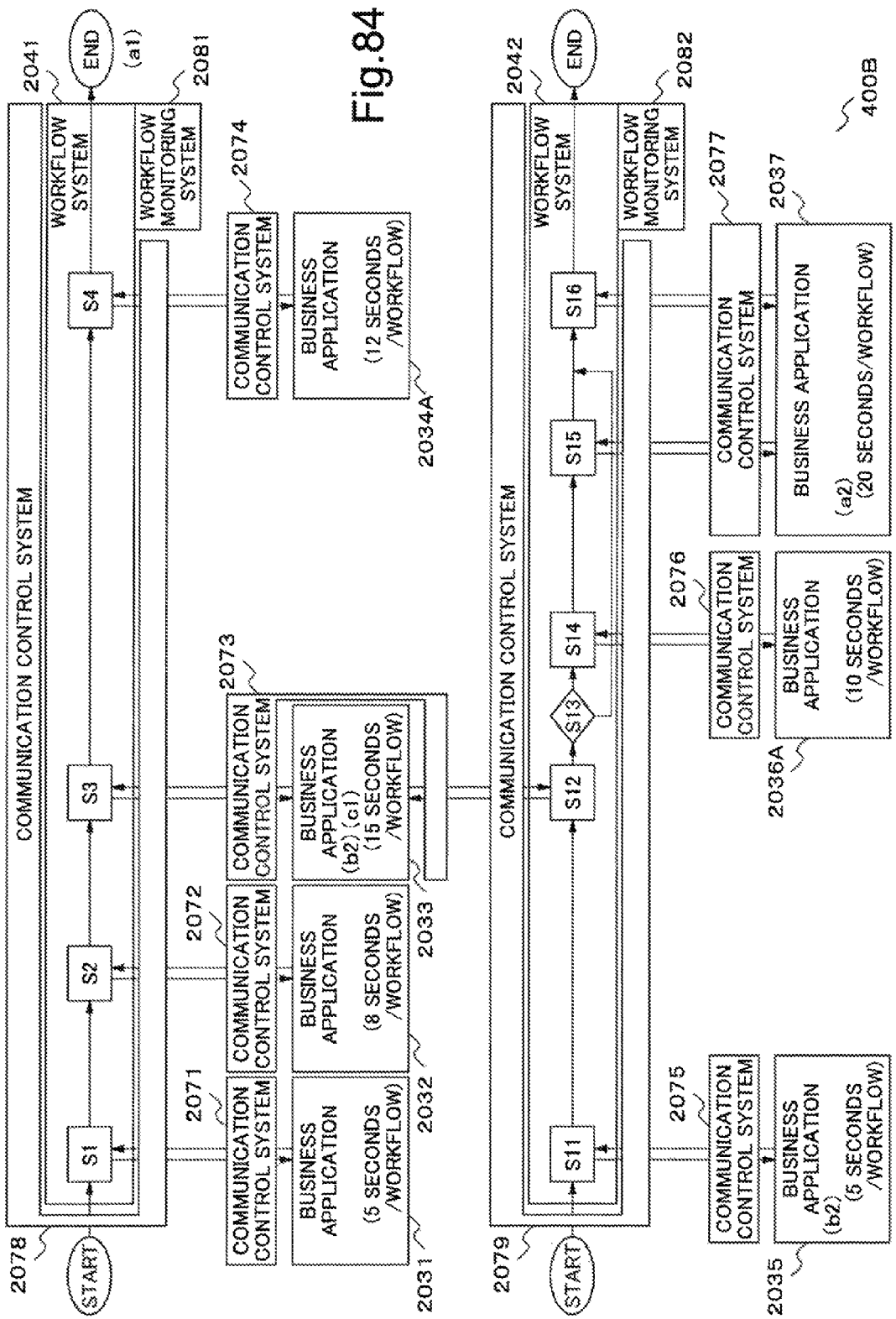
FIG. 84 is an explanation drawing showing the state of the synthesized workflows which are being executed at the time 660 according to the second modification example.

FIG. 84 shows the state of the synthesized workflows which are being executed at the time 660 when synthesized workflows have been executed since the time 0. Three synthesized workflows which are controlled by the first workflow system 2041 for their execution and two synthesized workflows which are controlled by the second workflow system 2042 for their execution are operating. At the time 660, the synthesized workflow (a1) has already completed its operation, and the synthesized workflows (b1) and (c1) are being executed in the third business application 2033. Further, the synthesized workflow (a2) is being executed in the seventh business application 2037, and the synthesized workflow (b2) is being executed in the fifth business application 2035. Three synthesized workflows in the first workflow system 2041 are required to complete within 150 seconds according to the given service level agreement. Further, two synthesized workflows in the second workflow system 2042 are required to complete within 180 seconds according to the given service level agreement.

FIG. 85 shows the state of the synthesized workflows which is acquired by the state observation part in a case where the activation control part started the state observation part for the first time at the time 660. This figure will be described together with FIG. 65. When the activation control part 227 starts the state observation part 228 for the first time at the time 660, the state observation part 228 acquires the state and the history information of the synthesized workflows as shown in this FIG. 85. At this time point, the information at the initial state of the control information holding part 246 (FIG. 6) is set to the control history storage DB 234 shown in FIG. 65. This is the information which directs the communication control system 207 or the like that the information transmitted by the control target is to be transmitted immediately, and the information to be received by the control target is to be transmitted immediately. The state observation part 228 inputs the state and the history information of the synthesized workflows shown in FIG. 85, and the information of the control history storage DB 234 to the most suitable priority control result calculation part 229B.

FIG. 86 shows the prediction of operation of the synthesized workflows until all synthesized workflows are completed, which was created by the most suitable priority control result calculation part 229B using the predicting part 233B. According to the prediction of operation of the synthesized workflows shown in FIG. 86 which is created by the most suitable priority control result calculation part 229B of FIG. 65 using the predicting part 233B, all synthesized workflows achieve the service level agreement with substantial excess.

For this reason, the computer resource reduction decision part 232B (FIG. 65) determines the business application 203 from which computer resources are to be reduced and the amount of reduction. The computer resource reduction decision part 232B adopts the method which reduces the minimum unit of computer resources from the business application 203 whose utilization ratio of the past fixed period is the smallest among the business applications 203 which are not used, in a period for which the prediction is performed, the synthesized workflow with the smallest margin to the service level agreement has predicted. Accordingly, the computer resource reduction decision part 232B (FIG. 65) obtains utilization ratio of business applications of the past fixed period from the synthesized workflows history.

FIG. 37 indicated before shows the utilization ratio of each business application 203 which is obtained by the computer resource reduction decision part 232B. When the result shown in this FIG. 37 is obtained, the business application with the lowest utilization ratio is the first business application 2031. Further, it is judged based on the synthesized workflow definition that the synthesized workflow (b1), which is a synthesized workflow with the smallest margin to the service level agreement, does not use the first business application 2031 after the time 660. For this reason, the computer resource reduction decision part 232B decides to reduce the minimum unit of computer resources from the first business application 2031. As a result, the amount of computer resources of the first business application 2031 is reduced, for example, reduced 10 units from the amount of computer resources shown in FIG. 14, and will be 10 units, and the processing required time of the first business application 2031 will become 10 seconds/case.

Next, the verification part 230B judges whether the priority control condition and the addition and reduction condition in the prediction are different from the control information which was set in the previous time. In this case, because control was started at the time 660 for the first time, the verification part 230B judges that it is different from the control information which was set in the previous time, and the control signal transmission part 235 transmits the control information to the communication control system 207.

<Third Modification Example of the Invention>

Figure 87:
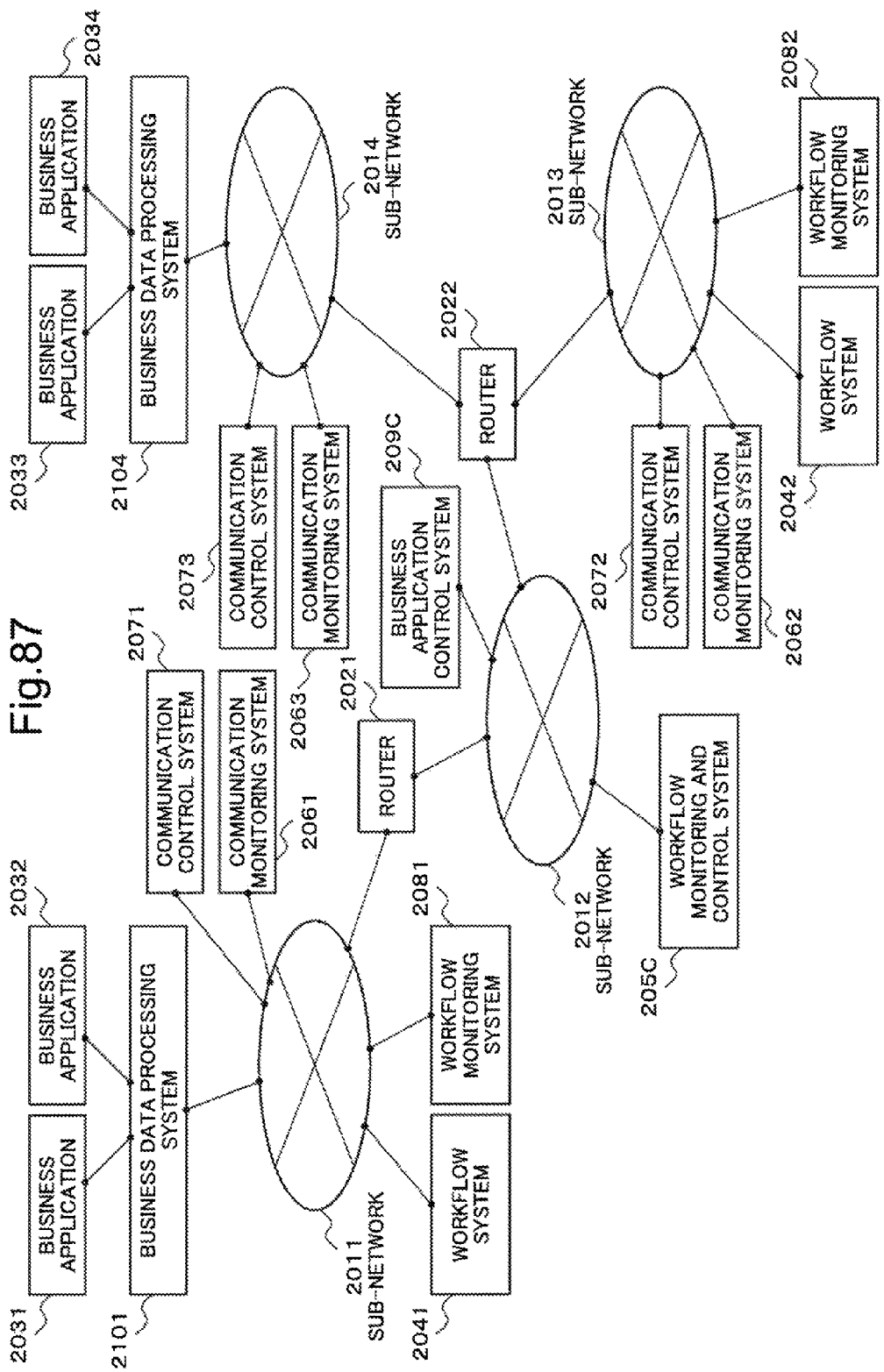
FIG. 87 is an explanation drawing showing a communication environment of a workflow monitoring and control system as a third modification example of the present invention.

FIG. 87 shows a communication environment of a workflow monitoring and control system 400C as a third modification example of the present invention. In FIG. 87, the same part as FIG. 4 is given an identical reference numeral, and the description is omitted appropriately.

In the communication environment shown in FIG. 87, there exists the computer resources used by the business applications 2031, 2032 or the like executed on the business data processing systems 2101, 2104 or the like and at least one business application control system 209C which controls the computer resources used by each of the business applications 2031, 2032. The business application control system 209C is connected to the second sub-network 2012 in an example shown in this figure. There also exists at least one workflow monitoring and control system 205C which monitors the business applications 2031, 2032 or the like and the workflow system 204. The workflow monitoring and control system 205C is connected to the second sub-network 2012.

In the second modification example of the present invention, time-shared control without priority was performed. In the third modification example of the present invention, time-shared control without priority at the normal time is performed, and when control is needed in relation to the service quality, priority control is performed among each of the business applications 2031, 2032 or the like.

Figure 88:
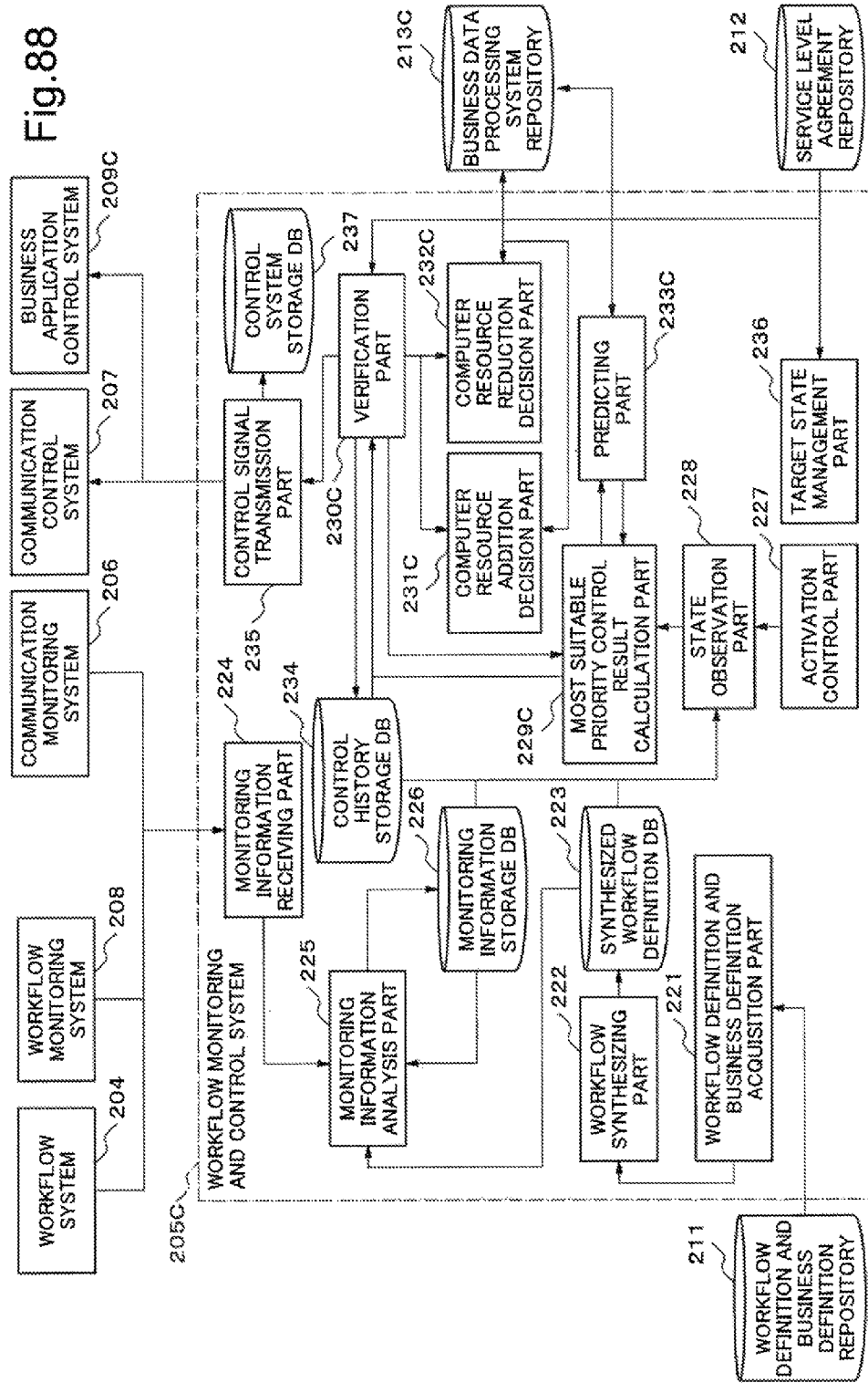
FIG. 88 is a system configuration drawing showing a primary part of the system configuration of the workflow monitoring and control system and its vicinities according to the third modification example.
Figure 103:
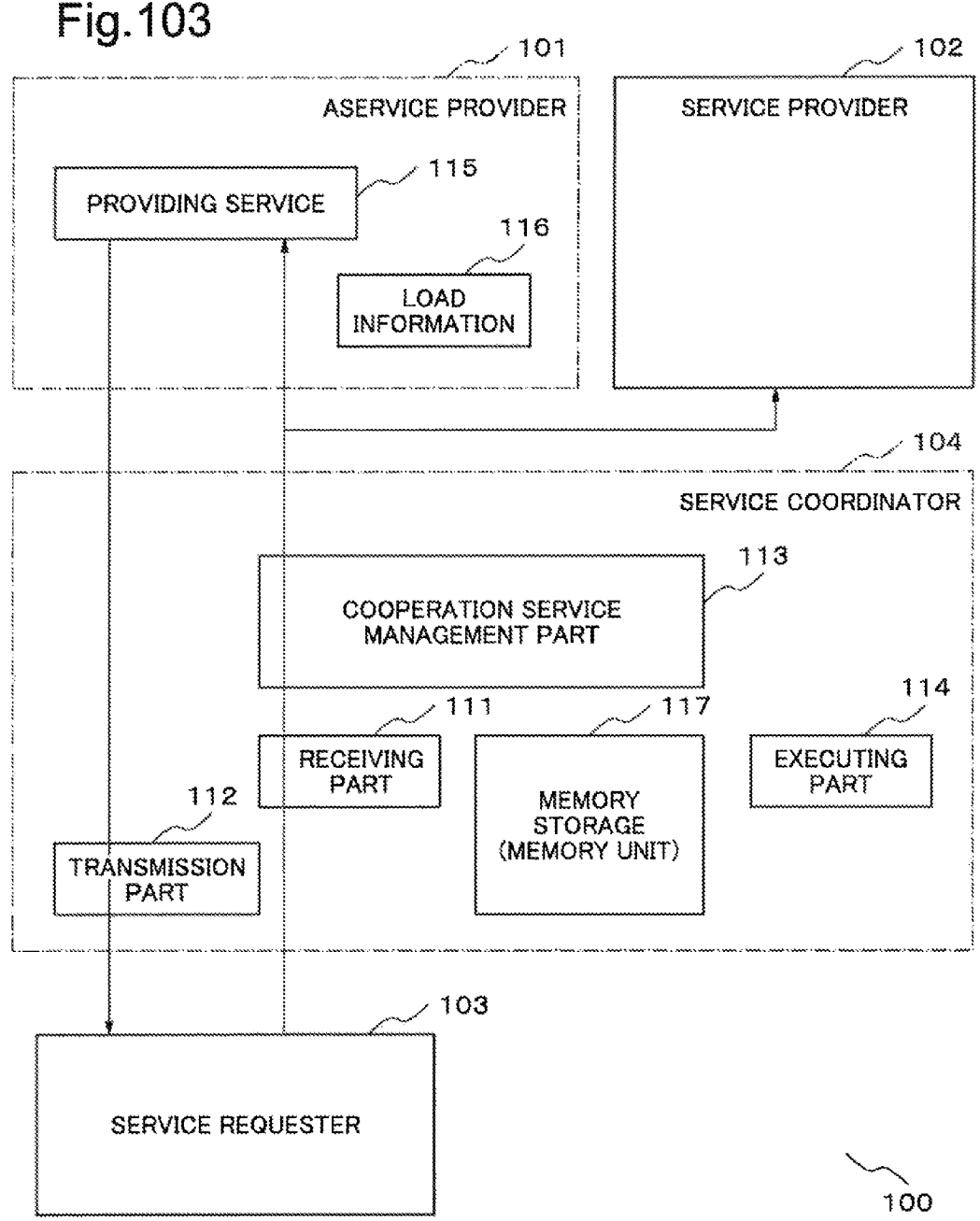
FIG. 103 is a system configuration drawing of a service control system according to the first related art of the present invention.
Figure 104:
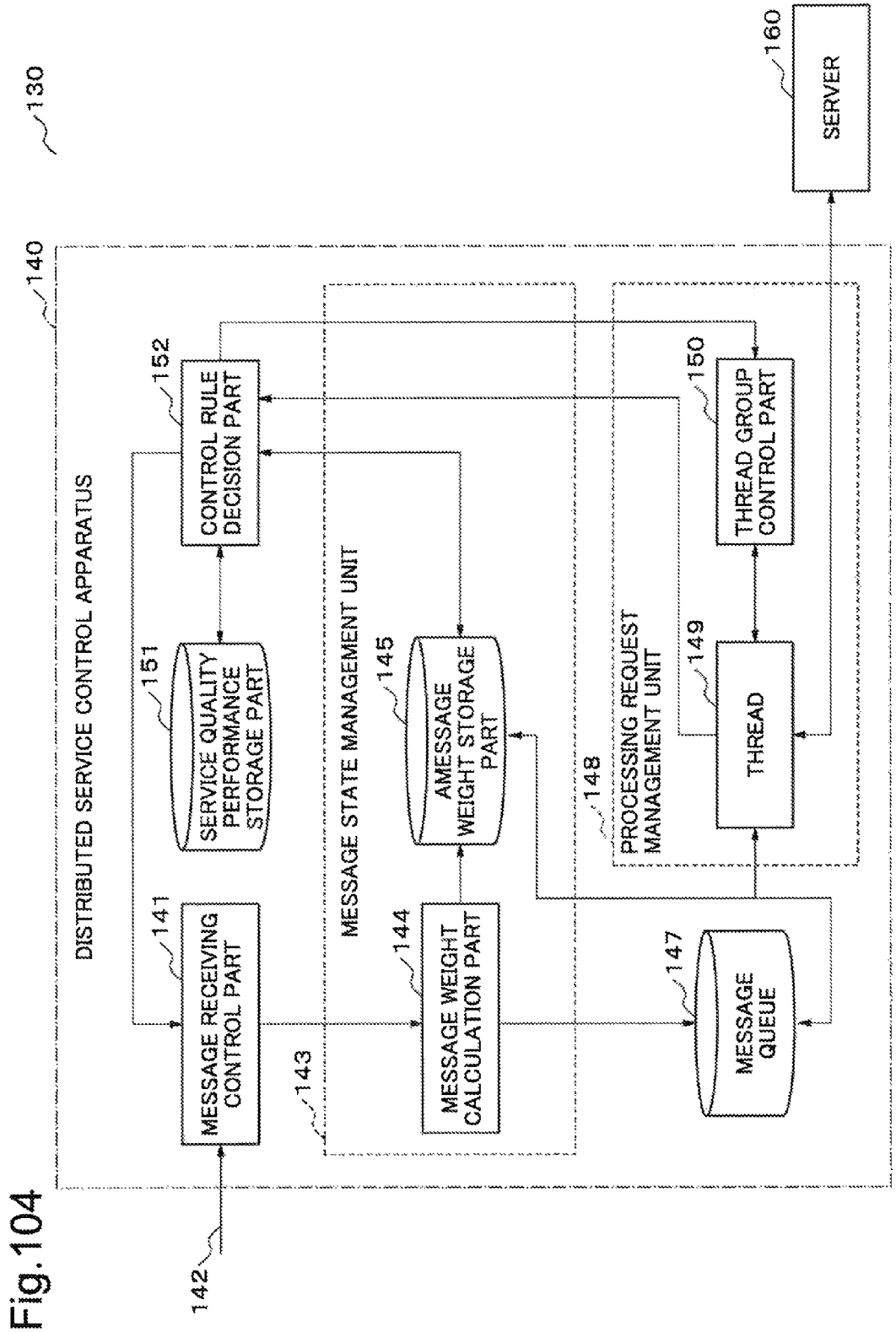
FIG. 104 is a system configuration drawing of a service control system according to the second related art of the present invention.

FIG. 88 shows a primary part of the system configuration of the workflow monitoring and control system 400C and its vicinities according to the third modification example. In FIG. 88, the same part as FIG. 5 is given an identical reference numeral, and the description is omitted appropriately.

In FIG. 88, the workflow monitoring and control system 205C includes a workflow definition and business definition acquisition part 221 which acquires a workflow definition and a business definition, a workflow synthesizing part 222 which analyzes a communication relation among a plurality of workflow definitions and business definitions and generates a synthesized workflow definition which a workflow definition and business definitions mutually communicating are synthesized, synthesized workflow definition DB (database) 223 which stores the synthesized workflow definitions, a monitoring information receiving part 224 which receives monitoring information from the workflow monitoring system 208 and the communication monitoring system 206, a monitoring information analysis part 225 which analyzes monitoring information by correlating with synthesized workflows definition, monitoring information storage DB (database) 226 which stores monitoring information, an activation control part 227 which transmits a start request periodically, a state observation part 228 which acquires the state of the synthesized workflows up to the present, a most suitable priority control result calculation part 229C which predicts operation of synthesized workflows when performing the most suitable control, a verification part 230C which verifies based on the prediction results whether the synthesized workflow is expected to achieve the service level agreement, a computer resource addition decision part 231C which calculates the amount of computer resources required for achieving the service level agreement, a computer resource reduction decision part 232C which calculates the reduction amount of computer resources which does not affect achievement of the service level agreement, a predicting part 233C which predicts a state of a synthesized workflow after a unit time based on a state of the synthesized workflows at a certain time, the allocation amount of computer resources to the business application control system 209C and process priorities, control history storage DB (database) 234 which stores past control histories, a control signal transmission part 235 which transmits a control signal to the communication control system 207, a target state management part 236 which holds the service level agreement, and control system storage DB (database) 237 which holds a mutual corresponding relationship among the communication control system 207. In FIG. 88, only one communication control system 207 is shown as a representative. When plural communication control systems 207 exist, the control system storage DB 237 holds a corresponding relationship among communication control systems 207.

In the third modification example, each system focusing on the workflow monitoring and control system 205C generally operates as follows. Operation of each system will be described together with FIG. 87 and FIG. 88.

In the workflow definition and business definition repository 211, the definition of workflow which is executed on the workflow system 204 of a monitoring control target and the definition of business application 203 which is executed on the business data processing system 210 are stored in advance. Also, in the service level agreement repository 212, the service level agreement set for the workflow system 204 of a monitoring control target and the business application 203 is stored in advance. Here, the service level agreement is an example of a lower limit which can be permitted to the service quality mentioned above. In the business data processing system repository 213C, deployment information of the business data processing system 210 to which the business application 203 can be deployed, performance characteristics information of the business data processing system 210, deployment information of the business application 203 in the business data processing system 210, and information of amount of computer resources allocated to the business application 203 are stored.

The workflow definition and business definition acquisition part 221 acquires workflow definitions and business definitions from the workflow definition and business definition repository 211 before execution of the workflow system 204 and the business application 203. The workflow synthesizing part 222 creates a synthesized workflow definition from the acquired workflow definitions and business definitions and stores in the synthesized workflow definition DB223. Further, the target state management part 236 acquires the service level agreement information from the service level agreement repository 212 and holds.

When the workflow system 204 and the business application 203 operate, the workflow monitoring system 208 and the communication monitoring system 206 detect progress of business data processing and occurrence of communication, and notify the monitoring information receiving part 224. The received monitoring information is analyzed by correlating with the synthesized workflow definitions in the monitoring information analysis part 225, and is stored in the monitoring information storage DB 226.

In parallel with this, the activation control part 227 transmits a start request to the state observation part 228 periodically. The state observation part 228 correlates the monitoring information stored in the monitoring information storage DB 226 with the synthesized workflow definitions stored in the synthesized workflow DB 223, and creates a state and the history information of the synthesized workflows which are currently being executed and the statistics information of the synthesized workflows which were executed in the past. Moreover, the state observation part 228 acquires the present control condition from the control history storage DB 234. The state observation part 228 inputs the state and the history information of the synthesized workflows which are currently being executed, the statistics information of the synthesized workflows which were executed in the past and the present control condition to the most suitable priority control result calculation part 229C.

The most suitable priority control result calculation part 229C predicts the future state, based on the inputted information, in a case where the most suitable priority control was supposed to be performed to the synthesized workflows which are currently being executed. The predicting part 233C performs this prediction using the allocation information of computer resources to the business application 203 and process priority stored in the business data processing system repository 213C. The most suitable priority control result calculation part 229C outputs the prediction result to the verification part 230C. Further, the service quality calculation part 14 shown in FIG. 1 calculates the service quality expected at the time of the completion of business data processing of each of the workflows. The calculation result is an example of the prediction result in this third modification example.

The verification part 230C compares the prediction result with the target state management part 236 and judges the target achievement state. The quality insufficiency judging part 15 shown in FIG. 1 is an example of the verification part 230C in the third modification example, and when the service quality of any of workflows is lower than a lower limit of the service quality at the time of the completion of the business data processing, this is discriminated. As a result, the verification part 230C stores the control information in the control history storage DB 234 if the prediction result is proper, transmits the validity of the prediction result to the communication control system 207 and the business application control system 209C by the control signal transmission part 235 and ends. If the prediction result does not achieve the service level agreement, the verification part 230C notifies the computer resource addition decision part 231C of the input and output of the most suitable priority control result calculation part 229C.

The computer resource addition decision part 231C creates a plan for adding computer resources to an appropriate business application 203 with reference to the received input and output of the most suitable priority control result calculation part 229C, and sets it to the business data processing system repository 213D. When the quality insufficiency judging part 15 shown in FIG. 1 judges that the service quality of a certain workflow is lower than the lower limit, the computer resource reallocation part 16 shown in FIG. 1 reallocates the amount of computer resources among a plurality of processing sections in order to correct a situation where the service quality of the certain workflow is lower than the lower limit. This processing is an example of creation of the plan for adding computer resources in the third modification example. The most suitable priority control result calculation part 229C inputs the state and the history information of the synthesized workflows which are currently being executed and the statistics information of the synthesized workflows which were executed in the past, and predicts the future state in a case where the most suitable priority control is performed to the synthesized workflows once again.

The verification part 230C notifies the computer resource reduction decision part 232C of the input and output of the most suitable priority control result calculation part 229C in case of judging that this prediction result achieves the service level agreement with great excess. The computer resource reduction decision part 232C creates a plan for appropriately reducing computer resources, by reducing the number of business application execution parts 501, having been allocated to the business applications 203 with reference to the received input and output of the most suitable priority control result calculation part 229C, and sets it to the business data processing system repository 213C. The most suitable priority control result calculation part 229C inputs the state and the history information of the synthesized workflows which are currently being executed and the statistics information of the synthesized workflows which were executed in the past, and predicts the state of the future in a case where the most suitable priority control was supposed to be performed to the synthesized workflows once again.

FIG. 66 outlines an overall processing operation of the workflow monitoring and control system according to the second modification example. This figure can also be used for the third modification example. Same also applies to FIG. 8 and FIG. 9.

FIG. 10 shows processing of the computer resource addition decision part 231, and FIG. 11 shows processing of the computer resource reduction decision part 232. These figures can also be used for the third modification. Further, these figures indicate each of operation examples of the computer resource addition decision part 231C and the computer resource reduction decision part 232C. Operation of the computer resource addition decision part 231C and the computer resource reduction decision part 232C varies depending on the contents of the monitoring control target and the service level agreement and the characteristics of the business data processing system. These figures will be described together with FIG. 88 and FIG. 6.

First, the computer resource addition decision part 231C acquires, from the verification part 230C, the prediction results in the most suitable priority control result calculation part 229C including the expected state of the synthesized workflows at the time that execution of all synthesized workflows has been completed and the history information until it has reached at this state, and the information of the target state management part 236 which was used for judgment of the prediction result by the verification part 230C (step S371:Y of FIG. 10). And, the computer resource addition decision part 231C specifies a synthesized workflow group which cannot achieve the service level agreement based on the inputted information (Step S372).

Next, the computer resource addition decision part 231C determines the business application 203 to which computer resources are to be added and the addition amount (Step S373). An example of this decision method is the method which adds the minimum unit of computer resources to the business application 203 which is predicted to have the largest total time of the time which is obtained by subtracting the shortest time required for executing the business application 203 from the time which is a time from a request of execution to each business application 203 by the synthesized workflow group specified in Step S372 to a completion of the execution. Also, this decision method may be the method by the following way. First, it obtains value 1 by dividing the time, which subtracts the shortest time required for executing the business application 203 from the time which is a time from a request of execution to each business application 203 by the synthesized workflow group specified in Step S372 to a completion of the execution, by the execution required time of the business application 203. Second, it obtains value 2 by multiplying value 1 by the execution required time improving amount of the business application 203 in case of having added the minimum unit of computer resources to the business application 203. Third, it obtains value 3 by summing value 2 of all execution requests requested to each business application 203 by the workflow included in the synthesized workflow group specified in Step S372 for each of the business applications 203. Finally, the minimum unit of computer resources is added to the business application 203 which is predicted to have the largest value 3.

When having determined the business application 203 to which computer resources are to be added and the addition amount as described above (Step S373), the computer resource addition decision part 231C stores the state after the obtained computer resources having been added to the obtained business application 203, in the business data processing system repository 213C (Step S374). The computer resource addition decision part 231C ends the processing in this way (end).

FIG. 11 indicated before shows operation of the computer resource reduction decision part. This figure will be described together with FIG. 88.

The computer resource reduction decision part 232C acquires, from the verification part 230C, the prediction results in the most suitable priority control result calculation part 229C including the expected state of the synthesized workflows at the time that execution of all synthesized workflows has been completed and the history information until it has reached at this state, and the information of the target state management part 236 which was used for judgment of the prediction result by the verification part 230C (step S391: Y).

Next, the computer resource reduction decision part 232C specifies the synthesized workflow having the smallest margin to the service level agreement based on this inputted information (Step S392). And, the business application 203 from which computer resources are to be reduced and the reduction amount are determined from a view point as achievement of the service level agreement to the synthesized workflows other than this specified synthesized workflow (Step S393). An example of this decision method is the method which reduces the minimum unit of computer resources from the business application 203 having the shortest waiting time among the business applications 203 which are not used, in a period for which the prediction is performed, by the synthesized workflow specified in step S392. Also, this decision method may be the method which reduces the minimum unit of computer resources from the business application 203 having the smallest utilization ratio of the past fixed period among the business applications 203 which are not used, in a period for which the prediction is performed, by the synthesized workflow specified in step S392.

When having determined the business application 203 from which computer resources are to be reduced and the reduction amount in Step S393 as described above, the computer resource reduction decision part 232C stores the state after the obtained computer resources having been reduced from the obtained business application 203, in the business data processing system repository 213C (Step S394). The computer resource reduction decision part 232C ends the processing in this way (end). With respect to reduction of computer resources, it is not the indispensable condition to specify the synthesized workflow having the smallest margin to the service level agreement first (FIG. 11, step S392). The reduction of computer resources is also possible by the technique other than this.

FIG. 12 can be use for the third modification example. The service level agreement is set in the workflow definition of the workflow shown in FIG. 12. In the synthesized workflow definition focusing on one workflow definition existing in the first workflow system 2041, the service level agreement which requests to complete processing within 150 seconds is set. Also, in the synthesized workflow definition focusing on one workflow definition existing in the second workflow system 2042, two of the service level agreements are defined depending on a user of the synthesized workflow definition. Specifically, for example, the service level agreement which requests to complete processing received from a part of users within 150 seconds and to complete processing received from the other users within 180 seconds is set. Such service level agreements are stored in the service level agreement repository 212 (FIG. 88). Thus, the service quality according to the degree of each user's demand for the service can be achieved by setting a service level agreement for each of a plurality of users.

In the workflow execution system 400C (not shown in figure) of the third modification example, the first workflow monitoring system 2081 targets at the first workflow system 2041 for monitoring, and the second workflow monitoring system 2082 targets at the second workflow system 2042 for monitoring.

In the initial state, the control information holding part 246 (refer to FIG. 6) of each of the communication control systems 2071-2079 holds the setting information which directs that each of the communication control systems 2071-2079 immediately transmits the information transmitted by the respective control targets. Further, the control information holding part 246 holds the setting information which directs that each of the communication control systems 2071-2079 immediately transmits the information to be received by the respective control targets. The control information holding part 246 holds the setting information which directs that the business application 203 performs every processing in the same priority. Moreover, communication among the first and the second workflow systems 2041, 2042 and the first to the seventh business applications 2031-2037 is monitored by the communication monitoring system 206. The information which decides these monitoring targets and control targets is stored in the control system storage DB 237 (FIG. 88).

Further, the state where the verification part 230C (FIG. 88) judges that "a prediction result achieves the service level agreement with great excess" means, for example, the state that all synthesized workflows are completed in a time of less than ⅔ of time defined by the service level agreement.

The activation control part 227 (FIG. 88) is set to start the state observation part 228 (FIG. 88) every 60 seconds. Further, the predicting part 233C (FIG. 88) is set to obtain the state of 0.1 seconds later of the state of the inputted synthesized workflow.

FIG. 67 in the second modification example can be used as it is for a figure to the a monitoring target of the third modification example which shows the state of the workflow monitoring and control system at the time 660 when synthesized workflows have been executed since the time 0. Accordingly, description of this figure is omitted.

FIG. 89 shows one example of the state and the history information of the synthesized workflows acquired when the activation control part has started the state observation part for the first time. This figure will be described together with FIG. 88 and FIG. 67.

When the activation control part 227 starts the state observation part 228 for the first time at the time 660, the state observation part 228 acquires the state and the history information of the synthesized workflows as shown in FIG. 89.

At this time point, the information of the initial state of the control information holding part 246 (FIG. 6), which directs to transmit immediately the information transmitted by the control target, immediately transmits the information to be received by the control target, and to perform every processing with the same priority by the business application 203, is set in the control history storage DB 234. The state observation part 228 inputs the state and the history information of the synthesized workflows as shown in FIG. 89, and the information of the control history storage DB 234 to the most suitable priority control result calculation part 229C.

The most suitable priority control result calculation part 229C creates the prediction of operation of the synthesized workflows until all synthesized workflows are completed by using the predicting part 233C. The workflow monitoring and control system 205C controls the completion order and the completion time of the processes which are already being executed, by controlling the priorities of the processes belonging to the synthesized workflows which are being executed in any of business applications 203 at the time 660.

FIG. 90 shows a prediction result in case of only this most suitable priority control. According to FIG. 90, the processing time of two synthesized workflows (e2) and (f2) does not reach the service level agreement. It is necessary to add computer resources in order to aim at achievement of the service level agreement.

Accordingly, the computer resource addition decision part 231C determines the business application 203 to which computer resources are to be added and the addition amount. The computer resource addition decision part 231C uses a concept of an expected waiting time improving amount. The expected waiting time improving amount is calculated as follows. First, value 1 is calculated by dividing the waiting time, which is a time from an execution request to each business application 203 by the synthesized workflow group not reaching the service level agreement to a start of execution, by the execution required time of the business application 203. Second, value 2 is calculated by multiplying value 1 by a execution waiting time interval improving amount of the business application 203 in case of having added the minimum unit of computer resources to the business application 203. Then, the expected waiting time improving amount is calculated by summing value 2 of all execution requests requested to each business application 203 by the workflow included in the synthesized workflow group specified in Step S372 of FIG. 10 for each of the business applications 203. And, the computer resource addition decision part 231C adds the minimum unit of computer resources to the business application 203 which is predicted to have the largest expected waiting time improving amount having been obtained.

FIG. 91 shows the expected waiting time improving amount of each of the business applications 203 calculated based on the prediction result. This FIG. 91 shows the expected waiting time improving amount of each business application 203 calculated based on the prediction result in order to obtain the business application 203 which is predicted to have the largest expected waiting time improving amount.

According to this FIG. 91, the third business application 2033 has the largest expected waiting time improving amount. Accordingly, in case of this example, the computer resource addition decision part 231C adds computer resources to the third business application 2033. As a result, the computer resources assigned to the third business application 2033 will be 60 units, and the processing required time of the application will become 12.5 seconds/case (refer to FIG. 13 and FIG. 14).

FIG. 92 shows the state of the synthesized workflows in a case where computer resources have been added first time. This figure will be described together with FIG. 88 and FIG. 67.

The most suitable priority control result calculation part 229C acquires the operation prediction of the synthesized workflow in case of computer resources having been added first, by the same method as used at the time when the prediction result of FIG. 17 was obtained. FIG. 92 shows this result. Here, for example, computer resources are added at the time 660. According to FIG. 92, the synthesized workflows (e2) and (f2) have not been able to achieve the service level agreement yet. For this reason, the computer resource addition decision part 231C obtains the expected waiting time improving amount in order to select once again the business application to which computer resources are to be added.

FIG. 93 shows the expected waiting time improving amount calculated to each business application in a case where computer resources are to be added second time. According to this FIG. 93, the third business application 2033 has the largest expected waiting time improving amount. For this reason, the computer resource addition decision part 231C adds computer resources to the third business application 2033. As a result, the computer resources assigned to the third business application 2033 will be 70 units, and the processing required time of the application will become 10.714 seconds/case (refer to FIG. 13 and FIG. 14).

By this condition, the most suitable priority control result calculation part 229C acquires the operation prediction of the synthesized workflows in case of computer resources having been added, by the same method as used at the time when the prediction result of FIG. 21 was obtained.

FIG. 94 shows the state of the synthesized workflows in a case where computer resources have been added second time. Here, it is supposed that computer resources are added at, the time 660. According to this FIG. 94, the synthesized workflows (e2) and (f2) have not been able to achieve the service level agreement yet. For this reason, the computer resource addition decision part 231C obtains the expected waiting time improving amount in order to select once again the business application 203 to which computer resources are to be added.

FIG. 95 shows the expected waiting time improving amount calculated to each business application 203 in a case where computer resources are to be added third time. According to this figure, the seventh business application 2037 has the largest expected waiting time improving amount. For this reason, the computer resource addition decision part 231C adds computer resources to the seventh business application 2037. As a result, the computer resources assigned to the seventh business application 2037 will be 50 units, and the processing required time of the application will become 16 seconds/case (refer to FIG. 13 and FIG. 14).

By this condition, the most suitable priority control result calculation part 229C acquires the operation prediction of the synthesized workflows in case of computer resources having been added, by the same method as used at the time when the prediction result of FIG. 23 was obtained.

FIG. 96 shows the state of the synthesized workflows in a case where computer resources have been added third time. Here, it is supposed that computer resources are added at the time 660. According to this FIG. 96, the synthesized workflow (e2) can achieve the service level agreement, but the synthesized workflow (f2) has not been able to achieve the service level agreement yet. For this reason, the computer resource addition decision part 231C obtains the expected waiting time improving amount in order to select once again the business application to which computer resources are to be added.

FIG. 97 shows the expected waiting time improving amount calculated to each business application 203 in a case where computer resources are to be added fourth time. According to this FIG. 97, the seventh business application 2037 has the largest expected waiting time improving amount. For this reason, the computer resource addition decision part 231C adds computer resources to the third business application 2037. As a result, the computer resources assigned to the seventh business application 2037 will be 60 units, and the processing required time of the application will become 13.333 seconds/case.

By this condition, the most suitable priority control result calculation part 229C acquires the operation prediction of the synthesized workflows in case of computer resources having been added, by the same method as used at the time when the prediction result of FIG. 25 was obtained.

FIG. 98 shows the state of the synthesized workflows in a case where computer resources have been added fourth time. Here, for example, computer resources are added at the time 660. According to FIG. 98, it is expected that all synthesized workflows can achieve the service level agreement by this condition.

When it becomes to be expected that all synthesized workflows can achieve the service level agreement by addition of computer resources as described above, the verification part 230C judges whether the priority control condition and the addition and reduction condition in the prediction mentioned above are different from the control information which was set in the previous time. In case of this example, because control was started at the time 660 for the first time, the verification part 230C judges that it is different from the control information which was set in the previous time, and the control signal transmission part 235 transmits the control information to the communication control system 207.

FIG. 99 shows the state of the synthesized workflows in a case where the activation control part 227 restarted the state observation part 228 at the time 720. When the activation control part 227 shown in FIG. 88 restarts the state observation part 228 at this time 720, the state observation part 228 acquires the state and the history information of the synthesized workflows shown in this FIG. 99. When comparing FIG. 99 with FIG. 98, processing of the synthesized workflow (d2) is different from the prediction result due to the conditional branch indicated in Step S13 of FIG. 67. In the synthesized workflows other than this, processing is progressing as the prediction result.

FIG. 100 shows the state of the synthesized workflows in a case where the future is predicted at time point of the time 720 in a similar way at time point of the time 660. As shown in this FIG. 100, in this case, it is expected that all synthesized workflows achieve the service level agreement. For this reason, new control is not performed.

Next, in this monitoring target, operation will be described in a case where the state of the synthesized workflows is different.

FIG. 84 can be used as it is for a figure of the third modification example which shows the state of the synthesized workflows which are being executed at the time 660 when the synthesized workflows have been executed since the time 0. That is, there existing three synthesized workflows which are controlled by the first workflow system 2041 for their execution and two synthesized workflows which are controlled by the second workflow system 2042 for their execution. At the time 660, the synthesized workflow (a1) has already completed its operation, and the synthesized workflows (b1) and (c1) are being executed in the third business application 2033. Further, the synthesized workflow (a2) is being executed in the seventh business application 2037, and the synthesized workflow (b2) is being executed in the fifth business application 2035. Three synthesized workflows in the first workflow system 2041 are required to complete within 150 seconds according to the given service level agreement. Further, two synthesized workflows in the second workflow system 2042 are required to complete within 180 seconds according to the given service level agreement.

FIG. 101 shows the state of the synthesized workflows acquired by the state observation part in a case where the activation control part started the state observation part for the first time at the time 660. This figure will be described together with FIG. 88. When the activation control part 227 starts the state observation part 228 for the first time at the time 660, the state observation part 228 acquires the state and the history information of the synthesized workflows as shown in this FIG. 101. At this time point, the information at the initial state of the control information holding part 246 (FIG. 6) is set to the control history storage DB 234 shown in FIG. 88. This is the information which specifies the communication control system 207 or the like that the information transmitted by the control target is to be transmitted immediately, the information to be received by the control target is to be transmitted immediately, and the priorities of processing for the business applications are all the same. The state observation part 228 inputs the state and the history information of the synthesized workflows shown in FIG. 101, and the information of the control history storage DB 234 to the most suitable priority control result calculation part 229C.

FIG. 102 shows the prediction of operation of the synthesized workflows until all synthesized workflows are completed, which was created by the most suitable priority control result calculation part 2290 using the predicting part 233C. According to the prediction of operation of the synthesized workflows shown in FIG. 102 which is created by the most suitable priority control result calculation part 229C of FIG. 88 using the predicting part 233C, all synthesized workflows achieve the service level agreement with substantial excess.

For this reason, the computer resource reduction decision part 232C (FIG. 88) determines the business application 203 from which computer resources are to be reduced and the amount of reduction. The verification part 230C adopts the method which reduces the minimum unit of computer resources from the business application 203 whose utilization ratio of the past fixed period is the smallest among the business applications 203 which are not used in a period, for which the prediction is performed, by the synthesized workflow with the smallest margin to the service level agreement. Accordingly, the computer resource reduction decision part 232C (FIG. 88) obtains utilization ratio of business applications of the past fixed period from the synthesized workflows history.

FIG. 37 shows the utilization ratio of each business application which is obtained by the computer resource reduction decision part 232C. When the result shown in this FIG. 37 is obtained, the business application with the lowest utilization ratio is the first business application 2031. Further, it is judged based on the synthesized workflow definition that the synthesized workflow (b1), which is a synthesized workflow with the smallest margin to the service level agreement, does not use the first business application 2031 after the time 660. For this reason, the computer resource reduction decision part 232C decides to reduce the minimum unit of computer resources from the first business application 2031. As a result, the amount of computer resources of the first business application 2031 is reduced, for example, reduced 10 units from the amount of computer resources shown in FIG. 14, and will be 10 units, and the processing required time of the first business application 2031 will become 10 seconds/case.

Next, the verification part 230C judges whether the priority control condition and the addition and reduction condition in the prediction are different from the control information which was set in the previous time. In this case, because control was started at the time 660 for the first time, the verification part 230C judges that it is different from the control information which was set in the previous time, and the control signal transmission part 235 transmits the control information to the communication control system 207.

FIELD OF INDUSTRIAL APPLICATION

The present invention can apply to the various uses such as a control apparatus of workflows and a program for realizing workflow control in a computer. Further, the present invention can also apply to the use such as improving utilization efficiency of an information providing apparatus. Moreover, the present invention can also apply to the use such as reducing computer resources used by the information providing apparatus.

While this invention has been particularly shown and described with reference to exemplary embodiments (and operation examples) thereof, the invention is not limited to those specific exemplary embodiments (and operation examples). It will be understood by those of ordinary skill in the art that various changes in form and details may be made therein without departing from the spirit and scope of the present invention.

This application is based upon and claims the benefit of priority from Japanese Patent Application No. 2009-119120, filed on May 15, 2009, the disclosure of which is incorporated herein in its entirety by reference.

The invention claimed is:

1. A workflow monitoring and control system comprising:
a plurality of processing computers each of which executes a unit process assigned respectively, a unit process being one of parts constituting business data processing, by using business application software and computer resources, and
a workflow monitoring and control computer which comprises:
a workflow defining part which sets a workflow definition which defines an execution order of the unit processes for each of a plurality of workflows, each of which is a business data processing request;
a service quality lower limit setting part which sets a lower limit of an acceptable service quality for each workflow, the service quality being a quality of the workflow whose unit processes have been executed by the plurality of processing computers according to the workflow definition set by the workflow defining part;
a service quality calculation part which calculates service quality for each workflow, by
calculating for each processing computer, processing time between an arrival and a completion of processing of a workflow at the processing computer, according to a processing time when the processing computer only processes the workflow and a way the processing computer handles a resource competition among the plurality of the workflows, and
accumulating a plurality of the calculated processing times of the processing computers required for each workflow;
a quality insufficiency judging part which judges if the service quality calculated by the service quality calculation part for any workflow is lower than the lower limit for the workflow; and
a computer resource reallocation part which changes an amount of the allocated computer resources for one of the plurality of the processing computers, when the quality insufficiency judging part judges the service quality of a workflow is lower than the lower limit, in order to correct a situation where the service quality of the workflow is lower than the lower limit for the workflow.

2. The workflow monitoring and control system according to claim 1, wherein the computer resource reallocation part comprises,
a computer resource management part which manages reserved computer resources which are used in neither of the plurality of the processing computers;
a waiting time adjusting part which adjusts a waiting time, which is a time from arrival of each of the workflows at any of the plurality of the processing to a start of a unit process in the processing computer, in order to maximize a number of workflows whose service quality is not lower than the lower limit; and
a computer resource addition part which adds an amount of computer resources to the plurality of the processing computers in a range of computer resources managed by the computer resource management part when the quality insufficiency judging part judges that there exists a workflow whose service quality is lower than the lower limit.

3. The workflow monitoring and control system according to claim 2, wherein the service quality calculation part includes a table which shows a required time from start to completion of a unit process in a processing computers for each of a plurality of amounts of computer resources for each of the plurality of the processing computers, and the computer resource addition part determines the processing computer to which computer resources are to be added and the addition amount by use of the table.

4. The workflow monitoring and control system according to claim 1, wherein the computer resource reallocation part comprises,
a computer resource reduction part which reduces, when there exists a workflow whose service quality exceeds the lower limit, an amount of computer resources in any of a plurality of the processing computers which have executed the workflow.

5. The workflow monitoring and control system according to claim 4, wherein the service quality calculation part includes a table which shows a required time from start to completion of the unit process in a processing computer for each of a plurality of amounts of computer resources for each of the plurality of processing computers, and the computer resource reduction part determines the processing computer from which computer resources are to be reduced and the reduction amount by use of the table.

6. The workflow monitoring and control system according to claim 1, wherein the service quality calculation part calculates a start time and a completion time of a unit process in each of the plurality of the processing computers for each of the workflows.

7. The workflow monitoring and control system according to claim 1, wherein the computer resource reallocation part reallocates computer resources by increasing and decreasing the number of business application execution parts which execute business application software in any of the plurality of the processing computers.

8. The workflow monitoring and control system according to claim 1, wherein each of the plurality of the processing computers starts processing workflows sequentially selecting a workflow having the highest priority.

9. The workflow monitoring and control system according to claim 1, wherein each of the plurality of the processing computers processes a plurality of workflows with a first priority in a time sharing manner.

10. A workflow monitoring and control system connected to a plurality of processing computers each of which executes a unit process assigned respectively, a unit process being one of parts constituting business data processing, by using business application software and computer resources, comprising:
a workflow defining means for setting a workflow definition which defines an execution order of the unit processes for each workflow, which is a business data processing request;
a service quality lower limit setting means for setting a lower limit of an acceptable service quality for each workflow, the service quality being a quality of the workflow whose unit processes have been executed by the plurality of processing computers according to the workflow definition set by the workflow defining means;

a service quality calculation means for calculating service quality for each workflow, under a condition where computer resources allocated to each of the plurality of the processing computers are fixed as they are, by calculating for each processing computer, processing time between an arrival and a completion of processing of a workflow at the processing computer, according to processing time when the processing computer only processes the workflow and a way the processing computers handles a resource competition among a plurality of the workflows, and accumulating a plurality of the calculated processing times of the processing computers required for each workflow;

a quality insufficiency judging means for judging if the service quality calculated by the service quality calculation means for any workflow is lower than the lower limit for the workflow; and a computer resource reallocation means for changing an amount of the allocated computer resources for one of the plurality of the processing computers, when the quality insufficiency judging means judges the service quality of a workflow is lower than the lower limit, in order to correct a situation where the service quality of the workflow is lower than the lower limit for the workflow.

11. A workflow monitoring and control method for executing workflows, each of which is a request for business data processing, by passing the workflow through each of a plurality of processing computers in a predetermined order, the processing computer inputting the workflow, and executing a unit process assigned respectively, a unit process being one of parts constituting the business data processing, by using business application software and computer resources, the method comprising:

calculating service quality for each workflow at a completion time of the business data processing, under a condition where computer resources allocated to each of the plurality of processing computers are fixed as they are, by calculating for each processing computer, processing time between an arrival and a completion of processing of the workflow at the processing computer, according to processing time when the processing computer only processes the workflow and a way the processing computer handles resource competition among a plurality of the workflows, and accumulating a plurality of the calculated processing times of the processing computers required for each workflow;

judging if the service quality for any workflow is lower than a lower limit which is defined corresponding to each workflow; and changing an amount of the allocated computer resources for one of the plurality of processing computers, when judging the service quality for any workflow is lower than the lower limit, in order to correct a situation where the service quality of the workflow is lower than the lower limit for the workflow.

12. The workflow monitoring and control method according to claim 11, wherein the method is characterized by:

adjusting a waiting time, which is a time from arrival of each of the workflows at any of the plurality of the processing to a start of a unit process in the processing computer in order to maximize the number of workflows whose service quality is not lower than the lower limit; and adding the amount of computer resources to be used in the plurality of the processing computers in the range of predetermined reserved computer resources when judging that there exists a workflow whose service quality is lower than the lower limit even after having adjusted the waiting time.

13. A non-transient computer-readable recording medium which stores a workflow monitoring and control program which causes a computer, which makes a workflow, which is a request for business data processing, executed by passing the workflow through each of a plurality of processing computers in a predetermined order, the processing computer inputting the workflow, and executing a unit process assigned respectively, a unit process being one of parts constituting the business data processing, by using business application software and computer resources, to execute processing of:

service quality calculation processing for calculating service quality for each workflow at a completion time of the business data processing, under a condition where computer resources allocated to each of the plurality of processing computers are fixed as they are, by calculating for each processing computer, processing time between an arrival and a completion of processing of a workflow at the processing computer, according to processing time when the processing computer only processes the workflow and a way the processing computer handles a resource competition among a plurality of workflows, and accumulating a plurality of the calculated processing times of the processing computers required for each workflow;

quality insufficiency judging processing for judging if the service quality for any workflow is lower than a lower limit which is defined corresponding to each workflow; and computer resource reallocation processing for changing an amount of the allocated computer resources for one of the plurality of processing computers, when judging the service quality for any workflow is lower than the lower limit, in order to correct a situation where the service quality of the workflow is lower than the lower limit for the workflow.

14. The non-transient computer-readable recording medium according to claim 13. which stores the workflow monitoring and control program, wherein the program is characterized by causing the computer to execute processing of:

waiting time adjusting processing for adjusting a waiting time, which is a time from arrival of each of the workflows at any of the plurality of processing computers to a start of a unit process in the processing computer in order to maximize the number of workflows whose service quality is not lower than the lower limit; and computer resource addition processing for adding the amount of computer resources to be used in the plurality of processing computers in the range of predetermined reserved computer resources when judging that there exists a workflow whose service quality is lower than the lower limit even after having adjusted the waiting time.

* * * * *